United States Patent [19]

Shapiro et al.

[11] Patent Number: 5,089,810
[45] Date of Patent: Feb. 18, 1992

[54] STACKED DISPLAY PANEL CONSTRUCTION AND METHOD OF MAKING SAME

[75] Inventors: Leonid Shapiro, Lakeside; William K. Bohannon; Randall Farwell, both of San Diego, all of Calif.

[73] Assignee: Computer Accessories Corporation, San Diego, Calif.

[21] Appl. No.: 506,621

[22] Filed: Apr. 9, 1990

Related U.S. Application Data

[63] Continuation-in-part of Ser. No. 506,429, Apr. 9, 1990, which is a continuation-in-part of Ser. No. 472,688, Jan. 30, 1990, which is a continuation-in-part of Ser. No. 222,144, Jul. 21, 1988, abandoned.

[51] Int. Cl.$^5$ .................. G09G 5/02; G09G 3/36; G09G 3/00; G02F 1/1347
[52] U.S. Cl. .................. 340/701; 340/784; 340/793; 359/53; 359/63; 359/55
[58] Field of Search .............. 358/169, 170, 171, 236, 358/164, 31, 32; 340/784, 793, 811, 812; 350/332, 335, 336

[56] References Cited

U.S. PATENT DOCUMENTS

| | | | |
|---|---|---|---|
| 3,703,329 | 11/1972 | Castellano . | |
| 3,785,721 | 1/1974 | Harsch . | |
| 3,811,751 | 5/1974 | Myer . | |
| 3,863,246 | 1/1975 | Treka et al. . | |
| 4,006,968 | 2/1977 | Ernstoff et al. . | |
| 4,044,546 | 8/1977 | Koike . | |
| 4,068,926 | 1/1978 | Nakamura et al. . | |
| 4,097,128 | 6/1978 | Matsumoto et al. | 350/335 |
| 4,097,130 | 6/1978 | Cole, Jr. | 350/335 |
| 4,127,322 | 11/1978 | Jacobson et al. . | |
| 4,171,874 | 10/1979 | Bigelow et al. . | |
| 4,232,948 | 11/1980 | Shanks . | |
| 4,241,339 | 12/1980 | Ushiyama . | |
| 4,251,137 | 2/1981 | Knop et al. . | |
| 4,257,682 | 3/1981 | Suzuki et al. . | |
| 4,299,447 | 11/1981 | Soltan et al. . | |
| 4,349,817 | 9/1982 | Hoffman et al. . | |
| 4,366,440 | 12/1982 | Olsen et al. | 358/169 |
| 4,394,069 | 7/1983 | Kaye . | |
| 4,411,496 | 10/1983 | Nonomura et al. | 350/332 |
| 4,416,514 | 11/1983 | Plummer | 350/335 |
| 4,443,065 | 4/1984 | Funada et al. . | |
| 4,487,481 | 12/1984 | Suzawa . | |
| 4,547,043 | 10/1985 | Penz . | |
| 4,597,636 | 7/1986 | Hoshikawa . | |

(List continued on next page.)

FOREIGN PATENT DOCUMENTS

| | | |
|---|---|---|
| 110296 | 8/1975 | Japan . |
| 159415 | 12/1980 | Japan . |
| 121076 | 9/1981 | Japan . |
| 140320 | 11/1981 | Japan . |
| 224376 | 12/1983 | Japan . |
| 189317 | 10/1984 | Japan . |
| 219719 | 12/1984 | Japan . |
| 100725 | 5/1986 | Japan . |
| 125328 | 6/1987 | Japan . |
| 164024 | 7/1987 | Japan . |
| 49736 | 3/1988 | Japan . |
| 144326 | 6/1988 | Japan . |
| 195624 | 8/1988 | Japan . |
| 234225 | 9/1988 | Japan . |
| 264731 | 11/1988 | Japan . |
| 44417 | 2/1989 | Japan . |

OTHER PUBLICATIONS

G. H. Heilmer and L. A. Zanoni, "Guest Host Interactions in Nematic Liquid Crystals, a New Electro-Optic Effect", Aug. 1, 1968, Applied Physics Letter, vol. 13, No. 3, p. 91, 92.

Primary Examiner—Alvin E. Oberley
Assistant Examiner—Steven J. Saras
Attorney, Agent, or Firm—Bernard L. Kleinke; William P. Waters; Jerry R. Potts

[57] ABSTRACT

A new display panel system includes a stacked display panel and drive units therefor. The drive units include a computer for adjusting for the individual gamma characerics of each one of the display panels for color balancing purposes and for causing the luminance of each panel to be maximized, or at least greatly increased for each intensity level or shading of each color.

19 Claims, 10 Drawing Sheets

U.S. PATENT DOCUMENTS

| | | |
|---|---|---|
| 4,608,558 | 8/1986 | Amstutz et al. . |
| 4,613,207 | 9/1986 | Fergason . |
| 4,634,229 | 1/1987 | Amstatuz et al. . |
| 4,651,148 | 3/1987 | Takeda et al. ........ 340/811 |
| 4,652,101 | 3/1987 | Grunwald . |
| 4,659,183 | 4/1987 | Suzawa . |
| 4,663,667 | 5/1987 | Shenk ........ 358/169 |
| 4,671,634 | 6/1987 | Kizaki et al. . |
| 4,697,884 | 10/1987 | Amstutz et al. . |
| 4,722,593 | 2/1988 | Shimazaki . |
| 4,723,840 | 2/1988 | Humbert et al. . |
| 4,726,663 | 2/1988 | Buzak . |
| 4,734,692 | 3/1988 | Hosono et al. ........ 340/784 |
| 4,745,406 | 5/1988 | Hayashi et al. . |
| 4,756,604 | 7/1988 | Nakatsuka et al. . |
| 4,758,818 | 7/1988 | Vatne . |
| 4,759,612 | 7/1988 | Nakatsuka et al. . |
| 4,770,500 | 9/1988 | Kalmanash et al. ........ 350/335 |
| 4,770,525 | 9/1988 | Umeda et al. . |
| 4,796,978 | 1/1989 | Tanaka et al. . |
| 4,812,034 | 3/1989 | Mochizuki et al. . |
| 4,813,770 | 3/1989 | Clerc . |
| 4,832,461 | 5/1989 | Yamagishi et al. . |
| 4,838,655 | 6/1989 | Hunahata et al. ........ 350/335 |
| 4,850,681 | 7/1989 | Yamanobe et al. . |
| 4,921,334 | 5/1990 | Akodes ........ 358/236 |

OTHER PUBLICATIONS

Donald L. White and Gary N. Taylor, "New Absorptive Mode Reflective Liquid-Crystal Display Device", Nov. 1974, Journal of Appl. Physics, vol. 45, No. 11, pp. 4718-23.

Masao Kawacki et al., "Light Scattering Characteristics in Nematic-Cholesteric Mixtures with Positive Dielectric Anistropy", Jul. 1978, Japan Journal of Appl. Physics, pp. 1245-1250.

Tatsuo Uchida et al., "Bright Dichroic Guest-Host LCD's Without a Polarizer", 1981 Proceeding of the SID, vol. 22/1, pp. 41-46.

K. Sato, "Novel Multicolored Liquid Crystal Display without Color Fitter", 1989 Japan Display, pp. 392-395.

C. Lijima et al., "640×400 Pixels Multicolor STN-LCD Using Birefringence Effect", 1989 Japan Display, pp. 300-302.

B. Lyot, "Compes Rendus", 1933, vol. 197, pp. 1592-1595.

Mitsuo Nagatu and Hiroshi Wada, "Neutralized Supertwisted Nematic LCD: Principle and Characteristics", Nov. 1988, The Transactions of the IEICE, vol. E71, No. 11, pp. 1080-1085.

Y. Kotani et al., "Effect of Various Parameters on Matrix Display Characteristics of SBE Liquid Crystal Cells", Japan Display 1986, pp. 384-386.

G. Assouline et al., "Two Color Liquid Crystal Display", Nov. 18, 1971, Electronics Letters, vol. 7, No. 23, pp. 699-700.

Tatsuo Uchida, "Multicolored Liquid Crystal Display", May/June 1984, Optical Engineering, vol. 23, No. 3, pp. 247-252.

M. F. Schiekel and K. Fahrenschom, "Deformation of Nematic Liquid Crystals with Vertical Orientation in Electrical Fields", Appl. Phys. Letter, vol. 19, No. 10 (1971), pp. 391-393.

Y. Yamagishi et al., "A Multicolored Nematic Cholesteric Liquid Crystal", 1988 IEEE CH-2678-1/88/00-00-0204, pp. 204-207.

A. Mochizuki, "New Nematic-Cholesteric LCD Using Hysteresis Behavior", 1985 Proceedings of the SID, vol. 26/4, pp. 243-248.

Uchida, "Color LCD's: Technological Developments", Japan Display, 1983, pp. 202-205.

Yamagishi, "A Multicolor Projection Display Using Nematic-Cholesteric Liquid Crystal", CH-26-78-1/88/0000-0204 $1.00 1988 IEEE.

Y. Takahashi et al., "The Effect of Various Parameters on TN-LCDs", Paper presented at the Eighth International Liquid Crystal Conference, Tokyo, Japan, Jun. 30-Jul. 4, 1980, pp. 491/171 through 501/181.

K. Kinugawa et al., "640×400 Pixel LCD Using Highly Twisted Birefringence Effect with Low Pretilt Angle", SID 86 Digest, pp. 122-125.

T. J. Scheffer et al., "24×80 Character LCD Panel Using the Supertwisted Birefringence Effect", SID 85 Digest, pp. 120-123.

S. Chandrasekhar et al., "Theory of Birefringence of Nematic Liquid Crystals", pp. 291-315.

STACKED DISPLAY PANEL CONSTRUCTION AND METHOD OF MAKING SAME

CROSS REFERENCED TO RELATED APPLICATIONS

This is a continuation-in-part of U.S. patent application Ser. No. 07/506,429 filed Apr. 9, 1990 entitled "STACKED DISPLAY PANEL CONSTRUCTION AND METHOD OF MAKING SAME" which is a continuation-in-part of U.S. patent application Ser. No. 07/472,688 filed Jan. 30, 1990, entitled "LIQUID CRYSTAL DISPLAY PANEL SYSTEM AND METHOD OF USING SAME", which is a continuation-in-part of U.S. patent application Ser. No. 07/222,144 filed July 21, 1988, now abandoned, entitled "GRAY SCALE SYSTEM FOR VISUAL DISPLAYS". The foregoing patent applications are incorporated herein by reference.

DESCRIPTION

1. Technical Field

The present invention relates, in general, to a stacked display panel system and a method of making it, in an improved manner. More particularly, the present invention relates to a stacked liquid crystal display panel system and method of making it, to improve the quality of the light images produced thereby.

2. Background Art

Large screen projection displays have been in demand for use in meetings, education, and for public announcement. Such systems are typically used in brightly lighted locations such as offices, airport lobbies and other public places. Thus, a bright screen with multicolored images is very important.

To satisfy the demand for such display systems, several types of liquid crystal display panel systems have been proposed. Such systems, however, have typically been limited in the number of different colors produced, or have exhibited poor contrast ratios. Such limitations result from various factors. For example, the physical and electrical characteristics of the individual liquid crystal display panel assemblies for producing colors, typically vary in actual production.

In a stacked display panel construction, a series of display panels and associated polarizers or filters are arranged along an optical path. The relative luminance of the individual panels is also effected by the order in which the panel assemblies are disposed within a stacked arrangement; i.e., a panel disposed more closely to the light source generally exhibits greater light transmittance characteristics as compared to a panel which is disposed more remotely from the light source along the common optical path because of the induced heating by the light source.

Another problem with conventional liquid crystal display panel systems is that the light transmission characteristics of the individual panels in a stacked panel arrangement, also vary in actual production. Consequently, the contrast levels of a multiple number of panels arranged along an optical path, does not follow in a linear manner, thereby resulting in color distortion.

Not only do the abstract values differ from panel to panel in a stacked configuration where each panel is responsible for a portion of the visible color spectrum, but also the excitation or gamma curves (applied voltage versus relative luminance) for each panel vary widely in significant manners. Accordingly, even if the panels could somehow be matched at one intensity or shading level, it would be difficult, if not impossible, to cause the contrast levels of the stacked panel arrangement to be balanced from one panel to the next, in a stacked panel arrangement.

Because typical liquid crystal display panel exhibits a hysteresis effect as a function of the applied voltage, different hues or shades of color can be produced by multiplexing the individual pixels or by applying incremented voltage steps between the excited and unexcited states of the panel. While such a technique may produce colors with multiple hues, it has been difficult, if not impossible, for such panel systems to produce a large number of different colors with multiple shading levels, because the relative luminance between the different colored panel assemblies varies to such a great extent.

For example, in U.S. Pat. No. 4,416,514, there is disclosed a liquid crystal color filter, which includes a set of differently colored dichroic polarizers interposed with an equal number of voltage responsive twisted nematic liquid crystal cells, and a neutral polarizer. Each of the above described elements are arranged along an optical path in a predetermined manner for modifying the spectral content of visible light incident to the filter to produce any one of eight predetermined colors. Shades of the predetermined colors are achieved by varying the voltage applied to the individual liquid crystal cells.

While the above described patented system may produce a full colored display image, it was limited to only an eight color system, since it would be difficult, if not impossible, to balance the filter colors for different hues on a pixel by pixel basis, as the light transmission characteristics of each of the liquid crystal display panels vary slightly, due to manufacturing inconsistencies between like panels and due to the physical and electrical characteristics of the panels. Thus, color balancing for the entire unit is generally unsatisfactory for some applications. More particularly, if the generating voltage levels are varied by same amount for each panel, each panel will have a different amount of relative luminance, thereby resulting in a distortion of the resulting colored image on a pixel by pixel image basis.

SUMMARY OF THE INVENTION

Therefore, the principal object of the present invention is to provide a new and improved display panel system, and a method of making it, to produce improved light image characteristics, and yet be able to manufacture such a system according to modern mass production techniques.

Another object of the present invention is to provide such a new and improved display panel system, and a method of making it, wherein the system includes a stacked display panel construction, and wherein the display panel stages or assembles are balanced optically from assembly to assembly.

Briefly, the above and further objects are realized by providing a new and improved display panel system.

A new display panel system includes a stacked display panel and drive units therefor. The drive units include a computer for adjusting for the individual gamma characteristics of each one of the display panels for color balancing purposes and for causing the luminance of each panel to be maximized, or at least greatly increased for each intensity level or shading of each color.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
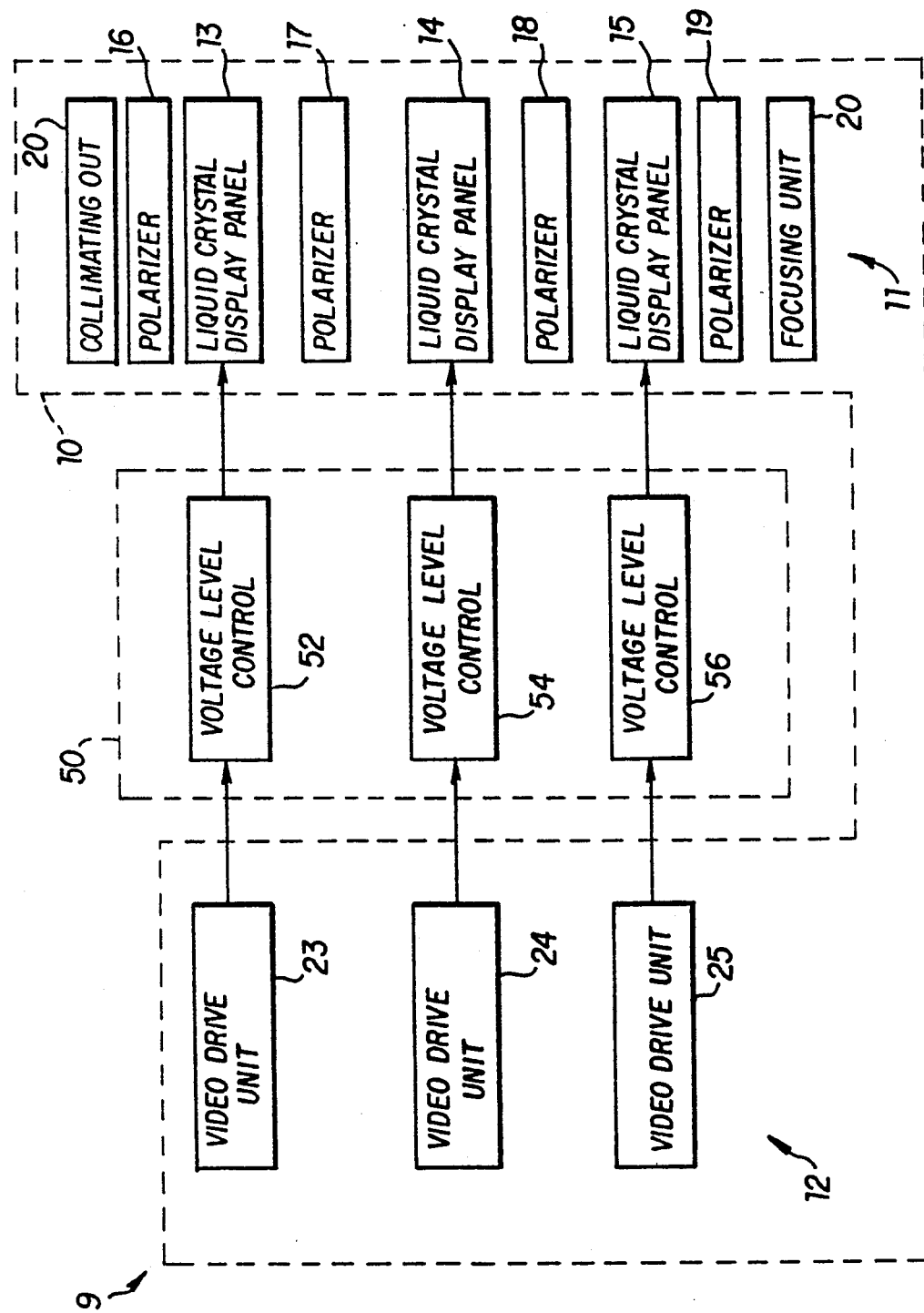
FIG. 1 is a block diagram of a display panel system, which is constructed in accordance with the present invention.

Referring now to FIG. 1, there is shown display panel system 9, which is constructed in accordance with the present invention, and which produces multicolored display images.

The display panel system 9 generally comprises a liquid crystal display panel assembly 10, which includes a liquid crystal display panel construction, shown generally at 11 and a video processing unit 12 which are more fully described in copending U.S. patent application Ser. No. 07/506,429 filed concurrently herewith and foregoing mentioned U.S. patent application Ser. No. 07/472,668 which are incorporated herein by reference.

The panel construction 11 includes a set of nematic liquid crystal display panels 13, 14, and 15 which are disposed along a common optical path, which includes a collimating unit 20 and focusing unit 21 for directing light along the common optical path. The panel construction 11 also includes a set of spaced apart polarizers 16, 17, 18, and 19 which are also interleaved with, and optically aligned with the display panels 13, 14, and 15 along the common optical path. The display panels may also be highly twisted or supertwist, active matrix, liquid crystal display panels.

The gamma curve adjustment system 10 generally comprises a linearization network 50 having a set of voltage level control circuits 52, 54, and 56 connected to the respective ones of the display panels 13, 14, and 15, for adjusting the initial direct current voltage applied to each one of the respective liquid crystal display panels to utilize substantially the full gamma curve characteristic for each respective panels, as will be explained hereinafter in greater detail. The linearization network 50 also tracks or follows the respective gamma curves characteristic for each one of the panels 13, 14, and 15, to permit the contrast level of the panel assembly 11 to be adjusted, without color distortion as will be explained hereinafter in greater detail.

Each of the voltage level control circuits 52, 54, and 56 is coupled between the individual liquid crystal display panels 13, 14, and 15 respectively, and a set of associated video drive units 23, 24, and 25 respectively. The drive units 23, 24, and 25 form part of the video processing unit 12. Each of the video drive units 23, 24, and 25 are also coupled to their respective liquid crystal display panels 13, 14, and 15 by suitable means (not shown), and are more fully described in the foregoing mentioned copending U.S. patent application Ser. No. 07/472,668.

Each one of the liquid crystal display panels is used for a different color, and exhibits a different relative luminance as a function of the voltage applied to the respective liquid crystal display panels, such as panels 13, 14, and 15.

Figure 4:
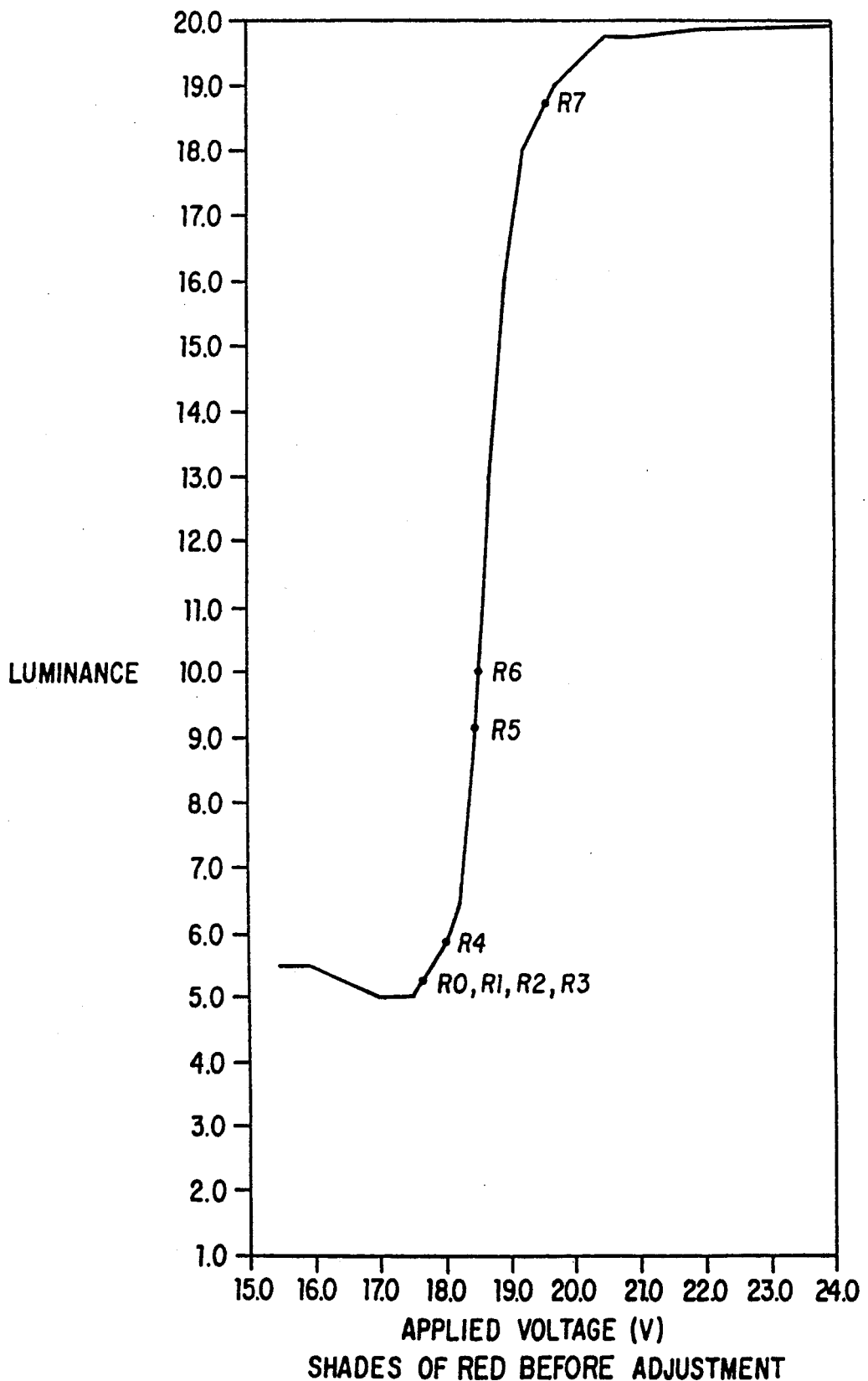
FIGS. 4–10 are graphs useful in the understanding of the present invention.
Figure 5:
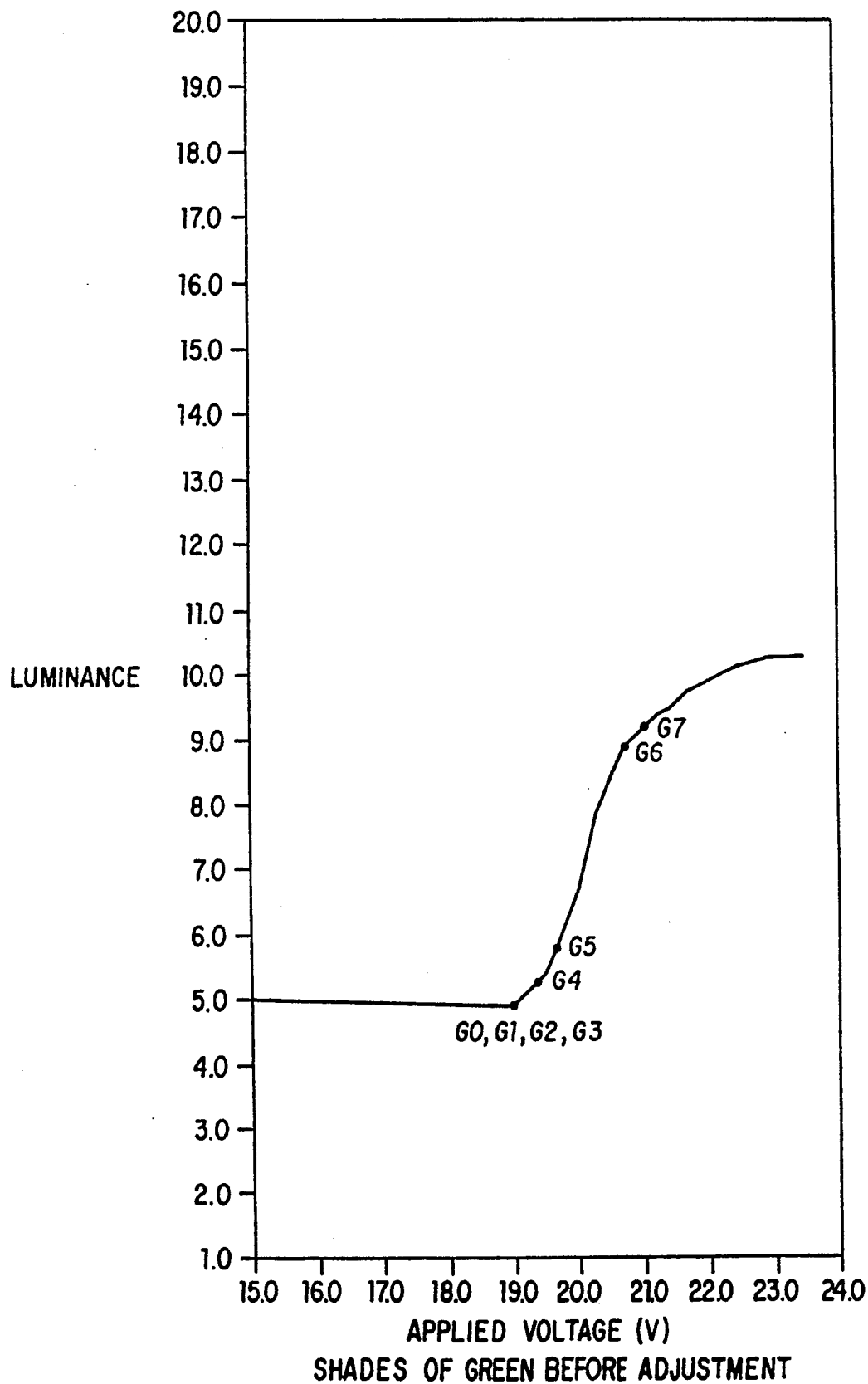
Figure 6:
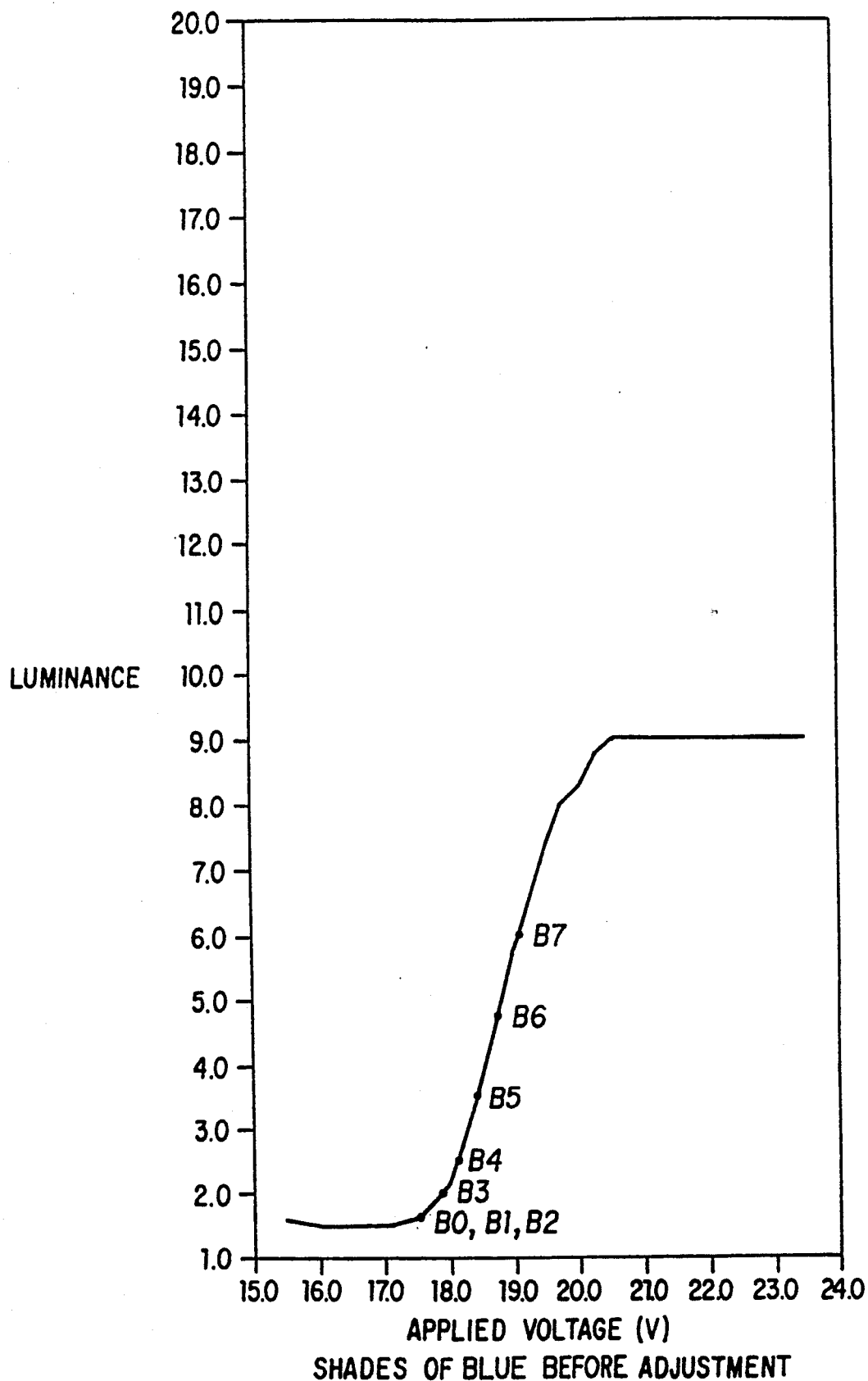

FIGS. 4, 5, and 6 show three typical gamma curves 28, 30, and 32 for panels 13, 14, and 15 respectively. As each of these curves is substantially identical in form, only gamma curve 28 will be described hereinafter in greater detail. In operation, the individual voltage level control circuits 52, 54, and 56 are adjusted to provide an initial direct current reference voltage (Vref) for their respective liquid crystal display panels 13, 14, and 15, to enable a maximum amount, if not a high percentage of relative luminance to be produced by each of the panels 13, 14, and 15. Thus, according to the present invention, the assembly 10 enables a high percentage, if not a maximum percentage, of luminance to be achieved for each level of color intensity displayed for each pixel.

Considering now the linearization network 50 in greater detail with reference to FIGS. 1 and 2, each of the voltage level control circuits 52, 54, and 56 are similar to one another, except as will be explained hereinafter in greater detail. Accordingly, with reference to FIG. 2, only control circuit 56 will now be described.

Figure 2:
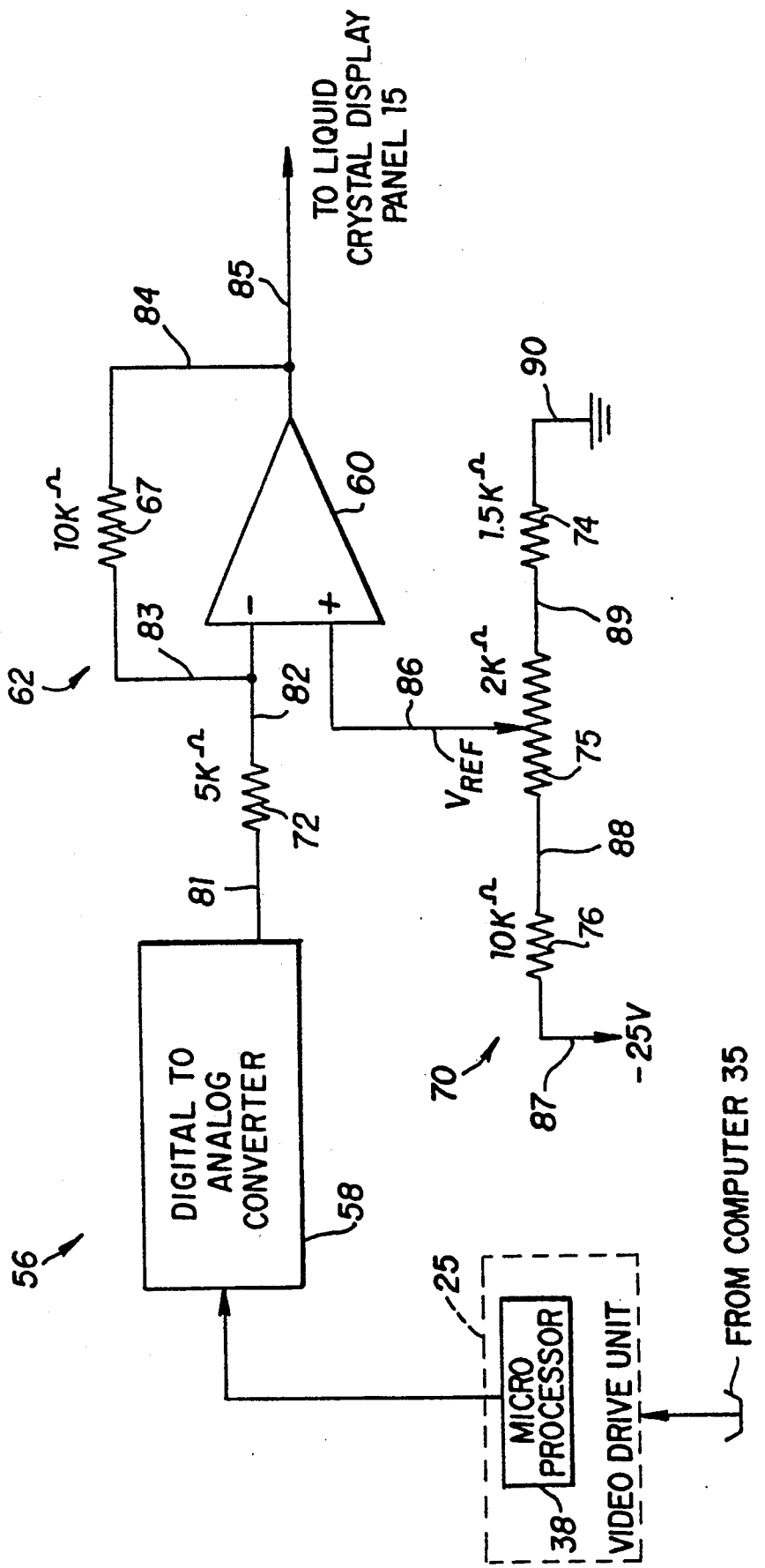
FIG. 2 is a symbolic block circuit diagram of a voltage level control unit of the system of FIG. 1.

Considering now the voltage level control circuit 56 in greater detail with reference to FIG. 2, the voltage level control circuit 56 is responsive to digital signals supplied by a microprocessor 38 disposed within the video drive unit 25. As more fully explained in the foregoing mentioned pending patent applications, each one of the digital signals supplied by the microprocessor 38 is indicative of a given shading or color level for a displayable pixel forming part of the image produced by the panel assembly 10. More particularly, the voltage level control circuit 56 supplies a selected operating voltage level to the panel 15, which in turn, enables each displayable pixel to be displayed with a maximum, if not a relative high percentage of relative luminance for helping to contrast one shading level from another.

In order to convert the digital signals supplied by the microprocessor 38 into an operating voltage level to maximize contrasting shading levels, the voltage level control circuit 56 includes a digital to analog converter 58 for converting digital signals from the computer 38, into analog voltage levels indicative of the different panel operating voltage levels for each color intensity level, to maximize, or at least to increase greatly the luminance of contrasting shading levels.

The voltage level control circuit 56 also includes a differential amplifier 60 for amplifying the analog voltage signal supplied by digital to analog converter 58 into an appropriate operating voltage level for the panel 15. In this regard, the control circuit 56 also includes a feedback gain control arrangement 62 for determining the amount of gain for the input signal to the amplifier 60.

In order to adjust the direct current reference voltage $V_{ref}$ on lead 86 for panel 15, relative to the various operating voltage levels for the panel, the voltage level control circuit 56 also includes a direct current voltage offset arrangement 70.

Considering now the digital to analog converter 58 in greater detail with reference to FIG. 2, the digital to analog converter 58 tend to maximize the number of discrete operating voltage levels between the threshold voltage level $V_T$ and the saturation voltage level $V_{SAT}$. The digital to analog converter 58 is also selected to have discrete voltage level steps or increments, which are balanced with the voltage increment levels produced by the digital to analog converters in each of the other control circuits 52 and 54. It should, therefore, be understood that the digital to analog converters of each one of the control circuits perform similar functions but will necessarily have different voltage increment step capabilities to compensate for the individual operating characteristics of their corresponding display panels 13, 14, and 15 respectively.

Considering now the feedback gain arrangement 62 in greater detail with reference to FIG. 2, the feedback gain arrangement includes two current limiting resistors 67 and 72 which are selected to cause the differential amplifier 60 to amplify the output voltage from the digital to analog converter 58, to an appropriate voltage. In this regard, like the digital to analog converters, the resistance values of the resistors in the other feedback gain arrangements for control circuits 52 and 54, may be different than the resistance values of resistors 67 and 72, although they perform a similar function.

As best seen in FIG. 2, the resistor 72 connects the output of the digital to analog converter at 81 to the negative or inverting input 82 of the differential amplifier 60. The negative or inverting input 82 of the amplifier 60 is also coupled through resistor 67 via conductors 83 and 84 to an output 85 of the amplifier 60. Resistor 72 is a 5 kohm resistor while resistor 67 is a 10 kohm resistor.

Considering now the differential amplifier 60 in greater detail with reference to FIG. 2, the output 85 of the amplifier 60 is connected to the liquid crystal display panel 15 to provide a selected operating voltage for attempting to maximize contrasting shading or color levels, so that each pixel energized at one level will be easily distinguished from every other pixel energized at different shading levels of the same basic color.

In order to provide a differential voltage level reference as well as to provide a direct current voltage level reference for utilizing to the fullest extend possible the full gamma curve of the panel 15 to be utilized in response to changing shading or color levels, the noninverting or positive input of the amplifier 60 is coupled to the offset adjustment arrangement 70 by a conductor 86.

Considering now the offset adjustment arrangement 70 in greater detail with reference to FIG. 2, the offset arrangement 70 consist of a manually adjustable potentimeter 75 which has its wiper or tap connected to the noninverting input of amplifier 60 by the conductor 86.

The offset arrangement also includes a pair of voltage divider resistor 74 and 76 for providing the proper reference voltage to the amplifier 60 as a function of the resistance setting of potentimeter 75.

Resistor 74 is coupled to ground by conductor 90 and the potentimeter 75 by conductor 89. The resistor 76 is coupled to a negative voltage source (not shown) by conductor 87 and the opposite terminal of potentimeter 75 by conductor 88. Resistor 74 is a 1.5 Kohm resistor, resistor 76 is a 10 Kohm resistor and potentimeter 75 is a 2.0 Kohm potentimeter.

Considering now the operation of the system 9 in greater detail with reference to the gamma curves illustrated in FIGS. 4 to 10. The gamma curve 28 illustrates the relative luminance of panel 13 as a function of the voltage applied by the voltage level control circuit 52 to the panel 13.

The gamma curve 28 is developed by positioning the liquid crystal display panel assembly 10 on an overhead projector 40 and focusing the light output of the system 10 into the projection lense of the overhead projector 40 to display an image (not shown) on a viewing screen or surface 43. The light source of the overhead projector 30 directs light into the collimating unit 20 for collimating the light. The system 10 is then electrically activated so that each panel (and all the associated displayable pixels within the panels) 13, 14, and 15 is placed in a saturated state by their associate voltage level control circuits 52, 54, and 56 respective, thus, enabling the panel construction 11 to pass noncolored light or light exhibiting the maximum relative luminance. This maximum relative luminance has an associated direct current reference or saturation voltage ($V_{SAT}$) which is measured by a user and record to form part of the gamma curve 28.

A processor program is then activated by a user to cause the microprocessor to generate a test pattern for displaying on the screen 43. The test pattern consists of three sets of discrete shading or color level setting, one set for each respective panel. Each set is substantially identical so only one will be described hereinafter.

Figure 3:
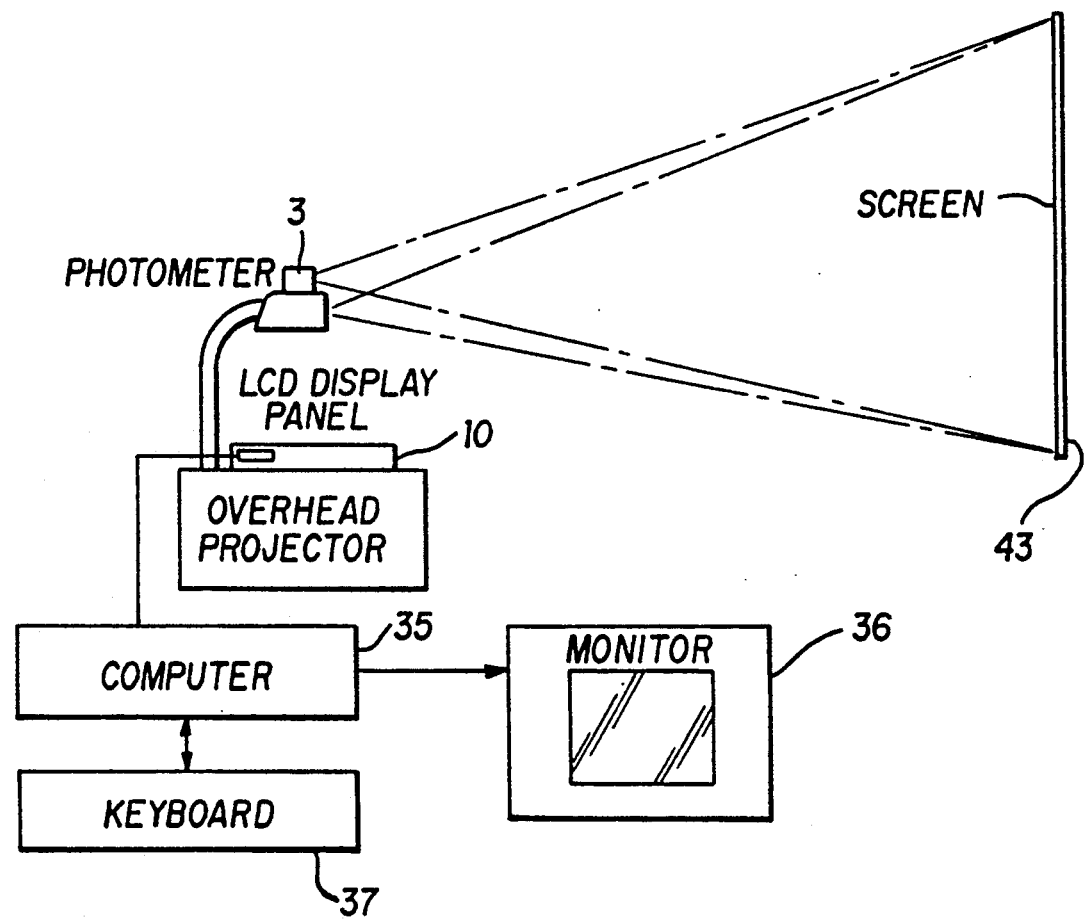
FIG. 3 is a diagrammatic and block diagram view of a display panel construction of the system of FIG. 1, illustrating it being used in a conventional overhead projector as by a computer.

Depending upon the type of computer that is driving the system 9, various shades of colors will be available. For example, a computer 35 (FIG. 3) is capable of producing at least 8 different shades of color where each shade is represented by a discrete digital code. These discrete colors are capable of being combined either in graphic or text form by the computer 35 to produce a display image which may be displayed on the screen of an associated video monitor; such as monitor 36 or on the viewing screen 43. Ideally the shading or contrast levels in the displayed images should be substantially the same as between the image displayed on the monitor 36 and the image displayed on the screen 43. The processor program enables the system 9 to be adjusted so that the full gamma curve 28 can be utilized so the system 9 can produce a full spectrum with colors.

As each level of shading or color is sequentially displayed on the screen 43, a user manually adjusted the reference potentimeter, such as potentimeter 75, to vary the direct current voltage applied to the panel 13 and using a photometer 45 measures the relative luminance with calibrated red, blue and photic filters of the panel 13 as a function of the applied voltage.

The program generates a test pattern of 8 discrete shading or color levels and causes the drive units to generate signals for producing on a screen by screen basis each individual discrete level within the 8 discrete levels. The program code for program is assembled in 870451 assembly language and is attached to this application as appendix A and represents the actual relative luminance of the panel 13 for each of the individual 8 shading or color levels as measured by a user.

To obtain each plotted point, the selected level is displayed and then using the photometer the relative red, green, or blue luminance of the screen 43 is measured as the potentimeter 75 is varied between $V_T$ and $V_{SAT}$. Whenever the relative luminance for the displayed level is distinguished from the next lower level, the measured relative luminance is recorded.

As the test pattern starts with maximum color level (level 0), this represents the darkest shade and the relative luminance will be a function of the threshold voltage (VT). This relative luminance level is also recorded as a function of the applied voltage to form another part of the gamma curve.

Ideally, to provide the greatest contrast between levels 0 and level 7, levels 0 to 7 should be equally spaced apart on the gamma curve 28 between $V_T$ and $V_{SAT}$.

The above disclosed process is repeated until all 8 levels of shading have been recorded to produce the gamma curve 28. The process is then repeated for the other panels to produce the other gamma curves 30 and 32. It should be noted that when recording the relative luminance level of the panels 13, 14, and 15, blue, red, and green filters (not shown) are used in the photometer 34 for recording the relative luminance as a function of applied voltage.

As best seen in FIG. 4 with respect to the individual shading levels of the blue panel 13, certain of the shading levels 0-3 were not distinguished from relative luminance at the threshold voltage level. Moreover, the upper shading level 7 was not disposed near the saturation voltage level. Thus, the full gamma curve is not utilized.

Figure 7:
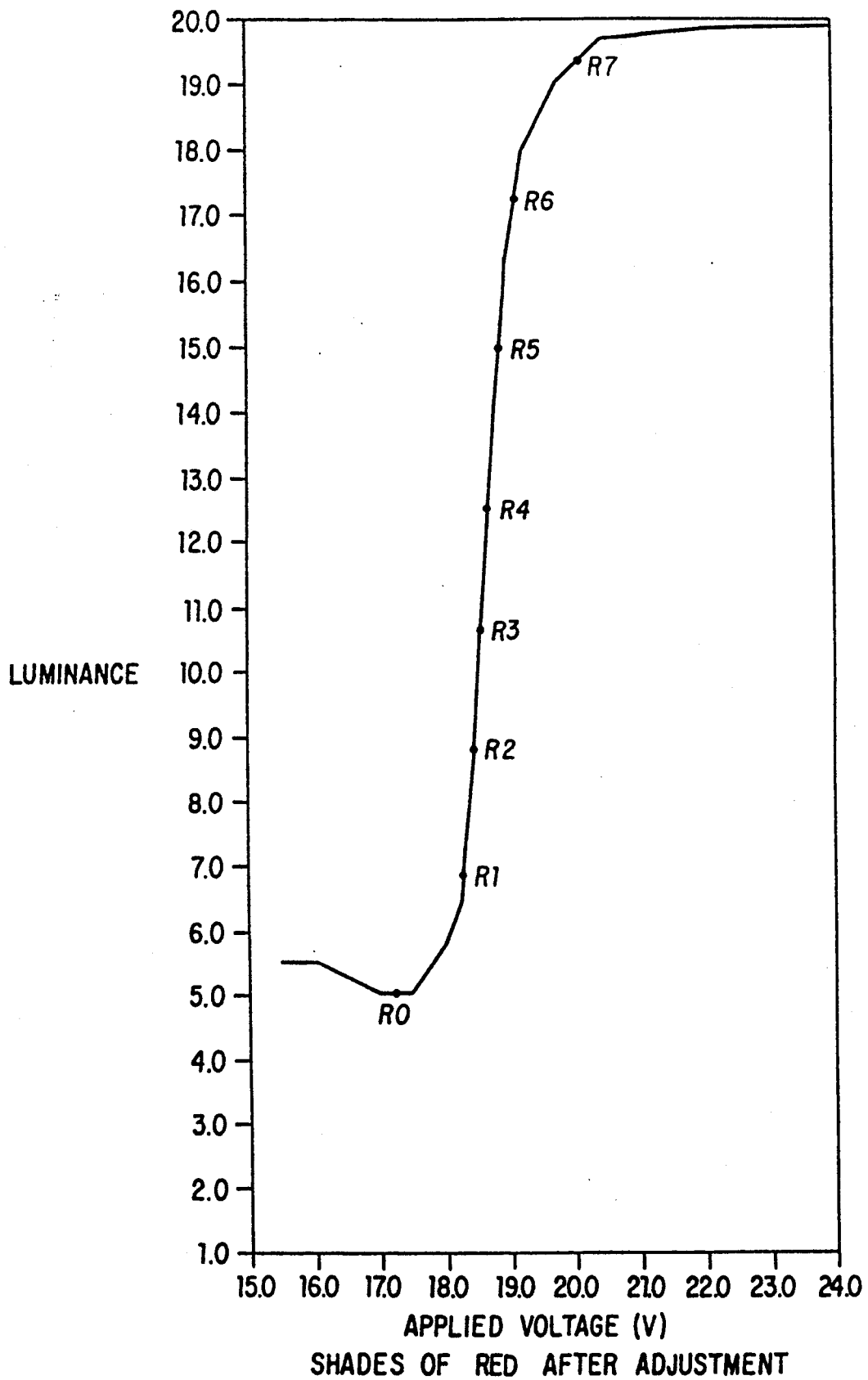
Figure 8:
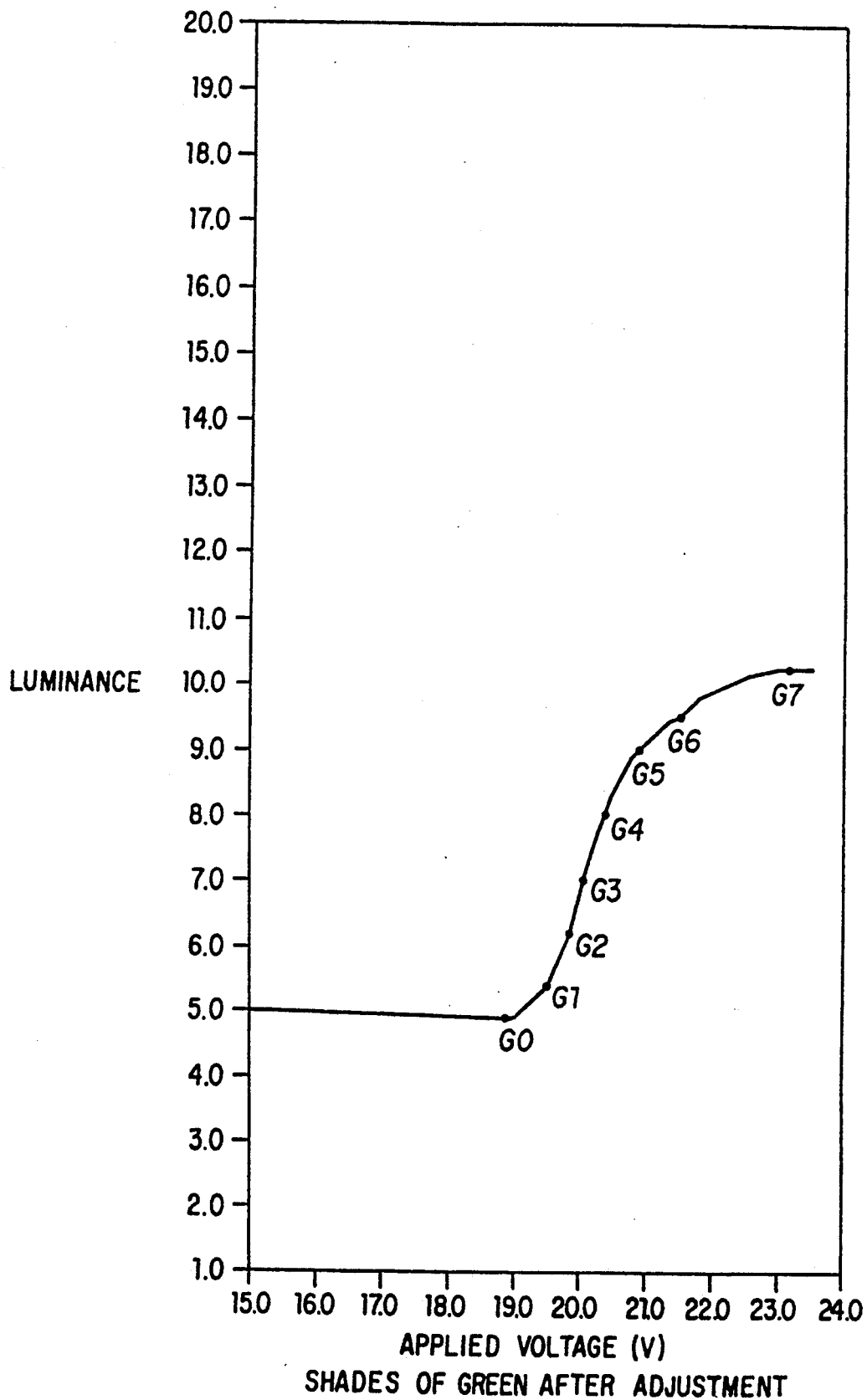
Figure 9:
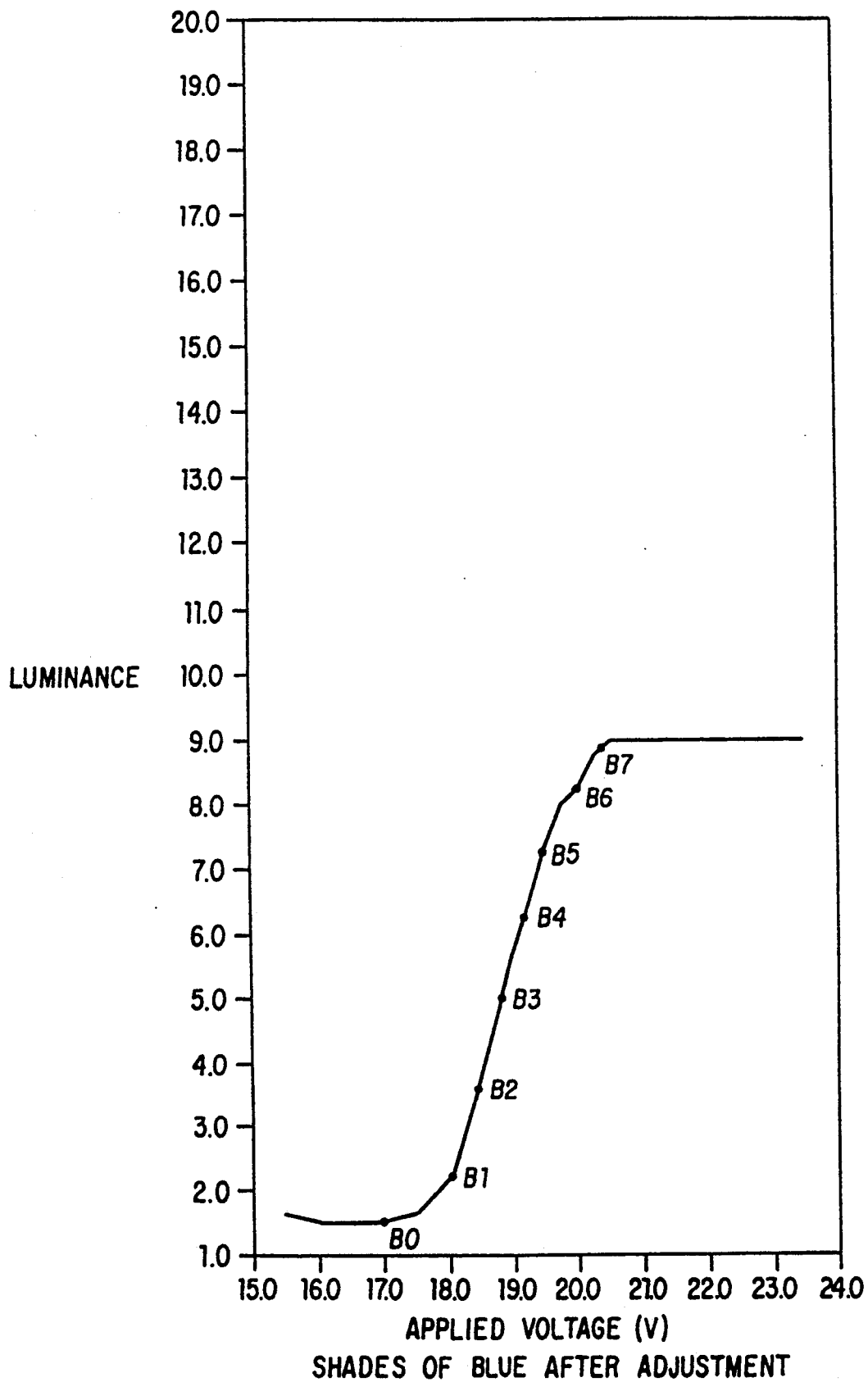

Referring now to FIG. 2, the digital signals generated by the microprocessor 38 correspond to the discrete shading levels. Accordingly, after determining the gamma curve response of the panels 13, 14, and 15, the microprocessor 38 is programmed by the user via a direct current voltage default program to adjust the operating voltage to utilize the full gamma curve. More particularly, for example, with reference to the blue panel, an offset of 18 levels is established to better use the gamma curve 28. Thus when a level 1 shading signal is received by the microprocessor 38 from the computer 35, the microprocessor which convey the level 1 shading signal into a pseudo level signal indicative of level 19 so that the output voltage of amplifier 60 will correspond to a level 19 applied voltage as opposed to the actual level 1 signal. In this manner, microprocessor 38 generates a series of pseudo signal that increment and decriment the applied voltage to maximum relative luminance between the discrete shading or color levels. FIGS. 7-9 illustrate the respective gamma curve 28A, 30A, and 32A and the relative luminance for the discrete shading levels when the microprocessor 38 has been programmed to offset the digital signals as described above.

Figure 10:
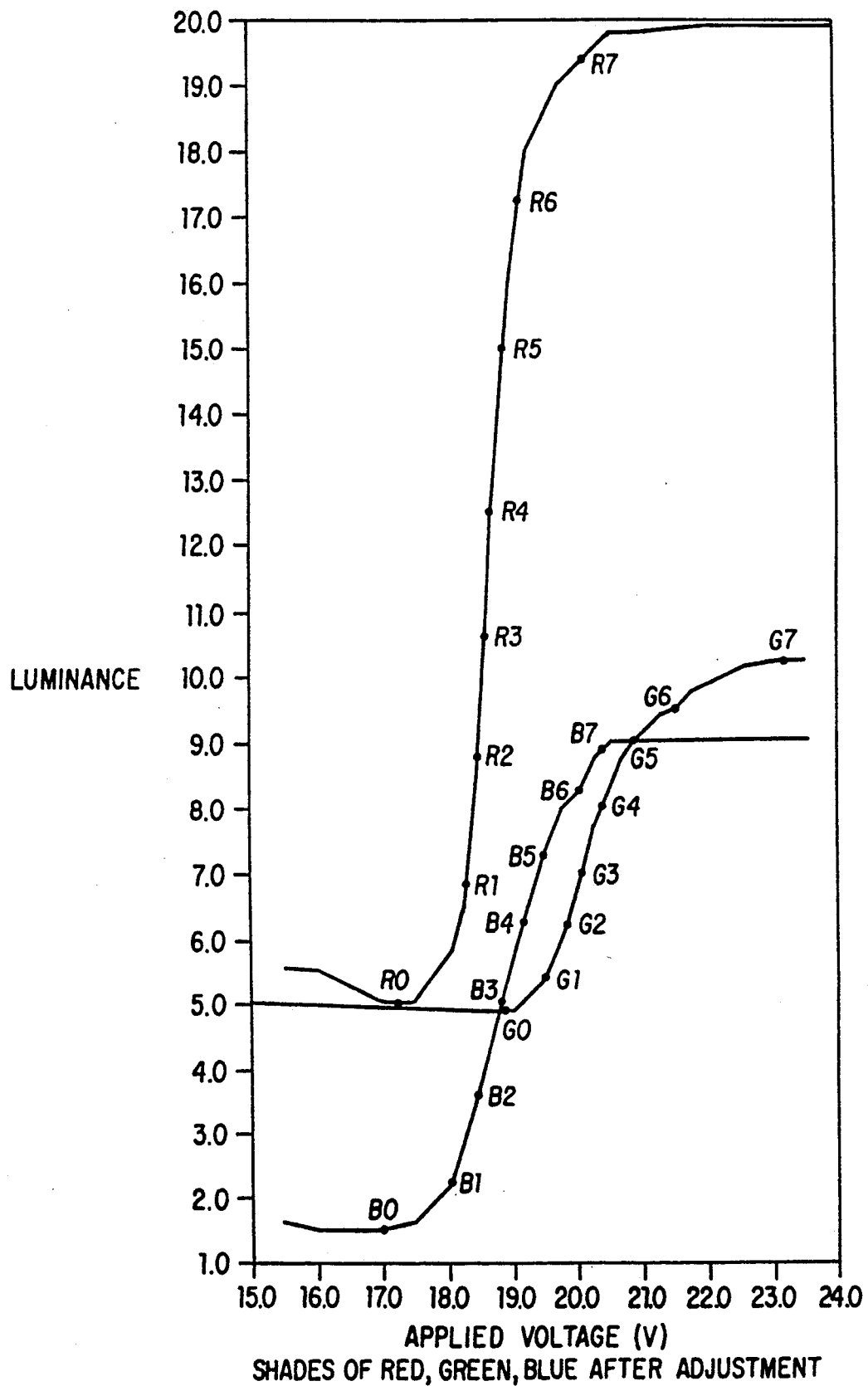

Considering now the gamma curves 28A, 30A, and 32A in greater detail with reference to FIG. 10, it will be noted that when the three gamma curves are superimposed on the same graph that they have substantially different discrete level shifts over the full 8 discrete levels. For example, the relative luminance of the red panel varies between 5.5 cd/m$^2$ and 19.7 cd/m$^2$, as the applied voltage varies between $-17.5$ volts ($V_T$) and $-20.5$ volts ($V_{SAT}$).

Comparing the green panel between threshold voltage of $-17.5$ volts and the saturation voltage of $-21.5$ volts, the relative luminance varied between 5.0 cd/m$^2$ and 10.5 cd/m$^2$.

From the foregoing, it should be clear that the step voltage changes vary substantial between different panels. To compensate for these differences, each of the d/a converters associated with the voltage level control circuits, such as d/a converter 58 have different step voltage responses that are selected to balance the color contrast between the panels 13, 14, and 15.

In order to enable a user to achieve the contrast balance, the user may press a selected function key on a keyboard or utilize other equivalent means such as a remote control infrared transmitter coupled to the microprocessor 38 by an infrared link.

Attached hereto as Appendix A is a source code listing of a firmware computer program stored in the microprocessor 38 for controlling the operation of the system 9. At pages 21, 43 through 49 of the appended Appendix A, there is disclosed the source code for controlling the tracking operation.

Therefore, the system 9 enables eight optimum operating levels for each one of the three color stages. In this regard, when the computer 35 calls for a given duty cycle level of color intensity to be generated by a given panel as explained in the foregoing patent applications, the microprocessor 38 provides a direct current bias signal for the given panel to bias the operation of the panel at the top of the luminance curve, so that when the computer 38 calls for a given intensity level, that designated level is optimized, since the intensity level voltage supplied to the panel is off-set by the d.c. bias voltage from the amplifier 60, thereby providing an optimized image display. The optimized image display is one where the luminance is of a sufficiently high relative value, and the contrast is also of a sufficiently high value. This voltage values corresponding the given bias level for a given computer 35 and a given panel are stored int he gamma curve look-up table found in the firmware to cause the amplifier 60 to generate the desired bias voltage level, for the top portion of the gamma curve. The contrast consideration takes into account that a manual contrast input (not shown) for the system 9 provides only a single decrement or increment, and yet the firmware determines three corresponding decremental or incremental changes in the voltage levels for the three different color panels of the system 9.

Therefore, it has been discovered that by determining a single d.c. biasing offset voltage for each panel for a given type of computer 35, such as a Mac II personal computer, the multiplexed duty cycle color intensity levels supplied to a given panel, as explained in the foregoing patent applications, is optimized automatically by causing the desired distribution of operating points along the gamma curves as shown in FIGS. 7-9 for the eight given color intensity levels for determination of the off-set d.c. voltage is selected in the manner as described in the appended Appendix B. The off-set bias voltage for given panels and given computers are stored in the look up table in the firmware of Appendix A.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

APPENDIX A

```
                1    $PAGEWIDTH=132
                2    $PAGINATE
                3    $pagelength=58
                4    $TITLE(A4720C MULTI-MODE DATA DISPLAY, RELEASE 1.0)
                5    $showincs
                6    $SHOWMACS
                7    ;LISTING ON = "$LIST", STARTING IN FIRST COLUMN"
                8    ;    "   OFF = "$NOLIST" "      "     "     "
                9    ;************************************************************************
               10    ;*         Project   : A720C
               11    ;*         Programmers: ROGER MARSHALL (RNM)
               12    ;*          Release  : NEBRASKA 1.1, (FROM A480SC, 10-19-89, 1.2C AND
               13    ;*                     A720C 1.0, 03-21-90)
               14    ;*         Last Edit : 04-04-90, RNM
               15    ;************************************************************************
=0000          16    PROXIMA   EQU    0              ;1="PROXIMA" TITLE SCREEN
               17                                    ;0=BOXES TITLE SCREEN
               18    ;------------------------------------------------
               19    ; Register usage:
               20    ;
               21    ; R7    cth  ; 16 bit counter, clocked by TF1
               22    ; R6    ctl  ; interrupt routine every 100 usec.
               23    ; R6 & R7 ARE USED BY THE IR INTERRUPT ROUTINES
               24    ;              DON'T USE!!
               25    ;------------------------------------------------
               26    $SETLN(equates.asm);%include "equates.asm"
                1    ;------------------------------------------------
                2    ;       FILE NAME: EQUATES.ASM
                3    ;       LAST EDIT: 04-04-90, 03:30 P.M., RNM
                4    ;------------------------------------------------
                5    ;==============HARDWARE PORT DEFINITIONS==============
                6    ;
                7    ;PORT 0..................................
=0080           8    TXLED     EQU    P0.0            ;TEXT LED, 1=OFF
=0081           9    KEY1      EQU    P0.1            ;KEY INPUT, 1=PRESSED
=0082          10    KEY2      EQU    P0.2            ;KEY INPUT, 1=PRESSED
               11    ;         EQU    P0.3            ;KEY PAD INPUT
               12    ;         EQU    P0.4            ; "
               13    ;         EQU    P0.5            ; "
               14    ;         EQU    P0.6            ; "
               15    ;         EQU    P0.7            ; "
               16    ;PORT 1..................................
=0090          17    ROW1      EQU    P1.0            ;OUTPUT TO ROW 1 & D0 OF U1
=0091          18    ROW2      EQU    P1.1            ;OUTPUT TO ROW 2 & D1 OF U1
=0092          19    CTDATA    EQU    P1.2            ;DATA FOR CONTRAST POT'S AND
               20                                    ;D2 OF U1
=0093          21    CTCLK     EQU    P1.3            ;0 TO 1, CLOCK FOR CONTRAST SHIFT REG
               22    ;         EQU    P1.4            ;A0 OF U1
               23    ;         EQU    P1.5            ;A1 OF U1
               24    ;         EQU    P1.6            ;A2 OF U1
=0097          25    NU1WR     EQU    P1.7            ;0=U1 WRITE PULSE
               26    ;PORT 2..................................
=00A0          27    CLLED     EQU    P2.0            ;CLEAR LED, 0=ON
=00A1          28    SEL11     EQU    P2.1            ;SELECT 11
=00A2          29    SEL12     EQU    P2.2            ;SELECT 12
=00A3          30    NORVID    EQU    P2.3            ;NORMAL/REVERSE VIDEO CONTROL
               31                                    ;FOR BOTH ANALOG & DIGITAL
               32                                    ;1=NORMAL VIDEO
               33                                    ;0=REVERSE VIDEO
=00A4          34    HSAH      EQU    P2.4            ;1=HS ACTIVE HIGH @U1
=00A5          35    VSAH      EQU    P2.5            ;1=VS ACTIVE HIGH @U1
=00A6          36    NVGASY    EQU    P2.6            ;0=VGA SYNC POS
=00A7          37    SEL10     EQU    P2.7            ;1=640 x 200
               38    ;PORT 3..................................
               39    ;         EQU    P3.0            ;RXD, SERIAL INPUT
               40    ;         EQU    P3.1            ;TXD, SERIAL OUTPUT
=00B2          41    VSIN      EQU    P3.2            ;INT0-, EXT INTERRUPT 0
               42                                    ;VERTICAL SYNC IN
               43    ;         EQU    P3.3            ;INT1-, EXT INTERRUPT 1
               44                                    ;IR (REMOTE)
=00B4          45    HSIN      EQU    P3.4            ;T0, TIMER 0 EXT IN
               46                                    ;HORIZ SYNC IN
=00B5          47    DEMO      EQU    P3.5            ;0=NORMAL OPERATION, 1=TITLE SCREEN
=00B6          48    SEL3      EQU    P3.6            ;1=720 x 480 PANEL MODE
               49                                    ;(EXT DATA MEMORY WRITE STROBE)
```

```
=00B7         50      HDEC    EQU     P3.7            ;1=SELECT DEC HSYNC
              51                                      ;0=SELECT CGA/EGA HSYNC
              52      ;PORT 4...................................
=00C0         53      P4              TEQ     0C0H    ;8XC451 PORT ADDRESSES
=00C0         54      NCSU1   EQU     P4.0            ;0=CS OF U1
              55      ;       EQU     P4.1            ;SEL13 OF U1 & DSCAN OF GAL
              56      ;       EQU     P4.2            ;1=COMPOSITE VIDEO
=00C3         57      DIGSEL  EQU     P4.3            ;1=SELECT DIGITAL VIDEO
              58                                      ;0=SELECT ANALOG VIDEO
=00C4         59      HOFF    EQU     P4.4            ;1=TRUE HSYNC DISABLED
=00C5         60      CTXB    EQU     P4.5            ;0 TO 1, XFER SHIFT REG TO
              61                                      ;BLUE CONTRAST DAC INPUTS
              62      ;       EQU     P4.6            ;SEL0 OF U1
=00C7         63      DCLK    EQU     P4.7            ;1=VCO DOUBLE DOT CLOCK
              64      ;PORT 5...................................
=00C8         65      P5              TEQ     0C8H    ;
              66      ;
              67      ;       EQU     P5.0            ;b OUT FOR TITLE SCREEN
              68      ;       EQU     P5.1            ;B "   "   "   "
              69      ;       EQU     P5.2            ;g "   "   "   "
              70      ;       EQU     P5.3            ;G "   "   "   "
              71      ;       EQU     P5.4            ;r "   "   "   "
              72      ;       EQU     P5.5            ;R "   "   "   "
=00CE         73      CPUHS   EQU     P5.6            ;HSYNC OUT FOR TITLE SCREEN
=00CF         74      CPUVS   EQU     P5.7            ;VSYNC OUT FOR TITLE SCREEN
              75      ;PORT 6...................................
=00D8         76      P6              TEQ     0D8H    ;
=00D8         77      CFLAGG  EQU     P6.0            ;CFLAG FOR GREEN GAL
=00D9         78      CFLAGR  EQU     P6.1            ;CFLAG FOR RED GAL
=00DA         79      CYCLOP  EQU     P6.2            ;0=CYCLOPS IS USING RS232
=00DB         80      CTXR    EQU     P6.3            ;0 TO 1, XFER SHIFT REG TO RED DAC
              81      ;
=00DC         82      CTXG    EQU     P6.4            ;0 TO 1,  "   "   "   " GREEN DAC
              83      ;
=00DD         84      SEL14   EQU     P6.5            ;1=NORMAL HSYNC DELAY IN U1
              85                                      ;0=LONG HSYNC DELAY IN U1
=00DE         86      CFLAGB  EQU     P6.6            ;CLFAG FOR BLUE GAL
=00DF         87      U1NOT   EQU     P6.7            ;0=RESET U1 CHIP
              88      ;..........................................
=00E8         89      CSR             TEQ     0E8H    ;
=00EC         90      AFLAG   TEQ     CSR.4           ;AFLAG BIT
=00EE         91      BFLAG   TEQ     CSR.6           ;BFLAG BIT
              92      ;..........................................
=0098         93      rx_flag         equ     scon.0
=0099         94      tx_flag         equ     scon.1
              95      ;============= COUNTER/TIMER USEAGE ============
              96      ;
              97      ;AT POWER UP.........................
              98      ;TIMER 0 IS IN MODE 1: SINGLE 16 BIT COUNTER, USED TO COUNT
              99      ;                       HSYNC'S TO DETERMINE DISPLAY MODE
              100     ;
              101     ;             +--------------------------+   +------+
              102     ; HSYNC (T0) ->| TL0, TH0, 16 BIT COUNTER |--->| TF1 |
              103     ;             +--------------------------+   +------+
              104     ;
              105     ;AFTER DETERMINATION OF DISPLAY MODE................
              106     ;TIMER 0, MODE 3: 2 SEPARTE TIMERS
              107     ;                       LOWER TIMER IS USED FOR MAC II TO
              108     ;                       DETERMINE TIMING OF DISABLING TRUE HSYNC
              109     ;
              110     ;                                       256 COUNT
              111     ;                                          V
              112     ; +-----+   +---------------+ 1.0851 usec +-----+   +-----+
              113     ; | OSC |-->| DIVIDE BY 12  |------------>| TL0 |-->| TF0 |
              114     ; +-----+   +---------------+             +-----+   +-----+
              115     ;
              116     ;               UPPER TIMER IS USED TO DETERMINE REMOTE DATA,
              117     ;               VSYNC & HSYNC POLARITY AND HEARTBEAT TICK (600usec)
              118     ;
              119     ;                                       100 usec
              120     ;                                          V
              121     ; +-----+   +---------------+ 1.0851 usec +-----+   +-----+
              122     ; | OSC |-->| DIVIDE BY 12  |------------>| TH0 |-->| TF1 |
              123     ; +-----+   +---------------+             +-----+   +-----+
              124     ;
              125     ;TIMER1, 8 BIT AUTO RELOAD TIMER: USED FOR BAUD RATE
              126     ;
              127     ;================== CONSTANTS=================================
```

```
=0000         128     reg0    equ    0       ; for direct address modes
=0001         129     reg1    equ    1
=0002         130     reg2    equ    2
=0003         131     reg3    equ    3
=0004         132     reg4    equ    4
=0005         133     reg5    equ    5
=0006         134     reg6    equ    6
=0007         135     reg7    equ    7
              136     ;......
=0002         137     STABLE  EQU    2                      ;MAX DIFFERENCE BETWEEN LONGEST AND
              138                                           ;SHORTEST HSYNC FREQ SAMPLE TO BE
              139                                           ;STILL CONSIDERED STABLE
              140     ;SELECTS FOR # OF SHADES
              141     ;AFLAG  BFLAG  CFLAG   MODE
              142     ;  0      0      0     CLEAR
              143     ;  0      0      1     MONO, BLACK & WHITE ONLY
              144     ;  0      1      0     NO SHADING (WAS 16 SHADES)
              145     ;  0      1      1     NOT USED (WAS 14 SHADES)
              146     ;  1      0      0     14 SHADES (WAS 8 SHADES)
              147     ;  1      0      1     8 SHADES (WAS 4 SHADES)
              148     ;  1      1      0     CGA # OF SHADES
              149     ;  1      1      1     EGA # OF SHADES
              150     ;CODES FOR # OF SHADES
=0000         151     SCLR    EQU    0                      ;CLEAR
=0001         152     SMONO   EQU    1                      ;MONOCHROME
=0002         153     SNOS    EQU    2                      ;NO SHADING, 8 COLOR ONLY MODE
=0004         154     S14     EQU    4                      ;14 SHADES
=0005         155     S8      EQU    5                      ;8 SHADES
=0006         156     SCGA    EQU    6                      ;CGA # OF SHADES
=0007         157     SEGA    EQU    7                      ;EGA # OF SHADES
=0007         158     S4      EQU    SEGA                   ;4 SHADES
=0004         159     S16     EQU    S14                    ;16 SHADES
              160     ;HORIZ. POSITION DEFAULTS
=0049         161     HPDCP   EQU    049H                   ;DEC VT220 PRIMARY
=004F         162     HPDCS   EQU    04FH                   ;DEC, SECONDARY
              163     ;DEFAULT CONTRASTS
              164     ;NOTE: DEFAULT + MAX TINT must be < 256
              165     ;      and DEFAULT - (MIN TINT + 8 COLOR MODE) must be > -1
              166     ;for RED max = 240 = 0F0H
              167     ;    RED min = 22+22=44 = 02CH
              168     ;for GREEN max = 240 = 0F0H
              169     ;    GREEN min = 15+22 = 37
              170     ;for BLUE max = 255 = 0FFH
              171     ;    BLUE min = 22 = 16H
              172     ;
=004D         173     DECR    EQU    04DH                   ;RED, DEC VT220
=003A         174     DECG    EQU    03AH                   ;GREEN, DEC VT220
=003E         175     DECB    EQU    03EH                   ;BLUE, DEC VT220
              176     ;
=0069         177     CGAR    EQU    069H                   ;RED, CGA
=004D         178     CGAG    EQU    04DH                   ;GREEN, CGA
=0044         179     CGAB    EQU    044H                   ;BLUE, CGA
              180     ;
              181     ;note: For the Sekonic Handy Lumi meter the following should be read
              182     ;      on the corresponding box.
              183     ;      RED       260-270
              184     ;      GREEN     165-175
              185     ;      BLUE      160-165
              186     ;      GREY WHITE 260-270
              187     ;
=003A         188     EGAR    EQU    03AH                   ;RED, EGA
=0024         189     EGAG    EQU    024H                   ;GREEN, EGA
=002B         190     EGAB    EQU    02BH                   ;BLUE, EGA
              191     ;
=005F         192     MSER    EQU    05FH                   ;RED, MAC SE
=0050         193     MSEG    EQU    050H                   ;GREEN, MAC SE
=005B         194     MSEB    EQU    05BH                   ;BLUE, MAC SE
              195     ;
=004D         196     HERR    EQU    04DH                   ;RED, HERCULES
=003A         197     HERG    EQU    03AH                   ;GREEN, "
=003E         198     HERB    EQU    03EH                   ;BLUE, "
              199     ;
=0085         200     MIIR    EQU    085H                   ;RED, MAC II
=0075         201     MIIG    EQU    075H                   ;GREEN MAC II
=006F         202     MIIB    EQU    06FH                   ;BLUE, MAC II
              203     ;
=0088         204     OLIR    EQU    088H                   ;RED, OLIVETTI
=005B         205     OLIG    EQU    05BH                   ;GREEN, "
=0056         206     OLIB    EQU    056H                   ;BLUE, "
              207     ;
```

```
=0069    208   VGAR    EQU    069H         ;RED, VGA
=004E    209   VGAG    EQU    04EH         ;GREEN, VGA
=0051    210   VGAB    EQU    051H         ;BLUE, VGA
         211   ;
=007E    212   VTEXR   EQU    07EH         ;REG, VGA TEXT
=0066    213   VTEXG   EQU    066H         ;GREEN, VGA TEXT
=006A    214   VTEXB   EQU    06AH         ;BLUE, VGA TEXT
         215   ;
         216   ;note: For title screen if the Sekonic Handy Lumi meter is used on the
         217   ;      center row of boxes (R,G,B) the following values should be read
         218   ;      on the meter:
         219   ;         RED     270-275
         220   ;         GREEN   165-175
         221   ;         BLUE    155-160
         222   ;
=0084    223   TITR    EQU    084H         ;RED, TITLE SCREEN
=0056    224   TITG    EQU    056H         ;GREEN, TITLE SCREEN
=004B    225   TITB    EQU    04BH         ;BLUE, TITLE SCREEN
         226   ;MISC COLOR ITEMS..................
=00B4    227   MAXDAC  EQU    180          ;MAX ALLOWED DAC
         228                                ;for some reason the DAC
         229                                ;will not go above 3.54v
=FFFF    230   MODE8C  EQU    -1           ;DECREASE CONTRAST VALUE FOR
         231                                ;NO SHADING (ie. 8 COLOR ONLY MODE)
         232   ;THE FOLLOWING TWO ITEMS CAN NOT BE CHANGED UNLESS THE TABLE "COLTAB"
         233   ;OR "CONTAB" IS CHANGED TO MATCH THE SIZE.
=0019    234   COLLIM  EQU    25           ;+- LIMIT FOR TINT CHANGES
=0028    235   CLIM    EQU    40           ;+- OVERALL CONTRAST LIMIT
         236   ;IR REMOTE CONSTANTS....................
=00AA    237   tick_tc equ    170          ; 100 usec "tick"
         238   ;
=0005    239   tc1     equ    05           ; noise threshold (Tp<.5msec)
=000F    240   tc2     equ    15           ; logic 0/1
=0019    241   tc3     equ    25           ; logic 1/end of frame
=0003    242   tc4     equ    3            ; key up timeout-50 msec
         243   ;
         244   ; NOTE: for 250 usec tick, use 41,02,06,10,1
         245   ;TIME CONSTANTS...........................
=0004    246   BLINK_TC EQU   4            ;for blinking clear lite
         247                                ;16 COLORS=FLASHING, 8=LED OFF
=0035    248   MACFPR  EQU    53           ;MAC II PERIODS OF 256 * 1.0851 usec
         249                                ;TO THE DISABLE OF THE TRUE HSYNC
=003B    250   DECFPR  EQU    59           ;DEC VT220 PERIOS OF 256 * 1.0851 usec
         251                                ;TO THE DISABLE OF THE TRUE HSYNC
=0009    252   HBPRE   EQU    9            ;HEARTBEAT (AND VSYNC POLARITY) PRESET
         253                                ;100 * 9 = 900 usec
         254                                ;NOTE: OLIVETTI HAS A VSYNC OF 600usec
=005A    255   TASKT   EQU    90           ;MAIN LOOP TASK PROCESSING DELAY TIME
         256                                ;900usec * 90 = 81.0 msec
=0021    257   VIDCLT  EQU    33           ;CLEAR VIDEO FRAME BUFFER TIME
         258                                ;900 usec * 33 = 30 msec
         259                                ;(MINIMUM = 20 msec)
=0006    260   NUMNO   EQU    6            ;# OF ATTEMPTS TO FIND MODE BEFORE
         261                                ;DISPLAYING TITLE SCREEN AFTER A
         262                                ;POLARITY CHANGE
=000C    263   BEGTIM  EQU    12           ;# OF TIMES IN A ROW THAT THE HSYNC
         264                                ;SIGNAL APPEARS TO BE INACTIVE AS
         265                                ;DETERMINED BY THE 100usec INTERRUPT
         266                                ;ROUTINE
         267   ;Control Registers........................
         268   ; TMOD:
         269   ;          b7    t1 gate 0   ; enable counter
         270   ;          b6    t1 c/t  0   ; timer, clock by osc/12
         271   ;          b5    t1 m1   1   ; timer1 in mode 2
         272   ;          b4    t1 m0   0   ; (autoload baud rate generator)
         273   ;          b3    t0 gate 0   ; OptiView-pulse width meas. mode
         274   ;          b2    t0 c/t  1   ; timer, clock by osc/12
         275   ;          b1    t0 m1   1   ; timer0 in mode 3
         276   ;          b0    t0 m0   1   ; (two 8-bit timers)
         277   ;
         278   ;tmodval equ  00100111b
=0023    279   tmodval equ  00100011b
         280   ;
         281   ; TCON:
         282   ;          b7    TF1     0   ; interrupt flag
         283   ;          b6    TR1     1   ; enable counter
         284   ;          b5    TF0     0   ; interrupt flag
         285   ;          b4    TR0     1   ; enable counter
         286   ;          IE1           1   ; Interrupt 1 enable
         287   ;          IT1           1   ; level/transition
```

```
         288    ;       IE0      1       ; Interrupt 0 enable
         289    ;       IT0      1       ; level/transition
         290    ;
         291    ;tconval equ  01011111b
=004F    292    tconval equ  01001111b
         293    ;
         294    ; PCON:
         295    ;       b7   smod    0    ; don't divide baud rate by 2
         296    ;       b6   x       0
         297    ;       b5   x       0
         298    ;       b4   x       0
         299    ;       b3   GF1     0    ; general purpose flag
         300    ;       b2   GF0     0    ; another one
         301    ;       b1   PwrDn   0    ; don't power down
         302    ;       b0   Idle    0    ; don't idle
         303    ;
=0000    304    pconval equ  00000000b
         305    ;
         306    ; SCON:
         307    ;       b7   sm0     0    ; serial mode 1
         308    ;       b6   sm1     1    ; (8-bit data, var baud rate)
         309    ;       b5   sm2     0    ; not multiprocessor mode
         310    ;       b4   REn     1    ; enable receiver
         311    ;       b3   TE8     0    ; extra uart bit
         312    ;       b2   RE8     0    ; extra uart bit
         313    ;       b1   ti      0    ; transmitter interrupt
         314    ;       b0   ri      0    ; receiver interrupt
         315    ;
=0050    316    sconval equ  01010000b
         317    ;
         318    ;============== RAM DEFINITIONS ====================
=0008    319    IR_byte     equ    08H
=0009    320    bit_count   equ    IR_byte+1
=000A    321    srl         equ    bit_count+1
=000B    322    srh         equ    srl+1
=000C    323    lastl       equ    srh+1
=000D    324    lasth       equ    lastl+1
=000E    325    macfra      equ    LASTH+1     ;FOR MAC II, COUNTER TO DISABLE
         326                                   ;OF TRUE HSYNC
=000F    327    blink_ctr   equ    macfra+1    ; 1h, clear lite blink TC
         328    ;
=0010    329    FREQ0       EQU    blink_ctr+1 ; randy's
=0010    330    PCOLOR      EQU    FREQ0       ;(7) EACH BYTE CONTAINS THE COLOR
         331                                   ;    FOR ONE OF THE LETTERS IN
         332                                   ;    THE WORD "PROXIMA"
=0015    333    MCOLOR      EQU    PCOLOR+5    ;COLOR FOR "M"
=0016    334    ACOLOR      EQU    PCOLOR+6    ;COLOR FOR "A"
=0017    335    BCKGND      EQU    PCOLOR+7    ;(1) BACKGROUND COLOR OF TITLE SCREEN
=0011    336    FREQ1       EQU    FREQ0+1   ;
=0012    337    FREQ2       EQU    FREQ1+1   ;
=0013    338    FREQ3       EQU    FREQ2+1   ;
=0014    339    FREQ4       EQU    FREQ3+1   ;
=0015    340    FREQ5       EQU    FREQ4+1   ;
=0016    341    FREQ6       EQU    FREQ5+1   ;
=0017    342    FREQ7       EQU    FREQ6+1   ;
=0018    343    FREQ        EQU    FREQ7+1     ;RUNNING AVERAGE VALUE OF FREQ0 - > FREQ7
         344    ;
=0019    345    H_POS       EQU    FREQ+1    ;
=001A    346    V_POS       EQU    H_POS+1   ;
=001B    347    PLL_LOW     EQU    V_POS+1   ;
=001C    348    PLL_HI      EQU    PLL_LOW+1 ;
=001D    349    H_MAX       EQU    PLL_HI+1  ;
         350    ;
=001E    351    NSYNCS      EQU    H_MAX+1     ;NEW VALUE FOR SYNC POLARITIES
         352
         353    ;BIT ADDRESSABLE AREA.....................
         354    ;BIT ADDRESS AREA = 20H TO 2FH
=0020    355    ACT_KEY1   EQU    20H       ;RAM STORAGE
=0006    356    KVPLUS     EQU    ACT_KEY1.6;
=0005    357    KHMINUS    EQU    ACT_KEY1.5;
=0004    358    KCOLPLUS   EQU    ACT_KEY1.4;
=0003    359    KCOLMIN    EQU    ACT_KEY1.3;
=0002    360    KTEXT      EQU    ACT_KEY1.2;
=0001    361    KCLEAR     EQU    ACT_KEY1.1;
=0000    362    K8COL      EQU    ACT_KEY1.0 ;IR ONLY, MASKED FROM KBD
         363                                 ;TOGGLE BETWEEN SHADING & NO SHADING
         364    ;
=0021    365    ACT_KEY2   EQU    21H       ;
=000F    366    KHPLUS     EQU    ACT_KEY2.7;
=000E    367    KVMINUS    EQU    ACT_KEY2.6;
```

```
=000C        368    KCONPLUS   EQU    ACT_KEY2.4;
=000B        369    KCONMIN    EQU    ACT_KEY2.3;
=000A        370    KSYNC      EQU    ACT_KEY2.2;
=0009        371    KRVIDEO    EQU    ACT_KEY2.1;
             372    ;
             373    ;
=0022        374    SYNCS      EQU    22H      ;
=0010        375    HSYNC      EQU    SYNCS.0  ;
=0011        376    VSYNC      EQU    SYNCS.1  ;
             377    ;
             378    ;
=0023        379    COMPUTER1  EQU    23H      ;
=001F        380    MAC_II     EQU    COMPUTER1.7;
=001E        381    VGA_TEXT   EQU    COMPUTER1.6;
=001D        382    VGA_GRAF   EQU    COMPUTER1.5;
=001C        383    VETTI400   EQU    COMPUTER1.4;
=001B        384    MAC_SE     EQU    COMPUTER1.3;
=001A        385    EGA        EQU    COMPUTER1.2 ;EGA 80 COLUMN MODE
=0019        386    CGA        EQU    COMPUTER1.1;
=0018        387    HERCULES   EQU    COMPUTER1.0;
             388    ;
=0024        389    COMPUTER2  EQU    24H      ;
=0027        390    VGA480     EQU    COMPUTER2.7
=0026        391    VGA400     EQU    COMPUTER2.6
=0025        392    VGA350     EQU    COMPUTER2.5
=0024        393    VETTI350   EQU    COMPUTER2.4
=0023        394    VT220      EQU    COMPUTER2.3
=0022        395    EGA40      EQU    COMPUTER2.2 ;EGA 40 COLUMN MODE
=0021        396    HGRAP      EQU    COMPUTER2.1
=0020        397    TITLE      EQU    COMPUTER2.0
             398    ;
=0025        399    COMPUTER3  EQU    25H
             400    ;          EQU    COMPUTER3.7
             401    ;          EQU    COMPUTER3.6
             402    ;          EQU    COMPUTER3.5
             403    ;          EQU    COMPUTER3.4
             404    ;          EQU    COMPUTER3.3
             405    ;          EQU    COMPUTER3.2
             406    ;          EQU    COMPUTER3.1
             407    ;          EQU    COMPUTER3.0
             408    ;
=0030        409    in_bits    equ    $26.0    ; IR
=0031        410    repeat_flag equ   $26.1    ; IR
=0032        411    sent_serial equ   $26.2    ; IR
=0033        412    clearon    equ    $26.3    ; Opti
=0034        413    revflag    equ    $26.4    ; Opti
=0035        414    shades16   equ    $26.5    ; smos
=0036        415    SYCOLD     EQU    $26.6    ;1=HAVE NOT PROCESSED CORRECT SYNC
             416                               ;  POLAARITIES AT LEAST ONCE
             417    ;
=0038        418    XEMPTY     EQU    27H.0    ;1=H/W XMIT BUF IS EMPTY
=0039        419    RCHAR      EQU    27H.1    ;1=REC'D A CHARA (USED IN SERIAL
             420                               ;  HANDLER)
=003A        421    CVIDM      EQU    27H.2    ;1=VIDEO RAM (FRAME BUFFER)
             422                               ;  CLEAR IS ACTIVE
=003B        423    LVSY       EQU    27H.3    ;LAST VERT SYNC POLARITY
=003C        424    COLDF      EQU    27H.4    ;1=COLD START, 0=WARM START
             425    ;          EQU    27H.5
=003E        426    RESTORE    EQU    27H.6    ;1=RESTORE CURRENT SETTING WHEN EXIT
             427                               ;  CLEAR
             428    ;
             429    ;MORE BYTE WIDE RAM AREA................
=0028        430    HBEAT      EQU    28H          ;HEARTBEAT COUNTER
=0029        431    OLDBEA     EQU    HBEAT+1      ;OLD HEARTBEAT COUNTER VALUE
=002A        432    VSCNT      EQU    OLDBEA+1     ;# OF 100usec STEPS TO SAMPLE
             433                                   ;VERT SYNC
             434    ;THE CONTRAST VALUES FOR COLORS. EACH CONTRAST AREA:
             435    ;       BYTE 0 = DATA FOR DEFAULT CONTRAST
             436    ;           "  1 = SIGN  "   "       "
             437    ;           "  2 = DATA FOR OVERALL CONTRAST (CONTRAST KEYS)
             438    ;           "  3 = SIGN  "   "       "
             439    ;           "  4 = DATA FOR TINT CONTRAST CHANGE (COLOR KEYS)
             440    ;           "  5 = SIGN  "   "       "
             441    ;           "  6 = DATA FOR 8 COLOR ONLY MODE, NO SHADING
             442    ;           "  7 = SIGN  "   "   "   "   "   "
             443    ;           "  8 = OVERALL CONTRAST, ASSUMED TO BE POSITIVE
             444    ;
=002B        445    CRED       EQU    VSCNT+1      ;(9) RED AREA
=0034        446    CGREEN     EQU    CRED+9       ;(9) GREEN AREA
=003D        447    CBLUE      EQU    CGREEN+9     ;(9) BLUE AREA
```

```
                        448  ;
=0046                   449  SHADES   EQU   CBLUE+9        ;(1) CODE FOR NUMBER OF SHADES
=0047                   450  TWIPER   EQU   SHADES+1       ;(1) SOFTWARE COLOR ADJUST WIPER
                        451                                ;    (ie. INDEX INTO "COLTAB" TABLE)
=0048                   452  CWIPER   EQU   TWIPER+1       ;(1) INDEX INTO OVERAL CONTRAST TABLE
=0049                   453  NOMODE   EQU   CWIPER+1       ;(1) # OF LOOPS TO FIND DISP MODE
=004A                   454  BEGDEL   EQU   NOMODE+1       ;(1) TIMER FOR NO HSYNC DURING NORMAL
                        455                                ;    OPERATION
=004B                   456  INDEX    EQU   BEGDEL+1       ;(1) INDEX INTO DISPLAY MODE INIT
                        457                                ;    TABLE
                        458  ;SERIAL QUEUES & THEIR PTR'S
=004C                   459  RQUE     EQU   INDEX+1        ;(3) RECEIVER QUEUE
=004F                   460  RQEND    EQU   RQUE+3
=004F                   461  XQUE     EQU   RQEND          ;(3) TRANSMIT QUEUE
=0052                   462  XQEND    EQU   XQUE+3
=0052                   463  RQPUS    EQU   XQEND          ;(1) REC PUSH PTR
=0053                   464  RQPOP    EQU   RQPUS+1        ;(1) "   POP  "
=0054                   465  XQPUS    EQU   RQPOP+1        ;(1) XMIT PUSH PTR
=0055                   466  XQPOP    EQU   XQPUS+1        ;(1) "   POP  "
                        467  ;
=0056                   468  COMSTA   EQU   XQPOP+1        ;(1) CURRENT COMM STATE
=0057                   469  XPTR     EQU   COMSTA+1       ;(1) TRANSMIT MESG PTR
=0058                   470  KEYOUT   EQU   XPTR+1         ;(1) IR KEY TO SERIAL XMIT
                        471  ;
=0059                   472  DECSTA   EQU   KEYOUT+1       ;(1) SEQUENCE STATES TO DETEMINE
                        473                                ;    DEC VIDEO MODE
=005A                   474  RAMEND   EQU   DECSTA+1
                        475  ;============ M A C R O S ====================
                        476  ;RFI_DELAY           %MACRO
                        477  ;        MOV    R1,#10  ;10*2= about 20 usec
                        478  ;        DJNZ   R1,$
                        479  ;        %ENDM
                        480  ;-------------------------------------------
                        481
                        482  $RESETLN
                        27   ;
                        28            defseg  a480, absolute
                        29            seg     a480
=0000                   30            org     0
                        31   ;
                        32   $SETLN(MAIN.ASM);%include     "MAIN.ASM"
                        1    ;==========================================
                        2    ;      File Name : MAIN.ASM
                        3    ;      Last Edit : 04-04-90, 03:15 P.M., RNM
                        4    ;==========================================
0000 00                 5           NOP                    ;CHIP PROGRAMMER BS
0001 80 23              6           SJMP    COLD           ;JUMP AROUND INTERRUPT VECTORS
                        7    ;
                        8    ;INTERRUPT VECTORS
                        9    ;MUST BE AT 03H
0003 02 0778            10          jmp     DOFF_INT       ;EXT INTERUPT int0
0006 00 00 00 00        11          DB      0,0,0,0,0
000A 00
                        12   ;MUST BE AT 0BH
000B 02 07A2            13          jmp     DON_INT        ;TIMER 0, LOWER INTERUPT TF0
000E 00 00 00 00        14          DB      0,0,0,0,0
0012 00
                        15   ;MUST BE AT 13H
0013 02 0B2D            16          jmp     IR_interrupt   ;EXT INTERUPT int1
0016 00 00 00 00        17          DB      0,0,0,0,0
001A 00
                        18   ;MUST BE AT 1BH
001B 02 0BE3            19          jmp     IR_counter_int ;TIMER 0, UPPER (TF1)
001E 00 00 00 00        20          DB      0,0,0,0,0
0022 00
                        21   ;MUST BE AT 23H
0023 02 073A            22          JMP     UART_I         ; UART (R1 # TI)
                        23   ;================================
                        24   ; *** POWER UP PROCESSING ***
                        25   ;
                        26   ;NOTE1: AT POWER UP ALL PORT LATCHES ARE AUTOMATICALLY SET
                        27   ;       TO ONES ALLOWING ALL PORTS TO BE INPUTS AND ACTIVATING
                        28   ;       THE ALTERNATE FUNCTIONS FOR PORT 3.
                        29   ;NOTE2: THE FOLLOWING INTRUCTIONS READ THE PORT LATCH AND NOT THE
                        30   ;       HARDWARE PIN:
                        31   ;              ANL
                        32   ;              ORL
                        33   ;              XRL
                        34   ;              JBC
                        35   ;              CPL
```

```
                         36  ;               INC
                         37  ;               DEC
                         38  ;               DJNZ
                         39  ;               MOV PX.Y,C
                         40  ;               CLR PX.Y
                         41  ;               SET PX.Y
                         42  ;NOTE3: STACK DEFAULTS TO 07H ON POWER UP / RESET
                         43  ;
=0026                    44  COLD     EQU     $
0026 75 E8 04            45           MOV     CSR,#04H          ;SETUP CSR FOR NORMAL I/O ON P6
                         46
0029 C2 DF               47           CLR     U1NOT             ;RESET TO U1
002B 75 81 59            48           MOV     SP,#RAMEND-1      ;SETUP STACK
002E 75 C8 FF            49           MOV     P5,#0FFH          ;MAKE SURE THERE IS NO
                         50                                     ;CONFLICT WITH VIDEO SIGNALS
0031 75 4A 0C            51           MOV     BEGDEL,#BEGTIM    ;# OF HSYNC'S INACTIVE
                         52                                     ;DURING NORMAL OPERATION
                         53                                     ;BEFORE RESTART
0034 C2 B5               54           CLR     DEMO              ;NORMAL NON-TITLE SCREEN
                         55                                     ;OPERATION
0036 C2 C4               56           CLR     HOFF              ;MAKE SURE HSYNC IS ENABLED
0038 12 001E             57           CALL    TITSCR            ;DISPLAY POWER UP SCREEN
                         58  ;
003B D2 3C               59           SETB    COLDF             ;COLD START FLAG
003D D2 36               60           SETB    SYCOLD            ;HAVE NOT PROCESSED CORRECT
                         61                                     ;POLOARTIES AT LEAST ONCE
003F C2 B7               62           CLR     NDEC              ;CGA/EGA HSYNC SELECT=CGA
                         63  ;WARM START
=0041                    64  BEGIN    EQU     $
0041 75 59 00            65           MOV     DECSTA,#0         ;SEQUENCE STATES FOR THE
                         66                                     ;DETERMINATION OF DEC AS THE
                         67                                     ;VIDEO MODE.
=0044                    68  BLOOP    EQU     $
0044 75 A8 00            69           MOV     IE,#00H           ;DISABLE ALL INTERRUPTS DURING
0047 C2 C4               70           CLR     HOFF              ;MAKE SURE HSYNC ENABLED
                         71  INITIALIZATION
0049 75 81 59            72           MOV     SP,#RAMEND-1      ;FOR EGA,CGA RESTARTS
004C 75 20 00            73           MOV     ACT_KEY1,#00H     ;CLEAR ALL FLAGS
004F 75 21 00            74           MOV     ACT_KEY2,#00H     ;
0052 75 0E 35            75           MOV     MACFRA,#MACFPR
                         76  ;
0055 75 89 55            77           MOV     TMOD,#01010101B   ;16 BIT COUNTERS
0058 7D 10               78           MOV     R5,#10H           ;LOOP COUNTER
005A 75 8C FF            79  HSYNC_CNT MOV    TH0,#0FFH         ;COUNTER 0 PRESET VALUE
005D 75 8A 66            80           MOV     TL0,#66H          ;
0060 D2 8C               81           SETB    TR0               ;TURN ON COUNTER 0
0062 12 04A2             82           CALL    DELAY             ;
0065 C2 8C               83           CLR     TR0               ;TURN OFF COUNTER 0
0067 12 0195             84           CALL    AVERAGE           ;
006A DD EE               85           DJNZ    R5,HSYNC_CNT      ;REPEAT 16 TIMES
006C 12 045A             86           CALL    DEFAULT           ;GET DEFAULT VALUES FROM TABLES
006F E5 4B               87           MOV     A,INDEX           ;CHECK FOR INVALID NUMBER
0071 B4 00 23            88           CJNE    A,#00H,CONTINUE   ;CONTINUE IF NON ZERO
                         89  ;CAN'T DETERMINE MODE: DISPLAY TITLE SCREEN AFTER "NUMNO" NUMBER OF
                         90  ;                  TRIES
=0074                    91  WARM20   EQU     $
0074 20 B7 04            92           JB      NDEC,WARM24       ;JMP IF DEC IS SELECTED
0077 05 59               93           INC     DECSTA            ;TO NEXT STEP IN DETEMINATION
                         94                                     ;OF DEC AS THE VIDEO MODE
0079 80 03               95           SJMP    WARM26
=007B                    96  WARM24   EQU     $
007B 75 59 00            97           MOV     DECSTA,#0         ;DEC NOT FOUND WITH DEC
                         98                                     ;SELECTED, RESTART PROCESS
=007E                    99  WARM26   EQU     $
007E B2 B7              100           CPL     NDEC              ;FLIP CGA/VT220 HSYNC SELECT
0080 30 3C 04           101           JNB     COLDF,WARM30      ;JMP IF NOT 1ST TIME
0083 C2 3C              102           CLR     COLDF             ;FLAG AS WARM
0085 80 BD              103           SJMP    BLOOP
=0087                   104  WARM30   EQU     $
0087 E5 49              105           MOV     A,NOMODE          ;TRIED TO FIND MODE ENOUGH?
0089 60 04              106           JZ      WARM35            ;YES, GO DISPLAY TITLE SCREEN
008B 15 49              107           DEC     NOMODE            ;NO, KEEP TRYING
008D 80 B5              108           SJMP    BLOOP
=008F                   109  WARM35   EQU     $
008F 75 A8 00           110           MOV     IE,#000H          ;DISABLE ALL INTERRUPTS
0092 12 001E            111           CALL    TITSCR            ;DISPLAY TITLE SCREEN
0095 80 AA              112           SJMP    BEGIN             ;TRY TO IDENTIFY COMPUTER AGAIN
                        113  ;DISPLAY (FREQ) MODE HAS BEEN DETERMINED
=0097                   114  CONTINUE EQU     $
0097 B4 08 0E           115           CJNE    A,#008H,WARM40    ;JMP IF NOT DEC VT220 OR CGA
```

```
                                116   ;FOR DEC, IT IS NECESSARY TO HAVE THE FOLLOWING SATISFIED IN ORDER:
                                117   ;      1. FIND DEC HSYNC WITH DEC SELECTED (HDEC=1)
                                118   ;      2. DON'T FIND HSYNC WITH CGA SELECTED (HDEC=0)
                                119   ;      3. FIND DEC A SECOND TIME WITH DEC SELECTED (HDEC=1)
009A 30 B7 OE                   120          JNB       HDEC,WARM50       ;GO INITIALIZE IF CGA SELECTED
009D 05 59                      121          INC       DECSTA            ;TO NEXT STEP
009F E5 59                      122          MOV       A,DECSTA
00A1 B4 03 00                   123          CJNE      A,#3,$+3          ;IS IT REALLY DEC MODE?
00A4 40 D8                      124          JC        WARM26            ;NO, NOT YET
00A6 80 03                      125          SJMP      WARM50
=00A8                           126   WARM40 EQU       $
00A8 20 B7 D0                   127          JB        HDEC,WARM24       ;JMP IF HSYNC WRONG
=00AB                           128   WARM50 EQU       $
00AB D2 DF                      129          SETB      U1NOT             ;U1 RESET BACK HIGH
00AD D2 80                      130          SETB      TXLED             ;MAKE SURE LIGHTS ARE OFF
00AF D2 A0                      131          SETB      CLLED
                                132   ;
00B1 C2 3A                      133          CLR       CVIDM             ;ASSUME VIDEO RAM CLEAR
                                134                                      ;INACTIVE
00B3 75 0F 04                   135          MOV       BLINK_CTR,#BLINK_TC ;CLR LIGHT FLASH RATE
                                136   ;SETUP NORAML VIDEO ONLY ONCE HAVE SUCESSFUL POWER UP
00B6 30 36 02                   137          JNB       SYCOLD,WARM60     ;JMP IF DONE ONCE
                                138                                      ;AFTER GOOD POLARTIES
00B9 D2 A3                      139          SETB      NORVID            ;FORCE NORMAL VIDEO FOR BOTH
                                140                                      ;ANALOG & DIGITAL
=00BB                           141   WARM60 EQU       $
                                142   ;DISPLAY MODE HAS BEEN DETERMINED
                                143   ;Initialize control registers
                                144   ; Set up the timers and UART
00BB 75 B8 03                   145          MOV       IP,#00000011B     ;MAC II INTERRUPTS=HIGH
                                146                                      ;VSYNC & TIMER 0 (D=1)
00BE 75 89 23                   147          mov       tmod,#tmodval
00C1 75 88 4F                   148          mov       tcon,#tconval
00C4 75 87 00                   149          mov       pcon,#pconval
00C7 75 98 50                   150          mov       scon,#sconval
00CA 75 8D E8                   151          mov       th1,#232          ; 1200 baud divisor
00CD D2 99                      152          setb      tx_flag           ;
                                153   ; Note: UART is now ready to send
                                154   ;INITIALIZE SOME MORE
00CF C2 33                      155          CLR       CLEARON           ;FLAG=NOT IN CLEAR MODE
00D1 12 0B1B                    156          call      init_IR_int       ;set up for IR interrupts
00D4 75 2A 09                   157          MOV       VSCNT,#HBPRE      ;# OF 100usec TO VERT SAMPLE
                                158                                      ;FOR 16 COLORS
00D7 75 28 00                   159          MOV       HBEAT,#0          ;FOR VIDEO RAM CLEAR, MAKE
00DA 75 29 00                   160          MOV       OLDBEA,#0         ;SURE TIMERS START AT 0 & TOGETHER
                                161   ;SETUP TRANSMIT RECEIVE QUEUES
00DD 75 52 4C                   162          MOV       RQPUS,#RQUE       ;REC QUEUE PUSH PTR
00E0 75 53 4C                   163          MOV       RQPOP,#RQUE
00E3 75 54 4F                   164          MOV       XQPUS,#XQUE       ;XMIT QUEUE PUSH PTR
00E6 75 55 4F                   165          MOV       XQPOP,#XQUE
00E9 75 58 00                   166          MOV       KEYOUT,#0         ;SET IR KEY TO XMIT TO NONE
                                167   ;
00EC 75 56 01                   168          MOV       COMSTA,#1         ;IDLE STATE FOR COMMUNICATIONS
                                169   ; Enable interrupts
                                170   ; Int1 (pin)
00EF D2 8A                      171          setb      IT1               ; int1: falling edge
00F1 D2 AA                      172          setb      EX1               ; enable int1
                                173   ; TF1 (timer 0, interrupt TF1)
00F3 D2 8E                      174          setb      TR1               ; start the timer
00F5 D2 AB                      175          setb      ET1               ; enable timer1 int
00F7 D2 A9                      176          setb      ET0               ;MAC II's HSYNC OFF
00F9 D2 9C                      177          setb      REN               ; enable serial reception
00FB D2 A8                      178          SETB      EX0               ;ENABLE VSYNC FOR MAC
00FD D2 38                      179          SETB      XEMPTY            ;XMIT BUF IS EMPTY
00FF D2 AC                      180          SETB      ES                ;ENABLE SERIAL INTERRUPTS
0101 75 1E 80                   181          MOV       NSYNCS,#80H       ;FLAG=NO REAL UPDATA YET
0104 D2 AF                      182          setb      EA                ; interrupts ON
                                183   ;WAIT FOR SYNC POLARITY UPDATE
=0106                           184   WARM80 EQU       $
0106 E5 1E                      185          MOV       A,NSYNCS          ;TRUE SYNCS AVAILABLE?
0108 20 E7 FB                   186          JB        ACC.7,WARM80      ;NO, KEEP WAITING
                                187   ;
010B 12 05FD                    188          CALL      INITMODE          ;INITIALIZE BOARD FOR PROPER MODE
010E 85 22 1E                   189          MOV       NSYNCS,SYNCS      ;COPY POLARITIES TO INTER LOC
0111 12 0845                    190          CALL      LDFCN             ;SETUP PANEL CONTRAST DEFAULT
                                191                                      ;OTHER CONTRIBUTIONS TO
                                192                                      ;CONTRAST ARE NOT CHANGED
                                193   ;++++++++++++++++++++++++++++++++++++++++++++
                                194   ;MAIN LOOP
                                195   ;++++++++++++++++++++++++++++++++++++++++++++
0114 00                         196   MAINTOP NOP                        ;TBD
```

```
0115 12 017C      197              CALL    SYNC_POL        ;DETERMINE SYNC POLARITIES
                  198      ;SEE IF TIME TO PROCESS OTHER ITEMS
0118 E5 28        199              MOV     A,HBEAT
011A F8           200              MOV     R0,A            ;DON'T USE NEW INTERRUPT VALUE
011B C2 D7        201              CLR     CY
011D 95 29        202              SUBB    A,OLDBEA        ;DELTA TIME=POS?
011F 50 02        203              JNC     MAIN10          ;YES
0121 34 FF        204              ADDC    A,#255          ;ROLL OVER TO POS
=0123             205      MAIN10  EQU     $
                  206      ;VIDEO RAM CLEAR HANDLING
0123 30 3A 0F     207              JNB     CVIDM,MAIN30    ;JMP IF VIDEO RAM CLEAR INACTIVE
0126 B4 21 00     208              CJNE    A,#VIDCLT,$+3   ;VIDEO RAM CLEAR TIME OVER?
0129 40 0A        209              JC      MAIN30          ;NO
012B C2 3A        210              CLR     CVIDM           ;VIDEO RAM CLEAR NOW INACTIVE
012D 75 46 01     211              MOV     SHADES,#SMONO   ;FORCE MONO MODE
0130 E5 46        212              MOV     A,SHADES
0132 12 0AC7      213              CALL    SHA_OUT         ;OUTPUT # OF SHADES CODE
=0135             214      MAIN30  EQU     $
0135 C2 D7        215              CLR     CY
0137 94 5A        216              SUBB    A,#TASKT        ;TIME TO PROCESS TASKS?
0139 40 D9        217              JC      MAINTOP         ;NO
013B 88 29        218              MOV     OLDBEA,R0       ;NEW INTO OLD
                  219      ;FOR DEC VT220 & MAC II CHECK IF HSYNC IS GONE
013D 20 23 03     220              JB      VT220,MAIN35    ;(2) JMP IF DEC VT220
0140 30 1F 20     221              JNB     MAC_II,MAIN80   ;(2) JMP IF NOT MAC II
=0143             222      MAIN35  EQU     $
0143 7B 20        223              MOV     R3,#32          ;(1) SAMPLE COUNTER
0145 74 00        224              MOV     A,#0            ;(1) POLARITY COUNTER
=0147             225      MAIN40  EQU     $
0147 20 B4 01     226              JB      HSIN,MAIN50     ;(2) JMP IF HORZ SYNC=1
014A 04           227              INC     A               ;(1) HORZ SYNC LOW AGAIN
=014B             228      MAIN50  EQU     $
014B DB FA        229              DJNZ    R3,MAIN40       ;(2) REPEAT FOR ALL SAMPLES
014D 60 03        230              JZ      MAIN60          ;(2) JMP IF ALWAYS HIGH THEN INACTIVE
014F B4 20 0E     231              CJNE    A,#32,MAIN70    ;(2) JMP IF NOT ALWAYS LOW
=0152             232      MAIN60  EQU     $
0152 E5 4A        233              MOV     A,BEGDEL        ;(1) DELAY TO RESTART
0154 C3           234              CLR     C
0155 94 03        235              SUBB    A,#3            ;(1) TIME TO RESTART?
0157 F5 4A        236              MOV     BEGDEL,A        ;(1)
0159 20 E7 02     237              JB      ACC.7,MAIN65    ;(2) YES, RESTART IF THROUGH 0
015C 70 05        238              JNZ     MAIN80          ;(2) NO
=015E             239      MAIN65  EQU     $
015E 0141         240              JMP     BEGIN           ;(2)
=0160             241      MAIN70  EQU     $
0160 75 4A 0C     242              MOV     BEGDEL,#BEGTIM  ;(2) RELOAD DELAY TO RESTART
                  243      ;NORMAL TASK PROCESSING
=0163             244      MAIN80  EQU     $
0163 12 025A      245              CALL    SW_READ         ;READ KEYPAD STATUS
0166 12 028C      246              CALL    FLAGCHEK        ;ACT ON PENDING KEYPRESSES
0169 12 04B5      247              CALL    MODECHEK        ;CHECK SERIAL PORT FOR MODE INFO
                  248      ;FLASH LIGHT IF NOT IN DEFAULT # OF SHADES
                  249      ;Check to see if CLEAR light needs blinking update.
016C 30 35 A5     250              JNB     SHADES16,MAINTOP ;JMP IF IN 8 SHADES MODE
016F 20 33 A2     251              JB      CLEARON,MAINTOP ;JMP IF IN CLEAR STATE
0172 D5 0F 9F     252              DJNZ    BLINK_CTR,MAINTOP ;JMP IF NOT TIME TO TOGGLE LED
                  253      ;Toggle the CLEAR light, reinit the counter
0175 B2 A0        254              CPL     CLLED
0177 75 0F 04     255              MOV     BLINK_CTR,#BLINK_TC
017A 80 98        256              JMP     MAINTOP
                  257      ;-------------------------------------
                  258      ;Subroutine: SYNC_POL
                  259      ;Function  : Determine polarities of hsync and vsync
                  260      ;Registers : R0
=017C             261      SYNC_POL EQU    $
017C E5 1E        262              MOV     A,HSYNCS        ;NEW POLARITIES AS DETERMINED
                  263                                      ;BY HEARTBEAT INTERRUPT
017E B4 04 02     264              CJNE    A,#4,SY_P20     ;JMP IF HSYNC IS ACTIVE
0181 80 00        265              SJMP    POL_CH          ;HSYNC IS INACTIVE, FORCE
                  266                                      ;RESTART
=0183             267      SY_P20  EQU     $
0183 20 18 07     268              JB      HERCULES,SY_P80 ;IGNORE SYNC CHANGES IF
                  269                                      ;HERCULES
0186 20 1B 04     270              JB      MAC_SE,SY_P80   ;IGNORE IF MAC_SE (IT HAS
                  271                                      ;ABOUT A 50% D.C. ON HSYNC
                  272                                      ;WHICH CAUSES THE POLARITY TO
                  273                                      ;CHANGE
0189 65 22        274              XRL     A,SYNCS         ;SEE IF THERE WAS A CHANGE
018B 70 03        275              JNZ     POL_CH          ;JMP IF POLARITIES CHANGED
=018D             276      SY_P80  EQU     $
```

```
0180 C2 36        277              CLR     SYCOLD          ;FLAG CORRECT POLARITIES SEEN
                  278                                      ;ONCE
018F 22           279              RET
=0190             280     POL_CK   EQU     $
0190 75 49 06     281              MOV     NOMODE,#NUMNO   ;# OF LOOPS TO TRY TO FIND
                  282                                      ;MODE BEFORE DISPLAYING TITLE
                  283                                      ;SCREEN
0193 0141         284              JMP     BEGIN           ;TO WARM START
                  285     ;----------------------------------------
                  286     ;Subroutine: AVERAGE
                  287     ;Function  : Average 8 Numbers
                  288     ;On Entry  : FREQ0 - FREQ7 contain the 8 numbers to be averaged
                  289     ;On Exit   : FREQ contains the average of FREQ0 - FREQ7
                  290     ;Registers : R2,R0 and B
0195 85 16 17     291     AVERAGE  MOV     FREQ7,FREQ6     ;RUNNING VALUES
0198 85 15 16     292              MOV     FREQ6,FREQ5     ;
019B 85 14 15     293              MOV     FREQ5,FREQ4     ;
019E 85 13 14     294              MOV     FREQ4,FREQ3     ;
01A1 85 12 13     295              MOV     FREQ3,FREQ2     ;
01A4 85 11 12     296              MOV     FREQ2,FREQ1     ;
01A7 85 10 11     297              MOV     FREQ1,FREQ0     ;
01AA 85 8A 10     298              MOV     FPEQ0,TL0       ;LATEST VALUE FROM HSYNC COUNTER
                  299     ;
01AD 78 10        300              MOV     R0,#FREQ0  ;R0 = DATA POINTER
01AF 75 F0 00     301              MOV     B,#00H     ;CLEAR B
01B2 7A 07        302              MOV     R2,#07H    ;COUNTER FOR ADDITIONS
01B4 C3           303              CLR     C          ;CLEAR CARRY BIT
01B5 E6           304              MOV     A,@R0      ;LOAD FIRST VALUE TO AVERAGE
01B6 08           305              INC     R0         ;
01B7 36           306     ADDER    ADDC    A,@R0      ;ADD FIRST TWO VALUES
01B8 08           307              INC     R0         ;INCREMENT POINTER
01B9 50 02        308              JNC     NO_CARRY   ;IF NO CARRY THEN DON'T ADD TO HIGH BYTE
01BB 05 F0        309              INC     B          ;INCREMENT HIGH BYTE
01BD DA F8        310     NO_CARRY DJNZ    R2,ADDER   ;ADD ALL VALUES
01BF 54 F8        311              ANL     A,#11111000B    ;CLEAR LOWER 3 BITS OF LOW BYTE
01C1 25 F0        312              ADD     A,B        ;REPLACE 3 BITS WITH THOSE FROM HIGH BYTE
01C3 03           313              RR      A          ;ROTATE RIGHT THREE TIMES = DIV BY 8
01C4 03           314              RR      A          ;
01C5 03           315              RR      A          ;
01C6 F5 18        316              MOV     FREQ,A     ;STORE NEW AVERAGE
01C8 22           317              RET                ;RETURN TO MAIN ROUTINE
                  318     ;----------------------------------------
                  319     ;Subroutine: PLL_CHNG
                  320     ;Function  : Change PLL divider in U1 (V_MOVE WRITES THE MSB !!!)
                  321     ;Registers : B
01C9 E5 1B        322     PLL_CHNG MOV     A,PLL_LOW       ;PLL RATIO
01CB 54 0F        323              ANL     A,#00001111B    ;MASK OFF
01CD 75 90 C0     324              MOV     P1,#11000000B   ;ADDRESS = 100
01D0 42 90        325              ORL     P1,A            ;(READS PORT LATCH AND NOT PINS)
01D2 C2 C0        326              CLR     NCSU1           ;CS FOR U1
01D4 C2 97        327              CLR     NU1WR           ;U1 WRITE PULSE (LOWER 4 BITS)
                  328              ;RFI_DELAY              ;DELAY FOR LARGE RFI CAP'S
01D6 79 0A        328              MOV     R1,#10  ;10*2= about 20 usec
01D8 D9 FE        328              DJNZ    R1,$
01DA D2 97        329              SETB    NU1WR           ;
01DC E5 1B        330              MOV     A,PLL_LOW       ;PLL RATIO
01DE C4           331              SWAP    A               ;
01DF 54 0F        332              ANL     A,#00001111B    ;MASK OFF
01E1 75 90 D0     333              MOV     P1,#11010000B   ;ADDRESS = 101
01E4 42 90        334              ORL     P1,A            ;
01E6 C2 97        335              CLR     NU1WR           ;U1 WRITE PULSE (UPPER 4 BITS)
                  336              ;RFI_DELAY              ;DELAY FOR LARGE RFI CAP'S
01E8 79 0A        336              MOV     R1,#10  ;10*2= about 20 usec
01EA D9 FE        336              DJNZ    R1,$
01EC D2 97        337              SETB    NU1WR           ;
01EE D2 C0        338              SETB    NCSU1           ;U1 DESELECTED
01F0 22           339              RET                     ;DONE
                  340     ;----------------------------------------
                  341     ;Subroutine: V_MOVE
                  342     ;Function  : Move picture vertically on panel
                  343     ;            or flag forcing of panel defaults
                  344     ;Registers : B
=01F1             345     V_MOVE   EQU     $
01F1 53 1A 7F     346              ANL     V_POS,#01111111B ;MASK IN MSB FOR PLL
01F4 E5 1C        347              MOV     A,PLL_HI        ;
01F6 42 1A        348              ORL     V_POS,A         ;
01F8 E5 1A        349              MOV     A,V_POS         ;NEW VERTICAL POSITION VALUE
01FA 54 0F        350              ANL     A,#00001111B    ;MASK OFF
01FC 75 90 A0     351              MOV     P1,#10100000B   ;ADDRESS = 010
01FF 42 90        352              ORL     P1,A            ;
```

```
0201 C2 C0      353              CLR     NCSU1           ;CS FOR U1
0203 C2 97      354              CLR     NU1WR           ;U1 WRITE PULSE (LOWER 4 BITS)
                355              ;RFI_DELAY
0205 79 0A      355              MOV     R1,#10 ;10*2= about 20 usec
0207 D9 FE      355              DJNZ    R1,$
0209 D2 97      356              SETB    NU1WR           ;
020B E5 1A      357              MOV     A,V_POS         ;
020D C4         358              SWAP    A               ;
020E 54 0F      359              ANL     A,#00001111B    ;MASK OFF
0210 75 90 B0   360              MOV     P1,#10110000B   ;ADDRESS = 011
0213 42 90      361              ORL     P1,A            ;
0215 C2 97      362              CLR     NU1WR           ;U1 WRITE PULSE (UPPER 4 BITS)
                363              ;RFI_DELAY              ;DELAY FOR RFI CAP'S
0217 79 0A      363              MOV     R1,#10 ;10*2= about 20 usec
0219 D9 FE      363              DJNZ    R1,$
021B D2 97      364              SETB    NU1WR           ;
021D D2 C0      365              SETB    NCSU1           ;DESELECT U1
021F 22         366              RET                     ;DONE
                367      ;--------------------------------
                368      ;Subroutine: H_MOVE
                369      ;Function  : Move picture horizontally on panel
                370      ;Registers : B
0220 E5 19      371      H_MOVE  MOV     A,H_POS         ;
                372              ;-JNB    MAC_SE,H_M20   ;JMP IF NOT MAC SE
                373              ;-CJNE   A,#HPSE-3,NO_MIN ;JMP IF NOT AT MIN MAC SE
                374              ;-SJMP   H_M30
=0222           375      H_M20   EQU     $
0222 B4 FF 07   376              CJNE    A,#0FFH,NO_MIN  ;IF PAST ZERO THEN
=0225           377      H_M30   EQU     $
0225 85 1D 19   378              MOV     H_POS,H_MAX     ;BACK TO MAX VALUE
0228 15 19      379              DEC     H_POS           ;ACTUAL MAX IS ONE LESS
022A 80 06      380              SJMP    HNORMAL         ;
022C B5 1D 03   381      NO_MIN  CJNE    A,H_MAX,HNORMAL ;IF AT MAXIMUM THEN SET TO 00H
022F 75 19 00   382              MOV     H_POS,#00H      ;BACK TO 00H
                383              ;-JNB    MAC_SE,HNORMAL ;JMP IF NOT MAC SE
                384              ;-MOV    H_POS,#HPSE-2  ;MAC SE MINIMUM
0232 E5 19      385      HNORMAL MOV     A,H_POS         ;NEW HORIZONTAL POSITION VALUE
0234 54 0F      386              ANL     A,#00001111B    ;MASK OFF
0236 75 90 80   387              MOV     P1,#10000000B   ;ADDRESS = 000
0239 42 90      388              ORL     P1,A            ;
023B C2 C0      389              CLR     NCSU1           ;CS FOR U1
023D C2 97      390              CLR     NU1WR           ;WRITE PULSE FOR U1 (LOWER 4 BITS)
                391              ;RFI_DELAY              ;DELAY FOR RFI CAP'S
023F 79 0A      391              MOV     R1,#10 ;10*2= about 20 usec
0241 D9 FE      391              DJNZ    R1,$
0243 D2 97      392              SETB    NU1WR           ;
0245 E5 19      393              MOV     A,H_POS         ;
0247 C4         394              SWAP    A               ;
0248 54 0F      395              ANL     A,#00001111B    ;MASK OFF
024A 75 90 90   396              MOV     P1,#10010000B   ;ADDRESS = 001
024D 42 90      397              ORL     P1,A            ;
024F C2 97      398              CLR     NU1WR           ;WRITE PULSE FOR U1 (UPPER 4 BITS)
                399              ;RFI_DELAY              ;DELAY FOR RFI CAP'S
0251 79 0A      399              MOV     R1,#10 ;10*2= about 20 usec
0253 D9 FE      399              DJNZ    R1,$
0255 D2 97      400              SETB    NU1WR           ;
0257 D2 C0      401              SETB    NCSU1           ;DESELECT U1
0259 22         402              RET                     ;DONE
                403      ;--------------------------------
                404      ;Subroutine: SW_READ
                405      ;Function  : Read keypad status
                406      ;On Exit   : ACT_KEY1 and ACT_KEY2 bits reflect keypad status
                407      ;Registers : None
=025A           408      SW_READ EQU     $
025A 75 90 FF   409              MOV     P1,#0FFH        ;MAKE SURE PORT IS IN CORRECT
                410                                      ;STATE SINCE SOME PINS ARE
                411                                      ;DUAL PURPOSE (ie. U1's DATA)
025D C2 90      412              CLR     ROW1            ;ROW1
                413              ;RFI_DELAY              ;DELAY FOR LARGE RFI CAP'S
025F 79 0A      413              MOV     R1,#10 ;10*2= about 20 usec
0261 D9 FE      413              DJNZ    R1,$
0263 E5 80      414              MOV     A,P0            ;
0265 F4         415              CPL     A               ;1'S ARE NOW ACTIVE
0266 54 FE      416              ANL     A,#11111110B    ;MASK OFF LOWER BIT NOT USED
0268 42 20      417              ORL     ACT_KEY1,A      ;MASK INTO FLAG BYTE 1
026A D2 90      418              SETB    ROW1            ;
                419                                      ;
026C C2 91      420              CLR     ROW2            ;ROW2
                421              ;RFI_DELAY              ;DELAY FOR LARGE RFI CAP'S
```

```
026E 79 0A      421           MOV    R1,#10    ;10*2= about 20 usec
0270 D9 FE      421           DJNZ   R1,$
0272 E5 80      422           MOV    A,P0                  ;
0274 F4         423           CPL    A                     ;1'S ARE NOW ACTIVE
0275 54 FE      424           ANL    A,#11111110B          ;MASK OFF UNUSED BIT
0277 42 21      425           ORL    ACT_KEY2,A            ;MASK INTO FLAG BYTE 2
0279 D2 91      426           SETB   ROW2                  ;
027B 22         427           RET                          ;KEYPAD SCANNING COMPLETE
                428   ;
                429   ;---------------------------------------------------------
                430   ;MAIN LOOP'S FLAG CHECK (KEY PROCESSING) SERVICE ROUTINES
                431   ;--------------------------------
                432   ;MOVE PICTURE UP
=027C           433   V_PLUS    EQU    $
027C 30 33 03   434             JNB    CLEARON,V_P20  ;JMP IF NOT IN CLEAR MODE
027F C2 3E      435             CLR    RESTORE        ;FLAG FORCE PANEL DEFAULTS
0281 22         436             RET
=0282           437   V_P20     EQU    $
                438   ;JUST A SCREEN MOVE
=0282           439   V_P50     EQU    $
0282 05 1A      440             INC    V_POS          ;MOVE UP 1 PIXEL
0284 31F1       441             CALL   V_MOVE         ;ROUTINE TO UPDATE U1
0286 22         442             RET                   ;DONE
                443   ;----------------------------
                444   ;MOVE PICTURE DOWN
=0287           445   V_MINUS   EQU    $
                446   ;JUST A SCREEN MOVE
=0287           447   V_M50     EQU    $
0287 15 1A      448             DEC    V_POS          ;MOVE DOWN 1 PIXEL
0289 31F1       449             CALL   V_MOVE         ;ROUTINE TO UPDATE U1
028B 22         450             RET                   ;DONE
                451   ;-+-+-+-+-+-+-+-+-+-+-+-+-+-+-+-+-+-
                452   ;Subroutine: FLAGCHEK
                453   ;Function : Act on pending keypresses or IR transmissions
                454   ;On Entry : ACT_KEY1 and ACT_KEY2 bits reflect status
                455   ;On Exit  : Actions performed and flags cleared
=028C           456   FLAGCHEK  EQU    $
028C 30 33 06   457             JNB    CLEARON,FLCK20 ;JMP IF NOT IN CLEAR MODE
028F 53 20 5A   458             ANL    ACT_KEY1,#5AH  ;ONLY UP, COL+, COL- AND CLEAR
                459                                   ;KEYS ARE ACTIVE
0292 75 21 00   460             MOV    ACT_KEY2,#0
=0295           461   FLCK20    EQU    $
0295 E5 20      462             MOV    A,ACT_KEY1     ;FLAG BYTE 1
0297 60 15      463             JZ     NOFLAGS1       ;CHECK BYTE 2 IF NO FLAGS SET
0299 10 06 E0   464             JBC    KVPLUS,V_PLUS  ;
029C 10 05 3D   465             JBC    KHMINUS,H_MINUS ;
029F 10 04 26   466             JBC    KCOLPLUS,RECOLP
02A2 10 03 26   467             JBC    KCOLMIN,RECOLM
02A5 10 02 26   468             JBC    KTEXT,RETEXT   ;
02A8 10 01 1A   469             JBC    KCLEAR,RECLEAR
02AB 10 00 26   470             JBC    KBCOL,RECTOG
                471   ;
02AE E5 21      472   NOFLAGS1  MOV    A,ACT_KEY2     ;FLAG BYTE 2
02B0 60 12      473             JZ     NOFLAGS2       ;DONE IF NO FLAGS SET
02B2 10 0E D2   474             JBC    KVMINUS,V_MINUS ;
02B5 10 0C 29   475             JBC    KCONPLUS,CON_PLUS ;ALL 3 CONTRASTS UP
02B8 10 0B 40   476             JBC    KCONMIN,CON_MIN   ;  "  "   "    DOWN
02BB 10 0A 13   477             JBC    KSYNC,RESYNC   ;SYNC KEY PRESSED
02BE 10 09 51   478             JBC    KRVIDEO,R_VIDEO ;
02C1 10 0F 13   479             JBC    KHPLUS,H_PLUS  ;
                480   ;
02C4 22         481   NOFLAGS2  RET                   ;DONE
02C5 02 040A    482   RECLEAR   JMP    CLEAR
02C8 02 0370    483   RECOLP    JMP    COL_PLUS
02CB 02 0393    484   RECOLM    JMP    COL_MIN
02CE 02 0320    485   RETEXT    JMP    TEXT
02D1 02 03B3    486   RESYNC    JMP    SYNC
02D4 02 03F6    487   RECTOG    JMP    CTOG
                488   ;----------------------------
                489   ;MOVE PICTURE LEFT
=02D7           490   H_PLUS    EQU    $
02D7 05 19      491             INC    H_POS          ;MOVE LEFT 1 PIXEL
02D9 5120       492             CALL   H_MOVE         ;ROUTINE TO UPDATE U1
02DB 22         493             RET                   ;DONE
                494   ;----------------------------
                495   ;MOVE PICTURE RIGHT
=02DC           496   H_MINUS   EQU    $
02DC 15 19      497             DEC    H_POS          ;MOVE RIGHT 1 PIXEL
02DE 5120       498             CALL   H_MOVE         ;ROUTINE TO UPDATE U1
02E0 22         499             RET                   ;DONE
```

```
                          500    ;------------------------------
                          501    ;CONTRAST PLUS
=02E1                     502    CON_PLUS  EQU     $
02E1 E5 48                503              MOV     A,CWIPER         ;WIPER FOR OVERALL CONTRAST
02E3 B4 50 00             504              CJNE    A,#CLIM*2,$+3    ;AT UPPER LIMIT?
02E6 50 12                505              JNC     CON_P80          ;YES, DONE
                          506    ;BUMP CONTRAST USING S/W WIPER INTO ROM TABLE
02E8 05 48                507              INC     CWIPER           ;TO NEXT SET OF VALUES
02EA 12 0922              508              CALL    CWIPD            ;XFER DATA FROM ROM TO RAM
02ED 12 0900              509              CALL    TES_ALL          ;ANY OF 3 COLORS OVER FLOW?
02F0 50 05                510              JNC     CON_P50          ;NO, OK
                          511    ;OVERFLOW
02F2 15 48                512              DEC     CWIPER           ;RESTORE WIPER
02F4 02 0922              513              JMP     CWIPD            ;GET PREVIOUS DATA
                          514    ;OK TO OUTPUT NEW CONTRAST
=02F7                     515    CON_P50   EQU     $
02F7 02 0806              516              JMP     RGB_OUT
=02FA                     517    CON_P80   EQU     $
02FA 22                   518              RET
                          519    ;------------------------------
                          520    ;CONTRAST MINUS
=02FB                     521    CON_MIN   EQU     $
02FB E5 48                522              MOV     A,CWIPER         ;WIPER FOR OVERALL CONTRAST
02FD 60 12                523              JZ      CON_M80          ;JMP IF NO ROOM
                          524    ;BUMP CONTRAST USING S/W WIPER INTO ROM TABLE
02FF 15 48                525              DEC     CWIPER           ;TO NEXT SET OF VALUES
0301 12 0922              526              CALL    CWIPD            ;XFER DATA FROM ROM TO RAM
0304 12 0900              527              CALL    TES_ALL          ;ANY OF 3 COLORS UNDER FLOW?
0307 50 05                528              JNC     CON_M50          ;NO, OK
                          529    ;UNDERFLOW
0309 05 48                530              INC     CWIPER           ;RESTORE WIPER
030B 02 0922              531              JMP     CWIPD            ;GET PREVIOUS DATA
                          532    ;OK TO OUTPUT NEW CONTRAST
=030E                     533    CON_M50   EQU     $
030E 02 0806              534              JMP     RGB_OUT
=0311                     535    CON_M80   EQU     $
0311 22                   536              RET
=0312                     538    R_VIDEO   EQU     $
0312 B2 A3                539              CPL     NORVID           ;CHANGE VIDEO POLARITY
0314 C2 91                540              CLR     ROW2             ;TURN ON ROW 2
                          541              ;RFI_DELAY              ;DELAY FOR LARGE RFI CAP'S
0316 79 0A                541              MOV     R1,#10  ;10*2= about 20 usec
0318 D9 FE                541              DJNZ    R1,$
031A 30 81 FD             542    RELEASE2  JNB     KEY1,RELEASE2    ;WAIT TIL KEY RELEASED
031D D2 91                543              SETB    ROW2             ;TURN OFF ROW 2
031F 22                   544              RET                      ;DONE
                          545    ;------------------------------
=0320                     546    TEXT      EQU     $
0320 10 1E 20             547              JBC     VGA_TEXT,TO_GRAF ;CHECK WHICH COMPUTER
0323 10 1D 27             548              JBC     VGA_GRAF,TO_TEXT ;
0326 20 21 04             549              JB      HGRAP,TO_H_T     ;HERC GRAP TO TEXT
0329 20 18 0C             550              JB      HERCULES,TO_H_G  ;HERC TEXT TO GRAP
032C 22                   551              RET
=032D                     552    TO_H_T    EQU     $
032D 75 48 18             553              MOV     INDEX,#24        ;TABLE INDEX FOR HERC TEXT
0330 C2 80                554              CLR     TXLED            ;TURN ON TEXT LED
0332 12 05FD              555              CALL    INITMODE         ;SETUP MODE
0335 02 035F              556              JMP     TEXTKEY          ;GO WAIT FOR KEY UP
=0338                     557    TO_H_G    EQU     $
0338 75 48 20             558              MOV     INDEX,#32        ;TABLE INDEX FOR HERC GRAPHICS
033B D2 80                559              SETB    TXLED            ;TURN OFF TEXT
033D 12 05FD              560              CALL    INITMODE         ;SETUP MODE
0340 02 035F              561              JMP     TEXTKEY          ;GO WAIT FOR KEY UP
                          562    ;------------------------------
0343 D2 1D                563    TO_GRAF   SETB    VGA_GRAF         ;SET NEW FLAG
0345 75 22 03             564              MOV     SYNCS,#03H       ;LET SYNC_POL ROUTINE DETERMINE NEW MODE
0348 D2 80                565              SETB    TXLED            ;TURN OF TEXT LED
034A 02 035F              566              JMP     TEXTKEY
                          567    ;
034D D2 1E                568    TO_TEXT   SETB    VGA_TEXT         ;SET NEW FLAG
034F E5 22                569              MOV     A,SYNCS          ;CHECK IF POSSIBLY IN TEXT MODE BY SYNCS
0351 B4 02 17             570              CJNE    A,#02H,NO400LNS  ;IGNORE IF NOT IN 400 LINE MODE
0354 75 48 60             571              MOV     INDEX,#96        ;TABLE INDEX FOR VGA TEXT
0357 C2 80                572              CLR     TXLED            ;TURN ON TEXT LED
0359 12 05FD              573              CALL    INITMODE         ;GO INITIALZIE FOR TEXT
035C 12 0845              574              CALL    LDFCN            ;UP CONTRAST FOR BLACK & WHITE
                          575    ;
035F C2 90                576    TEXTKEY   CLR     ROW1             ;TURN ON ROW 1
                          577              ;RFI_DELAY              ;DELAY FOR LARGE RFI CAP'S
0361 79 0A                577              MOV     R1,#10  ;10*2= about 20 usec
```

```
0363 D9 FE       577          DJNZ    R1,S
0365 30 82 FD    578 RELEASE3 JNB     KEY2,RELEASE3    ;WAIT TIL KEY RELEASED
0368 D2 90       579          SETB    ROW1             ;TURN OFF ROW 1
036A 22          580          RET                      ;DONE
036B C2 1E       581 NO400LNS CLR     VGA_TEXT         ;DON'T SET IF NOT POSSIBLY IN TEXT MODE
036D D2 1D       582          SETB    VGA_GRAF         ;STAY IN THIS MODE
036F 22          583          RET
                 584 ;------------------------------------
                 585 ;COLOR + KEY PRESSED
=0370            586 COL_PLUS EQU     $
0370 30 33 06    587          JNB     CLEARON,COL_P50  ;JMP IF NOT IN CLEAR MODE
0373 22          588          RET
                 589 ;WAS IN 8 COLOR ONLY MODE, INCREASE CONTRAST FOR NORMAL SHADING
0374 E5 46       590          MOV     A,SHADES         ;RESTORE # OF SHADES
0376 02 0AC7     591          JMP     SHA_OUT          ;FORCE CONTRAST CHANGE BUT
                 592                                   ;DON'T OUTPUT # OF SHADES TO GAL'S
                 593 ;NORMAL HANDLING
=0379            594 COL_P50  EQU     $
0379 E5 47       595          MOV     A,TWIPER         ;TINT ADJUST SOFTWARE WIPER
037B B4 32 00    596          CJNE    A,#COLLIM*2,$+3  ;AT UPPER LIMIT?
037E 50 12       597          JNC     COL_P80          ;YES, DO NOTHING
0380 05 47       598          INC     TWIPER           ;TO NEXT COLOR CONTRAST
0382 12 0A39     599          CALL    TWIPD            ;GET TINT CONTRAST DATA
0385 12 0900     600          CALL    TES_ALL          ;OVER/UNDER FLOW?
0388 50 05       601          JNC     COL_P60          ;NO, OK
038A 15 47       602          DEC     TWIPER           ;YES, RESTORE SETTINGS
038C 02 0A39     603          JMP     TWIPD
=038F            604 COL_P60  EQU     $
038F 02 0806     605          JMP     RGB_OUT
=0392            606 COL_P80  EQU     $
0392 22          607          RET
                 608 ;------------------------------------
                 609 ;COLOR - KEY PRESSED
=0393            610 COL_MIN  EQU     $
0393 30 33 06    611          JNB     CLEARON,COL_M50  ;JMP IF NOT IN CLEAR MODE
0396 22          612          RET
                 613 ;WAS IN GRAPHICS MODE, FORCE NO SHADING (ie. 8 COLOR ONLY MODE)
0397 74 02       614          MOV     A,#SNOS          ;NO SHADING
0399 02 0AC7     615          JMP     SHA_OUT          ;FORCE CONTRAST CHANGE BUT
                 616                                   ;DON'T OUTPUT # OF SHADES TO GAL'S
                 617 ;NORMAL HANDLING
=039C            618 COL_M50  EQU     $
039C E5 47       619          MOV     A,TWIPER         ;TINT ADJUST SOFTWARE WIPER
039E 60 12       620          JZ      COL_M80          ;JMP IF AT LOWER LIMIT?
03A0 15 47       621          DEC     TWIPER           ;TO NEXT COLOR CONTRAST
03A2 12 0A39     622          CALL    TWIPD            ;GET TINT CONTRAST DATA
03A5 12 0900     623          CALL    TES_ALL          ;OVER/UNDER FLOW?
03A8 50 05       624          JNC     COL_M60          ;NO, OK
03AA 05 47       625          INC     TWIPER           ;YES, RESTORE CONTRAST
03AC 02 0A39     626          JMP     TWIPD
=03AF            627 COL_M60  EQU     $
03AF 02 0806     628          JMP     RGB_OUT
=03B2            629 COL_M80  EQU     $
03B2 22          630          RET
                 631 ;------------------------------------
                 632 ;SYNC KEY PRESSED
=03B3            633 SYNC     EQU     $
03B3 30 23 17    634          JNB     VT220,SY40       ;JMP IF NOT DEC VT220
03B6 E5 1B       635          MOV     A,PLL_LOW        ;TOGGLE TO OTHER DOT CLOCK
                 636                                   ;DIVIDER
03B8 75 1B 65    637          MOV     PLL_LOW,#065H    ;ASSUME THIS DIVIDER
03BB 75 19 49    638          MOV     H_POS,#HPDCP     ;PRIMARY DEC HORZ POS
03BE B4 65 06    639          CJNE    A,#065H,SY20     ;JMP IF WAS IN SECONDARY SETTING
03C1 75 1B C8    640          MOV     PLL_LOW,#0C8H    ;TOGGLE TO SECONDARY SETTING
03C4 75 19 4F    641          MOV     H_POS,#HPDCS
=03C7            642 SY20     EQU     $
03C7 31C9        643          CALL    PLL_CHNG         ;CHANGE DOT CLK DIVIDER
03C9 5120        644          CALL    H_MOVE           ;HORZ POS TO HARDWARE
03CB 80 1D       645          SJMP    SY900
                 646 ;NON-DEC VT220 HANDLING
=03CD            647 SY40     EQU     $
03CD 30 1B 18    648          JNB     MAC_SE,SY200     ;JMP IF NOT MAC SE
03D0 B2 DD       649          CPL     SEL14            ;TOGGLE TO/FROM PRESCALED HSYNC DELAY
03D2 20 DD 08    650          JB      SEL14,SY70       ;JMP IF NO PRESCALAR (NORMAL)
                 651 ;MAC SE FORCE HSYNC PRESCALAR (CENTER OF SCREEN)
03D5 75 19 0C    652          MOV     H_POS,#00CH      ;HORZ POS
03D8 75 1D 41    653          MOV     H_MAX,#041H      ;MAX HORZ POS
03DB 80 06       654          SJMP    SY80
=03DD            655 SY70     EQU     $
                 656 ;MAC SE, FORCE NO HSYNC PRESCALAR (LEFT OF CENTER)
```

```
03DD 75 19 3D        657            MOV     H_POS,#03DH      ;HORZ POS
03E0 75 1D 3F        658            MOV     H_MAX,#03FH      ;MAX POSITION
=03E3                659    SY80    EQU     $
03E3 5120            660            CALL    H_MOVE           ;CHANGE POSITION
03E5 02 03EA         661            JMP     SY900
                     662    ;EVERYTHING ELSE HANDLING
=03E8                663    SY200   EQU     $
03E8 B2 A6           664            CPL     NVGASY           ;CHANGE SYNC EDGE
=03EA                665    SY900   EQU     $
03EA C2 91           666            CLR     ROW2             ;TURN ON ROW 2
                     667    ;RFI_DELAY
03EC 79 0A           667            MOV     R1,#10  ;10*2= about 20 usec
03EE D9 FE           667            DJNZ    R1,$
                     668    ;DEBOUNCE SYNC KEY
=03F0                669    RELEASE1 EQU    $
03F0 30 82 FD        670            JNB     KEY2,RELEASE1    ;WAIT TILL KEY RELEASED
03F3 D2 91           671            SETB    ROW2             ;TURN OFF ROW 2
03F5 22              672            RET
                     673    ;----------------------------------
                     674    ;(EXIT KEY ON IR REMOTE) TOGGLE BETWEEN
                     675    ;SHADING & NO SHADING
=03F6                676    CTOG    EQU     $
03F6 E5 46           677            MOV     A,SHADES
03F8 B4 01 01        678            CJNE    A,#SMONO,CTOG20  ;IF NOT MONOCHROME, ALLOW TOGGLE
                     679    ;IF MONOCHROME, DON'T ALLOW 8 COLOR MODE BECAUSE SIGNAL MAY
                     680    ;NOT COME IN ON CORRECT LINES
03FB 22              681            RET
                     682    ;ALL BUT MONOCHROME HANDLING
=03FC                683    CTOG20  EQU     $
03FC E5 31           684            MOV     A,CRED+6         ;SHADING ACTIVE?
03FE 70 05           685            JNZ     CTOG50           ;NO, FORCE IT
                     686    ;WAS IN GRAPHICS MODE, FORCE NO SHADING (ie. 8 COLOR ONLY MODE)
0400 74 02           687            MOV     A,#SNOS          ;NO SHADING
0402 02 0AC7         688            JMP     SHA_OUT          ;FORCE CONTRAST CHANGE BUT
                     689                                     ;DON'T OUTPUT # OF SHADES TO GAL'S
                     690    ;WAS IN 8 COLOR ONLY MODE, INCREASE CONTRAST FOR NORMAL SHADING
=0405                691    CTOG50  EQU     $
0405 E5 46           692            MOV     A,SHADES         ;RESTORE # OF SHADES
0407 02 0AC7         693            JMP     SHA_OUT          ;FORCE CONTRAST CHANGE BUT
                     694                                     ;DON'T OUTPUT # OF SHADES TO GAL'S
                     695    ;----------------------------------
                     696    ; CLEAR subroutine.
                     697    ;
                     698    ; The clear function was activated: Check the
                     699    ; 'clearon' flag for action.
                     700    ;
                     701    ; [NOTE: add 'clr clearon' to initialization]
                     702    ;
                     703    ; To clear (if clearon flag is 0):
                     704    ;   1. Set clearon flag to 1.
                     705    ;   2. Save state of REV.VID in revvidflag.
                     706    ;   3. Set REV VID to =normal=.
                     707    ;   4. Disable palette ram output and force 1's all cpu
                     708    ;   5a. If IR-activated, return.
                     709    ;   5b. If KB-activated, wait for key release,
                     710    ;       wait debounce interval, return.
                     711    ;
                     712    ; To restore (if clearon flag is 1):
                     713    ;   1. Set clearon flag to 0.
                     714    ;   2. Restore REV VID state from revvidflag.
                     715    ;   3. Restore OptiView palette from RAM.
                     716    ;   4. GoTo step 5a.
                     717    ;=========================================
                     718    ;
=040A                719    CLEAR   EQU     $
040A 10 33 28        720            jbc     clearon,turn_clear_off
                     721    ;
                     722    ; Turn CLEAR on.
                     723    ;
040D C2 A0           724            clr     CLLED            ; lite on
040F D2 33           725            setb    clearon          ; set flag: CLEAR is active
0411 D2 3E           726            SETB    RESTORE          ;FLAG=RESTORE CURRENT SETTINGS
0413 C2 34           727            clr     revflag          ; save rev vid state
0415 30 A3 02        728            jnb     NORVID,C2        ; it's low
0418 D2 34           729            setb    revflag          ; it's high
041A C2 A3           730    C2      clr     NORVID           ; FORCE normal video
                     731    ;CLEAR PANELS
041C C2 EC           732            CLR     AFLAG
041E C2 EE           733            CLR     BFLAG
0420 C2 D9           734            CLR     CFLAGR
0422 C2 D8           735            CLR     CFLAGG
```

```
0424 C2 DE        736            CLR     CFLAGB
                  737     ;WAIT FOR BUTTON UP
0426 C2 90        738     step5   clr     ROW1            ; set kb R1 low
                  739             ;RFI_DELAY              ;DELAY FOR LARGE RFI CAP'S
0428 79 0A        739             MOV     R1,#10  ;10*2= about 20 usec
042A D9 FE        739             DJNZ    R1,$
042C 30 81 FD     740     clrwait jnb     KEY1,clrwait    ; wait for release
042F D2 90        741             setb    ROW1            ; kb R1 high
0431 12 04A2      742             call    delay           ; debounce
0434 22           743             ret
                  744     ;
                  745     turn_clear_off
                  746     ;
                  747     ; Turn off the lite, and either restore settings or force defaults.
                  748     ;
0435 D2 A0        749             setb    CLLED           ; clear lite off
0437 E5 31        750             MOV     A,CRED+6        ;8 COLOR ONLY MODE?
0439 60 04        751             JZ      C05             ;NO, NORMAL SHADING
043B 74 02        752             MOV     A,#SHOS         ;RETURN TO 8 COLOR ONLY
043D 80 02        753             SJMP    C08
=043F             754     C05     EQU     $
043F E5 46        755             MOV     A,SHADES
=0441             756     C08     EQU     $
0441 12 0AC7      757             CALL    SHA_OUT         ;RESTORE # OF SHADES
0444 20 3E 0A     758             JB      RESTORE,C60     ;JMP TO RESTORE CURRENT SETTINGS
                  759     ;FORCE DEFAULT SETTINGS
0447 D2 A3        760             SETB    NORVID          ;FORCE NORMAL VIDEO
0449 12 05FD      761             CALL    INITMODE        ;RE-INITIALIZE MODE
044C 12 07B5      762             CALL    DEFCON          ;FORCE DEFAULT CONTRAST & INIT COLOR
                  763                                     ;AREAS
044F 80 D5        764             SJMP    STEP5
                  765     ;RESTORE CONDITIONS BEFORE CLEAR
=0451             766     C60     EQU     $
0451 C2 A3        767             CLR     NORVID          ;NORMAL VIDEO
0453 30 34 02     768             JNB     REVFLAG,C70
0456 D2 A3        769             setb    NORVID          ; reverse video
0458 80 CC        770     c70     sjmp    step5
                  771     ;----------------------------
                  772     ;Subroutine: DEFAULT
                  773     ;Function  : Gets the default values from a table based on
                  774     ;            which computer is detected.
                  775     ;On Entry  : FREQ contains the average value 00H - FFH
                  776     ;On Exit   : PLL_LOW, H_POS and V_POS contain the defaults
                  777     ;Registers : DPTR
=045A             778     DEFAULT EQU     $
                  779     ;FIRST CHECK IF HSYNC IS STABLE BY FINDING HIGHEST & LOWEST HSYNC
                  780     ;SAMPLE
045A 78 10        781             MOV     R0,#FREQ0       ;FIRST SAMPLE OF HSYNC
045C 7A FF        782             MOV     R2,#0FFH        ;LOWEST VALUE
045E 7B 00        783             MOV     R3,#0           ;HIGHEST VALUE
0460 75 4B 00     784             MOV     INDEX,#0        ;ASSUME UNSTABLE
=0463             785     DEF20   EQU     $
0463 E6           786             MOV     A,@R0           ;GET A SAMPLE
0464 B5 02 00     787             CJNE    A,REG2,$+3      ;NEW LOW?
0467 50 01        788             JNC     DEF40           ;NO
0469 FA           789             MOV     R2,A            ;YES, SAVE NEW LOW
=046A             790     DEF40   EQU     $
046A B5 03 00     791             CJNE    A,REG3,$+3      ;NEW HIGH?
046D 40 01        792             JC      DEF60           ;NO
046F FB           793             MOV     R3,A            ;YES, SAVE AS NEW HIGH
=0470             794     DEF60   EQU     $
0470 08           795             INC     R0              ;TO NEXT SAMPLE
0471 B8 18 00     796             CJNE    R0,#FREQ7+1,$+3 ;ALL SAMPLES PROCESSED?
0474 40 ED        797             JC      DEF20           ;NO
                  798     ;COMPARE HIGH & LOW, IF TOO FAR APART, HSYNC IS UNSTABLE
0476 EB           799             MOV     A,R3            ;LONGEST HSYNC
0477 C3           800             CLR     C
0478 9A           801             SUBB    A,R2            ;- SHORTEST
0479 B4 03 00     802             CJNE    A,#STABLE+1,$+3 ;HSYNC STABLE?
047C 50 0A        803             JNC     DEF90           ;NO, FORCE HSYNC UNKNOWN
                  804     ;STABLE HSYNC
047E 90 057D      805             MOV     DPTR,#FREQ_DEF  ;BASE OF PLL DIVISION LOOKUPS
0481 E5 18        806             MOV     A,FREQ          ;GET LATEST AVERAGE VALUE
0483 C3           807             CLR     C
0484 13           808             RRC     A
0485 93           809             MOVC    A,@A + DPTR     ;GET DEFAULT PLL_VAL VALUE
0486 F5 4B        810             MOV     INDEX,A         ;STORE
=0488             811     DEF90   EQU     $
0488 22           812             RET                     ;
```

```
                              813    ;------------------------------------
                              814    ;Subroutine: U1_SETUP
                              815    ;Function  : Initialize U1 parameters
                              816    ;Registers : B
=0489                         817    U1_SETUP    EQU     $
0489 E5 1A                    818                MOV     A,V_POS     ;SETUP PLL_HI BYTE VALUE
048B 54 80                    819                ANL     A,#080H
048D F5 1C                    820                MOV     PLL_HI,A
048F 31C9                     821                CALL    PLL_CHNG    ;PLL DIVIDER RATIO    30.240 MHz = 15EH @ CCH
0491 31F1                     822                CALL    V_MOVE      ;VERTICAL POSITION    28.322 MHz = 182H @ A8H
                              823
0493 5120                     824                CALL    H_MOVE      ;HORIZONTAL POSITION  25.175 MHz = 11EH @ A8H
0495 E5 31                    825                MOV     A,CRED+6    ;8 COLOR ONLY MODE?
0497 60 04                    826                JZ      U1_S30      ;NO, NORMAL SHADING
0499 74 02                    827                MOV     A,#SNOS     ;FORCE NO SHADING
049B 80 02                    828                SJMP    U1_S40
=049D                         829    U1_S30      EQU     $
049D E5 46                    830                MOV     A,SHADES
=049F                         831    U1_S40      EQU     $
049F 02 0AC7                  832                JMP     SHA_OUT     ;OUTPUT # OF          24.000 MHz = 190H @ 6FH
                              833    ;                              ;SHADES               16.257 MHz = 0E6H @ 46H
                              834    ;                                                    16.000 MHz = 15EH @ 23H
                              835    ;                                                    16.000 MHz = 170H @ 1FH
                              836    ;                                                    15.667 MHz = 0BEH @ 4AH
                              837    ;                                                    14.304 MHz = 18DH @ 07H
                              838    ;------------------------------------
                              839    ;Subroutine: DELAY
                              840    ;Function  : Time Delay = 10.24 mS @ 11.0592 MHz
                              841    ;Registers : R3,R2
04A2 7B 20                    842    DELAY       MOV     R3,#20H     ;COUNTER VALUE FOR LOOP2
04A4 7A 91                    843    LOOP2       MOV     R2,#91H     ;COUNTER VALUE FOR LOOP3
04A6 DA FE                    844    LOOP3       DJNZ    R2,LOOP3    ;REPEAT UNTIL 00H
04A8 DB FA                    845                DJNZ    R3,LOOP2    ;REPEAT UNTIL 00H
04AA 7B 19                    846                MOV     R3,#19H     ;COUNTER VALUE FOR LOOP4
04AC DB FE                    847    LOOP4       DJNZ    R3,LOOP4    ;REPEAT UNTIL 00H
04AE 22                       848                RET                 ;RETURN TO MAIN LOOP
                              849    ;------------------------------------
                              850    ;Subroutine: DELAY600
                              851    ;Function  : Time Delay = 600 Micro Sec
04AF 7B FF                    852    DELAY600    MOV     R3,#0FFH    ;COUNTER VALUE
04B1 00                       853    LOOP7       NOP                 ;
04B2 DB FD                    854                DJNZ    R3,LOOP7    ;
04B4 22                       855                RET                 ;DONE
                              856    ;------------------------------------
                              857    ;Subroutine: MODECHEK
                              858    ;Function  : CHECKS SERIAL RECEIVE BUFFER FOR MODE INFORMATION
=04B5                         859    MODECHEK    EQU     $
                              860    ;SEE IF ANYTHING IN REC'D QUEUE
04B5 C2 39                    861                CLR     RCHAR       ;FLAG AS NO CHAR REC'D
04B7 E5 53                    862                MOV     A,ROPOP     ;REC'D POP PTR
04B9 B5 52 02                 863                CJNE    A,ROPUS,MCK20   ;JMP IF REC'D A CHAR
04BC 80 0F                    864                SJMP    MCK50       ;TO CHECK COMMUNICATION STATE
                              865    ;A CHAR IS IN THE REC'D SERIAL QUEUE
=04BE                         866    MCK20       EQU     $
04BE D2 39                    867                SETB    RCHAR       ;FLAG AS REC'D A CHAR
04C0 F9                       868                MOV     R1,A        ;POP PTR
04C1 87 03                    869                MOV     REG3,@R1    ;REC'D CHAR
04C3 05 53                    870                INC     ROPOP       ;BUMP QUEUE POP PTR
04C5 E5 53                    871                MOV     A,ROPOP
04C7 B4 4F 03                 872                CJNE    A,#RQEND,MCK50  ;JMP IF NOT PAST END OF QUEUE
04CA 75 53 4C                 873                MOV     ROPOP,#RQUE ;WRAP TO START OF QUEUE
                              874    ;CHECK COMMUNICATION STATE
=04CD                         875    MCK50       EQU     $
04CD E5 56                    876                MOV     A,COMSTA    ;CURRENT COMMUNICATION STATE
04CF B4 01 46                 877                CJNE    A,#1,MCK300 ;JMP IF NOT IN IDLE STATE
                              878    ;IDLE STATE: CHECK IF THERE IS AN IR KEY READY FOR XMIT
04D2 E5 58                    879                MOV     A,KEYOUT    ;ANY KEY WAITING?
04D4 60 12                    880                JZ      MCK70       ;NO
                              881    ;XMIT IR KEY, SEE IF ROOM IN XMIT QUEUE
04D6 12 0568                  882                CALL    BXPUS       ;BUMP XMIT QUEUE PUSH PTR
04D9 B5 55 02                 883                CJNE    A,XQPOP,MCK60   ;JMP IF ROOM IF XMIT QUEUE
04DC 80 0A                    884                SJMP    MCK70
                              885    ;XFER IR KEY TO XMIT QUEUE
=04DE                         886    MCK60       EQU     $
04DE F5 54                    887                MOV     XQPUS,A
04E0 E5 58                    888                MOV     A,KEYOUT    ;IR KEY CODE
04E2 75 58 00                 889                MOV     KEYOUT,#0   ;CLEAR IT
04E5 12 0574                  890                CALL    XMIT        ;INTO XMIT QUEUE
                              891    ;IDLE STATE: LOOK FOR DISPLAY MODE CHANGE OR REQUEST FOR
                              892    ;            ID AND VERSION # FROM HOST
```

```
=04E8              893    MCK70   EQU     $
04E8 30 39 58      894            JNB     RCHAR,MCK900    ;JMP IF NO CHAR REC'D
04EB BB 76 03      895            CJNE    R3,#'v',MCK80   ;JMP IF NOT ID REQUEST
04EE 02 0513       896            JMP     MCK200          ;GO SETUP ID RESPONSE
                   897    ;
                   898    ;CHECK FOR PRODUCTION COLOR BALANCE SERVICE:
                   899    ;BECAUSE OF EXTREME CHANGE IN LIGHT OUTPUT OF THE
                   900    ;PANELS IN THE FIRST 15-30 MINUTES, IT IS NECESSARY
                   901    ;TO FORCE THE DEFAULTS TO A FAKE VALUE TO ADJUST FOR THIS
                   902    ;TEMPERTURE DEPENDENCY, TO ALLOW PRODUCTION TO SETUP THE A720C AT
                   903    ;ROOM TEMPERATURE. THIS IS INSTEAD OF USING AN OVEN TO PREHEAT THE
                   904    ;PANELS.
                   905    ;
=04F1              906    MCK80   EQU     $
04F1 BB 78 05      907            CJNE    R3,#'x',MCK100  ;JMP IF NOT PRODUCTION SETUP
04F4 75 56 03      908            MOV     COMSTA,#3       ;FORCE STATE THAT WAITS FOR
                   909                                    ;THE FAKE CONTRAST WIPER POSITION
04F7 80 4A         910            SJMP    MCK900          ;GO EXIT FOR NOW
                   911    ;PERHAPS DISPLAY MODE CHANGE
=04F9              912    MCK100  EQU     $
04F9 E5 23         913            MOV     A,COMPUTER1
04FB 54 60         914            ANL     A,#060H         ;VGA?
04FD 70 02         915            JNZ     MCK120          ;YES
                   916    ;NON-VGA DISPLAY MODE CHANGE
04FF 0141          917            JMP     BEGIN           ;RESTART
                   918    ;VGA MODE CHANGE
=0501              919    MCK120  EQU     $
0501 EB            920            MOV     A,R3            ;REC'D MODE BYTE
0502 20 E7 05      921            JB      ACC.7,MCK130    ;JMP IF POSSIBLE 720 MODE
0505 B4 07 07      922            CJNE    A,#7,MCK140     ;JMP IF NOT VGA 720x???
0508 80 05         923            SJMP    MCK140          ;JMP IF CHANGE TO VGA 720
=050A              924    MCK130  EQU     $
050A B4 84 00      925            CJNE    A,#084H,$+3
050D 40 02         926            JC      MCK150          ;JMP IF CHANGE TO VGA 720
=050F              927    MCK140  EQU     $
050F 0141          928            JMP     BEGIN           ;JMP IF NOT CHANGE TO VGA 720
                   929    ;FORCE VGA 720x??? MODE
=0511              930    MCK150  EQU     $
0511 614D          931            JMP     TO_TEXT
                   932    ;ID REQUEST JUST REC'D
=0513              933    MCK200  EQU     $
0513 75 57 00      934            MOV     XPTR,#0         ;REL PTR TO START OF ID MESG
0516 80 28         935            SJMP    MCK500
                   936    ;COMM. STATE 2 OR 3:
=0518              937    MCK300  EQU     $
0518 B4 02 02      938            CJNE    A,#2,MCK400     ;JMP IF NOT XMIT'G ID
051B 80 23         939            SJMP    MCK500          ;GO SERVICE ID XMIT
                   940    ;COMM. STATE 3: IF CHAR REC'D, IT MUST BE CONTRAST WIPER POSITION
=051D              941    MCK400  EQU     $
051D 30 39 23      942            JNB     RCHAR,MCK900    ;JMP IF NOT CHAR REC'D
0520 75 56 01      943            MOV     COMSTA,#1       ;BACK TO IDLE COMM. STATE
0523 BB 51 00      944            CJNE    R3,#CLIM*2+1,$+3 ;WIPER OUT OF RANGE?
0526 50 1B         945            JNC     MCK900          ;YES, IGNORE REQUEST
0528 E5 48         946            MOV     A,CWIPER        ;CUREENT WIPER
052A C0 E0         947            PUSH    ACC             ;SAVE POS IN CASE OF OVERFLOW
052C 8B 48         948            MOV     CWIPER,R3       ;REC'D CHAR
052E 12 0922       949            CALL    CWIPD           ;XFER DATA FROM ROM TABLE TO RAM
0531 12 0900       950            CALL    TES_ALL         ;ANY OF 3 COLORS OVERFLOW DAC?
0534 D0 E0         951            POP     ACC             ;SAVED WIPER POSITION
0536 40 03         952            JC      MCK450          ;YES, OVERFLOW
                   953    ;ON MOST PROJECTORS (EXCEPT THE VERY HOT ONES), THE PANELS HEAT
                   954    ;UNEVENLY. RED & BLUE HEAT ABOUT EQUAL BUT GREEN ONLY CHANGES
                   955    ;TEMPERATURE BY ABOUT HALF AS MUCH.
                   956            ;MOV    DPTR,#CONTAB+1  ;OVERALL CONTRAST TABLE START+TO GREEN
                   957            ;MOV    A,CWIPER        ;NEW FAKE WIPER FOR PRODUCTION SETUP
                   958            ;CLR    CY
                   959            ;SUBB   A,#CLIM         ;RELATIVE TO MIDDLE
                   960            ;CLR    CY
                   961            ;RRC    A               ;ONLY ADJUST GREEN BY 1/2 AS MUCH
                   962                                    ;SO THAT AFTER HEATING WILL BALANCE
                   963                                    ;WITH RED & BLUE
                   964            ;ADD    A,#CLIM         ;MAKE WIPER ABSOLUTE
                   965            ;MOV    R3,A            ;COPY WIPER FOR GREEN
                   966    ;3 BYTES PER ENTRY, COMPUTE INDEX
                   967    ;RED LSB, GREEN LSB, BLUE LSB
                   968            ;RL     A
                   969            ;RL     A
                   970            ;ANL    A,#0FEH         ;KEEP VALID BITS
                   971            ;CLR    C
                   972            ;SUBB   A,R3            ;(CWIPER*4)-CWIPER=CWIPER*3
```

```
                        973  ;FETCH GREEN'S CONTRAST, CHECK FOR SIGN AND STORE
                        974       ;MOV     R1,#CGREEN+2    ;PTR TO GREENS'S OVERALL CONTRAST
                        975       ;MOVC    A,@A+DPTR       ;CHANGE FOR GREEN CONTRAST
                        976       ;MOV     @R1,A           ;LSB OF RAM VALUE
                        977       ;INC     R1              ;TO RAM'S MSB, SIGN
                        978       ;MOV     @R1,#0          ;ASSUME POSITIVE
                        979       ;JNB     ACC.7,MCK430    ;JMP IF POS
                        980       ;MOV     @R1,#0FFH       ;NEG SIGN
                        981  ;OUTPUT PRODUCTION SETUP CONTRASTS TO DACS
=0538                   982  MCK430  EQU   $
0538 02 0806            983       JMP      RGB_OUT
                        984  ;OVERFLOW, RESTORE CONTRAST SETTINGS
=053B                   985  MCK450  EQU   $
053B F5 48              986       MOV      CWIPER,A        ;WIPER POSITION BEFORE CHANGE
053D 02 0922            987       JMP      CWIP0           ;RESTORE VALUES
                        988  ;COMM. STATE 2: WAITING TO FINISH TRANSMIT OF ID DATA
=0540                   989  MCK500  EQU   $
0540 12 0544            990       CALL     XID             ;KEEP XMIT'G ID MESSAGE
                        991  ;EXIT
=0543                   992  MCK900  EQU   $
0543 22                 993       RET
                        994  ;----------------------------------
                        995  ;XMIT ID AND VERSION MESSAGE
=0544                   996  XID     EQU   $
0544 90 0567            997       MOV      DPTR,#IDMESG    ;PTR TO START OF ID & VERSION INFO
=0547                   998  XID220  EQU   $
0547 12 056B            999       CALL     BXPUS           ;BUMP XMIT QUEUE PUSH PTR
054A B5 55 05          1000       CJNE     A,XQPOP,XID240  ;JMP IF ROOM IN QUEUE
054D 75 56 02          1001       MOV      COMSTA,#2       ;TO COMM STATE=FINISH XMIT OF ID
0550 80 14             1002       SJMP     XID900          ;GO EXIT
=0552                  1003  XID240  EQU   $
0552 F5 54             1004       MOV      XQPUS,A
0554 E5 57             1005       MOV      A,XPTR          ;CURRENT REL PTR TO DATA
0556 93                1006       MOVC     A,@A+DPTR       ;GET CHAR TO XMIT
0557 12 0574           1007       CALL     XMIT            ;PUT CHAR INTO XMIT QUEUE
055A 05 57             1008       INC      XPTR            ;BUMP MESG PTR
055C 74 03             1009       MOV      A,#IDEND-IDMESG
055E B5 57 00          1010       CJNE     A,XPTR,$+3      ;MESG COMPLETE?
0561 50 E4             1011       JNC      XID220          ;NO, KEEP LOADING QUEUE
0563 75 56 01          1012       MOV      COMSTA,#1       ;YES, BACK TO IDLE STATE
=0566                  1013  XID900  EQU   $
0566 22                1014       RET
                       1015  ;
=0567                  1016  IDMESG  EQU   $
0567 76                1017       DB       'v'             ;ECHO LOWER CASE "v"
0568 02                1018       DB       2               ;DATA DISPLAY ID CODE=A720C
                       1019                                ; (ID CODE 1=A480SC)
0569 01                1020       DB       1               ;VERSION= 1.0
056A 00                1021  IDEND   DB    0
                       1022  ;----------------------------------
                       1023  ;BUMP XMIT QUEUE'S PUSH PTR
                       1024  ;IN: (XQPUS) CURRENT PUSH PTR
                       1025  ;OUT: (A) ADJUSTED PTR
=056B                  1026  BXPUS   EQU   $
056B E5 54             1027       MOV      A,XQPUS
056D 04                1028       INC      A
056E B4 52 02          1029       CJNE     A,#XQEND,BXPUS50 ;JMP IF NOT PAST END OF QUEUE
0571 74 4F             1030       MOV      A,#XQUE         ;WRAP TO START OF QUEUE
=0573                  1031  BXPUS50 EQU   $
0573 22                1032       RET
                       1033  ;----------------------------------
                       1034  ;NAME: XMIT A CHAR OUT SERIAL CHANNEL
                       1035  ;IN: (A) CHAR TO XMIT OUT SERIAL CHANNEL
=0574                  1036  XMIT    EQU   $
0574 A9 54             1037       MOV      R1,XQPUS        ;CURRENT XMIT QUEUE PUSH PTR
0576 F7                1038       MOV      @R1,A           ;CHAR TO XMIT INTO QUEUE
0577 30 38 02          1039       JNB      XEMPTY,XMIT90   ;JMP IF XMIT UART HAS A CHAR
057A D2 99             1040       SETB     TI              ;IF EMPTY FORCE XMIT INTER TO LOAD IT
=057C                  1041  XMIT90  EQU   $
057C 22                1042       RET
                       1043  ;----------------------------------
                       1044  ;LOOKUP   TABLES
                       1045  ;NEXT AVAILABLE INDEX=120
=057D                  1046  FREQ_DEF EQU  $
057D 00 00 08 08       1047       DB       00,00,08,08,08,00,00,00 ;8=CGA (OR MAYBE DEC VT220)
0581 08 00 00 00
0585 00 00 00 00       1048       DB       00,00,00,00,00,00,00,24 ;24=HERC, TEXT
0589 00 00 00 18
058D 18 20 20 00       1049       DB       24,32,32,00,00,00,00,00 ;32=HERC, GR
0591 00 00 00 00
```

```
0595 00 00 00 00        1050            DB      00,00,00,00,00,00,00,00
0599 00 00 00 00
059D 00 70 28 28        1051            DB      00,112,40,40,48,48,00,00;112=EGA 40 COL,40=EGA, 48=MAC SE
05A1 30 30 00 00
05A5 00 00 00 00        1052            DB      00,00,00,00,00,00,00,00
05A9 00 00 00 00
05AD 00 00 00 00        1053            DB      00,00,00,00,00,00,00,56 ;56=OLIV & ATT 640x400
05B1 00 00 00 38
05B5 38 00 00 00        1054            DB      56,00,00,00,00,00,00,00
05B9 00 00 00 00
05BD 00 00 00 00        1055            DB      00,00,00,00,00,00,00,00
05C1 00 00 00 00
05C5 00 00 00 00        1056            DB      00,00,00,00,00,00,00,00
05C9 00 00 00 00
05CD 00 00 00 40        1057            DB      00,00,00,64,64,00,00,00 ;64=VGA GR, 640x400
05D1 40 00 00 00
05D5 00 00 00 00        1058            DB      00,00,00,00,00,00,00,00
05D9 00 00 00 00
05DD 00 00 00 00        1059            DB      00,00,00,00,00,00,72,72 ;72=MAC 2
05E1 00 00 48 48
05E5 00 00 00 00        1060            DB      00,00,00,00,00,00,00,00
05E9 00 00 00 00
05ED 00 00 00 00        1061            DB      00,00,00,00,00,00,00,00
05F1 00 00 00 00
05F5 00 00 00 00        1062            DB      00,00,00,00,00,00,00,00
05F9 00 00 00 00
                        1063    ;--- END OF SMOS FILE ------------
                        1064
                        1065
                        1066    $RESETLN
                        33      $SETLN(INIT.ASM);%include        "INIT.ASM"
                        1       ;=========================================
                        2       ;       FILE NAME: INIT.ASM
                        3       ;       LAST EDIT: 03-03-90, 03:30 P.M., RNM
                        4       ;=========================================
                        5       ;INITIALIZE BOARD FOR DISPLAY MODE
                        6       ;IN: (PLL_LOW) TABLE INDEX VALUE IN MULTIPLES OF 8
                        7       ;       LOWEST=8 CGA (MAY ALSO BE DEC VT220) (in freq table)
                        8       ;       16 = DEC VT220 (loaded below)
                        9       ;       24 = HERCULES TEXT (in freq table)
                        10      ;       32 = HERCULES GRAPHICS (in freq table)
                        11      ;       40 = EGA NORMAL (80 COLUMN) (in freq table)
                        12      ;       48 = MAC SE (in freq table)
                        13      ;       56 = OLIVETTI/AT & T, 640x400 (in freq table)
                        14      ;       64 = VGA GRAPHICS, 640x400 (in freq table)
                        15      ;       72 = MAC 2 (in freq table)
                        16      ;       80 = VGA GRAPHICS, 640x480 (loaded below)
                        17      ;       88 = VGA GRAPHICS, 640x350 (loaded below)
                        18      ;       96 = VGA TEXT (done by text key or serial mode change)
                        19      ;       104 = OLIVETTI, 640x350 (loaded below)
                        20      ;       112 = EGA 40 COLUMN (in freq table)
                        21      ;       120 = TITLE SCREEN (done in title handler)
                        22      ;       128 = next available index
=05FD                   23      INITMODE EQU    $
05FD E5 4B              24              MOV     A,INDEX
05FF B4 38 0A           25              CJNE    A,#56,INITM20    ;JMP IF NOT OLIV OR AT&T
0602 E5 1E              26              MOV     A,NSYNCS         ;TRUE SYNC POLARITIES
0604 B4 01 24           27              CJNE    A,#01H,INITM30   ;JMP IF OLIV 640x400
0607 75 4B 68           28              MOV     INDEX,#104       ;FORCE OLIV 640x350
060A 80 1F              29              SJMP    INITM30
=060C                   30      INITM20 EQU     $
060C B4 40 11           31              CJNE    A,#64,INITM25    ;JMP IF NOT NEW VGA
060F E5 1E              32              MOV     A,NSYNCS         ;TRUE SYNC POLARITIES
0611 70 05              33              JNZ     INITM22          ;JMP IF 350 OR 400 MODE
0613 75 4B 50           34              MOV     INDEX,#80        ;FORCE VGA 640x480
0616 80 13              35              SJMP    INITM30
=0618                   36      INITM22 EQU     $
0618 14                 37              DEC     A                ;POLARITIES=01?
0619 70 10              38              JNZ     INITM30          ;JMP IF VGA 640x400
061B 75 4B 58           39              MOV     INDEX,#88        ;FORCE VGA 640x350
061E 80 08              40              SJMP    INITM30
=0620                   41      INITM25 EQU     $
0620 B4 08 08           42              CJNE    A,#8,INITM30     ;JMP IF NOT DEC VT220 OR CGA
0623 30 B7 05           43              JNB     NDEC,INITM30     ;JMP IF H/W SET FOR CGA
0626 75 4B 10           44              MOV     INDEX,#16        ;FORCE DEC VT220
0629 D2 3A              45              SETB    CVIDM            ;FLAG VIDEO RAM CLEAR ACTIVE
                        46      ;XFER MODE INFO FROM ROM TABLE TO RAM FOR EASY ACCESS
=062B                   47      INITM30 EQU     $
062B E5 4B              48              MOV     A,INDEX
062D 90 068A            49              MOV     DPTR,#INIT_TAB-8 ;MODE INFO TABLE
```

```
0630 78 10      50          MOV     R0,#FREQ0       ;TEMP RAM COPY FOR EASY ACCESS
0632 79 08      51          MOV     R1,#8           ;# OF BYTES PER ENTRY
=0634           52  INITM35 EQU     $
0634 FA         53          MOV     R2,A            ;SAVE REL OFFSET
0635 93         54          MOVC    A,@A+DPTR       ;VALUE FROM ROM INFO TABLE
0636 F6         55          MOV     @R0,A           ;INTO RAM
0637 08         56          INC     R0              ;BUMP PTR TO RAM
0638 EA         57          MOV     A,R2            ;REL TABLE OFFSET
0639 04         58          INC     A               ;TO NEXT TABLE BYTE
063A D9 F8      59          DJNZ    R1,INITM35      ;DO ALL MODE BYTES
                60  ;SETUP PORT 4
063C 78 10      61          MOV     R0,#FREQ0
063E 86 C0      62          MOV     P4,@R0          ;THIS DISPLAY MODE'S SETUP
0640 08         63          INC     R0              ;TO NEXT MODE BYTE
                64  ;SETUP PORT 2, BITS 7,6,5,4,2 & 1 AND SEL3
0641 E6         65          MOV     A,@R0           ;THIS DISP MODE'S SETUP
0642 54 F6      66          ANL     A,#0F6H         ;P2 BIT 0 IS CLEAR LIGHT
                67                                  ;P2 BIT 3 IS REV VIDEO
0644 F9         68          MOV     R1,A            ;NEW P2.7-P2.1 (BUT FOR P2.3)
0645 E5 A0      69          MOV     A,P2            ;GET CLR LIGHT & REV VID STATUS
0647 54 09      70          ANL     A,#9            ;MASK FOR CLEAR LIGHT
                71                                  ;AND REV VIDEO
0649 45 01      72          ORL     A,REG1
064B F5 A0      73          MOV     P2,A
064D E6         74          MOV     A,@R0           ;DISP MODE'S SETUP
064E D2 B6      75          SETB    SEL3            ;ASSUME SEL3=1
0650 20 E0 02   76          JB      ACC.0,INITM40   ;JMP IF SEL3 IS =1
0653 C2 B6      77          CLR     SEL3            ;MUST BE 0
                78  ;SETUP HSYNC PRESCALER (SEL14)
=0655           79  INITM40 EQU     $
0655 08         80          INC     R0              ;TO DISP MODE'S INFO BYTE
0656 E6         81          MOV     A,@R0
0657 C2 35      82          CLR     SHADES16        ;ALWASY DEFAULT # OF SHADES
0659 D2 DD      83          SETB    SEL14           ;ASSUME NORAMAL HSYNC DELAY
065B 75 23 00   84          MOV     COMPUTER1,#0    ;CLEAR ALL COMPUTER FLAGS
065E 75 24 00   85          MOV     COMPUTER2,#0
0661 75 25 00   86          MOV     COMPUTER3,#0
0664 20 E7 02   87          JB      ACC.7,INITM50   ;JMP IF SEL14=1
0667 C2 DD      88          CLR     SEL14
=0669           89  INITM50 EQU     $
                90  ;SETUP SYNC POLARITY BYTE
0669 54 03      91          ANL     A,#003H         ;MASK FOR SYNC POLARITIES
066B F5 22      92          MOV     SYNCS,A
                93  ;FLAG COMPUTER DISPLAY MODE
066D E6         94          MOV     A,@R0           ;DISP MODE'S INFO BYTE
066E 03         95          RR      A               ;MOVE COMPUTER FLAG BIT # TO LSB
066F 03         96          RR      A
0670 54 1F      97          ANL     A,#01FH         ;MASK FOR COMPUTER FLAG BIT #
                98  ;note: IF VGA (BIT #'S 0D,0E,0F) MUST ALSO SET MASTER
                99  ;      VGA BIT "VGA_GRAF" AND TURN OFF TEXT LED
0672 B4 10 00   100         CJNE    A,#10H,$+3      ;POSSIBLE VGA MODE?
0675 50 09      101         JNC     INITM65         ;NO
0677 B4 0D 00   102         CJNE    A,#00DH,$+3     ;A VGA MODE?
067A 40 04      103         JC      INITM65         ;NO
067C D2 1D      104         SETB    VGA_GRAF        ;ASSUME GRAPHICS MODE
067E D2 80      105         SETB    TXLED           ;TEXT LIGHT OFF
                106 ;note: IF HERCULES GRAPHICS, MUST ALSO SET MASTER
                107 ;      HERCULES BIT
=0680           108 INITM65 EQU     $
0680 B4 09 02   109         CJNE    A,#9,INITM68    ;JMP IF NOT HERCULES GR
0683 D2 18      110         SETB    HERCULES
                111 ;SEARCH FOR COMPUTER BIT FLAG
=0685           112 INITM68 EQU     $
0685 79 25      113         MOV     R1,#COMPUTER3   ;ASSUME BIT IS IN 3RD BYTE
0687 20 E4 05   114         JB      ACC.4,INITM70   ;JMP IF IN 3RD BYTE
068A 19         115         DEC     R1              ;TO 2ND FLAG BYTE
068B 20 E3 01   116         JB      ACC.3,INITM70   ;JMP IF IN 2ND BYTE
068E 19         117         DEC     R1              ;TO 1ST FLAG BYTE
=068F           118 INITM70 EQU     $
068F 54 07      119         ANL     A,#007H         ;MASK FOR BIT #
0691 04         120         INC     A
0692 FA         121         MOV     R2,A
0693 74 80      122         MOV     A,#080H         ;BIT MARKER
=0695           123 INITM80 EQU     $
0695 23         124         RL      A               ;MOVE BIT MARKER
0696 DA FD      125         DJNZ    R2,INITM80      ;LOOP UNTIL FIND BIT
0698 47         126         ORL     A,@R1           ;COMBINE WITH FLAG BYTE
0699 F7         127         MOV     @R1,A           ;NEW COMPUTER FLAG BYTE
                128 ;GET DOT CLOCK VALUE
=069A           129 INIT90  EQU     $
```

```
069A 08          130          INC    R0
069B 86 1B       131          MOV    PLL_LOW,@R0
                 132   ;GET VERT POSITION DEFAULT
069D 08          133          INC    R0
069E 86 1A       134          MOV    V_POS,@R0
                 135   ;GET HORIZ. POSITION DEFAULT
06A0 08          136          INC    R0
06A1 86 19       137          MOV    H_POS,@R0
                 138   ;GET MAX HORIZ POSITION
06A3 08          139          INC    R0
06A4 86 1D       140          MOV    H_MAX,@R0
                 141   ;GET CODE FOR NUMBER OF SHADES
06A6 08          142          INC    R0
06A7 86 46       143          MOV    SHADES,@R0
06A9 E5 46       144          MOV    A,SHADES
06AB B4 01 12    145          CJNE   A,#SMONO,INIT95  ;JMP IF NOT MONOCHROME
                 146   ;IF MONOCHROME DON'T ALLOW 8 COLOR MODE
06AE 75 31 00    147          MOV    CRED+6,#0        ;FORCE 8 COLOR CONTRAST
06B1 75 32 00    148          MOV    CRED+7,#0        ;TO NORMAL
06B4 75 3A 00    149          MOV    CGREEN+6,#0
06B7 75 3B 00    150          MOV    CGREEN+7,#0
06BA 75 43 00    151          MOV    CBLUE+6,#0
06BD 75 44 00    152          MOV    CBLUE+7,#0
=06C0            153   INIT95 EQU    $
06C0 8189        154          JMP    U1_SETUP         ;GO SETUP DISP CONTROLLER CHIP
                 155   ;--------------------------------
                 156   ;INITIALIZE FOR DISPLAY MODE INFO TABLE
=06C2            157   INIT_TAB EQU  $
                 158   ;CGA, INDEX=8
06C2 EB          159          DB     11101011B        ;P4.7-P4.0 SETUPS
                 160                                  ;P4.7=DOUBLE DOT CLK
                 161                                  ;P4.6=SEL0 (U1's OSCILLATOR RATE)
                 162                                  ;P4.5=0 TO 1 XFERS CONTRAST TO BLUE DAC
                 163                                  ;P4.4=HOFF, THIS ALWAYS BE 0
                 164                                  ;P4.3= 1 IS FOR DIGITAL VIDEO, 0 FOR ANALOG
                 165                                  ;P4.2= 1 IS FOR COMPOSITE VIDEO
                 166                                  ;P4.1= SEL13
                 167                                  ;P4.0=CS OF U1
06C3 D9          168          DB     11011001B        ;B7: P2.7=SEL10
                 169                                  ;B6: P2.6=NVGASY
                 170                                  ;B5: P2.5=VSAH (VERT SYCN POL)
                 171                                  ;B4: P2.4=HSAH
                 172                                  ;B3: P2.3=NORVID (IGNORED BY INITMODE ROUTINE)
                 173                                  ;B2: P2.2=SEL12
                 174                                  ;B1: P2.1=SEL11
                 175                                  ;B0: P3.6=SEL3
06C4 87          176          DB     10000111B        ;B7: 1=SHORT HSYNC DELAY,0=LONG
                 177                                  ;B6-B2: COMPUTER FLAG BIT #
                 178                                  ;B1: VSYNC AT uP (1=ACT LOW)
                 179                                  ;B0: HSYNC AT uP (1=ACT HIGH)
                 180                                  ;    * INVERTED FROM U1
06C5 8E          181          DB     08EH             ;PLL_LOW (DOT CLK FREQ)
06C6 A3          182          DB     0A3H             ;DEFAULT V_POS
06C7 B2          183          DB     0B2H             ;DEFAULT H_POS
06C8 FB          184          DB     0FBH             ;H_MAX
06C9 06          185          DB     SCGA             ;CODE FOR # OF SHADES
                 186   ;DEC VT220, INDEX=16
06CA A5          187          DB     10100101B        ;P4
06CB EF          188          DB     11101111B        ;P2.7-P2.1,P3.6
06CC AD          189          DB     10101101B        ;HS DELAY, BIT #, SYNC
06CD C8          190          DB     0C8H             ;PLL_LOW (PRIMARY, 800 COLUMNS)
06CE 83          191          DB     083H             ;V_POS
06CF 4F          192          DB     NPDCS            ;H_POS
06D0 FE          193          DB     0FEH             ;H_MAX
06D1 00          194          DB     SCLR             ;FORCE VIDEO RAM CLEAR, THE MAIN
                 195                                  ;LOOP WILL RESTORE MONOCHROME
                 196   ;HERCULES TEXT, INDEX=24
06D2 A9          197          DB     10101001B        ;P4
06D3 FE          198          DB     11111110B        ;P2.7-P2.1,P3.6
06D4 82          199          DB     10000010B        ;HS DELAY, BIT #, SYNC
06D5 70          200          DB     070H             ;PLL_LOW
06D6 92          201          DB     092H             ;V_POS
06D7 99          202          DB     099H             ;H_POS
06D8 A0          203          DB     0A0H             ;H_MAX
06D9 01          204          DB     SMONO            ;MONOCHROME
                 205   ;HERCULES, GRAPHICS, INDEX=32
06DA A9          206          DB     10101001B        ;P4
06DB FE          207          DB     11111110B        ;P2.7-P2.1,P3.6
06DC A6          208          DB     10100110B        ;HS DELAY, BIT #, SYNC
06DD 5E          209          DB     05EH             ;PLL_LOW
06DE 91          210          DB     091H             ;V_POS
06DF 80          211          DB     080H             ;H_POS
```

```
06E0 8E     212         DB      08EH            ;H_MAX
06E1 01     213         DB      SMONO           ;MONOCHROME
            214 ;EGA, INDEX=40
06E2 A9     215         DB      10101001B       ;P4
06E3 AA     216         DB      10101010B       ;P2.7-P2.1,P3.6
06E4 89     217         DB      10001001B       ;HS DELAY, BIT #, SYNC
06E5 E6     218         DB      0E6H            ;PLL_LOW
06E6 0E     219         DB      00EH            ;V_POS
06E7 16     220         DB      016H            ;H_POS
06E8 66     221         DB      066H            ;H_MAX
06E9 07     222         DB      SEGA            ;CODE FOR # OF SHADES
            223 ;MAC SE, INDEX=48
06EA A9     224         DB      10101001B       ;P4
06EB 9A     225         DB      10011010B       ;P2.7-P2.1,P3.6
06EC 0F     226         DB      00001111B       ;HS DELAY (LONG DELAY), BIT #, SYNC
06ED 8E     227         DB      08EH            ;PLL_LOW
06EE 15     228         DB      015H            ;V_POS
06EF 0C     229         DB      00CH            ;H_POS
06F0 41     230         DB      041H            ;H_MAX
06F1 01     231         DB      SMONO           ;MONOCHROME
            232 ;OLIVETTI/AT & T, 640x400, INDEX=56
06F2 69     233         DB      01101001B       ;P4
06F3 59     234         DB      01011001B       ;P2.7-P2.1,P3.6
06F4 93     235         DB      10010011B       ;HS DELAY, BIT #, SYNC
06F5 9E     236         DB      09EH            ;PLL_LOW
06F6 A0     237         DB      0A0H            ;V_POS
06F7 04     238         DB      004H            ;H_POS
06F8 FF     239         DB      0FFH            ;H_MAX
06F9 04     240         DB      $14             ;CODE FOR # OF SHADES
            241 ;VGA GRAPHICS, 640x400, INDEX=64
06FA 61     242         DB      01100001B       ;P4
06FB 49     243         DB      01001001B       ;P2.7-P2.1,P3.6
06FC BA     244         DB      10111010B       ;HS DELAY, BIT #, SYNC
06FD 1E     245         DB      01EH            ;PLL_LOW
06FE A3     246         DB      0A3H            ;V_POS
06FF 8D     247         DB      08DH            ;H_POS
0700 9F     248         DB      09FH            ;H_MAX
0701 05     249         DB      $8              ;CODE FOR # OF SHADES
            250 ;MAC 2, INDEX=72
0702 65     251         DB      01100101B       ;P4
0703 68     252         DB      01101011B       ;P2.7-P2.1,P3.6
0704 9F     253         DB      10011111B       ;HS DELAY, BIT #, SYNC
0705 5E     254         DB      05EH            ;PLL_LOW
0706 A7     255         DB      0A7H            ;V_POS
0707 9C     256         DB      09CH            ;H_POS
0708 DC     257         DB      0DCH            ;H_MAX
0709 04     258         DB      $16             ;CODE FOR # OF SHADES
            259 ;VGA GRAPHICS 640x480, INDEX=80
070A 61     260         DB      01100001B       ;P4
070B 68     261         DB      01101011B       ;P2.7-P2.1,P3.6
070C BC     262         DB      10111100B       ;HS DELAY, BIT #, SYNC
070D 1E     263         DB      01EH            ;PLL_LOW
070E A1     264         DB      0A1H            ;V_POS
070F 8A     265         DB      08AH            ;H_POS
0710 A0     266         DB      0A0H            ;H_MAX
0711 04     267         DB      $14             ;CODE FOR # OF SHADES
            268 ;VGA GRAPHICS, 640x350, INDEX=88
0712 61     269         DB      01100001B       ;P4
0713 FB     270         DB      11111011B       ;P2.7-P2.1,P3.6
0714 B5     271         DB      10110101B       ;HS DELAY, BIT #, SYNC
0715 1E     272         DB      01EH            ;PLL_LOW
0716 BB     273         DB      0BBH            ;V_POS
0717 8D     274         DB      08DH            ;H_POS
0718 A0     275         DB      0A0H            ;H_MAX
0719 05     276         DB      $8              ;CODE FOR # OF SHADES
            277 ;VGA TEXT, INDEX=96
071A 61     278         DB      01100001B       ;P4
071B 0D     279         DB      00001101B       ;P2.7-P2.1,P3.6
071C 9A     280         DB      10011010B       ;HS DELAY, BIT #, SYNC
071D 82     281         DB      082H            ;PLL_LOW
071E A1     282         DB      0A1H            ;V_POS
071F 95     283         DB      095H            ;H_POS
0720 9F     284         DB      09FH            ;H_MAX
0721 05     285         DB      $8              ;CODE FOR # OF SHADES
            286 ;OLIVETTI 640x350, INDEX=104
0722 69     287         DB      01101001B       ;P4
0723 FB     288         DB      11111011B       ;P2.7-P2.1,P3.6
0724 B1     289         DB      10110001B       ;HS DELAY, BIT #, SYNC
0725 9E     290         DB      09EH            ;PLL_LOW
0726 9E     291         DB      09EH            ;V_POS
```

```
0727 CD          292           DB      0CDH            ;H_POS
0728 FF          293           DB      0FFH            ;H_MAX
0729 07          294           DB      SEGA            ;CODE FOR # FOR SHADES
                 295    ;EGA, 40 COLUMN, INDEX=112
072A A9          296           DB      10101001B       ;P4
072B EA          297           DB      11101010B       ;P2.7-P2.1,P3.6
072C A9          298           DB      10101001B       ;HS DELAY, BIT #, SYNC
072D EE          299           DB      0EEH            ;PLL_LOW
072E 0E          300           DB      00EH            ;V_POS
072F 17          301           DB      017H            ;H_POS
0730 66          302           DB      066H            ;H_MAX
0731 07          303           DB      SEGA            ;CODE FOR # OF SHADES
                 304    ;
                 305    ;---
                 306    ;       %IF PROXIMA EQ 1
                 307    ;;"PROXIMA" TITLE SCREEN, INDEX=120
                 308    ;       DB      10101011B       ;P4
                 309    ;       DB      11011001B       ;P2.7-P2.1,P3.6
                 310    ;       DB      10000111B       ;HS DELAY, BIT #, SYNC
                 311    ;                               ;FLAG AS CGA FOR CONTRAST SETUP
                 312    ;       DB      0F6H            ;PLL_LOW
                 313    ;       DB      001H            ;V_POS
                 314    ;       DB      01EH            ;H_POS
                 315    ;       DB      0FFH            ;H_MAX
                 316    ;       DB      SEGA            ;ALL 6 OF R,r,G,g,B,b
                 317    ;       %ENDIF
                 318    ;---
                 319    ;
                 320    ;
                 321    ;---
                 322    ;       %IF PROXIMA EQ 0
                 323    ;BOXES TITLE SCREEN, INDEX=120
0732 EB          324           DB      11101011B       ;P4
0733 D9          325           DB      11011001B       ;P2.7-P2.1,P3.6
0734 A3          326           DB      10100011B       ;HS DELAY, BIT #, SYNC
0735 4E          327           DB      04EH            ;PLL_LOW
0736 81          328           DB      081H            ;V_POS
0737 9A          329           DB      09AH            ;H_POS
0738 FF          330           DB      0FFH            ;H_MAX
0739 07          331           DB      SEGA            ;ALL 6 OF R,r,G,g,B,b
                 332    ;       %ENDIF
                 333    ;---
                 334    ;
                 335    ;---end of init.asm file-----
                 336
                 337    $RESETLN
                 34     $SETLN(INTER.ASM);%include    "INTER.ASM"
                 1      ;=====================================
                 2      ;       File Name: INTER.ASM
                 3      ;       Last Edit: 02-22-90, 03:15 P.M., RNM
                 4      ;=====================================
                 5      ;SERIAL UART XMIT & REC INTERRUPT SERVICE
=073A            6      UART_I  EQU     $
073A C0 E0       7              PUSH    ACC             ;(2)
073C C0 D0       8              PUSH    PSW             ;(2)
073E C0 00       9              PUSH    REG0            ;(2)
0740 20 99 13    10             JB      TI,UART_50      ;(2) JMP IF XMIT INTERRUPT
                 11     ;REC'D A CHAR ON SERIAL CHANNEL
0743 E5 99       12             MOV     A,SBUF          ;(1) GET REC'D CHAR
0745 A8 52       13             MOV     R0,RQPUS        ;(2) CURRENT RECEIVE QUEUE PUSH PTR
0747 F6          14             MOV     @R0,A           ;(1) INTO RECEIVER QUEUE
0748 05 52       15             INC     RQPUS           ;(1) BUMP QUEUE PUSH PTR
074A E5 52       16             MOV     A,RQPUS         ;(1)
074C C2 98       17             CLR     RI              ;(1) REC'D CHAR INTERRUPT FLAG
074E B4 4F 20    18             CJNE    A,#RQEND,UART_90 ;(2) JMP IF NOT PAST END OF QUEUE
0751 75 52 4C    19             MOV     RQPUS,#RQUE     ;(2) WRAP TO START OF QUEUE
0754 80 1B       20             SJMP    UART_90         ;(2)
                 21     ;READY TO XMIT ANOTHER CHAR, SEE IF THERE IS ONE
=0756            22     UART_50 EQU     $
0756 E5 55       23             MOV     A,XQPOP         ;(1) XMIT POP PTR
0758 C2 99       24             CLR     TI              ;(1) XMIT CHAR INTERRUPT FLAG
075A B5 54 04    25             CJNE    A,XQPUS,UART_60 ;(2) JMP IF MORE TO XMIT
075D D2 38       26             SETB    XEMPTY          ;(1) XMIT UART IS EMPTY
075F 80 10       27             SJMP    UART_90         ;(2) GO EXIT
=0761            28     UART_60 EQU     $
0761 C2 38       29             CLR     XEMPTY          ;(1) XMIT UART HAS A CHAR
0763 05 55       30             INC     XQPOP           ;(1) BUMP QUEUE POP PTR
0765 E5 55       31             MOV     A,XQPOP         ;(1)
0767 B4 52 03    32             CJNE    A,#XQEND,UART_70 ;(2) JMP IF NOT PAST END OF QUEUE
076A 75 55 4F    33             MOV     XQPOP,#XQUE     ;(2) WRAP TO START
```

```
                        34    UART_70  EQU    $
=0760                   35             MOV    R0,XQPOP      ;(1) POP PTR
0760 A8 55              36             MOV    SBUF,@R0      ;(2) CHR INTO UART'S XMIT BUF
076F 86 99              37    ;COMMON EXIT
                        38    UART_90  EQU    $
=0771                   39             POP    REG0          ;(2)
0771 D0 00              40             POP    PSW           ;(2)
0773 D0 D0              41             POP    ACC           ;(2)
0775 D0 E0              42             RETI                 ;(2)
0777 32                 43    ;----------------------------------
                        44    ;VERTICAL SYNC INTERRUPT FOR MAC II SYNC
                        45    ;EXTERNAL INTERRUPT, INT0-
                        46    ;EACH tcyc = 1.0851 usec
0778 C0 E0              47    DOFF_INT PUSH   ACC           ;(2)
077A C0 D0              48             PUSH   PSW           ;(2)
077C C2 8C              49             CLR    TR0           ;(2) MAKE USRE TIMER IS STOPPED
077E 75 8A 30           50             MOV    TL0,#6+14+28  ;(2) ODD TIMER PERIOD
0781 75 0E 35           51             MOV    MACFRA,#MACFPR ;(2) # OF TIMER INTERRUPTS
                        52                                  ;     TO SYNC FLIP-FLOP DATA
                        53                                  ;     LINE ON
0784 30 1F 04           54             JNB    MAC_II,DOF_I04 ;(2) JMP IF NOT MAC II
                        55    ;MAC II TIMING:
                        56    ;3 TO 7, +2 +12 = 19, 19*1.0851 usec = 20.62usec
0787 74 09              57             MOV    A,#9          ;(1)
0789 80 0B              58             SJMP   DOF_I08       ;(2)
=078B                   59    DOF_I04  EQU    $
078B 30 23 00           60             JNB    VT220,DOF_I16 ;(2) JMP IF NOT DEC VT200
                        61    ;DEC VT220 TIMING:
                        62    ;3 TO 7, +2 +18=25, 25 * 1.0851 = 27 usec
                        63    ;NEED 80-27=53 usec/1.0851=49, 49/3=16
078E 74 10              64             MOV    A,#16         ;(1)
0790 75 8A 95           65             MOV    TL0,#256-107  ;(2) ODD TIMER PERIOD
0793 75 0E 3B           66             MOV    MACFRA,#DECFPR ;(2) # OF TIMER INTERRUPTS
=0796                   67    DOF_I08  EQU    $
0796 D2 8C              68             SETB   TR0           ;(1) START TIMER 0, LOWER
=0798                   69    DOF_I12  EQU    $
0798 14                 70             DEC    A
0799 70 FD              71             JNZ    DOF_I12       ;(2) DELAY
                        72    ;RE-ENABLE HSYNC
=079B                   73    DOF_I16  EQU    $
079B C2 C4              74             CLR    HOFF          ;(1) FLIP-FLOP'S D LINE =0
079D D0 D0              75             POP    PSW
079F D0 E0              76             POP    ACC
07A1 32                 77             RETI
                        78    ;--------------------------------
                        79    ;TIMER 0 LOWER COUNTER INTERRUPT
                        80    ;EACH tcyc = 1.0851usec
07A2 C0 E0              81    DON_INT  PUSH   ACC           ;(2)
07A4 C0 D0              82             PUSH   PSW           ;(2)
07A6 15 0E              83             DEC    MACFRA        ;(1)
07A8 E5 0E              84             MOV    A,MACFRA      ;(1) TRI-STATE HSYNC FOR MACII?
07AA 70 04              85             JNZ    DON_I80       ;(2) NO
07AC C2 8C              86             CLR    TR0           ;(1) STOP TIMER
                        87    ;DISBALE MACII HSYNC
07AE D2 C4              88             SETB   HOFF          ;(1) FLIP-FLOP'S D LINE=1
07B0 D0 D0              89    DON_I80  POP    PSW           ;(2)
07B2 D0 E0              90             POP    ACC           ;(2)
07B4 32                 91             RETI
                        92    ;--------------END OF INTERRUPT--------------
                        93
                        94    $RESETLN
                        35    $SETLN(CONTRAST.ASM);%include    "CONTRAST.ASM"
                        1     ;=========================================
                        2     ;     File Name: CONTRAST.ASM
                        3     ;     Last Edit: 03-21-90, 02:30 P.M., RNM
                        4     ;=========================================
                        5     ;FROCE DEFAULT CONTRAST
                        6     ;
=07B5                   7     DEFCON   EQU    $
07B5 C0 00              8              PUSH   REG0
07B7 C0 02              9              PUSH   REG2
07B9 C0 03              10             PUSH   REG3
                        11    ;
07BB 78 2B              12             MOV    R0,#CRED      ;PTR TO RED CONTRAST AREA
07BD 7A 03              13             MOV    R2,#3         ;INITIALIZE RED,GREEN & BLUE
=07BF                   14    DC20     EQU    $
07BF 7B 08              15             MOV    R3,#8         ;# OF BYTES TO SETUP:
                        16                                  ;SIGN OF DEF CONTRAST (1)
                        17                                  ;OVERALL CONTRAST (2)
                        18                                  ;TINT CONTRAST (2)
```

```
                         19                            ;8 COLOR MODE CONTRAST (2)
                         20                            ;OVERALL CONTRAST (1).
07C1 08                  21          INC     R0        ;SKIP DEF VALUE
=07C2                    22  DC30    EQU     $
07C2 76 00               23          MOV     @R0,#0    ;INITIALIZE
07C4 08                  24          INC     R0
07C5 DB FB               25          DJNZ    R3,DC30   ;LOOP FOR ALL WITHIN A COLOR
07C7 DA F6               26          DJNZ    R2,DC20   ;LOOP FOR ALL COLORS
                         27  ;SET WIPERS TO DEFAULT
07C9 75 47 19            28          MOV     TWIPER,#COLLIM  ;TINT WIPER
07CC 75 48 28            29          MOV     CWIPER,#CLIM    ;OVERALL CONTRAST
07CF E5 46               30          MOV     A,SHADES  ;TRUE SHADES
07D1 12 0AC7             31          CALL    SHA_OUT   ;OUTPUT # OF SHADES
                         32                            ;AND SETUP 8 COLOR CONTRAST=0
07D4 12 0806             33          CALL    RGB_OUT   ;OUTPUT CONTRAST
                         34  ;
07D7 D0 03               35          POP     REG3
07D9 D0 02               36          POP     REG2
07DB D0 00               37          POP     REG0
07DD 22                  38          RET
                         39  ;--------------------------------
                         40  ;ADD ALL COMPONETS OF CONTRAST
                         41  ;IN: R0 = PTR TO START OF CONTRAST AREA
                         42  ;OUT: R4,R5 = SIGNED TOTAL CONTRAST
                         43  ;     A = 8 BIT TOTAL CONTRAST, ASSUMED POSITIVE
=07DE                    44  CON_ADD EQU     $
07DE C0 00               45          PUSH    REG0
07E0 C0 03               46          PUSH    REG3
07E2 7B 04               47          MOV     R3,#4     ;DEF, OVERALL, TINT & 8 COLOR
07E4 7C 00               48          MOV     R4,#0     ;TOTAL=0
07E6 7D 00               49          MOV     R5,#0
=07E8                    50  C_A20   EQU     $
07E8 E6                  51          MOV     A,@R0     ;GET VALUE FROM CONTRAST AREA
07E9 08                  52          INC     R0        ;TO SIGN FOR VALUE
07EA 2C                  53          ADD     A,R4      ;TOTAL DATA
07EB FC                  54          MOV     R4,A
07EC E6                  55          MOV     A,@R0     ;SIGN
07ED 3D                  56          ADDC    A,R5      ;TOTAL SIGN & OVERFLOW
07EE FD                  57          MOV     R5,A
07EF 08                  58          INC     R0
07F0 DB F6               59          DJNZ    R3,C_A20  ;LOOP FOR ALL PIECES
                         60  ;COPY VALUE TO ACC
07F2 EC                  61          MOV     A,R4      ;ASSUME POS
07F3 D0 03               62          POP     REG3
07F5 D0 00               63          POP     REG0
07F7 22                  64          RET
                         65  ;--------------------------------
                         66  ;TEST ADD TOTAL CONTRAST
                         67  ;IN: R0 = PTR TO START OF CONTRAST AREA
                         68  ;OUT: R4,R5 = TOTAL SIGNED CONTRAST
                         69  ;     CARRY=1 FOR OVER/UNDE FLOW
                         70  ;     CARRY=0 FOR O.K. RESULT
                         71  ;
=07F8                    72  TES_ADD EQU     $
07F8 F1DE                73          CALL    CON_ADD   ;DO ADD
07FA ED                  74          MOV     A,R5      ;OVER/UNDER FLOW?
07FB 60 03               75          JZ      T_A70     ;NO, PERHAPS OK
07FD D3                  76          SETB    C
07FE 80 05               77          SJMP    T_A90
=0800                    78  T_A70   EQU     $
0800 74 83               79          MOV     A,#MAXDAC-1 ;MAX ALLOWED DAC VALUE-1
0802 B5 04 00            80          CJNE    A,REG4,$+3  ;C=1 IF TOO HIGH
                         81                            ;C=0 IF OK
=0805                    82  T_A90   EQU     $
0805 22                  83          RET
                         84  ;--------------------------------
                         85  ;OUTPUT RED, GREEN AND BLUE CONTRAST TO DAC'S
                         86  ;IN: ACTCR  ACTIVE RED CONTRAST
                         87  ;    ACTCG    "   GREEN   "
                         88  ;    ACTCB    "   BLUE    "
                         89  ;
=0806                    90  RGB_OUT EQU     $
0806 C0 00               91          PUSH    REG0
                         92  ;
0808 78 2B               93          MOV     R0,#CRED  ;START OF RED'S CONTRAST AREA
080A 12 07DE             94          CALL    CON_ADD   ;ADD ALL PIECES
080D F5 33               95          MOV     CRED+8,A  ;OVERALL CONTRAST (FOR DEBUG)
080F 12 0835             96          CALL    CON_OUT   ;TO SHIFT REG
0812 C2 DB               97          CLR     CTXR      ;CLOCK TO SHIF REG OUT
0814 D2 DB               98          SETB    CTXR      ;FOR INPUT TO DAC
                         99  ;
```

```
0816 78 34            100         MOV     R0,#CGREEN         ;START OF GREEN'S AREA
0818 12 07DE          101         CALL    CON_ADD            ;INCLUDE ALL PIECES
081B F5 3C            102         MOV     CGREEN+8,A         ;OVERALL CONTRAST (FOR DEBUG)
081D 12 0835          103         CALL    CON_OUT            ;TO SHIFT REG
0820 C2 DC            104         CLR     CTXG               ;CLOCK TO SHIF REG OUT
0822 D2 DC            105         SETB    CTXG               ;FOR INPUT TO DAC
                      106         ;
0824 78 30            107         MOV     R0,#CBLUE          ;START OF BLUE'S AREA
0826 12 07DE          108         CALL    CON_ADD            ;INCLUDE ALL PIECES
0829 F5 45            109         MOV     CBLUE+8,A          ;OVERALL CONTRAST (FOR DEBUG)
082B 12 0835          110         CALL    CON_OUT            ;TO SHIFT REG
082E C2 C5            111         CLR     CTXB               ;CLOCK TO SHIF REG OUT
0830 D2 C5            112         SETB    CTXB               ;FOR INPUT TO DAC
                      113         ;
0832 D0 00            114         POP     REG0
0834 22               115         RET
                      116         ;--------------------------------
                      117         ;OUTPUT A CONTRAST TO A SHIFT REGISTER
                      118         ;IN: (A) CONTRAST VALUE
                      119         ;
=0835                 120         CON_OUT EQU     $
0835 C0 02            121                 PUSH    REG2
0837 7A 08            122                 MOV     R2,#8              ;8 BITS
                      123         ;LATCH IS LOADED M.S. TO L.S. BUT THE CORRESPONDING BITS
                      124         ;ON THE DAC INPUT ARE REVERSED. THE L.S. BIT OF DAC IS TIED
                      125         ;TO M.S. OF LATCH
=0839                 126         CON_20  EQU     $
0839 13               127                 RRC     A                  ;L.S. BIT FIRST
083A 92 92            128                 MOV     CTDATA,C           ;TO DATA PIN
083C C2 93            129                 CLR     CTCLK              ;CLK INTO SHIFT REG
083E D2 93            130                 SETB    CTCLK
0840 DA F7            131                 DJNZ    R2,CON_20
0842 D0 02            132                 POP     REG2
0844 22               133                 RET
                      134         ;--------------------------------
                      135         ;LOAD DEFAULT CONTRAST BASED ON DISPLAY MODE
                      136         ;IN: (COMPUTER1) AND (COMPUTER2) DISPLAY MODE FLAGS
                      137         ;OUT: (DCON) CONTAINS DEFAULT CONTRAST
                      138         ;       POT. IS ADJUSTED FOR DEFAULT
                      139         ;       R3 IS DESTROYED
=0845                 140         LDFCN   EQU     $
0845 30 1F 0C         141                 JNB     MAC_II,DFCN10      ;JMP IF NOT MAC II
0848 75 2B 85         142                 MOV     CRED,#MIIR         ;MAC II, RED DEFAULT CONTRAST
084B 75 34 75         143                 MOV     CGREEN,#MIIG       ;  "      GREEN    "      "
084E 75 30 6F         144                 MOV     CBLUE,#MIIB        ;  "      BLUE     "      "
0851 02 08D8          145                 JMP     DFCN90             ;GO ADJUST DIGITAL POT.
=0854                 146         DFCN10  EQU     $
0854 30 1E 0C         147                 JNB     VGA_TEXT,DFCN15    ;JMP IF NOT VGA TEXT
0857 75 2B 7E         148                 MOV     CRED,#VTEXR        ;VGA TEXT, RED DEFAULT CONTR.
085A 75 34 66         149                 MOV     CGREEN,#VTEXG      ;  "    "   GREEN    "    "
085D 75 30 6A         150                 MOV     CBLUE,#VTEXB       ;  "    "   BLUE     "    "
0860 02 08D8          151                 JMP     DFCN90
=0863                 152         DFCN15  EQU     $
0863 30 1D 0C         153                 JNB     VGA_GRAF,DFCN20    ;JMP IF NOT VGA TEXT OR GRAP
0866 75 2B 69         154                 MOV     CRED,#VGAR         ;VGA, RED DEFAULT CONTRAST
0869 75 34 4E         155                 MOV     CGREEN,#VGAG       ;  "  GREEN    "      "
086C 75 30 51         156                 MOV     CBLUE,#VGAB        ;  "  BLUE     "      "
086F 02 08D8          157                 JMP     DFCN90             ;GO ADJUST DIGITAL POT.
=0872                 158         DFCN20  EQU     $
0872 20 1C 03         159                 JB      VETTI400,DFCN25    ;JMP IF OLIVETTI 400
0875 30 24 0C         160                 JNB     VETTI350,DFCN30    ;JMP IF NEITHER OLIVETTI
=0878                 161         DFCN25  EQU     $
0878 75 2B 88         162                 MOV     CRED,#OLIR         ;OLIVETTI, RED DEFAULT CONTRAST
087B 75 34 5B         163                 MOV     CGREEN,#OLIG       ;  "       GREEN    "      "
087E 75 30 56         164                 MOV     CBLUE,#OLIB        ;  "       BLUE     "      "
0881 02 08D8          165                 JMP     DFCN90             ;GO ADJUST DIGITAL POT.
=0884                 166         DFCN30  EQU     $
0884 30 1B 0C         167                 JNB     MAC_SE,DFCN35      ;JMP IF NOT MAC SE
0887 75 2B 5F         168                 MOV     CRED,#MSER         ;MAC SE, RED DEFAULT CONTRAST
088A 75 34 50         169                 MOV     CGREEN,#MSEG       ;  "  "  GREEN    "      "
088D 75 30 5B         170                 MOV     CBLUE,#MSEB        ;  "  "  BLUE     "      "
0890 02 08D8          171                 JMP     DFCN90             ;GO ADJUST DIGITAL POT.
=0893                 172         DFCN35  EQU     $
0893 30 1A 0C         173                 JNB     EGA,DFCN40         ;JMP IF NOT EGA
0896 75 2B 3A         174                 MOV     CRED,#EGAR         ;EGA, RED DEFAULT CONTRAST
0899 75 34 24         175                 MOV     CGREEN,#EGAG       ;  "  GREEN    "      "
089C 75 30 2B         176                 MOV     CBLUE,#EGAB        ;  "  BLUE     "      "
089F 02 08D8          177                 JMP     DFCN90             ;GO ADJUST DIGITAL POT.
=08A2                 178         DFCN40  EQU     $
08A2 30 19 0C         179                 JNB     CGA,DFCN45         ;JMP IF NOT CGA
```

```
08A5 75 2B 69      180         MOV     CRED,#CGAR         ;CGA, RED DEFAULT CONTRAST
08A8 75 34 4D      181         MOV     CGREEN,#CGAG       ;  "  GREEN  "       "
08AB 75 3D 44      182         MOV     CBLUE,#CGAB        ;  "  BLUE   "       "
08AE 02 08D8       183         JMP     DFCN90             ;GO OUTPUT CONTRASTS TO DAC'S
=08B1              184 DFCN45  EQU     $
08B1 30 23 0C      185         JNB     VT220,DFCN50       ;JMP IF NOT DEC VT220
08B4 75 2B 4D      186         MOV     CRED,#DECR         ;DEC'S RED DEFAULT CONTRAST
08B7 75 34 3A      187         MOV     CGREEN,#DECG       ;  "   "    "      "
08BA 75 3D 3E      188         MOV     CBLUE,#DECB        ;  "   "    "      "
08BD 02 08D8       189         JMP     DFCN90             ;GO OUTPUT CONTRASTS
=08C0              190 DFCN50  EQU     $
08C0 30 20 0C      191         JNB     TITLE,DFCN55       ;JMP IF NOT TITLE SCREEN
08C3 75 2B 84      192         MOV     CRED,#TITR         ;TITLE SCREEN'S RED DEFAULT CONTRAST
08C6 75 34 56      193         MOV     CGREEN,#TITG       ;  "     "      GREEN  "      "
08C9 75 3D 4B      194         MOV     CBLUE,#TITB        ;  "     "      BLUE   "      "
08CC 02 08D8       195         JMP     DFCN90             ;GO OUTPUT CONTRAST
=08CF              196 DFCN55  EQU     $
08CF 75 2B 4D      197         MOV     CRED,#HERR         ;HERCULES, RED DEFAULT CONTRAST
08D2 75 34 3A      198         MOV     CGREEN,#HERG       ;  "       GREEN  "      "
08D5 75 3D 3E      199         MOV     CBLUE,#HERB        ;  "       BLUE   "      "
=08D8              200 DFCN90  EQU     $
08D8 75 2C 00      201         MOV     CRED+1,#0          ;RED'S SIGN
08DB 75 35 00      202         MOV     CGREEN+1,#0        ;GREEN'S SIGN
08DE 75 3E 00      203         MOV     CBLUE+1,#0         ;BLUE'S SIGN
08E1 02 08E4       204         JMP     ADJCON             ;ADJUST CONTRAST
                   205 ;------------------------------------
                   206 ;ADJUST CONTRAST TO PREVENT OVER/UNDER FLOW
=08E4              207 ADJCON  EQU     $
                   208 ;
=08E4              209 ADJC10  EQU     $
08E4 78 2B         210         MOV     R0,#CRED           ;PTR TO RED
08E6 12 07F8       211         CALL    TES_ADD            ;RED OK?
08E9 50 05         212         JNC     ADJC20             ;YES
=08EB              213 ADJC15  EQU     $
08EB 12 0914       214         CALL    FIXC               ;NO, FIX CONTRAST
08EE 80 F4         215         JMP     ADJC10             ;TRY AGAIN
=08F0              216 ADJC20  EQU     $
08F0 78 34         217         MOV     R0,#CGREEN         ;PTR TO GREEN
08F2 12 07F8       218         CALL    TES_ADD            ;GREEN OK?
08F5 40 F4         219         JC      ADJC15             ;NO, FIX & TRY AGAIN
=08F7              220 ADJC40  EQU     $
08F7 78 3D         221         MOV     R0,#CBLUE          ;PTR TO BLUE
08F9 12 07F8       222         CALL    TES_ADD            ;BLUE OK?
08FC 40 ED         223         JC      ADJC15             ;NO, FIX & TRY AGAIN
=08FE              224 ADJC60  EQU     $
08FE 0106          225         JMP     RGB_OUT            ;OUTPUT TO DAC'S
                   226 ;------------------------------------
                   227 ;TEST ALL 3 COLORS FOR OVER/UNDER FLOW
                   228 ;OUT: CARRY=1 IF OVER OR UNDER FLOW
                   229 ;     CARRY=0 IF ALL 3 OK
=0900              230 TES_ALL EQU     $
0900 78 2B         231         MOV     R0,#CRED           ;PTR TO RED'S AREA
0902 12 07F8       232         CALL    TES_ADD            ;OVER OR UNDER FLOW?
0905 40 0C         233         JC      TES_A80            ;YES
0907 78 34         234         MOV     R0,#CGREEN         ;PTR TO GREEN'S AREA
0909 12 07F8       235         CALL    TES_ADD            ;OVER OR UNDER FLOW?
090C 40 05         236         JC      TES_A80            ;YES
090E 78 3D         237         MOV     R0,#CBLUE          ;PTR TO BLUE'S AREA
0910 12 07F8       238         CALL    TES_ADD            ;OVER OR UNDER FLOW?
=0913              239 TES_A80 EQU     $
0913 22            240         RET
                   241 ;------------------------------------
                   242 ;FIX CONTRAST BECAUSE OF OVER/UNDER FLOW
                   243 ;CAUSED BY NEW DEFAULT
=0914              244 FIXC    EQU     $
0914 ED            245         MOV     A,R5               ;UNDER/OVER/SIGN BYTE
0915 B4 FF 05      246         CJNE    A,#0FFH,FIXC50     ;JMP IF OVER FLOW
                   247 ;UNDER FLOW
0918 05 48         248         INC     CWIPER             ;INCREASE CONTRAST
091A 02 0922       249         JMP     CWIPD              ;GET CONTRAST WIPER DATA
                   250 ;OVER FLOW
=091D              251 FIXC50  EQU     $
091D 15 48         252         DEC     CWIPER             ;DECREASE CONTRAST
091F 02 0922       253         JMP     CWIPD              ;FILL IN OVERALL CONTRAST FROM
                   254                                    ;TABLE
                   255 ;------------------------------------
                   256 ;GET DATA FROM TABLE FOR OVERALL CONTRAST
                   257 ;AND PLACE INTO COLOR AREA
=0922              258 CWIPD   EQU     $
0922 90 0946       259         MOV     DPTR,#CONTAB       ;OVERALL CONTRAST TAB START
0925 E5 48         260         MOV     A,CWIPER
```

```
                          261     ;3 BYTES PER ENTRY, COMPUTE INDEX
                          262     ;RED LSB, GREEN LSB, BLUE LSB
0927 23                   263              RL       A
0928 23                   264              RL       A
0929 54 FE                265              ANL      A,#0FEH              ;KEEP VALID BITS
092B C3                   266              CLR      C
092C 95 48                267              SUBB     A,CWIPER             ;(CWIPER*4)-CWIPER=CWIPER*3
                          268     ;FETCH EACH CONTRAST, CHECK FOR SIGN AND STORE
                          269     ;LSB FROM TABLE & MSB BASED ON SIGN INTO CONTRAST RAM AREA
092E FA                   270              MOV      R2,A                 ;SAVE TABLE INDEX
092F 7B 03                271              MOV      R3,#3                ;R,G,B
0931 79 2D                272              MOV      R1,#CRED+2           ;PTR TO RED'S OVERALL CONTRAST
                          273     ;LOOP FOR ALL 3
=0933                     274     CWD30    EQU      $
0933 EA                   275              MOV      A,R2                 ;TABLE INDEX
0934 93                   276              MOVC     A,@A+DPTR            ;CONTRAST CHANGE
0935 F7                   277              MOV      @R1,A                ;LSB OF RAM VALUE
0936 09                   278              INC      R1                   ;TO RAM'S MSB, SIGN
0937 77 00                279              MOV      @R1,#0               ;ASSUME POSITIVE
0939 30 E7 02             280              JNB      ACC.7,CWD40          ;JMP IF POS
093C 77 FF                281              MOV      @R1,#0FFH            ;NEG SIGN
=093E                     282     CWD40    EQU      $
093E 74 08                283              MOV      A,#9-1               ;OFFSET TO NEXT COLOR AREA
0940 29                   284              ADD      A,R1
0941 F9                   285              MOV      R1,A                 ;PTR TO NEXT RAM COLOR AREA
0942 0A                   286              INC      R2                   ;TABLE INDEX
0943 DB EE                287              DJNZ     R3,CWD30
0945 22                   288              RET
                          289     ;------------------------------------
                          290     ;TABLE OF OVERALL CONTRAST CHANGE CAUSED
                          291     ;BY CONTRAST KEYS
                          292     ;EACH ENTRY:
                          293     ;        BYTE 0 = RED LSB
                          294     ;          "  1 = GREEN LSB
                          295     ;          "  2 = BLUE LSB
                          296     ;SLOPES FOR THE GAMMA CURVES ARE:
                          297     ;        RED   = 19.72 LUM/VOLT
                          298     ;        GREEN = 4.87 LUM/VOLT
                          299     ;        BLUE  = 7.48 LUM/VOLT
                          300     ;RED IS ASSUMED TO BE THE BASE GAMMA CURVE
                          301     ;        GREEN FACTOR = (RED SLOPE)/(GREEN SLOPE) *
                          302     ;                       (RED GAIN)/(GREEN GAIN) =
                          303     ;                       19.72/4.87 * 1.22/1.5 = 3.29
                          304     ;        BLUE FACTOR  = (RED SLOPE)/(BLUE SLOPE) *
                          305     ;                       (RED GAIN)/(BLUE GAIN) =
                          306     ;                       19.72/7.48 * 1.22/1.5 = 2.14
                          307     ;
                          308     ;LIMIT = =127, -128
                          309     ;
=0084                     310     G        EQU      132
=0096                     311     F        EQU      150
                          312     ;
=0946                     313     CONTAB   EQU      $
0946 D8                   314              DB       -40                                                  ;RED, WIPER=0
0947 CB                   315              DB       -(40*G/100)-(40*G MOD 100)/50 ;GREEN, "
0948 C4                   316              DB       -(40*F/100)-(40*F MOD 100)/50 ;BLUE,  "
0949 D9 CD C5             317              DB -39,-(39*G/100)-(39*G MOD 100)/50,-(39*F/100)-(39*F MOD 100)/50 ;1
094C DA CE C7             318              DB -38,-(38*G/100)-(38*G MOD 100)/50,-(38*F/100)-(38*F MOD 100)/50 ;2
094F DB CF C8             319              DB -37,-(37*G/100)-(37*G MOD 100)/50,-(37*F/100)-(37*F MOD 100)/50 ;3
0952 DC D0 CA             320              DB -36,-(36*G/100)-(36*G MOD 100)/50,-(36*F/100)-(36*F MOD 100)/50 ;4
0955 DD D2 CB             321              DB -35,-(35*G/100)-(35*G MOD 100)/50,-(35*F/100)-(35*F MOD 100)/50 ;5
0958 DE D3 CD             322              DB -34,-(34*G/100)-(34*G MOD 100)/50,-(34*F/100)-(34*F MOD 100)/50 ;6
095B DF D4 CE             323              DB -33,-(33*G/100)-(33*G MOD 100)/50,-(33*F/100)-(33*F MOD 100)/50 ;7
095E E0 D6 D0             324              DB -32,-(32*G/100)-(32*G MOD 100)/50,-(32*F/100)-(32*F MOD 100)/50 ;8
0961 E1 D7 D1             325              DB -31,-(31*G/100)-(31*G MOD 100)/50,-(31*F/100)-(31*F MOD 100)/50 ;9
0964 E2 D8 D3             326              DB -30,-(30*G/100)-(30*G MOD 100)/50,-(30*F/100)-(30*F MOD 100)/50 ;10
0967 E3 DA D4             327              DB -29,-(29*G/100)-(29*G MOD 100)/50,-(29*F/100)-(29*F MOD 100)/50 ;11
096A E4 DB D6             328              DB -28,-(28*G/100)-(28*G MOD 100)/50,-(28*F/100)-(28*F MOD 100)/50 ;12
096D E5 DC D7             329              DB -27,-(27*G/100)-(27*G MOD 100)/50,-(27*F/100)-(27*F MOD 100)/50 ;13
0970 E6 DE D9             330              DB -26,-(26*G/100)-(26*G MOD 100)/50,-(26*F/100)-(26*F MOD 100)/50 ;14
0973 E7 DF DA             331              DB -25,-(25*G/100)-(25*G MOD 100)/50,-(25*F/100)-(25*F MOD 100)/50 ;15
0976 E8 E0 DC             332              DB -24,-(24*G/100)-(24*G MOD 100)/50,-(24*F/100)-(24*F MOD 100)/50 ;16
0979 E9 E2 DD             333              DB -23,-(23*G/100)-(23*G MOD 100)/50,-(23*F/100)-(23*F MOD 100)/50 ;17
097C EA E3 DF             334              DB -22,-(22*G/100)-(22*G MOD 100)/50,-(22*F/100)-(22*F MOD 100)/50 ;18
097F EB E4 E0             335              DB -21,-(21*G/100)-(21*G MOD 100)/50,-(21*F/100)-(21*F MOD 100)/50 ;19
0982 EC E6 E2             336              DB -20,-(20*G/100)-(20*G MOD 100)/50,-(20*F/100)-(20*F MOD 100)/50 ;20
0985 ED E7 E3             337              DB -19,-(19*G/100)-(19*G MOD 100)/50,-(19*F/100)-(19*F MOD 100)/50 ;21
0988 EE E8 E5             338              DB -18,-(18*G/100)-(18*G MOD 100)/50,-(18*F/100)-(18*F MOD 100)/50 ;22
098B EF EA E6             339              DB -17,-(17*G/100)-(17*G MOD 100)/50,-(17*F/100)-(17*F MOD 100)/50 ;23
```

```
098E F0 EB E8    340        DB  -16,-(16*G/100)-(16*G MOD 100)/50,-(16*F/100)-(16*F MOD 100)/50 ;24
0991 F1 EC E9    341        DB  -15,-(15*G/100)-(15*G MOD 100)/50,-(15*F/100)-(15*F MOD 100)/50 ;25
0994 F2 EE EB    342        DB  -14,-(14*G/100)-(14*G MOD 100)/50,-(14*F/100)-(14*F MOD 100)/50 ;26
0997 F3 EF EC    343        DB  -13,-(13*G/100)-(13*G MOD 100)/50,-(13*F/100)-(13*F MOD 100)/50 ;27
099A F4 F0 EE    344        DB  -12,-(12*G/100)-(12*G MOD 100)/50,-(12*F/100)-(12*F MOD 100)/50 ;28
099D F5 F1 EF    345        DB  -11,-(11*G/100)-(11*G MOD 100)/50,-(11*F/100)-(11*F MOD 100)/50 ;29
09A0 F6 F3 F1    346        DB  -10,-(10*G/100)-(10*G MOD 100)/50,-(10*F/100)-(10*F MOD 100)/50 ;30
09A3 F7 F4 F2    347        DB  -9,-(9*G/100)-(9*G MOD 100)/50,-(9*F/100)-(9*F MOD 100)/50 ;31
09A6 F8 F5 F4    348        DB  -8,-(8*G/100)-(8*G MOD 100)/50,-(8*F/100)-(8*F MOD 100)/50 ;32
09A9 F9 F7 F5    349        DB  -7,-(7*G/100)-(7*G MOD 100)/50,-(7*F/100)-(7*F MOD 100)/50 ;33
09AC FA F8 F7    350        DB  -6,-(6*G/100)-(6*G MOD 100)/50,-(6*F/100)-(6*F MOD 100)/50 ;34
09AF FB F9 F8    351        DB  -5,-(5*G/100)-(5*G MOD 100)/50,-(5*F/100)-(5*F MOD 100)/50 ;35
09B2 FC FB FA    352        DB  -4,-(4*G/100)-(4*G MOD 100)/50,-(4*F/100)-(4*F MOD 100)/50 ;36
09B5 FD FC FB    353        DB  -3,-(3*G/100)-(3*G MOD 100)/50,-(3*F/100)-(3*F MOD 100)/50 ;37
09B8 FE FD FD    354        DB  -2,-(2*G/100)-(2*G MOD 100)/50,-(2*F/100)-(2*F MOD 100)/50 ;38
09BB FF FF FE    355        DB  -1,-(1*G/100)-(1*G MOD 100)/50,-(1*F/100)-(1*F MOD 100)/50 ;39
09BE 00 00 00    356        DB  0,0,0                                                    ; = 40
09C1 01 01 02    357        DB  1,(1*G/100)+(1*G MOD 100)/50,(1*F/100)+(1*F MOD 100)/50 ;41
09C4 02 03 03    358        DB  2,(2*G/100)+(2*G MOD 100)/50,(2*F/100)+(2*F MOD 100)/50 ;42
09C7 03 04 05    359        DB  3,(3*G/100)+(3*G MOD 100)/50,(3*F/100)+(3*F MOD 100)/50 ;43
09CA 04 05 06    360        DB  4,(4*G/100)+(4*G MOD 100)/50,(4*F/100)+(4*F MOD 100)/50 ;44
09CD 05 07 08    361        DB  5,(5*G/100)+(5*G MOD 100)/50,(5*F/100)+(5*F MOD 100)/50 ;45
09D0 06 08 09    362        DB  6,(6*G/100)+(6*G MOD 100)/50,(6*F/100)+(6*F MOD 100)/50 ;46
09D3 07 09 0B    363        DB  7,(7*G/100)+(7*G MOD 100)/50,(7*F/100)+(7*F MOD 100)/50 ;47
09D6 08 0B 0C    364        DB  8,(8*G/100)+(8*G MOD 100)/50,(8*F/100)+(8*F MOD 100)/50 ;48
09D9 09 0C 0E    365        DB  9,(9*G/100)+(9*G MOD 100)/50,(9*F/100)+(9*F MOD 100)/50 ;49
09DC 0A 0D 0F    366        DB  10,(10*G/100)+(10*G MOD 100)/50,(10*F/100)+(10*F MOD 100)/50 ;50
09DF 0B 0F 11    367        DB  11,(11*G/100)+(11*G MOD 100)/50,(11*F/100)+(11*F MOD 100)/50 ;51
09E2 0C 10 12    368        DB  12,(12*G/100)+(12*G MOD 100)/50,(12*F/100)+(12*F MOD 100)/50 ;52
09E5 0D 11 14    369        DB  13,(13*G/100)+(13*G MOD 100)/50,(13*F/100)+(13*F MOD 100)/50 ;53
09E8 0E 12 15    370        DB  14,(14*G/100)+(14*G MOD 100)/50,(14*F/100)+(14*F MOD 100)/50 ;54
09EB 0F 14 17    371        DB  15,(15*G/100)+(15*G MOD 100)/50,(15*F/100)+(15*F MOD 100)/50 ;55
09EE 10 15 18    372        DB  16,(16*G/100)+(16*G MOD 100)/50,(16*F/100)+(16*F MOD 100)/50 ;56
09F1 11 16 1A    373        DB  17,(17*G/100)+(17*G MOD 100)/50,(17*F/100)+(17*F MOD 100)/50 ;57
09F4 12 18 1B    374        DB  18,(18*G/100)+(18*G MOD 100)/50,(18*F/100)+(18*F MOD 100)/50 ;58
09F7 13 19 1D    375        DB  19,(19*G/100)+(19*G MOD 100)/50,(19*F/100)+(19*F MOD 100)/50 ;59
09FA 14 1A 1E    376        DB  20,(20*G/100)+(20*G MOD 100)/50,(20*F/100)+(20*F MOD 100)/50 ;60
09FD 15 1C 20    377        DB  21,(21*G/100)+(21*G MOD 100)/50,(21*F/100)+(21*F MOD 100)/50 ;61
0A00 16 1D 21    378        DB  22,(22*G/100)+(22*G MOD 100)/50,(22*F/100)+(22*F MOD 100)/50 ;62
0A03 17 1E 23    379        DB  23,(23*G/100)+(23*G MOD 100)/50,(23*F/100)+(23*F MOD 100)/50 ;63
0A06 18 20 24    380        DB  24,(24*G/100)+(24*G MOD 100)/50,(24*F/100)+(24*F MOD 100)/50 ;64
0A09 19 21 26    381        DB  25,(25*G/100)+(25*G MOD 100)/50,(25*F/100)+(25*F MOD 100)/50 ;65
0A0C 1A 22 27    382        DB  26,(26*G/100)+(26*G MOD 100)/50,(26*F/100)+(26*F MOD 100)/50 ;66
0A0F 1B 24 29    383        DB  27,(27*G/100)+(27*G MOD 100)/50,(27*F/100)+(27*F MOD 100)/50 ;67
0A12 1C 25 2A    384        DB  28,(28*G/100)+(28*G MOD 100)/50,(28*F/100)+(28*F MOD 100)/50 ;68
0A15 1D 26 2C    385        DB  29,(29*G/100)+(29*G MOD 100)/50,(29*F/100)+(29*F MOD 100)/50 ;69
0A18 1E 28 2D    386        DB  30,(30*G/100)+(30*G MOD 100)/50,(30*F/100)+(30*F MOD 100)/50 ;70
0A1B 1F 1C 2F    387        DB  31,(21*G/100)+(31*G MOD 100)/50,(31*F/100)+(31*F MOD 100)/50 ;71
0A1E 20 2A 30    388        DB  32,(32*G/100)+(32*G MOD 100)/50,(32*F/100)+(32*F MOD 100)/50 ;72
0A21 21 2C 32    389        DB  33,(33*G/100)+(33*G MOD 100)/50,(33*F/100)+(33*F MOD 100)/50 ;73
0A24 22 2D 33    390        DB  34,(34*G/100)+(34*G MOD 100)/50,(34*F/100)+(34*F MOD 100)/50 ;74
0A27 23 2E 35    391        DB  35,(35*G/100)+(35*G MOD 100)/50,(35*F/100)+(35*F MOD 100)/50 ;75
0A2A 24 30 36    392        DB  36,(36*G/100)+(36*G MOD 100)/50,(36*F/100)+(36*F MOD 100)/50 ;76
0A2D 25 31 38    393        DB  37,(37*G/100)+(37*G MOD 100)/50,(37*F/100)+(37*F MOD 100)/50 ;77
0A30 26 32 39    394        DB  38,(38*G/100)+(38*G MOD 100)/50,(38*F/100)+(38*F MOD 100)/50 ;78
0A33 27 33 3B    395        DB  39,(39*G/100)+(39*G MOD 100)/50,(39*F/100)+(39*F MOD 100)/50 ;79
0A36 28 35 3C    396        DB  40,(40*G/100)+(40*G MOD 100)/50,(40*F/100)+(40*F MOD 100)/50 ;80
                 397        ;----------------------------------
                 398        ;GET TINT CONTRAST DATA
                 399        ;IN: (TWIPER) INDEX INTO TABLE, 0 TO "WIPLIM"
                 400        ;         THE DEFAULT HAS WIPER=WIPLIM/2
                 401        ;DESC: CHANGE COLOR USING COLOR ADJUST TABLE "COLTAB".
                 402        ;
=0A39            403   TWIPD    EQU     $
0A39 C0 01       404        PUSH    REG1
0A3B 90 0A61     405        MOV     DPTR,#COLTAB    ;START OF COLOR ADJUST TABLE
0A3E E5 47       406        MOV     A,TWIPER        ;NEW SOFTWARE TINT WIPER POSITION
0A40 C2 D7       407        CLR     CY
0A42 33          408        RLC     A               ;2 BYTES (RED&GREEN) PER ENTRY
0A43 F9          409        MOV     R1,A            ;SAVE PTR TO ENTRY
0A44 93          410        MOVC    A,@A+DPTR       ;SIGNED RED ADDITIONAL CHANGE
0A45 F5 2F       411        MOV     CRED+4,A        ;RED
0A47 75 30 00    412        MOV     CRED+5,#0       ;ASSUME POSITIVE
0A4A 30 E7 03    413        JNB     ACC.7,TWIP50    ;JMP IF POSITIVE
0A4D 75 30 FF    414        MOV     CRED+5,#0FFH    ;FLAG AS NEGATIVE
=0A50            415   TWIP50   EQU     $
0A50 E9          416        MOV     A,R1            ;PTR INTO TABLE ENTRY
0A51 04          417        INC     A               ;TO GREEN BYTE
0A52 93          418        MOVC    A,@A+DPTR       ;SIGNED GREEN ADDI. CHANGE
0A53 F5 38       419        MOV     CGREEN+4,A      ;GREEN
```

```
0A55 75 39 00        420            MOV     CGREEN+5,#0     ;ASSUME POSITIVE
0A58 30 E7 03        421            JNB     ACC.7,TWIP70    ;JMP IF POSITIVE
0A5B 75 39 FF        422            MOV     CGREEN+5,#0FFH  ;FLAG AS NEGATIVE
=0A5E                423    TWIP70  EQU     $
0A5E D0 01           424            POP     REG1
0A60 22              425            RET
                     426    ;----------------------------------
                     427    ;COLOR ADJUSTMENT TABLE
                     428    ;NOTE: MAX TOTAL + OR - ADJUSTMENT FROM DEFAULT
                     429    ;      MUST BE KEPT BELOW "COLLIM"
                     430    ;"WIPER" IS INDEX INTO TABLE (WIPER=WIPLIM/2 IS DEFAULT)
                     431    ;EACH ENTRY IS THE ADDITIONAL SIGNED CHANGE TO RED & GREEN
                     432    ;
=0A61                433    COLTAB  EQU     $
0A61 E7 21           434            DB  -25,(25*G/100)+(25*G MOD 100)/50  ;WIPER=0, FARTEST RED FOR COL-
                     435                                                  ;           "  GREEN "  "
0A63 E8 20           436            DB  -24,(24*G/100)+(24*G MOD 100)/50  ;WIPER=1
0A65 E9 1E           437            DB  -23,(23*G/100)+(23*G MOD 100)/50  ;2
0A67 EA 1D           438            DB  -22,(22*G/100)+(22*G MOD 100)/50  ;3
0A69 EB 1C           439            DB  -21,(21*G/100)+(21*G MOD 100)/50  ;4
0A6B EC 1A           440            DB  -20,(20*G/100)+(20*G MOD 100)/50  ;5
0A6D ED 19           441            DB  -19,(19*G/100)+(19*G MOD 100)/50  ;6
0A6F EE 18           442            DB  -18,(18*G/100)+(18*G MOD 100)/50  ;7
0A71 EF 16           443            DB  -17,(17*G/100)+(17*G MOD 100)/50  ;8
0A73 F0 15           444            DB  -16,(16*G/100)+(16*G MOD 100)/50  ;9
0A75 F1 14           445            DB  -15,(15*G/100)+(15*G MOD 100)/50  ;10
0A77 F2 12           446            DB  -14,(14*G/100)+(14*G MOD 100)/50  ;11
0A79 F3 11           447            DB  -13,(13*G/100)+(13*G MOD 100)/50  ;12
0A7B F4 10           448            DB  -12,(12*G/100)+(12*G MOD 100)/50  ;13
0A7D F5 0F           449            DB  -11,(11*G/100)+(11*G MOD 100)/50  ;14
0A7F F6 0D           450            DB  -10,(10*G/100)+(10*G MOD 100)/50  ;15
0A81 F7 0C           451            DB   -9,(9*G/100)+(9*G MOD 100)/50    ;16
0A83 F8 0B           452            DB   -8,(8*G/100)+(8*G MOD 100)/50    ;17
0A85 F9 09           453            DB   -7,(7*G/100)+(7*G MOD 100)/50    ;18
0A87 FA 08           454            DB   -6,(6*G/100)+(6*G MOD 100)/50    ;19
0A89 FB 07           455            DB   -5,(5*G/100)+(5*G MOD 100)/50    ;20
0A8B FC 05           456            DB   -4,(4*G/100)+(4*G MOD 100)/50    ;21
0A8D FD 04           457            DB   -3,(3*G/100)+(3*G MOD 100)/50    ;22
0A8F FE 03           458            DB   -2,(2*G/100)+(2*G MOD 100)/50    ;23
0A91 FF 01           459            DB   -1,(1*G/100)+(1*G MOD 100)/50    ;24
0A93 00 00           460            DB   0,0                              ;WIPER=25, MID POINT
0A95 01 FF           461            DB    1,-(1*G/100)-(1*G MOD 100)/50   ;26
0A97 02 FD           462            DB    2,-(2*G/100)-(2*G MOD 100)/50   ;27
0A99 03 FC           463            DB    3,-(3*G/100)-(3*G MOD 100)/50   ;28
0A9B 04 FB           464            DB    4,-(4*G/100)-(4*G MOD 100)/50   ;29
0A9D 05 F9           465            DB    5,-(5*G/100)-(5*G MOD 100)/50   ;30
0A9F 06 F8           466            DB    6,-(6*G/100)-(6*G MOD 100)/50   ;31
0AA1 07 F7           467            DB    7,-(7*G/100)-(7*G MOD 100)/50   ;32
0AA3 08 F5           468            DB    8,-(8*G/100)-(8*G MOD 100)/50   ;33
0AA5 09 F4           469            DB    9,-(9*G/100)-(9*G MOD 100)/50   ;34
0AA7 0A F3           470            DB   10,-(10*G/100)-(10*G MOD 100)/50 ;35
0AA9 0B F1           471            DB   11,-(11*G/100)-(11*G MOD 100)/50 ;36
0AAB 0C F0           472            DB   12,-(12*G/100)-(12*G MOD 100)/50 ;37
0AAD 0D EF           473            DB   13,-(13*G/100)-(13*G MOD 100)/50 ;38
0AAF 0E EE           474            DB   14,-(14*G/100)-(14*G MOD 100)/50 ;39
0AB1 0F EC           475            DB   15,-(15*G/100)-(15*G MOD 100)/50 ;40
0AB3 10 EB           476            DB   16,-(16*G/100)-(16*G MOD 100)/50 ;41
0AB5 11 EA           477            DB   17,-(17*G/100)-(17*G MOD 100)/50 ;42
0AB7 12 E8           478            DB   18,-(18*G/100)-(18*G MOD 100)/50 ;43
0AB9 13 E7           479            DB   19,-(19*G/100)-(19*G MOD 100)/50 ;44
0ABB 14 E6           480            DB   20,-(20*G/100)-(20*G MOD 100)/50 ;45
0ABD 15 E4           481            DB   21,-(21*G/100)-(21*G MOD 100)/50 ;46
0ABF 16 E3           482            DB   22,-(22*G/100)-(22*G MOD 100)/50 ;47
0AC1 17 E2           483            DB   23,-(23*G/100)-(23*G MOD 100)/50 ;48
0AC3 18 E0           484            DB   24,-(24*G/100)-(24*G MOD 100)/50 ;49
0AC5 19 DF           485            DB   25,-(25*G/100)-(25*G MOD 100)/50 ;50
                     486    ;----------------------------------
                     487    ;OUTPUT # OF SHADES TO GAL'S
                     488    ;IN: (SHADES) CODE FOR # OF SHADES IN FORM
                     489    ;           OF AFLAG BFLAG CFLAG
                     490    ;             MSB   ---   LSB
                     491    ;
=0AC7                492    SHA_OUT EQU     $
0AC7 C0 E0           493            PUSH    ACC
0AC9 B4 02 25        494            CJNE    A,#SNOS,SH_040  ;JMP IF SHADING TO BE ACTIVE
                     495    ;8 COLOR ONLY MODE, NO SHADING
0ACC 75 31 FF        496            MOV     CRED+6,#MODE8C  ;REDUCED CONTRAST
0ACF 75 32 FF        497            MOV     CRED+7,#0FFH    ;IT IS NEGATIVE
0AD2 75 3A FF        498            MOV     CGREEN+6,#MODE8C
0AD5 75 3B FF        499            MOV     CGREEN+7,#0FFH
```

```
0AD8 75 43 FF       500              MOV    CBLUE+6,#MODE8C
0ADB 75 44 FF       501              MOV    CBLUE+7,#0FFH
0ADE 11E4           502              CALL   ADJCON          ;ADJUST TO PREVENT UNDER FLOW
0AE0 E5 19          503              MOV    A,H_POS         ;CURRETN HORZ POS
0AE2 C0 E0          504              PUSH   ACC             ;SAVE IT
0AE4 14             505              DEC    A               ;ADJUST FOR GAL DELAY
0AE5 F5 19          506              MOV    H_POS,A
0AE7 12 0220        507              CALL   H_MOVE          ;CHANGE POS
0AEA D0 E0          508              POP    ACC             ;HORZ POS
0AEC F5 19          509              MOV    H_POS,A         ;RESTORE ORIG
0AEE 02 0B08        510              JMP    SH_060
                    511       ;SHADING IS TO BE ACTIVE
=0AF1               512       SH_040  EQU    $
0AF1 75 31 00       513              MOV    CRED+6,#0       ;RETURN TO NORMAL CONTRAST
0AF4 75 32 00       514              MOV    CRED+7,#0
0AF7 75 3A 00       515              MOV    CGREEN+6,#0
0AFA 75 3B 00       516              MOV    CGREEN+7,#0
0AFD 75 43 00       517              MOV    CBLUE+6,#0
0B00 75 44 00       518              MOV    CBLUE+7,#0
0B03 11E4           519              CALL   ADJCON          ;TEST/ADJUST TO PREVENT OVERFLOW
0B05 12 0220        520              CALL   H_MOVE          ;RESTORE HORZ POS
                    521       ;OUTPUT SHADE CODE
=0B08               522       SH_060  EQU    $
0B08 D0 E0          523              POP    ACC             ;SHADE CODE
                    524       ;IF IN CLEAR MODE, DON'T OUTPUT TO GAL'S SINCE IT WILL TAKE THE UNIT
                    525       ;OUT OF CLEAR
0B0A 20 33 00       526              JB     CLEARON,SH_090  ;IF CLEAR, SKIP GAL OUTPUT
0B0D 13             527              RRC    A
0B0E 92 D9          528              MOV    CFLAGR,C        ;RED GAL
0B10 92 D8          529              MOV    CFLAGG,C        ;GREEN GAL
0B12 92 DE          530              MOV    CFLAGB,C        ;BLUE GAL
0B14 13             531              RRC    A
0B15 92 EE          532              MOV    BFLAG,C         ;ALL SHADING GAL'S
0B17 13             533              RRC    A
0B18 92 EC          534              MOV    AFLAG,C         ;ALL SHADING GAL'S
=0B1A               535       SH_090  EQU    $
0B1A 22             536              RET
                    537       ;---- END OF CONTRAST FILE -----------
                    538
                    539       $RESETLN
                    36        $SETLN(ir.asm);%include     "ir.asm"
                    1         ;=============================================
                    2         ;       FILE NAME: IR.ASM
                    3         ;       LAST EDIT: 03-01-90, 05:00 P.M., RNM
                    4         ;=============================================
                    5         ; IR control I N T E R R U P T  Routines
                    6         ;--------------------------------------------
                    7         ; Set up for IR interrupt. Call once, before
                    8         ; receiving first IR pulse.
                    9         init_IR_int
0B1B C2 30          10               clr   in_bits        ; initialize flag
0B1D D2 31          11               setb  repeat_flag    ; for initial pass
0B1F E4             12               clr   A
0B20 F5 09          13               mov   bit_count,A    ; IR bit counter
0B22 F5 08          14               mov   IR_byte,A      ; clear IR byte-all keys up
0B24 75 0C 55       15               mov   lastl,#$55
0B27 75 0D AA       16               mov   lasth,#$AA     ; make sure they don't match
0B2A C2 32          17               clr   sent_serial    ; clear flag
0B2C 22             18               ret
                    19        ;-----------
                    20        IR_interrupt
                    21        ;-----------
                    22        ; A pulse was detected from the IR transmitter.
                    23        ; 1. Check for minimum Tp. If not, reinitialize
                    24        ;    and start over (it's noise). Set bit_count=0.
                    25        ; 2. Check for data '0' or '1'. If so, clock into srl/srh.
                    26        ; 3. Check for end of frame. If so, check # of received
                    27        ;    pulses--if not 17 set up for first bit of new frame
                    28        ;    received and bail out (set bit_count=1).
                    29        ; 4. If 17 pulses, check present frame (srl/srh) with
                    30        ;    last frame (lastl/lasth). The address fields must
                    31        ;    be the same, and all other bits must be complements
                    32        ;    of each other (from the previous frame).
                    33        ;       If correct, copy sr->last, assemble 5-bit data,
                    34        ;       jump to action routine, update IR_byte, set repeat
                    35        ;       flag if appropriate.
                    36        ;       If error, set bit_count=1 and exit.
                    37        ;
                    38        ; The "oneshot" is an interrupt driven counter R7:R6, clocked
                    39        ; every 100 usec. Every time IR_interrupt is entered, reset
```

```
                          40      ; the R7:R6 downcounter. When this counter hits 0, we know that
                          41      ; no IR pulses have ocurred for about 75 msec, indicating that
                          42      ; all keys are up.
                          43      ;
082D C0 D0                44              push    PSW
082F C0 E0                45              push    ACC
0831 EE                   46              mov     A,R6            ; save count (Tp)
0832 7F 03                47              mov     R7,#tc4         ; reset "one-shot" down
0834 7E FF                48              mov     R6,#$FF         ; counter (75 msec timeout)
                          49      ;
0836 30 31 08             50              jnb     repeat_flag,bailout  ; not a repeat key
                          51      ;                               ; for this key down
0839 20 30 0A             52              jb      in_bits,in_progress
                          53      ;
                          54      ; This is the first bit of a 15-bit frame.
                          55      ;
083C D2 30                56              setb    in_bits         ; frame in progress flag
083E 75 09 01             57              mov     bit_count,#1    ; this is the first bit
0841 D0 E0                58      bailout pop     ACC
0843 D0 D0                59              pop     PSW
0845 32                   60              reti
                          61      ;
                          62      in_progress
                          63      ;
                          64      ; We're in the middle of receiving an IR data frame.
                          65      ;
                          66      ; Is Tp greater than tc1?
                          67      ;
0846 F4                   68              cpl     A               ; make positive
0847 B4 05 00             69              cjne    A,#tc1,$+3      ; "CMP A,#tc1"
084A 50 07                70              jnc     OK              ; jmp if Tp>tc1
                          71      ;
                          72      ; Tp<tc1: it must be a noise pulse.
                          73      ;
084C C2 30                74      noise   clr     in_bits         ; reset everything
084E D0 E0                75              pop     ACC
0850 D0 D0                76              pop     PSW
0852 32                   77              reti
                          78      ;
                          79      ; Tp is greater than tc1. Check for
                          80      ; data bit or beginning of next frame.
                          81      ;
0853 05 09                82      OK      inc     bit_count
0855 B4 0F 00             83              cjne    A,#tc2,$+3      ; "CMP A,#tc2"
0858 50 10                84              jnc     not0            ; jmp if A>tc2
                          85      ;
                          86      ; tc1 < Tp < tc2 --> A logic "0".
                          87      ;
085A C3                   88              clr     C               ; clock in a 0
085B E5 0A                89      sreg    mov     A,srl
085D 33                   90              rlc     A
085E F5 0A                91              mov     srl,A
0860 E5 0B                92              mov     A,srh
0862 33                   93              rlc     A
0863 F5 0B                94              mov     srh,A
                          95      ;
0865 D0 E0                96              pop     ACC
0867 D0 D0                97              pop     PSW
0869 32                   98              reti
                          99      ;
                         100      ;
086A B4 19 00            101      not0    cjne    A,#tc3,$+3      ; check for logic
086D 40 EC               102              jc      sreg            ; CY set because A < tc3
                         103      ;
                         104      ; Tp > tc3 --> it's the end of a frame.
                         105      ; Check bit_count for exactly 17 pulses.
                         106      ; (NOTE: the last pulse is the first pulse of a
                         107      ; new frame).
                         108      ;
086F E5 09               109      not1    mov     A,bit_count
0871 B4 11 67            110              cjne    A,#17,b1exit    ; not exactly 17 pulses!
                         111      ;                                 this is bit 1 of new frame
                         112      ;
                         113      ; Frame is valid.
                         114      ;
                         115      ;       +++++++++++++++++++++++++++++
                         116      ; srh/lasth: + x  a0 a1 a2 a3 a4 d0 d1 +
                         117      ; srl/lastl: + d2 d3 d4 d5 e1 e2 M  K  +
                         118      ;       +++++++++++++++++++++++++++++
                         119      ; NOTE: a0-a4, e1 and e2 set by IC pins.
                         120      ;
```

```
                        121     valid_frame
0B74 C0 04              122         push reg4       ; save these
0B76 C0 05              123         push reg5
                        124     ;
0B78 E5 00              125         mov  A,lasth
0B7A 54 7C              126         anl  A,#01111100b   ; isolate address
0B7C FD                 127         mov  R5,A           ; save last
0B7D E5 0B              128         mov  A,srh          ; get latest
0B7F 54 7C              129         anl  A,#01111100b
0B81 B5 05 4D           130         cjne A,reg5,update_last ; addr's don't match
                        131     ;
                        132     ; Addresses match. Check data against
                        133     ; complemented version from last frame.
                        134     ;
0B84 E5 0C              135         mov  A,lastl
                        136     ;   anl  A,#11110000b   ; (use the whole byte)
0B86 FD                 137         mov  R5,A           ; save first half
0B87 E5 0A              138         mov  A,srl
0B89 F4                 139         cpl  A              ; complement it
                        140     ;   anl  A,#11110000b
0B8A B5 05 44           141         cjne A,reg5,update_last ; bad data compare
                        142     ;
0B8D E5 00              143         mov  A,lasth
0B8F 54 03              144         anl  A,#00000011b
0B91 FD                 145         mov  R5,a
0B92 E5 0B              146         mov  A,srh
0B94 F4                 147         cpl  A
0B95 54 03              148         anl  A,#00000011b
0B97 B5 05 37           149         cjne A,reg5,update_last
                        150     ;
                        151     ; A valid data frame. Turn on light
                        152     ;
                        153     ;   clr  p2.0           ; light ON
                        154     ;
                        155     ; Construct IR_Byte
                        156     ; Bit order is 0  0  d0 d1 d2 d3 d4 d5
                        157     ;
0B9A AC 0B               158         mov  r4,srh
0B9C AD 0A               159         mov  r5,srl
                        160     ;
0B9E EC                 161         mov  a,r4           ; rotate d1 into srl
0B9F 13                 162         rrc  a
0BA0 FC                 163         mov  r4,a
0BA1 ED                 164         mov  a,r5
0BA2 13                 165         rrc  a
0BA3 FD                 166         mov  r5,a
                        167     ;
0BA4 EC                 168         mov  a,r4           ; rotate d0 into srl
0BA5 13                 169         rrc  a
0BA6 ED                 170         mov  a,r5
0BA7 13                 171         rrc  a
0BA8 03                 172         rr   a              ; right justify
0BA9 03                 173         rr   a
0BAA 03                 174         rr   a              ; only 5 bits (max 32 keys)
0BAB FD                 175         mov  r5,a           ; temp storage
0BAC E5 0A              176         mov  A,srl
0BAE 13                 177         rrc  a              ; K bit --> CY
0BAF ED                 178         mov  a,R5           ; get data
0BB0 50 01              179         jnc  true_data
0BB2 F4                 180         cpl  A              ; K=1: complement data
                        181     ;
                        182     true_data
0BB3 54 1F              183         anl  A,#00011111b   ; masked for 32 possible
0BB5 C0 82              184         PUSH DPL
0BB7 C0 83              185         PUSH DPH
0BB9 C0 E0              186         push ACC            ; save raw IR_Byte
0BBB C3                 187         clr  c
0BBC 33                 188         rlc  A
0BBD C3                 189         clr  c
0BBE 33                 190         rlc  a              ; times 4
0BBF 90 0C80            191         mov  DPTR,#IR_action_table
0BC2 73                 192     act jmp  @A+DPTR        ; take the action
                        193     ;
                        194     ; Valid data exit
                        195     ; (jmp instr. above returns here)
                        196     ;
0BC3 D0 E0              197     bingo pop ACC
0BC5 D0 83              198         POP  DPH
0BC7 D0 82              199         POP  DPL
0BC9 F5 08              200         mov  IR_byte,A      ; update IR Byte
```

```
0BCB 75 0C 55      201             mov    lastl,#$55        ; force no match
0BCE 75 00 AA      202             mov    lasth,#$aa        ; (overkill)
                   203     update_last
0BD1 85 0A 0C      204             mov    lastl,srl         ; update last frame value
0BD4 85 0B 00      205             mov    lasth,srh
0BD7 D0 05         206         pop    reg5
0BD9 D0 04         207         pop    reg4
                   208     ;
0BDB D0 E0         209     b1exit  pop    ACC
0BDD D0 D0         210             pop    PSW
0BDF 75 09 01      211             mov    bit_count,#1      ; received the first bit
0BE2 32            212             reti
                   213     ;----------------------------
                   214     ;TIMER 0, UPPER, INTERRUPT
                   215     ;OCCURS EVERY 100 usec
                   216     ;LAST REVISION: 02-15-90, (RNM)
=0BE3              217     IR_counter_int EQU      $
0BE3 C0 E0         218             PUSH   ACC               ;(2)
0BE5 C0 D0         219             PUSH   PSW               ;(2)
0BE7 75 8C AA      220             MOV    TH0,#TICK_TC      ;(2) REINIT. 100usec
0BEA 15 2A         221             DEC    VSCNT             ;(1) VERTICAL SYNC POLARITY COUNTER
0BEC E5 2A         222             MOV    A,VSCNT           ;(1) CHECK POLARITY?
0BEE 70 60         223             JNZ    IRC_180           ;(2) NO
                   224     ;ALSO BUMP SYSTEM HEARTBEAT WHEN ITS TIME TO CHECK VERTICAL POLARITY
0BF0 05 28         225             INC    HBEAT             ;(1) SYSTEM'S HEART
0BF2 75 2A 09      226             MOV    VSCNT,#HBPRE      ;(2) RELOAD HEARTBEAT/VSYNC COUNTER
0BF5 20 3A 65      227             JB     CVIDM,IRC_180     ;(2) JMP IF VIDEO RAM CLR ACTIVE
                   228                                      ;    (NO VSYNC PRESENT)
0BF8 E4            229             CLR    A                 ;(1) ASSUME VERT SYNC IS ACTIVE HIGH
0BF9 20 B2 0A      230             JB     VSIN,IRC_120      ;(2) JMP IF VERT SYNC IS HIGH
                   231     ;VERTICAL SYNC IS CURRENTLY LOW
0BFC 30 3B 10      232             JNB    LVSY,IRC_145      ;(2) JMP IF LAST=CURRENT=LOW
                   233     ;FALLING EDGE OF VSYNC
0BFF C2 3B         234             CLR    LVSY              ;(2) LAST=CURRNET
0C01 20 23 0E      235             JB     VT220,IRC_150     ;(2) JMP IF DEC VT220
                   236                                      ;    (ONLY TEST HSYNC AFTER
                   237                                      ;     FALLING EDGE OF VSYNC)
0C04 80 57         238             SJMP   IRC_180           ;(2) JMP FOR LAST=HIGH, CURRENT=LOW
                   239     ;VERTICAL SYNC IS CURRENTLY HIGH
=0C06              240     IRC_120 EQU     $
0C06 20 3B 04      241             JB     LVSY,IRC_140      ;(2) JMP IF LAST=CURRENT=HIGH
                   242     ;RISING EDGE OF VSYNC
0C09 D2 3B         243             SETB   LVSY              ;(1) FLAG LAST AS NOW HIGH
0C0B 80 50         244             SJMP   IRC_180           ;(2)
                   245     ;VSYNC IS ACTIVE LOW (HIGH TWO READINGS IN A ROW)
=0C0D              246     IRC_140 EQU     $
0C0D D2 E0         247             SETB   ACC.0             ;(1)
                   248     ;IF MAC II, CANNOT TIE UP CPU TO DETERMINE HSYNC
=0C0F              249     IRC_145 EQU     $
0C0F 20 23 4B      250             JB     VT220,IRC_180     ;(2) JMP IF DEC VT220
=0C12              251     IRC_150 EQU     $
0C12 30 1F 05      252             JNB    MAC_II,IRC_155    ;(2) JMP IF NOT MAC II
0C15 75 1E 03      253             MOV    NSYNCS,#3         ;(1) FORCE POLARITIES FOR MAC II
0C18 80 43         254             SJMP   IRC_180           ;(2)
=0C1A              255     IRC_155 EQU     $
0C1A C0 00         256             PUSH   REG0              ;(2)
0C1C C0 03         257             PUSH   REG3              ;(2)
                   258     ;DETERMINE HSYNC POLARITY
0C1E 7B 10         259             MOV    R3,#16            ;(1) SAMPLE COUNTER
0C20 78 F8         260             MOV    R0,#0F8H          ;(1) POLARITY COUNTER
=0C22              261     IRC_160 EQU     $
0C22 20 B4 01      262             JB     HSIN,IRC_165      ;(2) JMP IF HORZ SYNC=1
0C25 08            263             INC    R0                ;(1) HORZ SYNC LOW AGAIN
=0C26              264     IRC_165 EQU     $
0C26 DB FA         265             DJNZ   R3,IRC_160        ;(2) REPEAT FOR ALL SAMPLES
0C28 88 03         266             MOV    REG3,R0           ;(2) SAVE HSYNC SAMPLER
0C2A 53 00 80      267             ANL    REG0,#080H        ;(2) MASK TO DETERMINE POLARITY >8
0C2D 48            268             ORL    A,R0              ;(1) COMBINE HORZ & VERT POLARITIES
0C2E 23            269             RL     A                 ;(1) B1=VERT, B0=HORZ
0C2F F5 1E         270             MOV    NSYNCS,A          ;(1) SAVE NEW POLARITIES
0C31 EB            271             MOV    A,R3              ;(1) HSYNC SAMPLER VALUE
0C32 D0 03         272             POP    REG3              ;(2)
0C34 D0 00         273             POP    REG0              ;(2)
                   274     ;CHECK IF HSYNC IS ACTIVE
=0C36              275     IRC_170 EQU     $
0C36 24 08         276             ADD    A,#8              ;(1) MAKE HSYNC SAMPLER 0 RELATIVE
0C38 60 03         277             JZ     IRC_173           ;(2) JMP IF ALWAYS HIGH THEN INACTIVE
0C3A B4 10 0B      278             CJNE   A,#16,IRC_175     ;(2) JMP IF NOT ALWAYS LOW
=0C3D              279     IRC_173 EQU     $
0C3D 15 4A         280             DEC    BEGDEL            ;(1) DELAY TO RESTART
```

```
OC3F E5 4A       281            MOV     A,BEGDEL      ;(1) TIME FOR RESTART?
OC41 70 08       282            JNZ     IRC_177       ;(2) NO
OC43 75 1E 04    283            MOV     NSYNCS,#004H  ;(2) YES, PFORCE RESTART
OC46 80 15       284            SJMP    IRC_180       ;(2)
=OC48            285    IRC_175 EQU     $
OC48 75 4A OC    286            MOV     BEGDEL,#BEGTIM ;(2) RELOAD DELAY TO RESTART
=OC4B            287    IRC_177 EQU     $
OC4B C2 8E       288            CLR     TR1           ;(1) STOP TIMER
OC4D C2 8F       289            CLR     TF1           ;(1) CLEAR ANY PENDING INTERRUPTS
OC4F E5 8C       290            MOV     A,THO         ;(1) CURRENT TIMER CONTENTS
OC51 24 AA       291            ADD     A,#TICK_TC    ;(1) NORMAL 100usec PRESET
OC53 F5 8C       292            MOV     THO,A         ;(1) RELOAD TIMER
OC55 D2 8E       293            SETB    TR1           ;(1) RESTART TIMER
OC57 DE 04       294            DJNZ    R6,IRC_180    ;(2) ADJUST FOR EXTRA PROCESSING TIME
OC59 DF 02       295            DJNZ    R7,IRC_180    ;(2)
OC5B 80 04       296            SJMP    IRC_185       ;(2)
                 297    ;NOW HANDLE REMOTE CONTROL ITEMS
                 298    ; Reset the time constant and check
                 299    ; counter for 0000. If 0000, there has not
                 300    ; been an IR interrupt for 75 msec,
                 301    ; indicating that all keys on the remote
                 302    ; control are up. If so, zero the IR_Byte,
                 303    ; clear in_bits flag, zero bit_count.
                 304    ;
                 305    ; If the sent_serial flag is 1, the pressed
                 306    ; key caused a byte to be sent to the serial
                 307    ; port--send a 00 byte to the serial port.
=OC5D            308    IRC_180 EQU     $
OC5D DE 19       309            djnz R6,exit         ; ct-L
OC5F DF 17       310            djnz R7,exit         ; ct-H
                 311    ; We've timed out.
                 312    ; If a serial byte has just been sent,
                 313    ; send the "-" break code.
=OC61            314    IRC_185 EQU     $
OC61 30 32 07    315            jnb sent_serial,fin
OC64 74 2D       316            mov a,#"-"
OC66 12 001B     317            call serial_out
OC69 C2 32       318            clr sent_serial     ; clear flag
                 319    ;
OC6B 75 08 00    320    fin     mov IR_byte,#0      ; clear IR_Byte
OC6E 7F 03       321            mov R7,#tc4         ; reset cth:ctl
OC70 1E          322            dec R6              ; to tc4:FF
OC71 75 09 00    323            mov bit_count,#0
OC74 C2 30       324            clr in_bits         ; not in a frame
                 325                                ; next IR interrupt
OC76 D2 31       326            setb repeat_flag    ; for next key down
=OC78            327    EXIT    EQU     $
OC78 D0 D0       328            POP     PSW
OC7A D0 E0       329            POP     ACC
OC7C 32          330            RETI
                 331    ;--------------------------
                 332    ; IR keyboard action routines.
                 333    ;--------------------------
                 334    ; These are JMP'ed to, and all
                 335    ; return to label 'bingo'.
                 336    ;
                 337    ; Three kinds of actions:
                 338    ; 1. Illegal key, just returns.
                 339    ; 2. A480 control, sets flag bits and returns.
                 340    ; 3. Computer control, sends single serial char.
                 341    ;    NOTE: the IR_counter_int routine which monitors
                 342    ;          the key-up condition sends the 00 break
                 343    ;          code to the serial port.
                 344    ;
                 345    ; Each entry of this table uses exactly 4 bytes
                 346    ; so the computed 'goto' can be done quickly.
                 347    ;
                 348    no_repeat2
OC7D 02 0017     349            jmp no_repeat
                 350    ;
                 351    IR_action_table
                 352    ;
OC80 02 0017     353            ljmp illeg    ; 00
OC83 00          354            nop           ; use 4 bytes
                 355    ;
OC84 D2 01       356            setb kclear   ; 01-CLEAR
OC86 80 F5       357            sjmp no_repeat2
                 358    ;
OC88 02 0017     359            ljmp illeg    ; 02
OC8B 00          360            nop
```

```
OC8C D2 00      361  ;
                362          SETB    K8COL           ;FLAG SHADING/NO SHADING KEY
OC8E 80 ED      363          SJMP    NO_REPEAT2
                364          ;-mov   A,#'L'
                365          ;-sjmp  send_serial  ; 03-exit key (Compr)
                366  ;
OC90 02 0017    367          ljmp illeg    ; 04
OC93 00         368          nop
                369  ;
OC94 D2 09      370          setb krvideo ; 05 REVERSE VIDEO
OC96 80 E5      371          sjmp no_repeat2
                372  ;
OC98 02 0017    373          ljmp illeg    ; 06
OC9B 00         374          nop
                375  ;
OC9C 02 0017    376          ljmp illeg    ; 07
OC9F 00         377          nop
                378  ;
OCA0 D2 06      379          setb kvplus ; 08 VERT POS+
                380  ;
OCA2 80 65      381            sjmp repeat
                382  ;
OCA4 D2 0B      383          setb KCONMIN ; 09 CONTRAST -
OCA6 80 61      384          sjmp repeat
                385  ;
OCA8 D2 0E      386          setb kvminus ; 0A VERT POS-
                387  ;
OCAA 80 5D      388            sjmp repeat
                389  ;
OCAC 80 69      390          sjmp illeg   ; 0B
OCAE 00         391          nop
OCAF 00         392          nop
                393  ;
OCB0 80 65      394          sjmp illeg   ; 0C
OCB2 00         395          nop
OCB3 00         396          nop
                397  ;
OCB4 74 4A      398          mov a,#"J"  ; 0D-REV key (Compr)
OCB6 80 48      399          sjmp send_serial
                400  ;
OCB8 D2 03      401          setb KCOLMIN ; 0E COLOR -
OCBA 80 4D      402          sjmp repeat
                403  ;
OCBC 80 59      404          sjmp illeg   ; 0F
OCBE 00         405          nop
OCBF 00         406          nop
                407  ;
OCC0 80 55      408          sjmp illeg   ; 10
OCC2 00         409          nop
OCC3 00         410          nop
                411  ;
OCC4 D2 0C      412          setb KCONPLUS ; 11 CONTRAST +
OCC6 80 41      413          sjmp repeat
                414  ;
OCC8 80 4D      415          sjmp illeg   ; 12
OCCA 00         416          nop
OCCB 00         417          nop
                418  ;
OCCC 80 49      419          sjmp illeg   ; 13
OCCE 00         420          nop
OCCF 00         421          nop
                422  ;
OCD0 D2 0F      423          setb khplus ; 14 HORIZ+
                424  ;
OCD2 80 35      425            sjmp repeat
                426  ;
OCD4 74 49      427          mov a,#"I"  ; 15-FWD key (Compr)
OCD6 80 28      428          sjmp send_serial
                429  ;
OCD8 D2 04      430          setb KCOLPLUS ; 16 COLOR +
OCDA 80 2D      431          sjmp repeat
                432  ;
OCDC 80 39      433          sjmp illeg   ; 17
OCDE 00         434          nop
OCDF 00         435          nop
                436  ;
OCE0 80 35      437          sjmp illeg   ; 18
OCE2 00         438          nop
OCE3 00         439          nop
                440  ;
```

```
OCE4 D2 0A      441             setb KSYNC      ; 19 SYNC KEY
OCE6 80 2F      442             sjmp no_repeat
                443     ;
OCE8 80 2D      444             sjmp illeg      ; 1A
OCEA 00         445             nop
OCEB 00         446             nop
                447     ;
OCEC 80 29      448             sjmp illeg      ; 1B
OCEE 00         449             nop
OCEF 00         450             nop
                451     ;
OCF0 D2 05      452             setb khminus    ; 1C-HORIZ-
OCF2 80 15      453             sjmp repeat
                454     ;
OCF4 74 4B      455             mov A,#"K"      ; 1D-Pause (Compr)
OCF6 80 08      456             sjmp send_serial
                457     ;
OCF8 D2 02      458             setb ktext      ; 1E-TEXT
OCFA 80 1B      459             sjmp no_repeat
                460     ;
OCFC 80 19      461             sjmp illeg      ; 1F
OCFE 00         462             nop
OCFF 00         463             nop
                464     ;
                465     send_serial
0D00 12 001B    466             call serial_out
0D03 D2 32      467             setb sent_serial
0D05 C2 31      468             clr  repeat_flag
0D07 61C3       469             jmp  bingo              ; return
                470     ;
0D09 D2 31      471     repeat  setb repeat_flag
0D0B 20 32 07   472     beepck  jb   sent_serial,nosend
0D0E 74 53      473             mov  a,#'S'
0D10 12 001B    474             call serial_out
0D13 D2 32      475             setb sent_serial
0D15 61C3       476     nosend  jmp  bingo
                477     ;
                478     illeg
                479     no_repeat
0D17 C2 31      480             clr  repeat_flag
0D19 80 F0      481             sjmp beepck
                482     ;
                483     ;=====================
                484     ; S U B R O U T I N E S
                485     ;=====================
                486     ;
                487     ; Send char in A to the UART
                488     ;
                489     serial_out
0D1B F5 58      490             MOV     KEYOUT,A        ;IR CHAR TO XMIT OUT
                491                                     ;SERAIL CHANNEL
0D1D 22         492             ret
                493
                494
                495     $RESETLN
                37      $SETLN(TITLE.ASM);%include    "TITLE.ASM"
                1       ;========================================
                2       ;       File Name: TITLE.ASM
                3       ;       Last Edit: 04-04-90, 03:30 P.M., RNM
                4       ;========================================
                5       ;FOR "PROXIMA":
                6       ;       EACH MACHINE CYCLE (tcyc) = 1.0851 usec = 10 dots
                7       ;               FOR A DOT CLOCK OF 1/.10851 usec = 9.2157 Mhz
                8       ;               [FOR CGA THE ALLOWABLE DOT CLOCK IS
                9       ;                9.21 Mhz <= dot clk <= 18.9 Mhz]
                10      ;       EACH LINE HAS 76 tcyc = 82.4676 usec = 640 + 120 = 760 dots
                11      ;                                       (640 are visible)
                12      ;               THIS IS A HORZ FREQ OF 1/82.4676 = 12,126 hz
                13      ;
                14      ;       EACH FRAME HAS 200 + 3 lines FOR A FRAME RATE OF
                15      ;               1/(82.4676 usec * 203 lines) = 59.73 hz
                16      ;       THE SIMULATED PIXELS = 2 tcyc OR 20 ACTUAL PIXELS
                17      ;               THERE ARE 32 VISIBLE SIMULATED PIXELS PER LINE
                18      ;
                19      ;       PLL DIVIDER IS 760-514=246=0F6H
                20      ;               PLL_LOW = 0F6H
                21      ;               PLL_HIGH IS THE MS BIT OF VERT POS =0
                22      ;               SEL0=0
                23      ;
                24      ;FOR NARROW BOXES:
```

```
                25  ;       EACH MACHINE CYCLE (tcyc) = 1.0851 usec = 10 dots
                26  ;              FOR A DOT CLOCK OF 1/.10851 usec = 9.2157 Mhz
                27  ;       EACH LINE HAS 75 tcyc = 81.3825 usec = 640 + 110 = 750 dots
                28  ;                                            (640 are visible)
                29  ;              THIS IS A HORZ FREQ OF 1/81.3825 = 12,288 hz
                30  ;
                31  ;       EACH FRAME HAS 200 + 3 lines FOR A FRAME RATE OF
                32  ;              1/(81.3825 usec * 203 lines) = 60.53 hz
                33  ;       THE SIMULATED PIXELS = 2 tcyc OR 20 ACTUAL PIXELS
                34  ;              THERE ARE 32 VISIBLE SIMULATED PIXELS PER LINE
                35  ;
                36  ;       PLL DIVIDER IS 750-514=236=0ECH
                37  ;              PLL_LOW = 0ECH
                38  ;              PLL_HIGH IS THE MS BIT OF VERT POS =0
                39  ;              SEL0=0
                40  ;
                41  ;FOR WIDE BOXES:
                42  ;       EACH MACHINE CYCLE (tcyc) = 1.0851 usec = 16 dots
                43  ;              FOR A DOT CLOCK OF 16/1.0851 usec = 14.75 Mhz
                44  ;       EACH LINE HAS 53 tcyc = 57.5103 usec = 640 + 208 = 848 dots
                45  ;                                            (640 are visible)
                46  ;              THIS IS A HORZ FREQ OF 1/57.5103 = 17,388 hz
                47  ;
                48  ;       EACH FRAME HAS 200 + 24 lines FOR A FRAME RATE OF
                49  ;              1/(57.5103 usec * 224 lines) = 77.63 hz
                50  ;
                51  ;       PLL DIVIDER IS 760-514=334=256+78=100H + 0F6H
                52  ;              PLL_LOW = 0F6H
                53  ;              PLL_HIGH IS THE MS BIT OF VERT POS =0
                54  ;              SEL0=1
                55  ;-----------------------------------------------
=0003           56  PHIGH   EQU     3               ;3 LINES OF DOUBLE SCANNED
                57                                  ;IS HEIGHT OF PIXEL
=0080           58  VSON    EQU     080H            ;VERT SYNC ONLY ACTIVE
=0000           59  VSOFF   EQU     000H            ;VERT & HSYNC INACTIVE, DATA=BLK
=0040           60  HSON    EQU     040H            ;HSYNC ONLY ACTIVE
=001E           61  TUPDAT  EQU     30              ;# OF VSYNC's TO A SCREEN CHANGE
                62  ;---
                63  ;       %IF PROXIMA EQ 1
                64  ;MINTIT EQU     8               ;# OF SCREEN CHANGS FOR MINIMUM
                65  ;                               ;TITLE DISPLAY TIME
                66  ;       %ENDIF
                67  ;
                68  ;       %IF PROXIMA EQ 0
=0078           69  MINTIT  EQU     120             ;# OF VSYNC'S FOR MINIMUM BAR DISPLAY
                70  ;       %ENDIF
                71  ;---
                72  ;COLOR CONSTANTS
=0000           73  BLACK   EQU     000H            ;BLACK
=0000           74  BLAC    EQU     BLACK
=003F           75  WHITE   EQU     03FH            ;BRIGHT WHITE
=003F           76  WHIT    EQU     WHITE
=0030           77  REDB    EQU     030H            ;BRIGHT RED
=0020           78  REDL    EQU     020H            ;LIGHT RED
=000C           79  GREENB  EQU     00CH            ;BRIGHT GREEN
=0008           80  GREENL  EQU     008H            ;LIGHT GREEN
=0003           81  BLUEB   EQU     003H            ;BRIGHT BLUE
=0002           82  BLUEL   EQU     002H            ;LIGHT BLUE
                83  ;-----------------------------------------------
                84  ;THE TITLE SCREEN DISPLAYS "PROXIMA" ON A DIAGONAL
                85  ;FROM TOP LEFT LEFT TO BOTTOM RIGHT OR
                86  ;16 ROWS OF NARROW BOXES OR 16 ROWS OF WIDE BOXES
                87  ;-----------------------------------------------
                88  ;FIRST SETUP CONTROLLER TO DISPLAY TITLE SCREEN
                89  ;AND LETTER's AND BACKGROUND COLOR AREA IN RAM
=001E           90  TITSCR  EQU     $
001E C2 DF      91          CLR     U1NOT           ;MAKE SURE U1 IS RESET
0020 D2 B5      92          SETB    DEMO            ;FORCE INPUT SIGNALS TO
                93                                  ;INACTIVE TO ALLOW MICRO
                94                                  ;TO TAKE CONTROL OF VIDEO
0022 12 07B5    95          CALL    DEFCON          ;INITIALIZE CONTRAST AREA
                96  ;
                97  ;---
                98  ;       %IF PROXIMA EQ 1
                99  ;;FILL COLOR RAM WITH BACKGROUND OF WHITE
                100 ;       MOV     A,#WHITE
                101 ;       MOV     R0,#PCOLOR      ;START OF COLOR AREA IN RAM
                102 ;       MOV     R2,#8           ;7 LETTERS + BACKGROUND
                103 ;TITS20 EQU     $
                104 ;       MOV     @R0,A
```

```
                         105    ;         INC     R0
                         106    ;         DJNZ    R2,TITS20
                         107    ;         %ENDIF
                         108    ;---
                         109    ;
0025 75 4B 78            110              MOV     INDEX,#120      ;TABLE INDEX FOR POWER UP SCREEN
0028 D2 DF               111              SETB    U1NOT           ;REMOVE U1 RESET
002A D2 A3               112              SETB    NORVID          ;FORCE NORMAL VIDEO
002C 12 05FD             113              CALL    INITMODE        ;GO SETUP MODE
002F 1145                114              CALL    LDFCN           ;LOAD DEFAULT CONTRAST AREA
0031 12 07B5             115              CALL    DEFCON          ;CLEAR ALL BUT DEFAULT CONTRASTS
0034 A2 B4               116              MOV     C,HSIN          ;CURRENT STATE OF TRUE HSYNC
0036 92 10               117              MOV     HSYNC,C         ;SAVE  "   "    "    "    "
0038 7E 78               118              MOV     R6,#MINTIT      ;MINIMUM TIME TO DISPLAY TITLE
003A 90 00EA             119              MOV     DPTR,#TTBSTA    ;START OF VIDEO DATA TABLE
                         120    ;
                         121    ;---
                         122    ;         %IF PROXIMA EQ 1
                         123    ;         MOV     R4,#0           ;INITIAL PTR INTO ROM TABLE OF COLORS
                         124    ;         MOV     R5,#2           ;DELAY TO 1ST "P"
                         125    ;         %ENDIF
                         126    ;---
                         127    ;
                         128    ;VERTICAL SYNC HANDLING
=003D                    129    VERTSY   EQU     $                ;(2) JMP TO HERE
003D 75 C8 80            130              MOV     P5,#VSON        ;(2) VSYNC ACTIVE
0040 B2 B7               131              CPL     NDEC            ;(1) MAKE SURE CPU SEES HSYNC
0042 75 C8 C0            132              MOV     P5,#VSON+HSON   ;(2) BOTH VSYNC & HSYNC ACTIVE
0045 C2 CE               133              CLR     CPUHS           ;(1) HSYNC BACK INACTIVE
                         134    ;
                         135    ;---
                         136    ;         %IF PROXIMA EQ 0
0047 78 00               137              MOV     R0,#0           ;(1) REL PTR TO VIDEO DATA TABLE
0049 7C 10               138              MOV     R4,#16          ;(1) # OF ROWS OF BOXES WITH BLACK
004B EE                  139              MOV     A,R6            ;(1) MIN DISPLAY TIME DONE?
004C 60 06               140              JZ      VS100           ;(2) YES
004E 1E                  141              DEC     R6              ;(1) MIN DISPLAY TIME
004F 75 02 14            142              MOV     REG2,#20        ;(2) DELAY TO NEXT HSYNC
0052 80 18               143              SJMP    VS200           ;(2) GO DELAY
=0054                    144    VS100    EQU     $
0054 75 03 05            145              MOV     REG3,#5         ;(2) # OF CHECKS OF REAL HSYNC
0057 7A 01               146              MOV     R2,#1           ;(1) DELAY TO NEXT HSYNC THIS PATH
=0059                    147    VS110    EQU     $
0059 A2 B4               148              MOV     C,HSIN          ;(1) NEW TRUE HSYNC STATE
005B 40 06               149              JC      VS120           ;(2) JMP IF HSYNC IS NOW HIGH
                         150    ;HSYNC IS NOW LOW, SEE IF IT WAS HIGH AND IF SO IT IS NOW ACTIVE
005D A2 10               151              MOV     C,HSYNC         ;(1) HAS HSYNC CHANGED STATE?
005F 50 09               152              JNC     VS150           ;(2) NO
0061 80 04               153              SJMP    VS140           ;(2) YES, PREPARE EXIT TO NORMAL
                         154    ;HSYNC IS NOW HIGH, SEE IF IT WAS LOW AND IF SO IT IS NOW ACTIVE
=0063                    155    VS120    EQU     $
0063 A2 10               156              MOV     C,HSYNC         ;(1) HAS HSYNC CHANGED STATE?
0065 40 03               157              JC      VS150           ;(2) NO
                         158    ;TRUE HSYNC IS ACTIVE, FILL FRAME BUFFER WITH WHITE
=0067                    159    VS140    EQU     $
0067 02 00D3             160              JMP     EX100           ;(2) PREPARE EXIT FROM TITLE SCREEN
                         161    ;TRUE HSYNC IS INACTIVE
=006A                    162    VS150    EQU     $
006A DB ED               163              DJNZ    R3,VS110        ;(2) KEEP CHECKING REAL HSYNC
                         164    ;FINISH DELAY TO NEXT HSYNC
=006C                    165    VS200    EQU     $
006C DA FE               166              DJNZ    R2,VS200        ;(2)
006E 75 C8 C0            167              MOV     P5,#VSON+HSON   ;(2) BOTH ACTIVE
0071 C2 CE               168              CLR     CPUHS           ;(1) HSYNC INACTIVE
0073 75 02 18            169              MOV     REG2,#24        ;(2)
=0076                    170    VS210    EQU     $
0076 DA FE               171              DJNZ    R2,VS210        ;(2)
0078 75 C8 C0            172              MOV     P5,#VSON+HSON   ;(2) BOTH ACTIVE
007B C2 CE               173              CLR     CPUHS           ;(1) HSYNC INACTIVE
007D 75 C8 00            174              MOV     P5,#VSOFF       ;(2) VSYNC ALSO INACTIVE
                         175    ;TOP MARGIN HANDLING
0080 7B 05               176              MOV     R3,#5           ;(1) TOP MARGIN + 1 LINE
0082 7A 14               177              MOV     R2,#20          ;(1)
=0084                    178    VS220    EQU     $
0084 DA FE               179              DJNZ    R2,VS220        ;(2)
=0086                    180    TM40     EQU     $
0086 93                  181              MOVC    A,@A+DPTR       ;(2) DELAY
0087 93                  182              MOVC    A,@A+DPTR       ;(2) DELAY
0088 93                  183              MOVC    A,@A+DPTR       ;(2) DELAY
0089 75 C8 40            184              MOV     P5,#HSON        ;(2) HSYNC ACTIVE
```

```
008C C2 CE        185            CLR    CPUHS            ;(1) HSYNC INACTIVE
008E 75 02 14     186            MOV    REG2,#20         ;(2)
=0091             187    TM60    EQU    $
0091 DA FE        188            DJNZ   R2,TM60          ;(2)
0093 DB F1        189            DJNZ   R3,TM40          ;(2)
                  190    ;TOP OF BOXES LOOP
=0095             191    BOXT    EQU    $
0095 A9 00        192            MOV    R1,REG0          ;(2) PTR TO VIDEO DATA FOR THIS
                  193                                    ;    ROW OF BOXES
0097 7B 0B        194            MOV    R3,#11           ;(1) BOX HEIGHT IN LINES
0099 80 04        195            SJMP   BOX20            ;(2)
=009B             196    BOX10   EQU    $
009B 93           197            MOVC   A,@A+DPTR        ;(2) DELAY
009C 00           198            NOP                     ;(1) DELAY
009D A8 01        199            MOV    R0,REG1          ;(2) PTR TO START OF BOX
                  200                                    ;    DATA FOR THIS LINE
=009F             201    BOX20   EQU    $
009F 7A 06        202            MOV    R2,#6            ;(1) # OF BOXES ON THIS LINE
00A1 75 C8 40     203            MOV    P5,#HSON         ;(2) HSYNC ACTIVE
00A4 C2 CE        204            CLR    CPUHS            ;(1) HSYNC INACTIVE
=00A6             205    BOX40   EQU    $
00A6 E8           206            MOV    A,R0             ;(1) REL PTR TO VIDEO DATA
00A7 93           207            MOVC   A,@A+DPTR        ;(2) VIDOE DATA FROM TABLE
00A8 F5 C8        208            MOV    P5,A             ;(1) OUT TO WORLD
00AA 08           209            INC    R0               ;(1) TO NEXT BOX'S DATA
00AB DA F9        210            DJNZ   R2,BOX40         ;(2) LOOP FOR ALL BOXES ON LINE
00AD DB EC        211            DJNZ   R3,BOX10         ;(2) REPEAT FOR LINES OF BOX
=00AF             212    BOX50   EQU    $
00AF 93           213            MOVC   A,@A+DPTR        ;(2) DELAY
00B0 93           214            MOVC   A,@A+DPTR        ;(2) DELAY
00B1 75 C8 00     215            MOV    P5,#BLACK        ;(2) VIDEO DATA
00B4 75 C8 40     216            MOV    P5,#HSON+BLACK   ;(2) HSYNC ACTIVE WITH BLACK VIDEO
00B7 C2 CE        217            CLR    CPUHS            ;(1) HSYNC INACTIVE STILL BLACK
00B9 75 02 14     218            MOV    REG2,#20         ;(2)
=00BC             219    BOX60   EQU    $
00BC DA FE        220            DJNZ   R2,BOX60         ;(2)
00BE DC D5        221            DJNZ   R4,BOXT          ;(2) REPEAT FOR ROWS
                  222    ;BOTTOM MARGIN
00C0 7B 10        223            MOV    R3,#16           ;(1) # OF LINES
=00C2             224    BOX70   EQU    $
00C2 00           225            NOP                     ;(1) DELAY
00C3 93           226            MOVC   A,@A+DPTR        ;(2) DELAY
00C4 93           227            MOVC   A,@A+DPTR        ;(2) DELAY
00C5 75 C8 40     228            MOV    P5,#HSON+BLACK   ;(2) HSYNC ACTIVE WITH BLACK VIDEO
00C8 C2 CE        229            CLR    CPUHS            ;(1) HSYNC INACTIVE "   "    "
00CA 7A 15        230            MOV    R2,#21           ;(1)
=00CC             231    BOX80   EQU    $
00CC DA FE        232            DJNZ   R2,BOX80         ;(2)
00CE DB F2        233            DJNZ   R3,BOX70         ;(2)
00D0 02 003D      234            LJMP   VERTSY           ;(2) TO NEXT VERT SCAN
                  235    ;PREPARE EXIT FROM TITLE SCREEN
=00D3             236    EX100   EQU    $
00D3 7B DC        237            MOV    R3,#200+20       ;(1) # OF LINES + SAFETY
=00D5             238    EX120   EQU    $
00D5 75 02 18     239            MOV    REG2,#24         ;(2) DELAY BETWEEN HSYNC'S
00D8 75 C8 7F     240            MOV    P5,#HSON+WHITE   ;(2) HSYNC AND WHITE COLOR
00DB C2 CE        241            CLR    CPUHS            ;(1) HSYNC INACTIVE
=00DD             242    EX140   EQU    $
00DD DA FE        243            DJNZ   R2,EX140         ;(2)
00DF DB F4        244            DJNZ   R3,EX120         ;(2)
                  245    ;
00E1 75 C8 FF     246            MOV    P5,#0FFH         ;(2) MAKE MICRO'S VIDEO INACTIVE
00E4 C2 B5        247            CLR    DEMO             ;(1) ACTIVATE TRUE INPUT SIGNAL
00E6 75 49 06     248            MOV    NOMODE,#NUMNO    ;(2) # OF LOOP TO FIND MODE BEFORE
                  249                                    ;    RE-DISPLAY THIS TITLE SCREEN
00E9 22           250            RET                     ;(2) BACK TO NORMAL RUNNING
                  251    ;-------------------------------
                  252    ;TABLE OF VIDEO DATA FOR BOXES
                  253    ;EACH ROW CONTAINS 8 BOXES AND THERE ARE 16 ROWS OF BOXES
                  254    ;TTBSTA  EQU    $
                  255            ;DB    030H,030H,WHIT,020H,WHIT,010H ;RED's + BLACK
                  256            ;DB    00CH,00CH,WHIT,008H,WHIT,004H ;GREEN's + "
                  257            ;DB    003H,003H,WHIT,002H,WHIT,001H ;BLUE's + "
                  258            ;DB    03CH,03CH,WHIT,038H,WHIT,034H ;ROW 4
                  259            ;DB    033H,033H,WHIT,032H,WHIT,031H ;ROW 5
                  260            ;DB    02CH,02CH,WHIT,028H,WHIT,024H ;ROW 6
                  261            ;DB    023H,023H,WHIT,022H,WHIT,021H ;ROW 7
                  262            ;DB    01CH,01CH,WHIT,018H,WHIT,014H ;ROW 8
                  263            ;DB    013H,013H,WHIT,012H,WHIT,011H ;ROW 9
                  264            ;DB    00FH,00FH,WHIT,00EH,WHIT,00DH ;ROW 10
```

```
                                      265          ;DB        00BH,00BH,WHIT,00AH,WHIT,009H ;ROW 11
                                      266          ;DB        007H,007H,WHIT,006H,WHIT,005H ;ROW 12
                                      267          ;DB        02FH,02FH,WHIT,02EH,WHIT,02DH ;ROW 13
                                      268          ;DB        01FH,01FH,WHIT,01EH,WHIT,01DH ;ROW 14
                                      269          ;DB        01BH,01BH,WHIT,01AH,WHIT,019H ;ROW 15
                                      270          ;DB        017H,017H,WHIT,016H,WHIT,015H ;ROW 16
                                      271  ;TABLE OF VIDEO DATA FOR BOXES
                                      272  ;EACH ROW CONTAINS 8 BOXES AND THERE ARE 16 ROWS OF BOXES
=0DEA                                 273  TTBSTA   EQU       $
0DEA 3F 3F 3C 3F                      274           DB        WHIT,WHIT,03CH,WHIT,033H,WHIT ;ROW 1
0DEE 33 3F
0DF0 08 08 3F 38                      275           DB        008H,008H,WHIT,038H,WHIT,034H ;ROW 2
0DF4 3F 34
0DF6 3F 3F 10 3F                      276           DB        WHIT,WHIT,010H,WHIT,018H,WHIT ;ROW 3
0DFA 18 3F
0DFC 33 33 3F 02                      277           DB        033H,033H,WHIT,002H,WHIT,02DH ;ROW 4
0E00 3F 2D
0E02 3F 3F 14 3F                      278           DB        WHIT,WHIT,014H,WHIT,009H,WHIT ;ROW 5
0E06 09 3F
0E08 0F 0F 3F 28                      279           DB        00FH,00FH,WHIT,028H,WHIT,020H ;ROW 6
0E0C 3F 20
0E0E 3F 3F 13 3F                      280           DB        WHIT,WHIT,013H,WHIT,012H,WHIT ;ROW 7
0E12 12 3F
0E14 30 30 3F 0C                      281           DB        030H,030H,WHIT,00CH,WHIT,003H ;ROW 8
0E18 3F 03
0E1A 3F 3F 04 3F                      282           DB        WHIT,WHIT,004H,WHIT,021H,WHIT ;ROW 9
0E1E 21 3F
0E20 2A 2A 3F 15                      283           DB        02AH,02AH,WHIT,015H,WHIT,023H ;ROW 10
0E24 3F 23
0E26 3F 3F 0E 3F                      284           DB        WHIT,WHIT,00EH,WHIT,028H,WHIT ;ROW 11
0E2A 28 3F
0E2C 32 32 3F 06                      285           DB        032H,032H,WHIT,006H,WHIT,00DH ;ROW 12
0E30 3F 0D
0E32 3F 3F 1C 3F                      286           DB        WHIT,WHIT,01CH,WHIT,00AH,WHIT ;ROW 13
0E36 0A 3F
0E38 01 01 3F 31                      287           DB        001H,001H,WHIT,031H,WHIT,022H ;ROW 14
0E3C 3F 22
0E3E 3F 3F 11 3F                      288           DB        WHIT,WHIT,011H,WHIT,007H,WHIT ;ROW 15
0E42 07 3F
0E44 2C 2C 3F 19                      289           DB        02CH,02CH,WHIT,019H,WHIT,024H ;ROW 16
0E48 3F 24
                                      290  ;        %ENDIF
                                      291  ;---
                                      292  ;
                                      293  ;
                                      294  ;---THIS NEXT "IF" EXTENDS TO END OF FILE
                                      295  ;        %IF PROXIMA EQ 1
                                      296  ;        DJNZ      R5,VS100       ;(2) JMP IF MORE VSYNC's
                                      297  ;                                 ;    BEFORE SCREEN CHANGE
                                      298  ;;IT IS TIME FOR A SCREEN CHANGE
                                      299  ;;FIRST SHIFT COLOR OF LETTERS IN RAM
                                      300  ;        MOV       A,R6           ;(1) MIN DISPLAY TIME OVER?
                                      301  ;        JZ        VS05           ;(2) YES
                                      302  ;        DEC       R6             ;(1)
                                      303  ;        SJMP      VS10           ;(2)
                                      304  ;VS05    EQU        $
                                      305  ;        NOP                      ;(1)
                                      306  ;        SJMP      VS10           ;(2)
                                      307  ;VS10    EQU        $
                                      308  ;        MOV       R5,#TUPDAT     ;(1) # OF VSYNC's TO NEXT UPDATE
                                      309  ;        MOV       R1,#ACOLOR     ;(1) LETTER A's COLOR LOCATION
                                      310  ;        MOV       R0,#MCOLOR     ;(1)  "   M's    "      "
                                      311  ;        MOV       R2,#6          ;(1) NEW P's COLOR WILL COME FROM ROM
                                      312  ;;FOLLOWING LOOP TIME=36 tcyc
                                      313  ;VS20    EQU        $
                                      314  ;        MOV       A,@R0          ;(1) LETTER TO LEFT's COLOR
                                      315  ;        MOV       @R1,A          ;(1) INTO LETTER TO RIGHT's COLOR
                                      316  ;        DEC       R1             ;(1)
                                      317  ;        DEC       R0             ;(1)
                                      318  ;        DJNZ      R2,VS20        ;(2)
                                      319  ;;LOAD LETTER P's COLOR FROM TABLE
                                      320  ;        MOV       A,R4           ;(1) CURRENT PTR INTO TABLE
                                      321  ;        MOVC      A,@A+DPTR      ;(2) COLOR FROM ROM TABLE
                                      322  ;        MOV       @R1,A          ;(1) INTO P's RAM COLOR LOCATION
                                      323  ;        INC       R4             ;(1) TO NEXT TABLE ENTRY
                                      324  ;        CJNE      R4,#TTBEND-TTBSTA,$+3 ;(2) PAST TABLE END?
                                      325  ;        JC        VS30           ;(2) NO
                                      326  ;        MOV       R4,#0          ;(1) WRAP TO TABLE START
                                      327  ;        SJMP      VS40           ;(2)
                                      328  ;VS30    EQU        $
```

```
329  ;          NOP                        ;(1) KEEP TIME THE SAME
330  ;          SJMP    VS40               ;(2)
331  ;VS40      EQU     $
332  ;          MOV     C,HSIN             ;(1) CURRENT STATUS OF HSYNC
333  ;          MOV     HSYNC,C            ;(2) SAVE "    "    "  "
334  ;          MOV     R0,#PCOLOR         ;(1) START OF P's COLOR IN RAM
335  ;          MOV     R3,#3              ;(1) DELAY TO NEXT HSYNC
336  ;          JMP     VS200              ;(2) REMAINING DELAY TO NEXT HSYNC
337  ;;--NO SCREEN CHANGE IS NEEDED
338  ;;  IF THERE IS A REAL HSYNC AND "PROXIMA"
339  ;;  HAS BEEN UP A MINIMUM TIME THEN START
340  ;;  NORMAL OPERATION.
341  ;;
342  ;VS100     EQU     $
343  ;          MOV     R0,#PCOLOR         ;(1) START OF COLOR DATA IN RAM
344  ;          CLR     VSYNC              ;(1) FLAG NO REAL HSYNC PRESENT
345  ;          MOV     R3,#4              ;(1) # OF READS OF TRUE HSYNC
346  ;VS110     EQU     $
347  ;          MOV     C,HSIN             ;(1) NEW TRUE HSYNC STATE
348  ;          JC      VS120              ;(2) JMP IF HSYNC IS NOW HIGH
349  ;;HSYNC IS NOW LOW, SEE IF IT WAS HIGH
350  ;          MOV     C,HSYNC            ;(1) HAS HSYNC CHANGED STATE?
351  ;          JC      VS130              ;(2) YES, TRUE HSYNC IS ACTIVE
352  ;          SJMP    VS140              ;(2) NO,
353  ;;HSYNC IS NOW HIGH, SEE IF IT WAS LOW
354  ;VS120     EQU     $
355  ;          MOV     C,HSYNC            ;(1) HAS HSYNC CHANGED STATE?
356  ;          JNC     VS130              ;(2) YES, TRUE HSYNC IS ACTIVE
357  ;          SJMP    VS140              ;(2) NO
358  ;;HSYNC HAS CHANGED STATE
359  ;VS130     EQU     $
360  ;;**********************
361  ;          ;-CLR    VSYNC
362  ;;***************************
363  ;          SETB    VSYNC              ;(1) FLAG HSYNC IS ACTIVE
364  ;          SJMP    VS150              ;(2)
365  ;;HSYNC HAS NOT CHANGED STATE
366  ;VS140     EQU     $
367  ;          NOP                        ;(1)
368  ;;BOTTOM OF HSYNC CHECK LOOP
369  ;VS150     EQU     $
370  ;          DJNZ    R3,VS110           ;(2)
371  ;          MOV     R3,#9              ;(1) DELAY TO HSYNC
372  ;          MOV     A,R6               ;(1) "PROXIMA" MIN TIME DONE?
373  ;          JZ      VS160              ;(2) YES
374  ;          SJMP    VS200              ;(2)
375  ;;"PROXMIA" HAS BEEN DISPLAYED FOR MIN TIME
376  ;VS160     EQU     $
377  ;;**************************
378  ;          ;-JMP    VS200
379  ;;**************************
380  ;          JNB     VSYNC,VS200        ;(2) JMP IF NO HSYNC PRESENT
381  ;          MOV     P5,#0FFH           ;(2) MAKE MICRO's SIGNALS INACTIVE
382  ;          CLR     DEMO               ;(1) ACTIVATE INPUT SIGNALS
383  ;          RET                        ;(2) RETURN TO NORMAL RUNNING
384  ;;--DELAY TO NEXT HSYNC DURING VSYNC
385  ;VS200     EQU     $
386  ;          DJNZ    R3,VS200           ;(2)
387  ;          MOV     P5,#VSON+HSON      ;(2) BOTH ACTIVE
388  ;          CLR     CPUHS              ;(1) HSYNC BACK INACTIVE
389  ;          MOV     R3,#36             ;(1)
390  ;VS210     EQU     $
391  ;          DJNZ    R3,VS210           ;(2)
392  ;          MOV     P5,#VSON+HSON      ;(2) BOTH ACTIVE
393  ;          CLR     CPUHS              ;(1) HSYNC BACK INACTIVE
394  ;          MOV     P5,#VSOFF          ;(2) BOTH INACTIVE
395  ;          MOV     REG3,#31           ;(2) DELAY TO NEXT HSYNC
396  ;VS220     EQU     $
397  ;          DJNZ    R3,VS220           ;(2)
398  ;;TOP MARGIN HANDLING
399  ;          MOV     R3,#PHIGH*2+3      ;(1) # OF LINES OF TOP MARGIN
400  ;          NOP                        ;(1) TO COLOR FOR NEXT LETTER
401  ;          SJMP    TOPM10             ;(2) KEEP HORZ FREQ CONSTANT
402  ;TOPM      EQU     $
403  ;          CALL    LDELAY             ;(4) DELAY SOME
404  ;TOPM10    EQU     $                  ;ENTRY FIRST LINE
405  ;          CALL    BLINE              ;(70) LINE OF BACKGROUND HANDLING
406  ;          DJNZ    R3,TOPM            ;(2) LOOP FOR ALL LINES
407  ;;TOP LINE OF "P"
408  ;SCRTOP    EQU     $
409  ;          MOV     R3,#PHIGH          ;(1) PIXEL HEIGHT IN DOUBLE SCANNED
```

```
410   ;                              ;   LINES
411   ;         NOP                  ;(1)
412   ;         SJMP    LP1F         ;(2) KEEP HORZ FREQ CONSTANT
413   ;LP1      EQU     $
414   ;         CALL    LDELAY       ;(4) DELAY SOME
415   ;LP1F     EQU     $            ;ENTRY FIRST LINE
416   ;         MOV     REG2,#5-1    ;(2) # OF ON-1
417   ;         MOV     R1,#26-2     ;(1) # OF OFF-2 PIXELS
418   ;         MOV     P5,#HSON     ;(2) HSYNC ACTIVE STATE
419   ;         CLR     CPUHS        ;(1) HSYNC INACTIVE STATE
420   ;         MOV     P5,@R0       ;(2) PIXEL 1
421   ;         CALL    SONSOF       ;(62) PIXELS 2 TO 32
422   ;         DJNZ    R3,LP1       ;(2) LOOP FOR ALL LINES
423   ;;LINES 2 & 3 OF "P"
424   ;         MOV     R3,#PHIGH*2  ;(1) PIXEL HEIGHT IN DOUBLE SCANNED
425   ;                              ;    LINES
426   ;         NOP                  ;(1)
427   ;         SJMP    LP2F         ;(2) KEEP HORZ FREQ CONSTANT
428   ;LP2      EQU     $
429   ;         CALL    LDELAY       ;(4) DELAY SOME
430   ;LP2F     EQU     $            ;ENTRY FIRST LINE
431   ;         MOVC    A,@A+DPTR    ;(2) DELAY
432   ;         MOV     R1,#24-2     ;(1) # OF ADDI OFF PIXELS AT END-2
433   ;         MOV     P5,#HSON     ;(2) HSYNC ACTIVE STATE
434   ;         CLR     CPUHS        ;(1) HSYNC INACTIVE STATE
435   ;         MOV     P5,BCKGND    ;(2) PIXEL 1
436   ;         MOV     P5,@R0       ;(2) PIXEL 2
437   ;         CALL    X0011        ;(10) PIXELS 3-7, ON,OFF,OFF,ON,ON
438   ;         MOV     P5,BCKGND    ;(2) PIXEL 8
439   ;         CALL    SOFF         ;(48) PIXELS 9-32
440   ;         DJNZ    R3,LP2       ;(2) LOOP FOR ALL LINES
441   ;;4TH LINE OF "P"
442   ;         MOV     R3,#PHIGH    ;(1) PIXEL HEIGHT IN DOUBLE SCANNED
443   ;                              ;    LINES
444   ;         NOP                  ;(1)
445   ;         SJMP    LP4F         ;(2) KEEP HORZ FREQ CONSTANT
446   ;LP4      EQU     $
447   ;         CALL    LDELAY       ;(4) DELAY SOME
448   ;LP4F     EQU     $            ;ENTRY FIRST LINE
449   ;         MOV     REG2,#4-1    ;(2) # OF ON PIXELS LATER-1
450   ;         MOV     R1,#26-2     ;(1) # OF OFF PIXELS
451   ;         MOV     P5,#HSON     ;(2) HSYNC ACTIVE STATE
452   ;         CLR     CPUHS        ;(1) HSYNC INACTIVE STATE
453   ;         MOV     P5,BCKGND    ;(2) PIXEL 1
454   ;         MOV     P5,@R0       ;(2) PIXEL 2
455   ;         CALL    SONSOF       ;(60) PIXELS 3-32
456   ;         DJNZ    R3,LP4       ;(2) LOOP FOR ALL LINES
457   ;;LINES 5 & 6 OF "P"
458   ;         MOV     R3,#PHIGH*2  ;(1) PIXEL HEIGHT IN DOUBLE SCANNED
459   ;                              ;    LINES
460   ;         NOP                  ;(1)
461   ;         SJMP    LP5F         ;(2) KEEP HORZ FREQ CONSTANT
462   ;LP5      EQU     $
463   ;         CALL    LDELAY       ;(4) DELAY SOME
464   ;LP5F     EQU     $            ;ENTRY FIRST LINE
465   ;         MOVC    A,@A+DPTR    ;(2) DELAY
466   ;         MOV     R1,#28-2     ;(1) # OF ADDI OFF PIXELS AT END-2
467   ;         MOV     P5,#HSON     ;(2) HSYNC ACTIVE STATE
468   ;         CLR     CPUHS        ;(1) HSYNC INACTIVE STATE
469   ;         MOV     P5,BCKGND    ;(2) PIXEL 1
470   ;         MOV     P5,@R0       ;(2) PIXEL 2
471   ;         MOVC    A,@A+DPTR    ;(2) PIXEL 3
472   ;         MOV     P5,BCKGND    ;(2) PIXEL 4
473   ;         CALL    SOFF         ;(56) PIXELS 5-32
474   ;         DJNZ    R3,LP5       ;(2) LOOP FOR ALL LINES
475   ;;7TH LINE OF "P"
476   ;         MOV     R3,#PHIGH    ;(1) PIXEL HEIGHT IN DOUBLE SCANNED
477   ;                              ;    LINES
478   ;         NOP                  ;(1)
479   ;         SJMP    LP7F         ;(2) KEEP HORZ FREQ CONSTANT
480   ;LP7      EQU     $
481   ;         CALL    LDELAY       ;(4) DELAY SOME
482   ;LP7F     EQU     $            ;ENTRY FIRST LINE
483   ;         MOV     REG2,#3-1    ;(2) # OF ON-1
484   ;         MOV     R1,#28-2     ;(1) # OF OFF-2
485   ;         MOV     P5,#HSON     ;(2) HSYNC ACTIVE STATE
486   ;         CLR     CPUHS        ;(1) HSYNC INACTIVE STATE
487   ;         MOV     P5,@R0       ;(2) PIXEL 1
488   ;         CALL    SONSOF       ;(62) PIXELS 3 TO 32
489   ;         DJNZ    R3,LP7       ;(2) LOOP FOR ALL LINES
```

```
490  ;;LINES 8 & 9 OF LETTER AREA
491  ;       MOV     R3,#PHIGH+PHIGH  ;(1) PIXEL HEIGHT IN DOUBLE SCANNED
492  ;                                ;    LINES FOR 2 PIXELS
493  ;       INC     R0               ;(1) TO COLOR FOR NEXT LETTER
494  ;       SJMP    LP8F             ;(2) KEEP HORZ FREQ CONSTANT
495  ;LP8    EQU     $
496  ;       CALL    LDELAY           ;(4) DELAY SOME
497  ;LP8F   EQU     $                ;ENTRY FIRST LINE
498  ;       CALL    BLINE            ;(70) LINE OF BACKGROUND HANDLING
499  ;       DJNZ    R3,LP8           ;(2) LOOP FOR ALL LINES
500  ;;LINE 10 OF LETTER AREA, LINE 1 OF "R"
501  ;       MOV     R3,#PHIGH        ;(1) PIXEL HEIGHT IN DOUBLE SCANNED
502  ;                                ;    LINES
503  ;       NOP
504  ;       SJMP    LR1F             ;(2) KEEP HORZ FREQ CONSTANT
505  ;LR1    EQU     $
506  ;       CALL    LDELAY           ;(4) DELAY SOME
507  ;LR1F   EQU     $                ;ENTRY FIRST LINE
508  ;       MOV     R2,#4-2          ;(1) # OF INITIAL BACKGND'S-2
509  ;       CALL    HSBKS            ;(13) HSYNC & PIXELS 1-4
510  ;       MOV     P5,@R0           ;(2) PIXEL 5
511  ;       MOV     R2,#5-1          ;(1) # OF ADDI ON-1, 1/2 PIXEL 6
512  ;       MOV     R1,#21-2         ;(1) # OF OFF-2, 1/2 PIXEL 6
513  ;       CALL    SONSOF           ;(52) PIXELS 7-32
514  ;       DJNZ    R3,LR1           ;(2) LOOP FOR ALL LINES
515  ;;LINES 11 & 12 OF LETTER AREA, LINES 2 & 3 OF "R"
516  ;       MOV     R3,#PHIGH*2      ;(1) PIXEL HEIGHT IN DOUBLE SCANNED
517  ;                                ;    LINES
518  ;       NOP
519  ;       SJMP    LR2F             ;(2) KEEP HORZ FREQ CONSTANT
520  ;LR2    EQU     $
521  ;       CALL    LDELAY           ;(4) DELAY SOME
522  ;LR2F   EQU     $                ;ENTRY FIRST LINE
523  ;       MOV     R2,#5-2          ;(1) # OF INITIAL BKGND PIXELS
524  ;       CALL    HSBKS            ;(15) HSYNC & PIXELS 1-5
525  ;       MOV     P5,@R0           ;(2) PIXEL 6
526  ;       CALL    X0011B           ;(52) PIXELS 7-32, ON,OFF,OFF,ON,ON
527  ;                                ;    AND 21 OFF PIXELS
528  ;       DJNZ    R3,LR2           ;(2) LOOP FOR ALL LINES
529  ;;LINE 13 OF LETTER AREA, LINE 4 OF "R"
530  ;       MOV     R3,#PHIGH        ;(1) PIXEL HEIGHT IN DOUBLE SCANNED
531  ;                                ;    LINES
532  ;       NOP
533  ;       SJMP    LR4F             ;(2) KEEP HORZ FREQ CONSTANT
534  ;LR4    EQU     $
535  ;       CALL    LDELAY           ;(4) DELAY SOME
536  ;LR4F   EQU     $                ;ENTRY FIRST LINE
537  ;       MOV     R2,#5-2          ;(1) # OF INITIAL BKGND PIXELS-2
538  ;       CALL    HSBKS            ;(15) PIXELS 1-5
539  ;       MOV     P5,@R0           ;(2) PIXEL 6
540  ;       MOV     R2,#3-1          ;(1) # OF ADDI ON-1, 1/2 PIXEL 7
541  ;       MOV     R1,#22-2         ;(1) # OF OFF-2, 1/2 PIXEL 7
542  ;       CALL    SONSOF           ;(50) PIXELS 8-32
543  ;       DJNZ    R3,LR4           ;(2) LOOP FOR ALL LINES
544  ;;LINE 14 OF LETTER AREA, LINE 5 OF "R"
545  ;       MOV     R3,#PHIGH        ;(1) PIXEL HEIGHT IN DOUBLE SCANNED
546  ;                                ;    LINES
547  ;       NOP
548  ;       SJMP    LR5F             ;(2) KEEP HORZ FREQ CONSTANT
549  ;LR5    EQU     $
550  ;       CALL    LDELAY           ;(4) DELAY SOME
551  ;LR5F   EQU     $                ;ENTRY FIRST LINE
552  ;       MOV     R2,#5-2          ;(1) # OF INITAL BKGND PIXELS-2
553  ;       CALL    HSBKS            ;(15) PIXELS 1-5
554  ;       MOV     P5,@R0           ;(2) PIXEL 6
555  ;       CALL    X011             ;(8) PIXELS 7-10, ON,OFF,ON,ON
556  ;       MOV     P5,BCKGND        ;(2) PIXEL 11
557  ;       MOV     REG2,#20         ;(2) PIXEL 12, 32-12=20
558  ;LR5L2  EQU     $
559  ;       DJNZ    R2,LR5L2         ;(2) LOOP FOR REST OF LINE
560  ;       DJNZ    R3,LR5           ;(2) LOOP FOR ALL LINES
561  ;;LINE 15 OF LETTER AREA, LINE 6 OF "R"
562  ;       MOV     R3,#PHIGH        ;(1) PIXEL HEIGHT IN DOUBLE SCANNED
```

```
563   ;                                   ;     LINES
564   ;           NOP
565   ;           SJMP    LR6F            ;(2) KEEP HORZ FREQ CONSTANT
566   ;LR6        EQU     $
567   ;           CALL    LDELAY          ;(4) DELAY SOME
568   ;LR6F       EQU     $               ;ENTRY FIRST LINE
569   ;           MOV     R2,#5-2         ;(1) # OF INIT BKGND PIXELS-2
570   ;           CALL    HSBKS           ;(15) PIXELS 1-5
571   ;           MOV     P5,@R0          ;(2) PIXEL 6
572   ;           CALL    X00118          ;(52) PIXELS 7-32, ON,OFF,OFF,ON,ON
573   ;                                   ;     AND 21 OFF PIXELS
574   ;           DJNZ    R3,LR6          ;(2) LOOP FOR ALL LINES
575   ;;LINE 16 OF LETTER AREA, LINE 7 OF "R"
576   ;           MOV     R3,#PHIGH       ;(1) PIXEL HEIGHT IN DOUBLE SCANNED
577   ;                                   ;     LINES
578   ;           NOP
579   ;           SJMP    LR7F            ;(2) KEEP HORZ FREQ CONSTANT
580   ;LR7        EQU     $
581   ;           CALL    LDELAY          ;(4) DELAY SOME
582   ;LR7F       EQU     $               ;ENTRY FIRST LINE
583   ;           MOV     R2,#4-2         ;(1) # OF INIT BKGND PIXELS-2
584   ;           CALL    HSBKS           ;(13) HSYNC & PIXELS 1-4
585   ;           MOV     P5,@R0          ;(2) PIXEL 5
586   ;           MOVC    A,@A+DPTR       ;(2) PIXEL 6
587   ;           CALL    X0011B          ;(52) PIXELS 7-11, ON,OFF,OFF,ON,ON
588   ;                                   ;     AND 21 OFF PIXELS
589   ;           DJNZ    R3,LR7          ;(2) LOOP FOR ALL LINES
590   ;;LINES 17 & 18 OF LETTER AREA
591   ;           MOV     R3,#PHIGH+PHIGH ;(1) PIXEL HEIGHT IN DOUBLE SCANNED
592   ;                                   ;     LINES FOR 2 PIXELS
593   ;           INC     R0              ;(1) TO COLOR FOR NEXT LETTER
594   ;           SJMP    LR8F            ;(2) KEEP HORZ FREQ CONSTANT
595   ;LR8        EQU     $
596   ;           CALL    LDELAY          ;(4) DELAY SOME
597   ;LR8F       EQU     $               ;ENTRY FIRST LINE
598   ;           CALL    BLINE           ;(70) BKGND LINE HANDLING
599   ;           DJNZ    R3,LR8          ;(2) LOOP FOR ALL LINES
600   ;;LINE 19 OF LETTER AREA, LINE 1 OF "O"
601   ;           MOV     R3,#PHIGH       ;(1) PIXEL HEIGHT IN DOUBLE SCANNED
602   ;                                   ;     LINES
603   ;           NOP
604   ;           SJMP    LO1F            ;(2) KEEP HORZ FREQ CONSTANT
605   ;LO1        EQU     $
606   ;           CALL    LDELAY          ;(4) DELAY SOME
607   ;LO1F       EQU     $               ;ENTRY FIRST LINE
608   ;           MOV     R2,#9-2         ;(1) # OF INIT BKGND PIXELS
609   ;           CALL    HSBKS           ;(23) HSYNC & PIXELS 1-9
610   ;           MOV     P5,@R0          ;(2) PIXEL 10
611   ;           MOV     R2,#3-1         ;(1) # OF ADDI ON-1, 1/2 PIXEL 11
612   ;           MOV     R1,#18-2        ;(1) # OF OFF PIXELS-2, 1/2 PIXEL 12
613   ;           CALL    SONSOF          ;(42) PIXELS 13-32
614   ;           DJNZ    R3,LO1          ;(2) LOOP FOR ALL LINES
615   ;;LINES 20-24 OF LETTER AREA, LINES 2-6 OF "O"
616   ;           MOV     R3,#PHIGH*5     ;(1) PIXEL HEIGHT IN DOUBLE SCANNED
617   ;                                   ;     LINES
618   ;           NOP                     ;(1)
619   ;           SJMP    LO2F            ;(2) KEEP HORZ FREQ CONSTANT
620   ;LO2        EQU     $
621   ;           CALL    LDELAY          ;(4) DELAY SOME
622   ;LO2F       EQU     $               ;ENTRY FIRST LINE
623   ;           MOV     R2,#8-2         ;(1) # OF INIT BKGND PIXELS
624   ;           CALL    HSBKS           ;(21) HSYNC & PIXELS 1-8
625   ;           MOV     P5,@R0          ;(2) PIXEL 9
626   ;           CALL    X00011          ;(12) PIXELS 10-15, ON,OFF,OFF,OFF,ON,ON
627   ;           MOV     P5,BCKGND       ;(2) PIXEL 16
628   ;           MOV     REG2,#15        ;(2) PIXEL 17, 32-17=15
629   ;LO2L2      EQU     $
630   ;           DJNZ    R2,LO2L2        ;(2) LOOP FOR REST OF LINE
631   ;           DJNZ    R3,LO2          ;(2) LOOP FOR ALL LINES
632   ;;LINE 25 OF LETTER AREA, LINE 7 OF "O"
633   ;           MOV     R3,#PHIGH       ;(1) PIXEL HEIGHT IN DOUBLE SCANNED
634   ;                                   ;     LINES
635   ;           NOP
636   ;           SJMP    LO7F            ;(2) KEEP HORZ FREQ CONSTANT
637   ;LO7        EQU     $
638   ;           CALL    LDELAY          ;(4) DELAY SOME
639   ;LO7F       EQU     $               ;ENTRY FIRST LINE
640   ;           MOV     R2,#9-2         ;(1) # OF INIT BKGND PIXELS
641   ;           CALL    HSBKS           ;(23) HSYNC & PIXELS 1-9
642   ;           MOV     P5,@R0          ;(2) PIXEL 10
```

```
643  ;        MOV    R2,#3-1          ;(1) # OF ADDI ON-1, 1/2 PIXEL 11
644  ;        MOV    R1,#18-2         ;(1) # OF OFF PIXELS-2, 1/2 PIXEL 12
645  ;        CALL   SONSOF           ;(42) PIXELS 13-32
646  ;        DJNZ   R3,LO7           ;(2) LOOP FOR ALL LINES
647  ;;LINES 26 & 27 OF LETTER AREA
648  ;        MOV    R3,#PHIGH+PHIGH  ;(1) PIXEL HEIGHT IN DOUBLE SCANNED
649  ;                                ;    LINES FOR 2 PIXELS
650  ;        INC    R0               ;(1) TO COLOR FOR NEXT LETTER
651  ;        SJMP   LO8F             ;(2) KEEP HORZ FREQ CONSTANT
652  ;LO8    EQU    $
653  ;        CALL   LDELAY           ;(4) DELAY SOME
654  ;LO8F   EQU    $                ;ENTRY FIRST LINE
655  ;        CALL   BLINE            ;(70) BKGND LINE HANDLER
656  ;        DJNZ   R3,LO8           ;(2) LOOP FOR ALL LINES
657  ;;LINES 28 & 29 OF LETTER AREA, LINES 1 & 2 OF "X"
658  ;        MOV    R3,#PHIGH*2      ;(1) PIXEL HEIGHT IN DOUBLE SCANNED
659  ;                                ;    LINES
660  ;        NOP
661  ;        SJMP   LX1F             ;(2) KEEP HORZ FREQ CONSTANT
662  ;LX1    EQU    $
663  ;        CALL   LDELAY           ;(4) DELAY SOME
664  ;LX1F   EQU    $                ;ENTRY FIRST LINE
665  ;        MOV    R2,#12-2         ;(1) # OF INIT BKGND PIXELS
666  ;        CALL   HSBKS            ;(29) HSYNC & PIXELS 1-12
667  ;        MOV    P5,@R0           ;(2) PIXEL 13
668  ;        CALL   X00011           ;(12) PIXELS 14-19,
669  ;                                ;    ON,OFF,OFF,OFF,ON,ON
670  ;        MOV    P5,BCKGND        ;(2) PIXEL 20
671  ;        MOV    REG2,#11         ;(2) PIXEL 21, 32-21=11
672  ;LX1L2  EQU    $
673  ;        DJNZ   R2,LX1L2         ;(2) LOOP FOR REST OF LINE
674  ;        DJNZ   R3,LX1           ;(2) LOOP FOR ALL LINES
675  ;;LINE 30 OF LETTER AREA, LINE 3 OF "X"
676  ;        MOV    R3,#PHIGH        ;(1) PIXEL HEIGHT IN DOUBLE SCANNED
677  ;                                ;    LINES
678  ;        NOP
679  ;        SJMP   LX3F             ;(2) KEEP HORZ FREQ CONSTANT
680  ;LX3    EQU    $
681  ;        CALL   LDELAY           ;(4) DELAY SOME
682  ;LX3F   EQU    $                ;ENTRY FIRST LINE
683  ;        MOV    R2,#13-2         ;(1) # OF INIT BKGND PIXELS
684  ;        CALL   HSBKS            ;(31) HSYNC & PIXELS 1-13
685  ;        MOV    P5,@R0           ;(2) PIXEL 14
686  ;        CALL   X011             ;(8) PIXELS 15-18, ON,OFF,ON,ON
687  ;        MOV    P5,BCKGND        ;(2) PIEXL 19
688  ;        MOV    REG2,#12         ;(2) PIXEL 20, 32-20=12
689  ;LX3L2  EQU    $
690  ;        DJNZ   R2,LX3L2         ;(2) LOOP FOR REST OF LINE
691  ;        DJNZ   R3,LX3           ;(2) LOOP FOR ALL LINES
692  ;;LINES 31 & 32 OF LETTER AREA, LINES 4 & 5 OF "X"
693  ;        MOV    R3,#PHIGH*2      ;(1) PIXEL HEIGHT IN DOUBLE SCANNED
694  ;                                ;    LINES
695  ;        NOP
696  ;        SJMP   LX4F             ;(2) KEEP HORZ FREQ CONSTANT
697  ;LX4    EQU    $
698  ;        CALL   LDELAY           ;(4) DELAY SOME
699  ;LX4F   EQU    $                ;ENTRY FIRST LINE
700  ;        MOV    R2,#14-2         ;(1) # OF INIT BKGND PIXELS-2
701  ;        CALL   HSBKS            ;(33) HSYNC & PIXELS 1-14
702  ;        MOV    P5,@R0           ;(2) PIXEL 15
703  ;        MOVC   A,@A+DPTR        ;(2) PIXEL 16
704  ;        MOVC   A,@A+DPTR        ;(2) PIXEL 17
705  ;        MOV    P5,BCKGND        ;(2) PIXEL 18
706  ;        MOV    REG2,#13         ;(2) PIXEL 19, 32-19=13
707  ;LX4L2  EQU    $
708  ;        DJNZ   R2,LX4L2         ;(2) LOOP FOR REST OF LINE
709  ;        DJNZ   R3,LX4           ;(2) LOOP FOR ALL LINES
710  ;;LINE 33 OF LETTER AREA, LINE 6 OF "X"
711  ;        MOV    R3,#PHIGH        ;(1) PIXEL HEIGHT IN DOUBLE SCANNED
712  ;                                ;    LINES
713  ;        NOP                     ;(1)
714  ;        SJMP   LX6F             ;(2) KEEP HORZ FREQ CONSTANT
715  ;LX6    EQU    $
716  ;        CALL   LDELAY           ;(4) DELAY SOME
717  ;LX6F   EQU    $                ;ENTRY FIRST LINE
718  ;        MOV    R2,#13-2         ;(1) # OF INIT BKGND PIXELS-2
719  ;        CALL   HSBKS            ;(31) HSYNC & PIXELS 1-13
720  ;        MOV    P5,@R0           ;(2) PIXEL 14
721  ;        CALL   X011             ;(8) PIXELS 15-18, ON,OFF,ON,ON
```

```
722    ;        MOV     P5,BCKGND       ;(2) PIEXL 19
723    ;        MOV     REG2,#12        ;(2) PIXEL 20, 32-20=12
724    ;LX6L2   EQU     $
725    ;        DJNZ    R2,LX6L2        ;(2) LOOP FOR REST OF LINE
726    ;        DJNZ    R3,LX6          ;(2) LOOP FOR ALL LINES
727    ;;LINE 34 OF LETTER AREA, LINE 7 OF "X"
728    ;        MOV     R3,#PHIGH       ;(1) PIXEL HEIGHT IN DOUBLE SCANNED
729    ;                                ;    LINES
730    ;        NOP
731    ;        SJMP    LX7F            ;(2) KEEP HORZ FREQ CONSTANT
732    ;LX7     EQU     $
733    ;        CALL    LDELAY          ;(4) DELAY SOME
734    ;LX7F    EQU     $               ;ENTRY FIRST LINE
735    ;        MOV     R2,#12-2        ;(1) # OF INIT BKGND PIXELS-2
736    ;        CALL    HSBKS           ;(29) HSYNC & PIXELS 1-12
737    ;        MOV     P5,@R0          ;(2) PIXEL 13
738    ;        CALL    X00011          ;(12) PIXELS 14-19
739    ;                                ;     ON,OFF,OFF,OFF,ON,ON
740    ;        MOV     P5,BCKGND       ;(2) PIXEL 20
741    ;        MOV     REG2,#11        ;(2) PIXEL 21, 32-21=11
742    ;LX7L2   EQU     $
743    ;        DJNZ    R2,LX7L2        ;(2) LOOP FOR REST OF LINE
744    ;        DJNZ    R3,LX7          ;(2) LOOP FOR ALL LINES
745    ;;LINES 35 & 36 OF LETTER AREA
746    ;        MOV     R3,#PHIGH+PHIGH ;(1) PIXEL HEIGHT IN DOUBLE SCANNED
747    ;                                ;    LINES FOR 2 PIXELS
748    ;        INC     R0              ;(1) TO COLOR FOR NEXT LETTER
749    ;        SJMP    LX8F            ;(2) KEEP HORZ FREQ CONSTANT
750    ;LX8     EQU     $
751    ;        CALL    LDELAY          ;(4) DELAY SOME
752    ;LX8F    EQU     $               ;ENTRY FIRST LINE
753    ;        CALL    BLINE           ;(70) BKGND LINE HANDLER
754    ;        DJNZ    R3,LX8          ;(2) LOOP FOR ALL LINES
755    ;;LINE 37 OF LETTER AREA, LINE 1 OF "I"
756    ;        MOV     R3,#PHIGH       ;(1) PIXEL HEIGHT IN DOUBLE SCANNED
757    ;                                ;    LINES
758    ;        NOP
759    ;        SJMP    LI1F            ;(2) KEEP HORZ FREQ CONSTANT
760    ;LI1     EQU     $
761    ;        CALL    LDELAY          ;(4) DELAY SOME
762    ;LI1F    EQU     $               ;ENTRY FIRST LINE
763    ;        MOV     R2,#18-2        ;(1) # OF INIT BKGND PIXELS-2
764    ;        CALL    HSBKS           ;(41) HSYNC & PIXELS 1-18
765    ;        MOV     P5,@R0          ;(2) PIXEL 19
766    ;        MOV     R2,#2-1         ;(1) # OF ADDI ON-1, 1/2 PIXEL 20
767    ;        MOV     R1,#10-2        ;(1) # OF OFF PIXELS-2, 1/2 PIXEL 20
768    ;        CALL    SONSOF          ;(24) PIXELS 21-32
769    ;        DJNZ    R3,LI1          ;(2) LOOP FOR ALL LINES
770    ;;LINES 38-42 OF LETTER AREA, LINES 2-6 OF "I"
771    ;        MOV     R3,#PHIGH*5     ;(1) PIXEL HEIGHT IN DOUBLE SCANNED
772    ;                                ;    LINES
773    ;        NOP
774    ;        SJMP    LI2F            ;(2) KEEP HORZ FREQ CONSTANT
775    ;LI2     EQU     $
776    ;        CALL    LDELAY          ;(4) DELAY SOME
777    ;LI2F    EQU     $               ;ENTRY FIRST LINE
778    ;        MOV     R2,#19-2        ;(1) # OF INIT BKGND PIXELS-2
779    ;        CALL    HSBKS           ;(43) HSYNC & PIXELS 1-19
780    ;        MOV     P5,@R0          ;(2) PIXEL 20
781    ;        MOVC    A,@A+DPTR       ;(2) PIXEL 21
782    ;        MOV     P5,BCKGND       ;(2) PIXEL 22
783    ;        MOV     REG2,#9         ;(2) PIXEL 23, 32-23=9
784    ;LI2L2   EQU     $
785    ;        DJNZ    R2,LI2L2        ;(2) LOOP FOR REST OF LINE
786    ;        DJNZ    R3,LI2          ;(2) LOOP FOR ALL LINES
787    ;;LINE 43 OF LETTER AREA, LINE 7 OF "I"
788    ;        MOV     R3,#PHIGH       ;(1) PIXEL HEIGHT IN DOUBLE SCANNED
789    ;                                ;    LINES
790    ;        NOP
791    ;        SJMP    LI7F            ;(2) KEEP HORZ FREQ CONSTANT
792    ;LI7     EQU     $
793    ;        CALL    LDELAY          ;(4) DELAY SOME
794    ;LI7F    EQU     $               ;ENTRY FIRST LINE
795    ;        MOV     R2,#18-2        ;(1) # OF INIT BKGND PIXELS-2
796    ;        CALL    HSBKS           ;(41) HSYNC & PIXELS 1-18
797    ;        MOV     P5,@R0          ;(2) PIXEL 19
798    ;        MOV     R2,#2-1         ;(1) # OF ADDI ON-1, 1/2 PIXEL 20
799    ;        MOV     R1,#10-2        ;(1) # OF OFF PIXELS-2, 1/2 PIXEL 20
800    ;        CALL    SONSOF          ;(24) PIXELS 21-32
801    ;        DJNZ    R3,LI7          ;(2) LOOP FOR ALL LINES
```

```
802      ;;LINES 44 & 45 OF LETTER AREA
803      ;         MOV     R3,#PHIGH+PHIGH  ;(1) PIXEL HEIGHT IN DOUBLE SCANNED
804      ;                                  ;     LINES FOR 2 PIXELS
805      ;         INC     R0               ;(1) TO COLOR FOR NEXT LETTER
806      ;         SJMP    LI8F             ;(2) KEEP HORZ FREQ CONSTANT
807      ;LI8      EQU     $
808      ;         CALL    LDELAY           ;(4) DELAY SOME
809      ;LI8F     EQU     $                ;ENTRY FIRST LINE
810      ;         CALL    BLINE            ;(70) BKGND LINE HANDLER
811      ;         DJNZ    R3,LI8           ;(2) LOOP FOR ALL LINES
812      ;;LINE 46 OF LETTER AREA, LINE 1 OF "M"
813      ;         MOV     R3,#PHIGH        ;(1) PIXEL HEIGHT IN DOUBLE SCANNED
814      ;                                  ;     LINES
815      ;         NOP
816      ;         SJMP    LM1F             ;(2) KEEP HORZ FREQ CONSTANT
817      ;LM1      EQU     $
818      ;         CALL    LDELAY           ;(4) DELAY SOME
819      ;LM1F     EQU     $                ;ENTRY FIRST LINE
820      ;         MOV     R2,#21-2         ;(1) # OF INIT BKGND PIXELS-2
821      ;         CALL    NSBKS            ;(47) NSYNC & PIXELS 1-21
822      ;         MOV     P5,@R0           ;(2) PIXEL 22
823      ;         CALL    X00011           ;(12) PIXELS 23-28
824      ;                                  ;     ON,OFF,OFF,OFF,ON,ON
825      ;         MOV     P5,BCKGND        ;(2) PIXEL 29
826      ;         MOV     REG2,#2          ;(2) PIXEL 30, 32-30=2
827      ;LM1L2    EQU     $
828      ;         DJNZ    R2,LM1L2         ;(2) LOOP FOR REST OF LINE
829      ;         DJNZ    R3,LM1           ;(2) LOOP FOR ALL LINES
830      ;;LINE 47 OF LETTER AREA, LINE 2 OF "M"
831      ;         MOV     R3,#PHIGH        ;(1) PIXEL HEIGHT IN DOUBLE SCANNED
832      ;                                  ;     LINES
833      ;         NOP
834      ;         SJMP    LM2F             ;(2) KEEP HORZ FREQ CONSTANT
835      ;LM2      EQU     $
836      ;         CALL    LDELAY           ;(4) DELAY SOME
837      ;LM2F     EQU     $                ;ENTRY FIRST LINE
838      ;         MOV     R2,#21-2         ;(1) # OF INIT BKGND PIXELS-2
839      ;         CALL    NSBKS            ;(47) NSYNC & PIXELS 1-21
840      ;         MOV     P5,@R0           ;(2) PIXEL 22
841      ;         MOVC    A,@A+DPTR        ;(2) PIXEL 23
842      ;         CALL    X011             ;(8) PIXELS 24-27, ON,OFF,ON,ON
843      ;         MOV     P5,@R0           ;(2) PIXEL 28
844      ;         MOV     P5,BCKGND        ;(2) PIXEL 29
845      ;         MOV     REG2,#2          ;(2) PIXEL 30, 32-30=2
846      ;LM2L2    EQU     $
847      ;         DJNZ    R2,LM2L2         ;(2) LOOP FOR REST OF LINE
848      ;         DJNZ    R3,LM2           ;(2) LOOP FOR ALL LINES
849      ;;LINES 48 & 49 OF LETTER AREA, LINES 3 & 4 OF "M"
850      ;         MOV     R3,#PHIGH*2      ;(1) PIXEL HEIGHT IN DOUBLE SCANNED
851      ;                                  ;     LINES
852      ;         NOP
853      ;         SJMP    LM3F             ;(2) KEEP HORZ FREQ CONSTANT
854      ;LM3      EQU     $
855      ;         CALL    LDELAY           ;(4) DELAY SOME
856      ;LM3F     EQU     $                ;ENTRY FIRST LINE
857      ;         MOV     R2,#21-2         ;(1) # OF INIT BKGND PIXELS-2
858      ;         CALL    NSBKS            ;(47) NSYNC & PIXELS 1-21
859      ;         MOV     P5,@R0           ;(2) PIXEL 22
860      ;         MOV     R2,#5-1          ;(1) # OF ADDI ON-1, 1/2 PIXEL 23
861      ;         MOV     R1,#4-2          ;(1) # OF OFF PIXELS-2, 1/2 PIXEL 23
862      ;         CALL    SONSOF           ;(18) PIXELS 24-32
863      ;         DJNZ    R3,LM3           ;(2) LOOP FOR ALL LINES
864      ;;LINE 50 OF LETTER AREA, LINE 5 OF "M"
865      ;         MOV     R3,#PHIGH        ;(1) PIXEL HEIGHT IN DOUBLE SCANNED
866      ;                                  ;     LINES
867      ;         NOP
868      ;         SJMP    LM5F             ;(2) KEEP HORZ FREQ CONSTANT
869      ;LM5      EQU     $
870      ;         CALL    LDELAY           ;(4) DELAY SOME
871      ;LM5F     EQU     $                ;ENTRY FIRST LINE
872      ;         MOV     R2,#21-2         ;(1) # OF INIT BKGND PIXELS-2
873      ;         CALL    NSBKS            ;(47) NSYNC & PIXELS 1-21
874      ;         MOV     P5,@R0           ;(2) PIXEL 22
875      ;         MOVC    A,@A+DPTR        ;(2) PIXEL 23
876      ;         MOV     P5,BCKGND        ;(2) PIXEL 24
877      ;         MOV     P5,@R0           ;(2) PIXEL 25
878      ;         MOV     P5,BCKGND        ;(2) PIXEL 26
879      ;         MOV     P5,@R0           ;(2) PIXEL 27
880      ;         MOVC    A,@A+DPTR        ;(2) PIXEL 28
881      ;         MOV     P5,BCKGND        ;(2) PIXEL 29
```

```
882     ;          MOV    REG2,#2         ;(2) PIXEL 30, 32-30=2
883     ;LM5L2     EQU    $
884     ;          DJNZ   R2,LM5L2        ;(2) LOOP FOR REST OF LINE
885     ;          DJNZ   R3,LM5          ;(2) LOOP FOR ALL LINES
886     ;;LINES 51 & 52 OF LETTER AREA, LINES 6 & 7 OF "M"
887     ;          MOV    R3,#PHIGH*2     ;(1) PIXEL HEIGHT IN DOUBLE SCANNED
888     ;                                 ;    LINES
889     ;          NOP
890     ;          SJMP   LM6F            ;(2) KEEP HORZ FREQ CONSTANT
891     ;LM6       EQU    $
892     ;          CALL   LDELAY          ;(4) DELAY SOME
893     ;LM6F      EQU    $               ;ENTRY FIRST LINE
894     ;          MOV    R2,#21-2        ;(1) # OF INIT BKGND PIXELS-2
895     ;          CALL   HSBKS           ;(47) HSYNC & PIXELS 1-21
896     ;          MOV    P5,@R0          ;(2) PIXEL 22
897     ;          CALL   X00011          ;(12) PIXELS 23-28
898     ;                                 ;    ON,OFF,OFF,OFF,ON,ON
899     ;          MOV    P5,BCKGND       ;(2) PIXEL 29
900     ;          MOV    REG2,#2         ;(2) PIXEL 30, 32-30=2
901     ;LM6L2     EQU    $
902     ;          DJNZ   R2,LM6L2        ;(2) LOOP FOR REST OF LINE
903     ;          DJNZ   R3,LM6          ;(2) LOOP FOR ALL LINES
904     ;;LINES 53 & 54 OF LETTER AREA
905     ;          MOV    R3,#PHIGH+PHIGH ;(1) PIXEL HEIGHT IN DOUBLE SCANNED
906     ;                                 ;    LINES FOR 2 PIXELS
907     ;          INC    R0              ;(1) TO COLOR FOR NEXT LETTER
908     ;          SJMP   LM8F            ;(2) KEEP HORZ FREQ CONSTANT
909     ;LM8       EQU    $
910     ;          CALL   LDELAY          ;(4) DELAY SOME
911     ;LM8F      EQU    $               ;ENTRY FIRST LINE
912     ;          CALL   BLINE           ;(70) BKGND LINE HANDLER
913     ;          DJNZ   R3,LM8          ;(2) LOOP FOR ALL LINES
914     ;;LINE 55 OF LETTER AREA, LINE 1 OF "A"
915     ;          MOV    R3,#PHIGH       ;(1) PIXEL HEIGHT IN DOUBLE SCANNED
916     ;                                 ;    LINES
917     ;          NOP
918     ;          SJMP   LA1F            ;(2) KEEP HORZ FREQ CONSTANT
919     ;LA1       EQU    $
920     ;          CALL   LDELAY          ;(4) DELAY SOME
921     ;LA1F      EQU    $               ;ENTRY FIRST LINE
922     ;          MOV    R2,#27-2        ;(1) # OF INIT BKGND PIXELS-2
923     ;          CALL   HSBKS           ;(59) HSYNC & PIXELS 1-27
924     ;          MOV    P5,@R0          ;(2) PIXEL 28
925     ;          MOVC   A,@A+DPTR       ;(2) PIXEL 29
926     ;          MOVC   A,@A+DPTR       ;(2) PIXEL 30
927     ;          MOV    P5,BCKGND       ;(2) PIXEL 31
928     ;          MOVC   A,@A+DPTR       ;(2) PIXEL 32
929     ;          DJNZ   R3,LA1          ;(2) LOOP FOR ALL LINES
930     ;;LINE 56 OF LETTER AREA, LINE 2 OF "A"
931     ;          MOV    R3,#PHIGH       ;(1) PIXEL HEIGHT IN DOUBLE SCANNED
932     ;                                 ;    LINES
933     ;          NOP
934     ;          SJMP   LA2F            ;(2) KEEP HORZ FREQ CONSTANT
935     ;LA2       EQU    $
936     ;          CALL   LDELAY          ;(4) DELAY SOME
937     ;LA2F      EQU    $               ;ENTRY FIRST LINE
938     ;          MOV    R2,#26-2        ;(1) # OF INIT BKGND PIXELS-2
939     ;          CALL   HSBKS           ;(57) HSYNC & PIXELS 1-26
940     ;          MOV    P5,@R0          ;(2) PIXEL 27
941     ;          MOV    REG2,#3         ;(2) PIXEL 28, 31-28=3
942     ;LA2L2     EQU    $
943     ;          DJNZ   R2,LA2L2        ;(2)
944     ;          MOV    P5,BCKGND       ;(2) PIXEL 32
945     ;          DJNZ   R3,LA2          ;(2) LOOP FOR ALL LINES
946     ;;LINES 57 & 58 OF LETTER AREA, LINES 3 & 4 OF "A"
947     ;          MOV    R3,#PHIGH*2     ;(1) PIXEL HEIGHT IN DOUBLE SCANNED
948     ;                                 ;    LINES
949     ;          NOP
950     ;          SJMP   LA3F            ;(2) KEEP HORZ FREQ CONSTANT
951     ;LA3       EQU    $
952     ;          CALL   LDELAY          ;(4) DELAY SOME
953     ;LA3F      EQU    $               ;ENTRY FIRST LINE
954     ;          MOV    R2,#25-2        ;(1) # OF INIT BKGND PIXELS-2
955     ;          CALL   HSBKS           ;(55) HSYNC & PIXELS 1-25
956     ;          MOV    P5,@R0          ;(2) PIXEL 26
957     ;          CALL   X00011          ;(12) PIXELS 27-32
958     ;                                 ;    ON,OFF,OFF,OFF,ON,ON
959     ;          DJNZ   R3,LA3          ;(2) LOOP FOR ALL LINES
960     ;;LINE 57 OF LETTER AREA, LINE 5 OF "A"
961     ;          MOV    R3,#PHIGH       ;(1) PIXEL HEIGHT IN DOUBLE SCANNED
```

```
962  ;                          ;   LINES
963  ;         NOP
964  ;         SJMP    LA5F     ;(2) KEEP HORZ FREQ CONSTANT
965  ;LA5      EQU     $
966  ;         CALL    LDELAY   ;(4) DELAY SOME
967  ;LA5F     EQU     $        ;ENTRY FIRST LINE
968  ;         MOV     R2,#25-2 ;(1) # OF INIT BKGND PIXELS-2
969  ;         CALL    HSBKS    ;(55) HSYNC & PIXELS 1-25
970  ;         MOV     P5,@R0   ;(2) PIXEL 26
971  ;         MOV     REG2,#5  ;(2) PIXEL 27, 32-27=5
972  ;LA5L2    EQU     $
973  ;         DJNZ    R2,LA5L2 ;(2)
974  ;         DJNZ    R3,LA5   ;(2) LOOP FOR ALL LINES
975  ;;LINES 58 & 59 OF LETTER AREA, LINES 6 & 7 OF "A"
976  ;         MOV     R3,#PHIGH*2 ;(1) PIXEL HEIGHT IN DOUBLE SCANNED
977  ;                          ;    LINES
978  ;         NOP
979  ;         SJMP    LA6F     ;(2) KEEP HORZ FREQ CONSTANT
980  ;LA6      EQU     $
981  ;         CALL    LDELAY   ;(4) DELAY SOME
982  ;LA6F     EQU     $        ;ENTRY FIRST LINE
983  ;         MOV     R2,#25-2 ;(1) # OF INIT BKGND PIXELS-2
984  ;         CALL    HSBKS    ;(55) HSYNC & PIXELS 1-25
985  ;         MOV     P5,@R0   ;(2) PIXEL 26
986  ;         CALL    X00011   ;(12) PIXELS 27-32
987  ;                          ;    ON,OFF,OFF,OFF,ON,ON
988  ;         DJNZ    R3,LA6   ;(2) LOOP FOR ALL LINES
989  ;;BOTTOM MARGIN OF SCREEN
990  ;         MOV     R3,#PHIGH*3 ;(1) # OF LINES OF TOP MARGIN
991  ;         NOP              ;(1) TO COLOR FOR NEXT LETTER
992  ;         SJMP    BOTM10   ;(2) KEEP HORZ FREQ CONSTANT
993  ;BOTM     EQU     $
994  ;         CALL    LDELAY   ;(4) DELAY SOME
995  ;BOTM10   EQU     $        ;ENTRY FIRST LINE
996  ;         CALL    BLINE    ;(70) BKGND LINE HANDLER
997  ;         DJNZ    R3,BOTM  ;(2) LOOP FOR ALL LINES
998  ;;
999  ;         LJMP    VERTSY   ;(2) TO VERT SYNC HANDLING
1000 ;;------------------------------
1001 ;;X0011B
1002 ;;X0011 AND 21 BCKGND PIXELS
1003 ;;TOTAL EXECUTION TIME=52 tcyc
1004 ;X0011B   EQU     $        ;(2) 2ND PIXEL OF VALUE AT CALL
1005 ;         MOV     P5,BCKGND ;(2) OFF
1006 ;         CALL    X11      ;(6) OFF,ON,ON
1007 ;         MOV     P5,BCKGND ;(2) 1ST OF 21 OFF PIXELS
1008 ;         MOV     REG1,#21-4 ;(2) 2ND OFF TIME
1009 ;         SJMP    SOFF     ;(2+36) REMAINING 19 OFF PIXELS
1010 ;;------------------------------
1011 ;;XX, OFF, OFF, OFF, ON, ON
1012 ;; X,  0,   0,   0,  1,  1
1013 ;;CALLER MUST FIRST DO "MOV P5,@R0" OR MOV P5,BCKGND
1014 ;;THEN CALL ITSELF IS SECOND PIXEL OF SAME
1015 ;X00011   EQU     $        ;(2) 2ND x
1016 ;         MOV     P5,BCKGND ;(2) 1ST OFF
1017 ;;XX, OFF, OFF, ON, ON
1018 ;;X,  0 , 0 , 1 , 1
1019 ;X0011    EQU     $        ;2 tcyc FOR CALL TO X0011
1020 ;         MOV     P5,BCKGND ;(2) 2ND OFF
1021 ;;XX, OFF, ON, ON
1022 ;; X,  0,  1,  1
1023 ;X011     EQU     $        ;2 tcyc FOR CALL TO X011
1024 ;         MOV     P5,BCKGND ;(2) 3RD OFF
1025 ;X11      EQU     $
1026 ;         MOV     P5,@R0   ;(2) 1ST ON
1027 ;;LINE DELAY 4 tcyc
1028 ;LDELAY   EQU     $        ;2 tcyc FOR CALL TO LDELAY
1029 ;         RET              ;(2)
1030 ;;------------------------------
1031 ;;BACK GROUND LINE HANDLER
1032 ;BLINE    EQU     $
1033 ;         MOV     R2,#32-2 ;(1) # OF BACKGND PIXELS-2
1034 ;;------------------------------
1035 ;;HSYNC & SVERAL BKGND PIXELS
1036 ;;IN: (R2) = # OF BKGND PIXELS-2
1037 ;;EXECUTION TIME = 9 + (R1+R2)*2
1038 ;HSBKS    EQU     $
1039 ;         MOV     P5,#HSON ;(2) HSYNC ACTIVE
1040 ;         CLR     CPUHS    ;(1) HSYNC BACK INACTIVE
1041 ;         MOV     P5,BCKGND ;(2) PIXEL 1
```

```
1042        ;HSBK50   EQU      $
1043        ;         DJNZ     R2,HSBK50        ;(2) LOOP FOR REST OF BKGND PIXELS
1044        ;         RET                       ;(2) LAST BKGND PIXEL
1045        ;;--------------------------------
1046        ;;SEVERAL "ON" PIXELS THEN SEVERAL "OFF" PIXELS
1047        ;;IN: (R2) = # OF ADDI ON PIXELS -1
1048        ;;    (R1) = # OF OFF PIXELS -2
1049        ;;EXECUTION TIME = 6 + (R2+R1)*2
1050        ;SONSOF   EQU      $
1051        ;         DJNZ     R2,SONSOF        ;(2) ON PIXELS
1052        ;         MOV      P5,BCKGND        ;(2) 1ST OFF PIXEL
1053        ;SOFF     EQU      $
1054        ;         DJNZ     R1,SOFF          ;(2) OFF PIXELS
1055        ;         RET                       ;(2) LAST OFF PIXEL
1056        ;;--------------------------------
1057        ;;TABLE OF COLORS FOR TITLE SCREEN
1058        ;TTBSTA   EQU      $
1059        ;         DB       REDB             ;MOVING INITIAL BRIGHT LETTER
1060        ;                                   ;(BRIGHT RED)
1061        ;         DB       REDL,REDL,REDL   ;COLOR AFTER HIGHLIGHT MOVES TO
1062        ;                                   ;NEXT LETTER (LIGHT RED)
1063        ;         DB       REDL,REDL,REDL,REDL
1064        ;         DB       GREENB           ;NEXT MOVING LETTER HIGHTLIGHT
1065        ;         DB       GREENL,GREENL,GREENL
1066        ;         DB       GREENL,GREENL,GREENL,GREENL
1067        ;         DB       BLUEB            ;3RD MOVING LETTER HIGH LIGHT
1068        ;         DB       BLUEL,BLUEL,BLUEL,BLUEL
1069        ;         DB       BLUEL,BLUEL,BLUEL
1070        ;         DB       00FH,03CH,033H,00CH ;RAINBOW COLORS
1071        ;                                   ;(TUR,YELLOW,PURPLE,GREEN)
1072        ;         DB       023H,00EH,038H,002H ;(PURP,TURQ,YELLOW,BLUE)
1073        ;         DB       02CH,00EH,038H,002H ;(YELLOW,TURQ,PURP,RED)
1074        ;         DB       00AH,022H,028H,003H ;(TURQ,PURP,YELLOW,BLUE)
1075        ;;
1076        ;         DB       WHITE,WHITE,WHITE ;BLEND ALL LETTERS WITH
1077        ;         DB       WHITE,WHITE,WHITE,WHITE ;BACKGROUND
1078        ;TTBEND   EQU      $                ;END OF TABLE MARKER
1079        ;         %ENDIF
1080        ;---
1081        ;
1082        ;--- END OF TITLE FILE ----
1083
1084        $RESETLN
  38        $SETLN(ropti.asm);%include    "ropti.asm"
   1        ;===========================================
   2        ;       FILE NAME: ROPTI.ASM
   3        ;       LAST EDIT: 09-25-89, 01:15 P.M., RNM
   4        ;===========================================
   5        ; Checks Randy's 'vsync' bit for polarity.
   6        ; HI=positive pulse, LO=negative pulse.
   7        ;
   8        wait_VS_start
   9                 jnb      vsync,vs2        ; pos
  10        vs1      jb       VSIN,vs1         ; neg: wait to start (lo)
  11                 ret
  12        vs2      jnb      VSIN,vs2         ; pos: wait to start (hi)
  13                 ret
  14        ;--------------------------------
  15        ROMEND   EQU      $
  16        ;--------------------------
  17        ;FILL REST OF MEMORY WITH A CONSTANT TO
  18        ;ALLOW FOR EASY DEVICE VERIFY
  19        LENGTH   EQU      01000H-ROMEND
  20        ;*********************************************************
  21        ;THE AVOCET ASSEMBLER CANNOT COMPUTE "LENGTH" CORRECTLY
  22        ;SINCE IT DOES NOT KNOW WHAT THE PROGRAM COUNTER IS AT
  23        ;THE TIME IT EXPANDS THE BELOW IN-LINE MACRO. THEREFORE
  24        ;ADJUST THE "FAKELENGTH" TO MAKE SURE AT LEAST MEMORY IS
  25        ;FILLED THROUGH 0FFFH
  26        ;*********************************************************
  27        FAKELENGTH        EQU      500H/16
  28        ;        %REPT    FAKELENGTH
  29        ;        DB       0,0,0,0,0,0,0,0,0,0,0,0,0,0,0,0
  30        ;        %ENDREPT
  30                 DB       0,0,0,0,0,0,0,0,0,0,0,0,0,0,0,0
  30                 DB       0,0,0,0,0,0,0,0,0,0,0,0,0,0,0,0
```

```
0E6D 00 00 00 00
0E71 00 00 00 00
0E75 00 00 00 00         30       DB       0,0,0,0,0,0,0,0,0,0,0,0,0,0,0,0
0E79 00 00 00 00
0E7D 00 00 00 00
0E81 00 00 00 00
0E85 00 00 00 00         30       DB       0,0,0,0,0,0,0,0,0,0,0,0,0,0,0,0
0E89 00 00 00 00
0E8D 00 00 00 00
0E91 00 00 00 00
0E95 00 00 00 00         30       DB       0,0,0,0,0,0,0,0,0,0,0,0,0,0,0,0
0E99 00 00 00 00
0E9D 00 00 00 00
0EA1 00 00 00 00
0EA5 00 00 00 00         30       DB       0,0,0,0,0,0,0,0,0,0,0,0,0,0,0,0
0EA9 00 00 00 00
0EAD 00 00 00 00
0EB1 00 00 00 00
0EB5 00 00 00 00         30       DB       0,0,0,0,0,0,0,0,0,0,0,0,0,0,0,0
0EB9 00 00 00 00
0EBD 00 00 00 00
0EC1 00 00 00 00
0EC5 00 00 00 00         30       DB       0,0,0,0,0,0,0,0,0,0,0,0,0,0,0,0
0EC9 00 00 00 00
0ECD 00 00 00 00
0ED1 00 00 00 00
0ED5 00 00 00 00         30       DB       0,0,0,0,0,0,0,0,0,0,0,0,0,0,0,0
0ED9 00 00 00 00
0EDD 00 00 00 00
0EE1 00 00 00 00
0EE5 00 00 00 00         30       DB       0,0,0,0,0,0,0,0,0,0,0,0,0,0,0,0
0EE9 00 00 00 00
0EED 00 00 00 00
0EF1 00 00 00 00
0EF5 00 00 00 00         30       DB       0,0,0,0,0,0,0,0,0,0,0,0,0,0,0,0
0EF9 00 00 00 00
0EFD 00 00 00 00
0F01 00 00 00 00
0F05 00 00 00 00         30       DB       0,0,0,0,0,0,0,0,0,0,0,0,0,0,0,0
0F09 00 00 00 00
0F0D 00 00 00 00
0F11 00 00 00 00
0F15 00 00 00 00         30       DB       0,0,0,0,0,0,0,0,0,0,0,0,0,0,0,0
0F19 00 00 00 00
0F1D 00 00 00 00
0F21 00 00 00 00
0F25 00 00 00 00         30       DB       0,0,0,0,0,0,0,0,0,0,0,0,0,0,0,0
0F29 00 00 00 00
0F2D 00 00 00 00
0F31 00 00 00 00
0F35 00 00 00 00         30       DB       0,0,0,0,0,0,0,0,0,0,0,0,0,0,0,0
0F39 00 00 00 00
0F3D 00 00 00 00
0F41 00 00 00 00
0F45 00 00 00 00         30       DB       0,0,0,0,0,0,0,0,0,0,0,0,0,0,0,0
0F49 00 00 00 00
0F4D 00 00 00 00
0F51 00 00 00 00
0F55 00 00 00 00         30       DB       0,0,0,0,0,0,0,0,0,0,0,0,0,0,0,0
0F59 00 00 00 00
0F5D 00 00 00 00
0F61 00 00 00 00
0F65 00 00 00 00         30       DB       0,0,0,0,0,0,0,0,0,0,0,0,0,0,0,0
0F69 00 00 00 00
0F6D 00 00 00 00
0F71 00 00 00 00
0F75 00 00 00 00         30       DB       0,0,0,0,0,0,0,0,0,0,0,0,0,0,0,0
0F79 00 00 00 00
0F7D 00 00 00 00
0F81 00 00 00 00
0F85 00 00 00 00         30       DB       0,0,0,0,0,0,0,0,0,0,0,0,0,0,0,0
0F89 00 00 00 00
0F8D 00 00 00 00
0F91 00 00 00 00
0F95 00 00 00 00         30       DB       0,0,0,0,0,0,0,0,0,0,0,0,0,0,0,0
0F99 00 00 00 00
0F9D 00 00 00 00
0FA1 00 00 00 00
0FA5 00 00 00 00         30       DB       0,0,0,0,0,0,0,0,0,0,0,0,0,0,0,0
0FA9 00 00 00 00
```

```
0FAD  00 00 00 00
0FB1  00 00 00 00
0FB5  00 00 00 00      30      DB      0,0,0,0,0,0,0,0,0,0,0,0,0,0,0,0
0FB9  00 00 00 00
0FBD  00 00 00 00
0FC1  00 00 00 00
0FC5  00 00 00 00      30      DB      0,0,0,0,0,0,0,0,0,0,0,0,0,0,0,0
0FC9  00 00 00 00
0FCD  00 00 00 00
0FD1  00 00 00 00
0FD5  00 00 00 00      30      DB      0,0,0,0,0,0,0,0,0,0,0,0,0,0,0,0
0FD9  00 00 00 00
0FDD  00 00 00 00
0FE1  00 00 00 00
0FE5  00 00 00 00      30      DB      0,0,0,0,0,0,0,0,0,0,0,0,0,0,0,0
0FE9  00 00 00 00
0FED  00 00 00 00
0FF1  00 00 00 00
0FF5  00 00 00 00      30      DB      0,0,0,0,0,0,0,0,0,0,0,0,0,0,0,0
0FF9  00 00 00 00
0FFD  00 00 00 00
1001  00 00 00 00
1005  00 00 00 00      30      DB      0,0,0,0,0,0,0,0,0,0,0,0,0,0,0,0
1009  00 00 00 00
100D  00 00 00 00
1011  00 00 00 00
1015  00 00 00 00      30      DB      0,0,0,0,0,0,0,0,0,0,0,0,0,0,0,0
1019  00 00 00 00
101D  00 00 00 00
1021  00 00 00 00
1025  00 00 00 00      30      DB      0,0,0,0,0,0,0,0,0,0,0,0,0,0,0,0
1029  00 00 00 00
102D  00 00 00 00
1031  00 00 00 00
1035  00 00 00 00      30      DB      0,0,0,0,0,0,0,0,0,0,0,0,0,0,0,0
1039  00 00 00 00
103D  00 00 00 00
1041  00 00 00 00
1045  00 00 00 00      30      DB      0,0,0,0,0,0,0,0,0,0,0,0,0,0,0,0
1049  00 00 00 00
104D  00 00 00 00
1051  00 00 00 00
1055  00 00 00 00      30      DB      0,0,0,0,0,0,0,0,0,0,0,0,0,0,0,0
1059  00 00 00 00
105D  00 00 00 00
1061  00 00 00 00
1065  00 00 00 00      30      DB      0,0,0,0,0,0,0,0,0,0,0,0,0,0,0,0
1069  00 00 00 00
106D  00 00 00 00
1071  00 00 00 00
1075  00 00 00 00      30      DB      0,0,0,0,0,0,0,0,0,0,0,0,0,0,0,0
1079  00 00 00 00
107D  00 00 00 00
1081  00 00 00 00
1085  00 00 00 00      30      DB      0,0,0,0,0,0,0,0,0,0,0,0,0,0,0,0
1089  00 00 00 00
108D  00 00 00 00
1091  00 00 00 00
1095  00 00 00 00      30      DB      0,0,0,0,0,0,0,0,0,0,0,0,0,0,0,0
1099  00 00 00 00
109D  00 00 00 00
10A1  00 00 00 00
10A5  00 00 00 00      30      DB      0,0,0,0,0,0,0,0,0,0,0,0,0,0,0,0
10A9  00 00 00 00
10AD  00 00 00 00
10B1  00 00 00 00
10B5  00 00 00 00      30      DB      0,0,0,0,0,0,0,0,0,0,0,0,0,0,0,0
10B9  00 00 00 00
10BD  00 00 00 00
10C1  00 00 00 00
10C5  00 00 00 00      30      DB      0,0,0,0,0,0,0,0,0,0,0,0,0,0,0,0
10C9  00 00 00 00
10CD  00 00 00 00
10D1  00 00 00 00
10D5  00 00 00 00      30      DB      0,0,0,0,0,0,0,0,0,0,0,0,0,0,0,0
10D9  00 00 00 00
10DD  00 00 00 00
10E1  00 00 00 00
10E5  00 00 00 00      30      DB      0,0,0,0,0,0,0,0,0,0,0,0,0,0,0,0
10E9  00 00 00 00
10ED  00 00 00 00
```

```
10F1 00 00 00 00
10F5 00 00 00 00        30      DB      0,0,0,0,0,0,0,0,0,0,0,0,0,0,0,0
10F9 00 00 00 00
10FD 00 00 00 00
1101 00 00 00 00
1105 00 00 00 00        30      DB      0,0,0,0,0,0,0,0,0,0,0,0,0,0,0,0
1109 00 00 00 00
110D 00 00 00 00
1111 00 00 00 00
1115 00 00 00 00        30      DB      0,0,0,0,0,0,0,0,0,0,0,0,0,0,0,0
1119 00 00 00 00
111D 00 00 00 00
1121 00 00 00 00
1125 00 00 00 00        30      DB      0,0,0,0,0,0,0,0,0,0,0,0,0,0,0,0
1129 00 00 00 00
112D 00 00 00 00
1131 00 00 00 00
1135 00 00 00 00        30      DB      0,0,0,0,0,0,0,0,0,0,0,0,0,0,0,0
1139 00 00 00 00
113D 00 00 00 00
1141 00 00 00 00
1145 00 00 00 00        30      DB      0,0,0,0,0,0,0,0,0,0,0,0,0,0,0,0
1149 00 00 00 00
114D 00 00 00 00
1151 00 00 00 00
1155 00 00 00 00        30      DB      0,0,0,0,0,0,0,0,0,0,0,0,0,0,0,0
1159 00 00 00 00
115D 00 00 00 00
1161 00 00 00 00
1165 00 00 00 00        30      DB      0,0,0,0,0,0,0,0,0,0,0,0,0,0,0,0
1169 00 00 00 00
116D 00 00 00 00
1171 00 00 00 00
1175 00 00 00 00        30      DB      0,0,0,0,0,0,0,0,0,0,0,0,0,0,0,0
1179 00 00 00 00
117D 00 00 00 00
1181 00 00 00 00
1185 00 00 00 00        30      DB      0,0,0,0,0,0,0,0,0,0,0,0,0,0,0,0
1189 00 00 00 00
118D 00 00 00 00
1191 00 00 00 00
1195 00 00 00 00        30      DB      0,0,0,0,0,0,0,0,0,0,0,0,0,0,0,0
1199 00 00 00 00
119D 00 00 00 00
11A1 00 00 00 00
11A5 00 00 00 00        30      DB      0,0,0,0,0,0,0,0,0,0,0,0,0,0,0,0
11A9 00 00 00 00
11AD 00 00 00 00
11B1 00 00 00 00
11B5 00 00 00 00        30      DB      0,0,0,0,0,0,0,0,0,0,0,0,0,0,0,0
11B9 00 00 00 00
11BD 00 00 00 00
11C1 00 00 00 00
11C5 00 00 00 00        30      DB      0,0,0,0,0,0,0,0,0,0,0,0,0,0,0,0
11C9 00 00 00 00
11CD 00 00 00 00
11D1 00 00 00 00
11D5 00 00 00 00        30      DB      0,0,0,0,0,0,0,0,0,0,0,0,0,0,0,0
11D9 00 00 00 00
11DD 00 00 00 00
11E1 00 00 00 00
11E5 00 00 00 00        30      DB      0,0,0,0,0,0,0,0,0,0,0,0,0,0,0,0
11E9 00 00 00 00
11ED 00 00 00 00
11F1 00 00 00 00
11F5 00 00 00 00        30      DB      0,0,0,0,0,0,0,0,0,0,0,0,0,0,0,0
11F9 00 00 00 00
11FD 00 00 00 00
1201 00 00 00 00
1205 00 00 00 00        30      DB      0,0,0,0,0,0,0,0,0,0,0,0,0,0,0,0
1209 00 00 00 00
120D 00 00 00 00
1211 00 00 00 00
1215 00 00 00 00        30      DB      0,0,0,0,0,0,0,0,0,0,0,0,0,0,0,0
1219 00 00 00 00
121D 00 00 00 00
1221 00 00 00 00
1225 00 00 00 00        30      DB      0,0,0,0,0,0,0,0,0,0,0,0,0,0,0,0
1229 00 00 00 00
122D 00 00 00 00
```

```
1231 00 00 00 00
1235 00 00 00 00         30        DB       0,0,0,0,0,0,0,0,0,0,0,0,0,0,0,0
1239 00 00 00 00
123D 00 00 00 00
1241 00 00 00 00
1245 00 00 00 00         30        DB       0,0,0,0,0,0,0,0,0,0,0,0,0,0,0,0
1249 00 00 00 00
124D 00 00 00 00
1251 00 00 00 00
1255 00 00 00 00         30        DB       0,0,0,0,0,0,0,0,0,0,0,0,0,0,0,0
1259 00 00 00 00
125D 00 00 00 00
1261 00 00 00 00
1265 00 00 00 00         30        DB       0,0,0,0,0,0,0,0,0,0,0,0,0,0,0,0
1269 00 00 00 00
126D 00 00 00 00
1271 00 00 00 00
1275 00 00 00 00         30        DB       0,0,0,0,0,0,0,0,0,0,0,0,0,0,0,0
1279 00 00 00 00
127D 00 00 00 00
1281 00 00 00 00
1285 00 00 00 00         30        DB       0,0,0,0,0,0,0,0,0,0,0,0,0,0,0,0
1289 00 00 00 00
128D 00 00 00 00
1291 00 00 00 00
1295 00 00 00 00         30        DB       0,0,0,0,0,0,0,0,0,0,0,0,0,0,0,0
1299 00 00 00 00
129D 00 00 00 00
12A1 00 00 00 00
12A5 00 00 00 00         30        DB       0,0,0,0,0,0,0,0,0,0,0,0,0,0,0,0
12A9 00 00 00 00
12AD 00 00 00 00
12B1 00 00 00 00
12B5 00 00 00 00         30        DB       0,0,0,0,0,0,0,0,0,0,0,0,0,0,0,0
12B9 00 00 00 00
12BD 00 00 00 00
12C1 00 00 00 00
12C5 00 00 00 00         30        DB       0,0,0,0,0,0,0,0,0,0,0,0,0,0,0,0
12C9 00 00 00 00
12CD 00 00 00 00
12D1 00 00 00 00
12D5 00 00 00 00         30        DB       0,0,0,0,0,0,0,0,0,0,0,0,0,0,0,0
12D9 00 00 00 00
12DD 00 00 00 00
12E1 00 00 00 00
12E5 00 00 00 00         30        DB       0,0,0,0,0,0,0,0,0,0,0,0,0,0,0,0
12E9 00 00 00 00
12ED 00 00 00 00
12F1 00 00 00 00
12F5 00 00 00 00         30        DB       0,0,0,0,0,0,0,0,0,0,0,0,0,0,0,0
12F9 00 00 00 00
12FD 00 00 00 00
1301 00 00 00 00
1305 00 00 00 00         30        DB       0,0,0,0,0,0,0,0,0,0,0,0,0,0,0,0
1309 00 00 00 00
130D 00 00 00 00
1311 00 00 00 00
1315 00 00 00 00         30        DB       0,0,0,0,0,0,0,0,0,0,0,0,0,0,0,0
1319 00 00 00 00
131D 00 00 00 00
1321 00 00 00 00
1325 00 00 00 00         30        DB       0,0,0,0,0,0,0,0,0,0,0,0,0,0,0,0
1329 00 00 00 00
132D 00 00 00 00
1331 00 00 00 00
1335 00 00 00 00         30        DB       0,0,0,0,0,0,0,0,0,0,0,0,0,0,0,0
1339 00 00 00 00
133D 00 00 00 00
1341 00 00 00 00
1345 00 00 00 00         30        DB       0,0,0,0,0,0,0,0,0,0,0,0,0,0,0,0
1349 00 00 00 00
134D 00 00 00 00
1351 00 00 00 00
                         31        ;
                         32
                         33        $RESETLN
                         39        ;
                         40                 end SEGMENT INFORMATION ===== PUBLIC SEGMENT NAMES AND VALUES
   SEGMENT NAME     ADDRESS
A480                0000H
```

```
PROC SYMBOL REPORT FOR FILE SHELL.XRF
No Local PROCs

LOCAL SYMBOL REPORT FOR FILE SHELL.XRF
        SYMBOL NAME, Line, Home filename, Home Segment,    Home PROC.

A480                    28      shell.asm       None            None
        -refs- (SEG=None, FILE=shell.asm) 29
ACOLOR                  334     equates.asm     None            None
ACT                     192     ir.asm          A480            None
ACT_KEY1                355     equates.asm     None            None
        -refs- (SEG=None, FILE=equates.asm) 356 357 358 359 360 361 362
               (SEG=A480, FILE=MAIN.ASM) 73 417 458 462
ACT_KEY2                365     equates.asm     None            None
        -refs- (SEG=None, FILE=equates.asm) 366 367 368 369 370 371
               (SEG=A480, FILE=MAIN.ASM) 74 425 460 472
ADDER                   306     MAIN.ASM        A480            None
        -refs- (SEG=A480, FILE=MAIN.ASM) 310
ADJC10                  209     CONTRAST.ASM    None            None
        -refs- (SEG=A480, FILE=CONTRAST.ASM) 215
ADJC15                  213     CONTRAST.ASM    None            None
        -refs- (SEG=A480, FILE=CONTRAST.ASM) 219 223
ADJC20                  216     CONTRAST.ASM    None            None
        -refs- (SEG=A480, FILE=CONTRAST.ASM) 212
ADJC40                  220     CONTRAST.ASM    None            None
ADJC60                  224     CONTRAST.ASM    None            None
ADJCON                  207     CONTRAST.ASM    None            None
        -refs- (SEG=A480, FILE=CONTRAST.ASM) 204 502 519
AFLAG                   90      equates.asm     None            None
        -refs- (SEG=A480, FILE=MAIN.ASM) 732
               (SEG=A480, FILE=CONTRAST.ASM) 534
AVERAGE                 291     MAIN.ASM        A480            None
        -refs- (SEG=A480, FILE=MAIN.ASM) 84
B1EXIT                  209     ir.asm          A480            None
        -refs- (SEG=A480, FILE=ir.asm) 110
BAILOUT                 58      ir.asm          A480            None
        -refs- (SEG=A480, FILE=ir.asm) 50
BCKGND                  335     equates.asm     None            None
BEEPCK                  472     ir.asm          A480            None
        -refs- (SEG=A480, FILE=ir.asm) 481
BEGDEL                  454     equates.asm     None            None
        -refs- (SEG=None, FILE=equates.asm) 456
               (SEG=A480, FILE=MAIN.ASM) 51 233 236 242
               (SEG=A480, FILE=ir.asm) 280 281 286
BEGIN                   64      MAIN.ASM        None            None
        -refs- (SEG=A480, FILE=MAIN.ASM) 112 240 284 917 928
BEGTIM                  263     equates.asm     None            None
        -refs- (SEG=A480, FILE=MAIN.ASM) 51 242
               (SEG=A480, FILE=ir.asm) 286
BFLAG                   91      equates.asm     None            None
        -refs- (SEG=A480, FILE=MAIN.ASM) 733
               (SEG=A480, FILE=CONTRAST.ASM) 532
BINGO                   197     ir.asm          A480            None
        -refs- (SEG=A480, FILE=ir.asm) 469 476
BIT                     0       shell.asm       None            None
.BIT_COUNT              320     equates.asm     None            None
        -refs- (SEG=None, FILE=equates.asm) 321
               (SEG=A480, FILE=ir.asm) 13 57 82 109 211 323
BLAC                    74      TITLE.ASM       None            None
BLACK                   73      TITLE.ASM       None            None
        -refs- (SEG=A480, FILE=TITLE.ASM) 74 215 216 228
BLINK_CTR               327     equates.asm     None            None
        -refs- (SEG=None, FILE=equates.asm) 329
               (SEG=A480, FILE=MAIN.ASM) 135 252 255
BLINK_TC                246     equates.asm     None            None
        -refs- (SEG=A480, FILE=MAIN.ASM) 135 255
BLOOP                   68      MAIN.ASM        None            None
        -refs- (SEG=A480, FILE=MAIN.ASM) 103 108
BLUEB                   81      TITLE.ASM       None            None
BLUEL                   82      TITLE.ASM       None            None
BOX10                   196     TITLE.ASM       None            None
        -refs- (SEG=A480, FILE=TITLE.ASM) 211
BOX20                   201     TITLE.ASM       None            None
        -refs- (SEG=A480, FILE=TITLE.ASM) 195
BOX40                   205     TITLE.ASM       None            None
        -refs- (SEG=A480, FILE=TITLE.ASM) 210
BOX50                   212     TITLE.ASM       None            None
BOX60                   219     TITLE.ASM       None            None
        -refs- (SEG=A480, FILE=TITLE.ASM) 220
```

| | | | | |
|---|---|---|---|---|
| BOX70 | 224 | TITLE.ASM | None | None |
| -refs- | (SEG=A480, FILE=TITLE.ASM) 233 | | | |
| BOX80 | 231 | TITLE.ASM | None | None |
| -refs- | (SEG=A480, FILE=TITLE.ASM) 232 | | | |
| BOXT | 191 | TITLE.ASM | None | None |
| -refs- | (SEG=A480, FILE=TITLE.ASM) 221 | | | |
| BXPUS | 1026 | MAIN.ASM | None | None |
| -refs- | (SEG=A480, FILE=MAIN.ASM) 882 999 | | | |
| BXPUS50 | 1031 | MAIN.ASM | None | None |
| -refs- | (SEG=A480, FILE=MAIN.ASM) 1029 | | | |
| C05 | 754 | MAIN.ASM | None | None |
| -refs- | (SEG=A480, FILE=MAIN.ASM) 751 | | | |
| C08 | 756 | MAIN.ASM | None | None |
| -refs- | (SEG=A480, FILE=MAIN.ASM) 753 | | | |
| C2 | 730 | MAIN.ASM | A480 | None |
| -refs- | (SEG=A480, FILE=MAIN.ASM) 728 | | | |
| C60 | 766 | MAIN.ASM | None | None |
| -refs- | (SEG=A480, FILE=MAIN.ASM) 758 | | | |
| C70 | 770 | MAIN.ASM | A480 | None |
| -refs- | (SEG=A480, FILE=MAIN.ASM) 768 | | | |
| CBLUE | 447 | equates.asm | None | None |
| -refs- | (SEG=None, FILE=equates.asm) 449 | | | |
| | (SEG=A480, FILE=INIT.ASM) 151 152 | | | |
| | (SEG=A480, FILE=CONTRAST.ASM) 107 109 144 150 156 164 | | | |
| | 170 176 182 188 194 199 203 221 237 500 501 | | | |
| | 517 518 | | | |
| CFLAGB | 86 | equates.asm | None | None |
| -refs- | (SEG=A480, FILE=MAIN.ASM) 736 | | | |
| | (SEG=A480, FILE=CONTRAST.ASM) 530 | | | |
| CFLAGG | 77 | equates.asm | None | None |
| -refs- | (SEG=A480, FILE=MAIN.ASM) 735 | | | |
| | (SEG=A480, FILE=CONTRAST.ASM) 529 | | | |
| CFLAGR | 78 | equates.asm | None | None |
| -refs- | (SEG=A480, FILE=MAIN.ASM) 734 | | | |
| | (SEG=A480, FILE=CONTRAST.ASM) 528 | | | |
| CGA | 386 | equates.asm | None | None |
| -refs- | (SEG=A480, FILE=CONTRAST.ASM) 179 | | | |
| CGAB | 179 | equates.asm | None | None |
| -refs- | (SEG=A480, FILE=CONTRAST.ASM) 182 | | | |
| CGAG | 178 | equates.asm | None | None |
| -refs- | (SEG=A480, FILE=CONTRAST.ASM) 181 | | | |
| CGAR | 177 | equates.asm | None | None |
| -refs- | (SEG=A480, FILE=CONTRAST.ASM) 180 | | | |
| CGREEN | 446 | equates.asm | None | None |
| -refs- | (SEG=None, FILE=equates.asm) 447 | | | |
| | (SEG=A480, FILE=INIT.ASM) 149 150 | | | |
| | (SEG=A480, FILE=CONTRAST.ASM) 100 102 143 149 155 163 | | | |
| | 169 175 181 187 193 198 202 217 234 419 420 | | | |
| | 422 498 499 515 516 | | | |
| CLEAR | 719 | MAIN.ASM | None | None |
| -refs- | (SEG=A480, FILE=MAIN.ASM) 482 | | | |
| CLEARON | 412 | equates.asm | None | None |
| -refs- | (SEG=A480, FILE=MAIN.ASM) 155 251 434 457 587 611 720 725 | | | |
| | (SEG=A480, FILE=CONTRAST.ASM) 526 | | | |
| CLIM | 235 | equates.asm | None | None |
| -refs- | (SEG=A480, FILE=MAIN.ASM) 504 944 | | | |
| | (SEG=A480, FILE=CONTRAST.ASM) 29 | | | |
| CLLED | 27 | equates.asm | None | None |
| -refs- | (SEG=A480, FILE=MAIN.ASM) 131 254 724 749 | | | |
| CLRWAIT | 740 | MAIN.ASM | A480 | None |
| CODE | 0 | shell.asm | None | None |
| COLD | 44 | MAIN.ASM | None | None |
| -refs- | (SEG=A480, FILE=MAIN.ASM) 6 | | | |
| COLDF | 424 | equates.asm | None | None |
| -refs- | (SEG=A480, FILE=MAIN.ASM) 59 101 102 | | | |
| COLLIM | 234 | equates.asm | None | None |
| -refs- | (SEG=A480, FILE=MAIN.ASM) 596 | | | |
| | (SEG=A480, FILE=CONTRAST.ASM) 28 | | | |
| COLTAB | 433 | CONTRAST.ASM | None | None |
| -refs- | (SEG=A480, FILE=CONTRAST.ASM) 405 | | | |
| COL_M50 | 618 | MAIN.ASM | None | None |
| -refs- | (SEG=A480, FILE=MAIN.ASM) 611 | | | |
| COL_M60 | 627 | MAIN.ASM | None | None |
| -refs- | (SEG=A480, FILE=MAIN.ASM) 624 | | | |
| COL_M80 | 629 | MAIN.ASM | None | None |
| -refs- | (SEG=A480, FILE=MAIN.ASM) 620 | | | |
| COL_MIN | 610 | MAIN.ASM | None | None |
| -refs- | (SEG=A480, FILE=MAIN.ASM) 484 | | | |
| COL_P50 | 594 | MAIN.ASM | None | None |
| -refs- | (SEG=A480, FILE=MAIN.ASM) 587 | | | |

```
COL_P60              604      MAIN.ASM              None             None
         -refs- (SEG=A480, FILE=MAIN.ASM) 601
COL_P80              606      MAIN.ASM              None             None
         -refs- (SEG=A480, FILE=MAIN.ASM) 597
COL_PLUS             586      MAIN.ASM              None             None
         -refs- (SEG=A480, FILE=MAIN.ASM) 483
COMPUTER1            379      equates.asm           None             None
         -refs- (SEG=None, FILE=equates.asm) 380 381 382 383 384 385 386 387
                (SEG=A480, FILE=MAIN.ASM) 913
                (SEG=A480, FILE=INIT.ASM) 84
COMPUTER2            389      equates.asm           None             None
         -refs- (SEG=None, FILE=equates.asm) 390 391 392 393 394 395 396 397
                (SEG=A480, FILE=INIT.ASM) 85
COMPUTER3            399      equates.asm           None             None
         -refs- (SEG=A480, FILE=INIT.ASM) 86 113
COMSTA               468      equates.asm           None             None
         -refs- (SEG=None, FILE=equates.asm) 469
                (SEG=A480, FILE=MAIN.ASM) 168 876 908 943 1001 1012
CONTAB               313      CONTRAST.ASM          None             None
         -refs- (SEG=A480, FILE=CONTRAST.ASM) 259
CONTINUE             114      MAIN.ASM              None             None
         -refs- (SEG=A480, FILE=MAIN.ASM) 88
CON_20               126      CONTRAST.ASM          None             None
         -refs- (SEG=A480, FILE=CONTRAST.ASM) 131
CON_ADD              44       CONTRAST.ASM          None             None
         -refs- (SEG=A480, FILE=CONTRAST.ASM) 73 94 101 108
CON_M50              533      MAIN.ASM              None             None
         -refs- (SEG=A480, FILE=MAIN.ASM) 528
CON_M80              535      MAIN.ASM              None             None
         -refs- (SEG=A480, FILE=MAIN.ASM) 523
CON_MIN              521      MAIN.ASM              None             None
         -refs- (SEG=A480, FILE=MAIN.ASM) 476
CON_OUT              120      CONTRAST.ASM          None             None
         -refs- (SEG=A480, FILE=CONTRAST.ASM) 96 103 110
CON_P50              515      MAIN.ASM              None             None
         -refs- (SEG=A480, FILE=MAIN.ASM) 510
CON_P80              517      MAIN.ASM              None             None
         -refs- (SEG=A480, FILE=MAIN.ASM) 505
CON_PLUS             502      MAIN.ASM              None             None
         -refs- (SEG=A480, FILE=MAIN.ASM) 475
CPUHS                73       equates.asm           None             None
         -refs- (SEG=A480, FILE=TITLE.ASM) 133 168 173 185 204 217 229 241
CPUVS                74       equates.asm           None             None
CRED                 445      equates.asm           None             None
         -refs- (SEG=None, FILE=equates.asm) 446
                (SEG=A480, FILE=MAIN.ASM) 684 750 825
                (SEG=A480, FILE=INIT.ASM) 147 148
                (SEG=A480, FILE=CONTRAST.ASM) 12 93 95 142 148 154
                       162 168 174 180 186 192 197 201 210 231 272
                       411 412 414 496 497 513 514
CSR                  89       equates.asm           None             None
         -refs- (SEG=None, FILE=equates.asm) 90 91
                (SEG=A480, FILE=MAIN.ASM) 45
CTCLK                21       equates.asm           None             None
         -refs- (SEG=A480, FILE=CONTRAST.ASM) 129 130
CTDATA               19       equates.asm           None             None
         -refs- (SEG=A480, FILE=CONTRAST.ASM) 128
CTOG                 676      MAIN.ASM              None             None
         -refs- (SEG=A480, FILE=MAIN.ASM) 487
CTOG20               683      MAIN.ASM              None             None
         -refs- (SEG=A480, FILE=MAIN.ASM) 678
CTOG50               691      MAIN.ASM              None             None
         -refs- (SEG=A480, FILE=MAIN.ASM) 685
CTXB                 60       equates.asm           None             None
         -refs- (SEG=A480, FILE=CONTRAST.ASM) 111 112
CTXG                 82       equates.asm           None             None
         -refs- (SEG=A480, FILE=CONTRAST.ASM) 104 105
CTXR                 80       equates.asm           None             None
         -refs- (SEG=A480, FILE=CONTRAST.ASM) 97 98
CVIDM                421      equates.asm           None             None
         -refs- (SEG=A480, FILE=MAIN.ASM) 133 207 210
                (SEG=A480, FILE=INIT.ASM) 45
                (SEG=A480, FILE=ir.asm) 227
CWD30                274      CONTRAST.ASM          None             None
         -refs- (SEG=A480, FILE=CONTRAST.ASM) 287
CWD40                282      CONTRAST.ASM          None             None
         -refs- (SEG=A480, FILE=CONTRAST.ASM) 280
CWIPD                258      CONTRAST.ASM          None             None
         -refs- (SEG=A480, FILE=MAIN.ASM) 508 513 526 531 949 987
                (SEG=A480, FILE=CONTRAST.ASM) 249 253
```

| Symbol | Value | File | Col4 | Col5 |
|---|---|---|---|---|
| CWIPER | 452 | equates.asm | None | None |
| -refs- | (SEG=None, FILE=equates.asm) 453 | | | |
| | (SEG=A480, FILE=MAIN.ASM) 503 507 512 522 525 530 946 948 986 | | | |
| | (SEG=A480, FILE=CONTRAST.ASM) 29 248 252 260 267 | | | |
| CYCLOP | 79 | equates.asm | None | None |
| C_A20 | 50 | CONTRAST.ASM | None | None |
| -refs- | (SEG=A480, FILE=CONTRAST.ASM) 59 | | | |
| DATA | 0 | shell.asm | None | None |
| DC20 | 14 | CONTRAST.ASM | None | None |
| -refs- | (SEG=A480, FILE=CONTRAST.ASM) 26 | | | |
| DC30 | 22 | CONTRAST.ASM | None | None |
| -refs- | (SEG=A480, FILE=CONTRAST.ASM) 25 | | | |
| DCLK | 63 | equates.asm | None | None |
| DECB | 175 | equates.asm | None | None |
| -refs- | (SEG=A480, FILE=CONTRAST.ASM) 188 | | | |
| DECFPR | 250 | equates.asm | None | None |
| -refs- | (SEG=A480, FILE=INTER.ASM) 66 | | | |
| DECG | 174 | equates.asm | None | None |
| -refs- | (SEG=A480, FILE=CONTRAST.ASM) 187 | | | |
| DECR | 173 | equates.asm | None | None |
| -refs- | (SEG=A480, FILE=CONTRAST.ASM) 186 | | | |
| DECSTA | 472 | equates.asm | None | None |
| -refs- | (SEG=None, FILE=equates.asm) 474 | | | |
| | (SEG=A480, FILE=MAIN.ASM) 65 93 97 121 122 | | | |
| DEF20 | 785 | MAIN.ASM | None | None |
| -refs- | (SEG=A480, FILE=MAIN.ASM) 797 | | | |
| DEF40 | 790 | MAIN.ASM | None | None |
| -refs- | (SEG=A480, FILE=MAIN.ASM) 788 | | | |
| DEF60 | 794 | MAIN.ASM | None | None |
| -refs- | (SEG=A480, FILE=MAIN.ASM) 792 | | | |
| DEF90 | 811 | MAIN.ASM | None | None |
| -refs- | (SEG=A480, FILE=MAIN.ASM) 803 | | | |
| DEFAULT | 778 | MAIN.ASM | None | None |
| -refs- | (SEG=A480, FILE=MAIN.ASM) 86 | | | |
| DEFCON | 7 | CONTRAST.ASM | None | None |
| -refs- | (SEG=A480, FILE=MAIN.ASM) 762 | | | |
| | (SEG=A480, FILE=TITLE.ASM) 95 115 | | | |
| DELAY | 842 | MAIN.ASM | A480 | None |
| -refs- | (SEG=A480, FILE=MAIN.ASM) 82 742 | | | |
| DELAY600 | 852 | MAIN.ASM | A480 | None |
| DEMO | 47 | equates.asm | None | None |
| -refs- | (SEG=A480, FILE=MAIN.ASM) 54 | | | |
| | (SEG=A480, FILE=TITLE.ASM) 92 247 | | | |
| DFCN10 | 146 | CONTRAST.ASM | None | None |
| -refs- | (SEG=A480, FILE=CONTRAST.ASM) 141 | | | |
| DFCN15 | 152 | CONTRAST.ASM | None | None |
| -refs- | (SEG=A480, FILE=CONTRAST.ASM) 147 | | | |
| DFCN20 | 158 | CONTRAST.ASM | None | None |
| -refs- | (SEG=A480, FILE=CONTRAST.ASM) 153 | | | |
| DFCN25 | 161 | CONTRAST.ASM | None | None |
| -refs- | (SEG=A480, FILE=CONTRAST.ASM) 159 | | | |
| DFCN30 | 166 | CONTRAST.ASM | None | None |
| -refs- | (SEG=A480, FILE=CONTRAST.ASM) 160 | | | |
| DFCN35 | 172 | CONTRAST.ASM | None | None |
| -refs- | (SEG=A480, FILE=CONTRAST.ASM) 167 | | | |
| DFCN40 | 178 | CONTRAST.ASM | None | None |
| -refs- | (SEG=A480, FILE=CONTRAST.ASM) 173 | | | |
| DFCN45 | 184 | CONTRAST.ASM | None | None |
| -refs- | (SEG=A480, FILE=CONTRAST.ASM) 179 | | | |
| DFCN50 | 190 | CONTRAST.ASM | None | None |
| -refs- | (SEG=A480, FILE=CONTRAST.ASM) 185 | | | |
| DFCN55 | 196 | CONTRAST.ASM | None | None |
| -refs- | (SEG=A480, FILE=CONTRAST.ASM) 191 | | | |
| DFCN90 | 200 | CONTRAST.ASM | None | None |
| -refs- | (SEG=A480, FILE=CONTRAST.ASM) 145 151 157 165 171 177 183 189 195 | | | |
| DIGSEL | 57 | equates.asm | None | None |
| DOFF_INT | 47 | INTER.ASM | A480 | None |
| -refs- | (SEG=A480, FILE=MAIN.ASM) 10 | | | |
| DOF_I04 | 59 | INTER.ASM | None | None |
| -refs- | (SEG=A480, FILE=INTER.ASM) 54 | | | |
| DOF_I08 | 67 | INTER.ASM | None | None |
| -refs- | (SEG=A480, FILE=INTER.ASM) 58 | | | |
| DOF_I12 | 69 | INTER.ASM | None | None |
| -refs- | (SEG=A480, FILE=INTER.ASM) 71 | | | |
| DOF_I16 | 73 | INTER.ASM | None | None |
| -refs- | (SEG=A480, FILE=INTER.ASM) 60 | | | |

```
DON_I80              89      INTER.ASM          A480      None
       -refs- (SEG=A480, FILE=INTER.ASM) 85
DON_INT              81      INTER.ASM          A480      None
       -refs- (SEG=A480, FILE=MAIN.ASM) 13
EGA                 385      equates.asm        None      None
       -refs- (SEG=A480, FILE=CONTRAST.ASM) 173
EGA40               395      equates.asm        None      None
EGAB                190      equates.asm        None      None
       -refs- (SEG=A480, FILE=CONTRAST.ASM) 176
EGAG                189      equates.asm        None      None
       -refs- (SEG=A480, FILE=CONTRAST.ASM) 175
EGAR                188      equates.asm        None      None
       -refs- (SEG=A480, FILE=CONTRAST.ASM) 174
EX100               236      TITLE.ASM          None      None
       -refs- (SEG=A480, FILE=TITLE.ASM) 160
EX120               238      TITLE.ASM          None      None
       -refs- (SEG=A480, FILE=TITLE.ASM) 244
EX140               242      TITLE.ASM          None      None
       -refs- (SEG=A480, FILE=TITLE.ASM) 243
EXIT                327      ir.asm             None      None
       -refs- (SEG=A480, FILE=ir.asm) 309 310
F                   311      CONTRAST.ASM       None      None
       -refs- (SEG=A480, FILE=CONTRAST.ASM) 316 316 317 317 318 318
              319 319 320 320 321 321 322 322 323 323 324
              324 325 325 326 326 327 327 328 328 329 329
              330 330 331 331 332 332 333 333 334 334 335
              335 336 336 337 337 338 338 339 339 340 340
              341 341 342 342 343 343 344 344 345 345 346
              346 347 347 348 348 349 349 350 350 351 351
              352 352 353 353 354 354 355 355 357 357 358
              358 359 359 360 360 361 361 362 362 363 363
              364 364 365 365 366 366 367 367 368 368 369
              369 370 370 371 371 372 372 373 373 374 374
              375 375 376 376 377 377 378 378 379 379 380
              380 381 381 382 382 383 383 384 384 385 385
              386 386 387 387 388 388 389 389 390 390 391
              391 392 392 393 393 394 394 395 395 396 396
FAKELENGTH           27      ropti.asm          None      None
FIN                 320      ir.asm             A480      None
       -refs- (SEG=A480, FILE=ir.asm) 315
FIXC                244      CONTRAST.ASM       None      None
       -refs- (SEG=A480, FILE=CONTRAST.ASM) 214
FIXC50              251      CONTRAST.ASM       None      None
       -refs- (SEG=A480, FILE=CONTRAST.ASM) 246
FLAGCHEK            456      MAIN.ASM           None      None
       -refs- (SEG=A480, FILE=MAIN.ASM) 246
FLCK20              461      MAIN.ASM           None      None
       -refs- (SEG=A480, FILE=MAIN.ASM) 457
FREQ                343      equates.asm        None      None
       -refs- (SEG=None, FILE=equates.asm) 345
              (SEG=A480, FILE=MAIN.ASM) 316 806
FREQ0               329      equates.asm        None      None
       -refs- (SEG=None, FILE=equates.asm) 330 336
              (SEG=A480, FILE=MAIN.ASM) 297 298 300 781
              (SEG=A480, FILE=INIT.ASM) 50 61
FREQ1               336      equates.asm        None      None
       -refs- (SEG=None, FILE=equates.asm) 337
              (SEG=A480, FILE=MAIN.ASM) 296 297
FREQ2               337      equates.asm        None      None
       -refs- (SEG=None, FILE=equates.asm) 338
              (SEG=A480, FILE=MAIN.ASM) 295 296
FREQ3               338      equates.asm        None      None
       -refs- (SEG=None, FILE=equates.asm) 339
              (SEG=A480, FILE=MAIN.ASM) 294 295
FREQ4               339      equates.asm        None      None
       -refs- (SEG=None, FILE=equates.asm) 340
              (SEG=A480, FILE=MAIN.ASM) 293 294
FREQ5               340      equates.asm        None      None
       -refs- (SEG=None, FILE=equates.asm) 341
              (SEG=A480, FILE=MAIN.ASM) 292 293
FREQ6               341      equates.asm        None      None
       -refs- (SEG=None, FILE=equates.asm) 342
              (SEG=A480, FILE=MAIN.ASM) 291 292
FREQ7               342      equates.asm        None      None
       -refs- (SEG=None, FILE=equates.asm) 343
              (SEG=A480, FILE=MAIN.ASM) 291 796
FREQ_DEF           1046      MAIN.ASM           None      None
       -refs- (SEG=A480, FILE=MAIN.ASM) 805
```

| | | | | |
|---|---|---|---|---|
| G | 310 | CONTRAST.ASM | None | None |

```
    -refs- (SEG=A480, FILE=CONTRAST.ASM) 315 315 317 317 318 318
                                         319 319 320 320 321 321 322 322 323 323 324
                                         324 325 325 326 326 327 327 328 328 329 329
                                         330 330 331 331 332 332 333 333 334 334 335
                                         335 336 336 337 337 338 338 339 339 340 340
                                         341 341 342 342 343 343 344 344 345 345 346
                                         346 347 347 348 348 349 349 350 350 351 351
                                         352 352 353 353 354 354 355 355 357 357 358
                                         358 359 359 360 360 361 361 362 362 363 363
                                         364 364 365 365 366 366 367 367 368 368 369
                                         369 370 370 371 371 372 372 373 373 374 374
                                         375 375 376 376 377 377 378 378 379 379 380
                                         380 381 381 382 382 383 383 384 384 385 385
                                         386 386 387 387 388 388 389 389 390 390 391
                                         391 392 392 393 393 394 394 395 395 396 396
                                         434 434 436 436 437 437 438 438 439 439 440
                                         440 441 441 442 442 443 443 444 444 445 445
                                         446 446 447 447 448 448 449 449 450 450 451
                                         451 452 452 453 453 454 454 455 455 456 456
                                         457 457 458 458 459 459 461 461 462 462 463
                                         463 464 464 465 465 466 466 467 467 468 468
                                         469 469 470 470 471 471 472 472 473 473 474
                                         474 475 475 476 476
                   (SEG=A480, FILE=CONTRAST.ASM) 477 477 478 478 479 479
                                         480 480 481 481 482 482 483 483 484 484 485
                                         485
```

| | | | | |
|---|---|---|---|---|
| GREENB | 79 | TITLE.ASM | None | None |
| GREENL | 80 | TITLE.ASM | None | None |
| HBEAT | 430 | equates.asm | None | None |

```
    -refs- (SEG=None, FILE=equates.asm) 431
           (SEG=A480, FILE=MAIN.ASM) 159 199
           (SEG=A480, FILE=ir.asm) 225
```

| | | | | |
|---|---|---|---|---|
| HBPRE | 252 | equates.asm | None | None |

```
    -refs- (SEG=A480, FILE=MAIN.ASM) 157
           (SEG=A480, FILE=ir.asm) 226
```

| | | | | |
|---|---|---|---|---|
| HDEC | 50 | equates.asm | None | None |

```
    -refs- (SEG=A480, FILE=MAIN.ASM) 62 92 100 120 127
           (SEG=A480, FILE=INIT.ASM) 43
           (SEG=A480, FILE=TITLE.ASM) 131
```

| | | | | |
|---|---|---|---|---|
| HERB | 198 | equates.asm | None | None |

```
    -refs- (SEG=A480, FILE=CONTRAST.ASM) 199
```

| | | | | |
|---|---|---|---|---|
| HERCULES | 387 | equates.asm | None | None |

```
    -refs- (SEG=A480, FILE=MAIN.ASM) 268 550
           (SEG=A480, FILE=INIT.ASM) 110
```

| | | | | |
|---|---|---|---|---|
| HERG | 197 | equates.asm | None | None |

```
    -refs- (SEG=A480, FILE=CONTRAST.ASM) 198
```

| | | | | |
|---|---|---|---|---|
| HERR | 196 | equates.asm | None | None |

```
    -refs- (SEG=A480, FILE=CONTRAST.ASM) 197
```

| | | | | |
|---|---|---|---|---|
| HGRAP | 396 | equates.asm | None | None |

```
    -refs- (SEG=A480, FILE=MAIN.ASM) 549
```

| | | | | |
|---|---|---|---|---|
| HNORMAL | 385 | MAIN.ASM | A480 | None |

```
    -refs- (SEG=A480, FILE=MAIN.ASM) 380 381
```

| | | | | |
|---|---|---|---|---|
| HOFF | 59 | equates.asm | None | None |

```
    -refs- (SEG=A480, FILE=MAIN.ASM) 56 70
           (SEG=A480, FILE=INTER.ASM) 74 88
```

| | | | | |
|---|---|---|---|---|
| HPDCP | 161 | equates.asm | None | None |

```
    -refs- (SEG=A480, FILE=MAIN.ASM) 638
```

| | | | | |
|---|---|---|---|---|
| HPDCS | 162 | equates.asm | None | None |

```
    -refs- (SEG=A480, FILE=MAIN.ASM) 641
           (SEG=A480, FILE=INIT.ASM) 192
```

| | | | | |
|---|---|---|---|---|
| HSAH | 34 | equates.asm | None | None |
| HSIN | 45 | equates.asm | None | None |

```
    -refs- (SEG=A480, FILE=MAIN.ASM) 226
           (SEG=A480, FILE=ir.asm) 262
           (SEG=A480, FILE=TITLE.ASM) 116 148
```

| | | | | |
|---|---|---|---|---|
| HSON | 60 | TITLE.ASM | None | None |

```
    -refs- (SEG=A480, FILE=TITLE.ASM) 132 167 172 184 203 216 228 240
```

| | | | | |
|---|---|---|---|---|
| HSYNC | 375 | equates.asm | None | None |

```
    -refs- (SEG=A480, FILE=TITLE.ASM) 117 151 156
```

| | | | | |
|---|---|---|---|---|
| HSYNC_CNT | 79 | MAIN.ASM | A480 | None |

```
    -refs- (SEG=A480, FILE=MAIN.ASM) 85
```

| | | | | |
|---|---|---|---|---|
| H_M20 | 375 | MAIN.ASM | None | None |
| H_M30 | 377 | MAIN.ASM | None | None |
| H_MAX | 349 | equates.asm | None | None |

```
    -refs- (SEG=None, FILE=equates.asm) 351
           (SEG=A480, FILE=MAIN.ASM) 378 381 653 658
           (SEG=A480, FILE=INIT.ASM) 140
```

| | | | | |
|---|---|---|---|---|
| H_MINUS | 496 | MAIN.ASM | None | None |

```
    -refs- (SEG=A480, FILE=MAIN.ASM) 465
```

| | | | | |
|---|---|---|---|---|
| H_MOVE | 371 | MAIN.ASM | A480 | None |

```
              -refs- (SEG=A480, FILE=MAIN.ASM) 492 498 644 660 824
                     (SEG=A480, FILE=CONTRAST.ASM) 507 520
H_PLUS              490         MAIN.ASM         None         None
              -refs- (SEG=A480, FILE=MAIN.ASM) 479
H_POS               345         equates.asm      None         None
              -refs- (SEG=None, FILE=equates.asm) 346
                     (SEG=A480, FILE=MAIN.ASM) 371 378 379 382 385 393 491
                     497 638 641 652 657
                     (SEG=A480, FILE=INIT.ASM) 137
                     (SEG=A480, FILE=CONTRAST.ASM) 503 506 509
IDEND              1021         MAIN.ASM         A480         None
              -refs- (SEG=A480, FILE=MAIN.ASM) 1009
IDMESG             1016         MAIN.ASM         None         None
              -refs- (SEG=A480, FILE=MAIN.ASM) 997 1009
ILLEG               478         ir.asm           A480         None
              -refs- (SEG=A480, FILE=ir.asm) 353 359 367 373 376 390 394
                     404 408 415 419 433 437 444 448 461
INDEX               456         equates.asm      None         None
              -refs- (SEG=None, FILE=equates.asm) 459
                     (SEG=A480, FILE=MAIN.ASM) 87 553 558 571 784 810
                     (SEG=A480, FILE=INIT.ASM) 24 28 34 39 44 48
                     (SEG=A480, FILE=TITLE.ASM) 110
INIT90              129         INIT.ASM         None         None
INIT95              153         INIT.ASM         None         None
              -refs- (SEG=A480, FILE=INIT.ASM) 145
INITIALIZATION       71         MAIN.ASM         A480         None
INITM20              30         INIT.ASM         None         None
              -refs- (SEG=A480, FILE=INIT.ASM) 25
INITM22              36         INIT.ASM         None         None
              -refs- (SEG=A480, FILE=INIT.ASM) 33
INITM25              41         INIT.ASM         None         None
              -refs- (SEG=A480, FILE=INIT.ASM) 31
INITM30              47         INIT.ASM         None         None
              -refs- (SEG=A480, FILE=INIT.ASM) 27 29 35 38 40 42 43
INITM35              52         INIT.ASM         None         None
              -refs- (SEG=A480, FILE=INIT.ASM) 59
INITM40              79         INIT.ASM         None         None
              -refs- (SEG=A480, FILE=INIT.ASM) 76
INITM50              89         INIT.ASM         None         None
              -refs- (SEG=A480, FILE=INIT.ASM) 87
INITM65             108         INIT.ASM         None         None
              -refs- (SEG=A480, FILE=INIT.ASM) 101 103
INITM68             112         INIT.ASM         None         None
              -refs- (SEG=A480, FILE=INIT.ASM) 109
INITM70             118         INIT.ASM         None         None
              -refs- (SEG=A480, FILE=INIT.ASM) 114 116
INITM80             123         INIT.ASM         None         None
              -refs- (SEG=A480, FILE=INIT.ASM) 125
INITMODE             23         INIT.ASM         None         None
              -refs- (SEG=A480, FILE=MAIN.ASM) 188 555 560 573 761
                     (SEG=A480, FILE=TITLE.ASM) 113
INIT_IR_INT           9         ir.asm           A480         None
              -refs- (SEG=A480, FILE=MAIN.ASM) 156
INIT_TAB            157         INIT.ASM         None         None
              -refs- (SEG=A480, FILE=INIT.ASM) 49
IN_BITS             409         equates.asm      None         None
              -refs- (SEG=A480, FILE=ir.asm) 10 52 56 74 324
IN_PROGRESS          62         ir.asm           A480         None
              -refs- (SEG=A480, FILE=ir.asm) 52
IRC_120             240         ir.asm           None         None
              -refs- (SEG=A480, FILE=ir.asm) 230
IRC_140             246         ir.asm           None         None
              -refs- (SEG=A480, FILE=ir.asm) 241
IRC_145             249         ir.asm           None         None
              -refs- (SEG=A480, FILE=ir.asm) 232
IRC_150             251         ir.asm           None         None
              -refs- (SEG=A480, FILE=ir.asm) 235
IRC_155             255         ir.asm           None         None
              -refs- (SEG=A480, FILE=ir.asm) 252
IRC_160             261         ir.asm           None         None
              -refs- (SEG=A480, FILE=ir.asm) 265
IRC_165             264         ir.asm           None         None
              -refs- (SEG=A480, FILE=ir.asm) 262
IRC_170             275         ir.asm           None         None
IRC_173             279         ir.asm           None         None
              -refs- (SEG=A480, FILE=ir.asm) 277
IRC_175             285         ir.asm           None         None
              -refs- (SEG=A480, FILE=ir.asm) 278
IRC_177             287         ir.asm           None         None
              -refs- (SEG=A480, FILE=ir.asm) 282
```

```
IRC_180              308       ir.asm            None           None
     -refs- (SEG=A480, FILE=ir.asm) 223 227 238 244 250 254 284 294 295
IRC_185              314       ir.asm            None           None
     -refs- (SEG=A480, FILE=ir.asm) 296
IR_ACTION_TABLE      351       ir.asm            A480           None
     -refs- (SEG=A480, FILE=ir.asm) 191
IR_BYTE              319       equates.asm       None           None
     -refs- (SEG=None, FILE=equates.asm) 320
            (SEG=A480, FILE=ir.asm) 14 200 320
IR_COUNTER_INT       217       ir.asm            None           None
     -refs- (SEG=A480, FILE=MAIN.ASM) 19
IR_INTERRUPT         20        ir.asm            A480           None
     -refs- (SEG=A480, FILE=MAIN.ASM) 16
KBCOL                362       equates.asm       None           None
     -refs- (SEG=A480, FILE=MAIN.ASM) 470
KCLEAR               361       equates.asm       None           None
     -refs- (SEG=A480, FILE=MAIN.ASM) 469
            (SEG=A480, FILE=ir.asm) 356
KCOLMIN              359       equates.asm       None           None
     -refs- (SEG=A480, FILE=MAIN.ASM) 467
            (SEG=A480, FILE=ir.asm) 401
KCOLPLUS             358       equates.asm       None           None
     -refs- (SEG=A480, FILE=MAIN.ASM) 466
            (SEG=A480, FILE=ir.asm) 430
KCONMIN              369       equates.asm       None           None
     -refs- (SEG=A480, FILE=MAIN.ASM) 476
            (SEG=A480, FILE=ir.asm) 383
KCONPLUS             368       equates.asm       None           None
     -refs- (SEG=A480, FILE=MAIN.ASM) 475
            (SEG=A480, FILE=ir.asm) 412
KEY1                 9         equates.asm       None           None
     -refs- (SEG=A480, FILE=MAIN.ASM) 542 740
KEY2                 10        equates.asm       None           None
     -refs- (SEG=A480, FILE=MAIN.ASM) 578 670
KEYOUT               470       equates.asm       None           None
     -refs- (SEG=None, FILE=equates.asm) 472
            (SEG=A480, FILE=MAIN.ASM) 166 879 888 889
            (SEG=A480, FILE=ir.asm) 490
KHMINUS              357       equates.asm       None           None
     -refs- (SEG=A480, FILE=MAIN.ASM) 465
            (SEG=A480, FILE=ir.asm) 452
KHPLUS               366       equates.asm       None           None
     -refs- (SEG=A480, FILE=MAIN.ASM) 479
            (SEG=A480, FILE=ir.asm) 423
KRVIDEO              371       equates.asm       None           None
     -refs- (SEG=A480, FILE=MAIN.ASM) 478
            (SEG=A480, FILE=ir.asm) 370
KSYNC                370       equates.asm       None           None
     -refs- (SEG=A480, FILE=MAIN.ASM) 477
            (SEG=A480, FILE=ir.asm) 441
KTEXT                360       equates.asm       None           None
     -refs- (SEG=A480, FILE=MAIN.ASM) 468
            (SEG=A480, FILE=ir.asm) 458
KVMINUS              367       equates.asm       None           None
     -refs- (SEG=A480, FILE=MAIN.ASM) 474
            (SEG=A480, FILE=ir.asm) 386
KVPLUS               356       equates.asm       None           None
     -refs- (SEG=A480, FILE=MAIN.ASM) 464
            (SEG=A480, FILE=ir.asm) 379
LASTH                324       equates.asm       None           None
     -refs- (SEG=None, FILE=equates.asm) 325
            (SEG=A480, FILE=ir.asm) 16 125 143 202 205
LASTL                323       equates.asm       None           None
     -refs- (SEG=None, FILE=equates.asm) 324
            (SEG=A480, FILE=ir.asm) 15 135 201 204
LDFCN                140       CONTRAST.ASM      None           None
     -refs- (SEG=A480, FILE=MAIN.ASM) 190 574
            (SEG=A480, FILE=TITLE.ASM) 114
LENGTH               19        ropti.asm         None           None
LOOP2                843       MAIN.ASM          A480           None
     -refs- (SEG=A480, FILE=MAIN.ASM) 845
LOOP3                844       MAIN.ASM          A480           None
LOOP4                847       MAIN.ASM          A480           None
LOOP7                853       MAIN.ASM          A480           None
     -refs- (SEG=A480, FILE=MAIN.ASM) 854
LVSY                 423       equates.asm       None           None
     -refs- (SEG=A480, FILE=ir.asm) 232 234 241 243
MACFPR               248       equates.asm       None           None
     -refs- (SEG=A480, FILE=MAIN.ASM) 75
```

| | | (SEG=A480, FILE=INTER.ASM) 51 | | |
|---|---|---|---|---|
| MACFRA | 325 | equates.asm | None | None |
| -refs- | (SEG=None, FILE=equates.asm) 327 | | | |
| | (SEG=A480, FILE=MAIN.ASM) 75 | | | |
| | (SEG=A480, FILE=INTER.ASM) 51 66 83 84 | | | |
| MAC_II | 380 | equates.asm | None | None |
| -refs- | (SEG=A480, FILE=MAIN.ASM) 221 | | | |
| | (SEG=A480, FILE=INTER.ASM) 54 | | | |
| | (SEG=A480, FILE=CONTRAST.ASM) 141 | | | |
| | (SEG=A480, FILE=ir.asm) 252 | | | |
| MAC_SE | 384 | equates.asm | None | None |
| -refs- | (SEG=A480, FILE=MAIN.ASM) 270 648 | | | |
| | (SEG=A480, FILE=CONTRAST.ASM) 167 | | | |
| MAIN10 | 205 | MAIN.ASM | None | None |
| -refs- | (SEG=A480, FILE=MAIN.ASM) 203 | | | |
| MAIN30 | 214 | MAIN.ASM | None | None |
| -refs- | (SEG=A480, FILE=MAIN.ASM) 207 209 | | | |
| MAIN35 | 222 | MAIN.ASM | None | None |
| -refs- | (SEG=A480, FILE=MAIN.ASM) 220 | | | |
| MAIN40 | 225 | MAIN.ASM | None | None |
| -refs- | (SEG=A480, FILE=MAIN.ASM) 229 | | | |
| MAIN50 | 228 | MAIN.ASM | None | None |
| -refs- | (SEG=A480, FILE=MAIN.ASM) 226 | | | |
| MAIN60 | 232 | MAIN.ASM | None | None |
| -refs- | (SEG=A480, FILE=MAIN.ASM) 230 | | | |
| MAIN65 | 239 | MAIN.ASM | None | None |
| -refs- | (SEG=A480, FILE=MAIN.ASM) 237 | | | |
| MAIN70 | 241 | MAIN.ASM | None | None |
| -refs- | (SEG=A480, FILE=MAIN.ASM) 231 | | | |
| MAIN80 | 244 | MAIN.ASM | None | None |
| -refs- | (SEG=A480, FILE=MAIN.ASM) 221 238 | | | |
| MAINTOP | 196 | MAIN.ASM | A480 | None |
| -refs- | (SEG=A480, FILE=MAIN.ASM) 217 250 251 252 256 | | | |
| MAXDAC | 227 | equates.asm | None | None |
| -refs- | (SEG=A480, FILE=CONTRAST.ASM) 79 | | | |
| MCK100 | 912 | MAIN.ASM | None | None |
| -refs- | (SEG=A480, FILE=MAIN.ASM) 907 | | | |
| MCK120 | 919 | MAIN.ASM | None | None |
| -refs- | (SEG=A480, FILE=MAIN.ASM) 915 | | | |
| MCK130 | 924 | MAIN.ASM | None | None |
| -refs- | (SEG=A480, FILE=MAIN.ASM) 921 | | | |
| MCK140 | 927 | MAIN.ASM | None | None |
| -refs- | (SEG=A480, FILE=MAIN.ASM) 922 923 | | | |
| MCK150 | 930 | MAIN.ASM | None | None |
| -refs- | (SEG=A480, FILE=MAIN.ASM) 926 | | | |
| MCK20 | 866 | MAIN.ASM | None | None |
| -refs- | (SEG=A480, FILE=MAIN.ASM) 863 | | | |
| MCK200 | 933 | MAIN.ASM | None | None |
| -refs- | (SEG=A480, FILE=MAIN.ASM) 896 | | | |
| MCK300 | 937 | MAIN.ASM | None | None |
| -refs- | (SEG=A480, FILE=MAIN.ASM) 877 | | | |
| MCK400 | 941 | MAIN.ASM | None | None |
| -refs- | (SEG=A480, FILE=MAIN.ASM) 938 | | | |
| MCK430 | 982 | MAIN.ASM | None | None |
| MCK450 | 985 | MAIN.ASM | None | None |
| -refs- | (SEG=A480, FILE=MAIN.ASM) 952 | | | |
| MCK50 | 875 | MAIN.ASM | None | None |
| -refs- | (SEG=A480, FILE=MAIN.ASM) 864 872 | | | |
| MCK500 | 989 | MAIN.ASM | None | None |
| -refs- | (SEG=A480, FILE=MAIN.ASM) 935 939 | | | |
| MCK60 | 886 | MAIN.ASM | None | None |
| -refs- | (SEG=A480, FILE=MAIN.ASM) 883 | | | |
| MCK70 | 893 | MAIN.ASM | None | None |
| -refs- | (SEG=A480, FILE=MAIN.ASM) 880 884 | | | |
| MCK80 | 906 | MAIN.ASM | None | None |
| -refs- | (SEG=A480, FILE=MAIN.ASM) 895 | | | |
| MCK900 | 992 | MAIN.ASM | None | None |
| -refs- | (SEG=A480, FILE=MAIN.ASM) 894 910 942 945 | | | |
| MCOLOR | 333 | equates.asm | None | None |
| MIIB | 202 | equates.asm | None | None |
| -refs- | (SEG=A480, FILE=CONTRAST.ASM) 144 | | | |
| MIIG | 201 | equates.asm | None | None |
| -refs- | (SEG=A480, FILE=CONTRAST.ASM) 143 | | | |
| MIIR | 200 | equates.asm | None | None |
| -refs- | (SEG=A480, FILE=CONTRAST.ASM) 142 | | | |
| MINTIT | 69 | TITLE.ASM | None | None |
| -refs- | (SEG=A480, FILE=TITLE.ASM) 118 | | | |
| MODE8C | 230 | equates.asm | None | None |
| -refs- | (SEG=A480, FILE=CONTRAST.ASM) 496 498 500 | | | |
| MODECHEK | 859 | MAIN.ASM | None | None |
| -refs- | (SEG=A480, FILE=MAIN.ASM) 247 | | | |

| Symbol | Value | File | Seg | Other |
|---|---|---|---|---|
| MSEB | 194 | equates.asm | None | None |
| -refs- | (SEG=A480, FILE=CONTRAST.ASM) 170 | | | |
| MSEG | 193 | equates.asm | None | None |
| -refs- | (SEG=A480, FILE=CONTRAST.ASM) 169 | | | |
| MSER | 192 | equates.asm | None | None |
| -refs- | (SEG=A480, FILE=CONTRAST.ASM) 168 | | | |
| NCSU1 | 54 | equates.asm | None | None |
| -refs- | (SEG=A480, FILE=MAIN.ASM) 326 338 353 365 389 401 | | | |
| NO400LNS | 581 | MAIN.ASM | A480 | None |
| -refs- | (SEG=A480, FILE=MAIN.ASM) 570 | | | |
| NOFLAGS1 | 472 | MAIN.ASM | A480 | None |
| -refs- | (SEG=A480, FILE=MAIN.ASM) 463 | | | |
| NOFLAGS2 | 481 | MAIN.ASM | A480 | None |
| -refs- | (SEG=A480, FILE=MAIN.ASM) 473 | | | |
| NOISE | 74 | ir.asm | A480 | None |
| NOMODE | 453 | equates.asm | None | None |
| -refs- | (SEG=None, FILE=equates.asm) 454 | | | |
| | (SEG=A480, FILE=MAIN.ASM) 105 107 281 | | | |
| | (SEG=A480, FILE=TITLE.ASM) 248 | | | |
| NORVID | 30 | equates.asm | None | None |
| -refs- | (SEG=A480, FILE=MAIN.ASM) 139 539 728 730 760 767 769 | | | |
| | (SEG=A480, FILE=TITLE.ASM) 112 | | | |
| NOSEND | 476 | ir.asm | A480 | None |
| -refs- | (SEG=A480, FILE=ir.asm) 472 | | | |
| NOT0 | 101 | ir.asm | A480 | None |
| -refs- | (SEG=A480, FILE=ir.asm) 84 | | | |
| NOT1 | 109 | ir.asm | A480 | None |
| NO_CARRY | 310 | MAIN.ASM | A480 | None |
| -refs- | (SEG=A480, FILE=MAIN.ASM) 308 | | | |
| NO_MIN | 381 | MAIN.ASM | A480 | None |
| -refs- | (SEG=A480, FILE=MAIN.ASM) 376 | | | |
| NO_REPEAT | 479 | ir.asm | A480 | None |
| -refs- | (SEG=A480, FILE=ir.asm) 349 442 459 | | | |
| NO_REPEAT2 | 348 | ir.asm | A480 | None |
| -refs- | (SEG=A480, FILE=ir.asm) 357 363 371 | | | |
| NSYNCS | 351 | equates.asm | None | None |
| -refs- | (SEG=A480, FILE=MAIN.ASM) 181 185 189 262 | | | |
| | (SEG=A480, FILE=INIT.ASM) 26 32 | | | |
| | (SEG=A480, FILE=ir.asm) 253 270 283 | | | |
| NU1WR | 25 | equates.asm | None | None |
| -refs- | (SEG=A480, FILE=MAIN.ASM) 327 329 335 337 354 356 362 | | | |
| | 364 390 392 398 400 | | | |
| NUMNO | 260 | equates.asm | None | None |
| -refs- | (SEG=A480, FILE=MAIN.ASM) 281 | | | |
| | (SEG=A480, FILE=TITLE.ASM) 248 | | | |
| NVGASY | 36 | equates.asm | None | None |
| -refs- | (SEG=A480, FILE=MAIN.ASM) 664 | | | |
| OK | 82 | ir.asm | A480 | None |
| -refs- | (SEG=A480, FILE=ir.asm) 70 | | | |
| OLDBEA | 431 | equates.asm | None | None |
| -refs- | (SEG=None, FILE=equates.asm) 432 | | | |
| | (SEG=A480, FILE=MAIN.ASM) 160 202 218 | | | |
| OLIB | 206 | equates.asm | None | None |
| -refs- | (SEG=A480, FILE=CONTRAST.ASM) 164 | | | |
| OLIG | 205 | equates.asm | None | None |
| -refs- | (SEG=A480, FILE=CONTRAST.ASM) 163 | | | |
| OLIR | 204 | equates.asm | None | None |
| -refs- | (SEG=A480, FILE=CONTRAST.ASM) 162 | | | |
| P6 | 76 | equates.asm | None | None |
| -refs- | (SEG=None, FILE=equates.asm) 77 78 79 80 82 84 86 87 | | | |
| PCOLOR | 330 | equates.asm | None | None |
| -refs- | (SEG=None, FILE=equates.asm) 333 334 335 | | | |
| PCONVAL | 304 | equates.asm | None | None |
| -refs- | (SEG=A480, FILE=MAIN.ASM) 149 | | | |
| PHIGH | 56 | TITLE.ASM | None | None |
| PLL_CHNG | 322 | MAIN.ASM | A480 | None |
| -refs- | (SEG=A480, FILE=MAIN.ASM) 643 821 | | | |
| PLL_HI | 348 | equates.asm | None | None |
| -refs- | (SEG=None, FILE=equates.asm) 349 | | | |
| | (SEG=A480, FILE=MAIN.ASM) 347 820 | | | |
| PLL_LOW | 347 | equates.asm | None | None |
| -refs- | (SEG=None, FILE=equates.asm) 348 | | | |
| | (SEG=A480, FILE=MAIN.ASM) 322 330 635 637 640 | | | |
| | (SEG=A480, FILE=INIT.ASM) 131 | | | |
| POL_CH | 280 | MAIN.ASM | None | None |
| -refs- | (SEG=A480, FILE=MAIN.ASM) 265 275 | | | |
| PROXIMA | 16 | shell.asm | None | None |
| RAMEND | 474 | equates.asm | None | None |

```
                   -refs- (SEG=A480, FILE=MAIN.ASM) 48 72
RCHAR               419        equates.asm        None        None
                   -refs- (SEG=A480, FILE=MAIN.ASM) 861 867 894 942
RECLEAR             482        MAIN.ASM           A480        None
                   -refs- (SEG=A480, FILE=MAIN.ASM) 469
RECOLM              484        MAIN.ASM           A480        None
                   -refs- (SEG=A480, FILE=MAIN.ASM) 467
RECOLP              483        MAIN.ASM           A480        None
                   -refs- (SEG=A480, FILE=MAIN.ASM) 466
RECTOG              487        MAIN.ASM           A480        None
                   -refs- (SEG=A480, FILE=MAIN.ASM) 470
REDB                77         TITLE.ASM          None        None
REDL                78         TITLE.ASM          None        None
REG0                128        equates.asm        None        None
                   -refs- (SEG=A480, FILE=INTER.ASM) 9 39
                          (SEG=A480, FILE=CONTRAST.ASM) 8 37 45 63 91 114
                          (SEG=A480, FILE=ir.asm) 256 267 273
                          (SEG=A480, FILE=TITLE.ASM) 192
REG1                129        equates.asm        None        None
                   -refs- (SEG=A480, FILE=INIT.ASM) 72
                          (SEG=A480, FILE=CONTRAST.ASM) 404 424
                          (SEG=A480, FILE=TITLE.ASM) 199
REG2                130        equates.asm        None        None
                   -refs- (SEG=A480, FILE=MAIN.ASM) 787
                          (SEG=A480, FILE=CONTRAST.ASM) 9 36 121 132
                          (SEG=A480, FILE=TITLE.ASM) 142 169 186 218 239
REG3                131        equates.asm        None        None
                   -refs- (SEG=A480, FILE=MAIN.ASM) 791 869
                          (SEG=A480, FILE=CONTRAST.ASM) 10 35 46 62
                          (SEG=A480, FILE=ir.asm) 257 266 272
                          (SEG=A480, FILE=TITLE.ASM) 145
REG4                132        equates.asm        None        None
                   -refs- (SEG=A480, FILE=CONTRAST.ASM) 80
                          (SEG=A480, FILE=ir.asm) 122 207
REG5                133        equates.asm        None        None
                   -refs- (SEG=A480, FILE=ir.asm) 123 130 141 149 206
REG6                134        equates.asm        None        None
REG7                135        equates.asm        None        None
RELEASE1            669        MAIN.ASM           None        None
                   -refs- (SEG=A480, FILE=MAIN.ASM) 670
RELEASE2            542        MAIN.ASM           A480        None
RELEASE3            578        MAIN.ASM           A480        None
REPEAT              471        ir.asm             A480        None
                   -refs- (SEG=A480, FILE=ir.asm) 381 384 388 402 413 425 431 453
REPEAT_FLAG         410        equates.asm        None        None
                   -refs- (SEG=A480, FILE=ir.asm) 11 50 326 468 471 480
RESTORE             426        equates.asm        None        None
                   -refs- (SEG=A480, FILE=MAIN.ASM) 435 726 758
RESYNC              486        MAIN.ASM           A480        None
                   -refs- (SEG=A480, FILE=MAIN.ASM) 477
RETEXT              485        MAIN.ASM           A480        None
                   -refs- (SEG=A480, FILE=MAIN.ASM) 468
REVFLAG             413        equates.asm        None        None
                   -refs- (SEG=A480, FILE=MAIN.ASM) 727 729 768
RGB_OUT             90         CONTRAST.ASM       None        None
                   -refs- (SEG=A480, FILE=MAIN.ASM) 516 534 605 628 983
                          (SEG=A480, FILE=CONTRAST.ASM) 33 225
ROMEND              15         ropti.asm          None        None
                   -refs- (SEG=A480, FILE=ropti.asm) 19
ROW1                17         equates.asm        None        None
                   -refs- (SEG=A480, FILE=MAIN.ASM) 412 418 576 579 738 741
ROW2                18         equates.asm        None        None
                   -refs- (SEG=A480, FILE=MAIN.ASM) 420 426 540 543 666 671
RQEND               460        equates.asm        None        None
                   -refs- (SEG=None, FILE=equates.asm) 461
                          (SEG=A480, FILE=MAIN.ASM) 872
                          (SEG=A480, FILE=INTER.ASM) 18
RQPOP               464        equates.asm        None        None
                   -refs- (SEG=None, FILE=equates.asm) 465
                          (SEG=A480, FILE=MAIN.ASM) 163 862 870 871 873
RQPUS               463        equates.asm        None        None
                   -refs- (SEG=None, FILE=equates.asm) 464
                          (SEG=A480, FILE=MAIN.ASM) 162 863
                          (SEG=A480, FILE=INTER.ASM) 13 15 16 19
RQUE                459        equates.asm        None        None
                   -refs- (SEG=None, FILE=equates.asm) 460
                          (SEG=A480, FILE=MAIN.ASM) 162 163 873
                          (SEG=A480, FILE=INTER.ASM) 19
RX_FLAG             93         equates.asm        None        None
R_VIDEO             538        MAIN.ASM           None        None
                   -refs- (SEG=A480, FILE=MAIN.ASM) 478
```

```
S14                     154         equates.asm         None            None
        -refs-  (SEG=None, FILE=equates.asm) 159
                (SEG=A480, FILE=INIT.ASM) 240 267
S16                     159         equates.asm         None            None
        -refs-  (SEG=A480, FILE=INIT.ASM) 258
S4                      158         equates.asm         None            None
S8                      155         equates.asm         None            None
        -refs-  (SEG=A480, FILE=INIT.ASM) 249 276 285
SCGA                    156         equates.asm         None            None
        -refs-  (SEG=A480, FILE=INIT.ASM) 185
SCLR                    151         equates.asm         None            None
        -refs-  (SEG=A480, FILE=INIT.ASM) 194
SCONVAL                 316         equates.asm         None            None
        -refs-  (SEG=A480, FILE=MAIN.ASM) 150
SEGA                    157         equates.asm         None            None
        -refs-  (SEG=None, FILE=equates.asm) 158
                (SEG=A480, FILE=INIT.ASM) 222 294 303 331
SEL10                   37          equates.asm         None            None
SEL11                   28          equates.asm         None            None
SEL12                   29          equates.asm         None            None
SEL14                   84          equates.asm         None            None
        -refs-  (SEG=A480, FILE=MAIN.ASM) 649 650
                (SEG=A480, FILE=INIT.ASM) 83 88
SEL3                    48          equates.asm         None            None
        -refs-  (SEG=A480, FILE=INIT.ASM) 75 77
SEND_SERIAL             465         ir.asm              A480            None
        -refs-  (SEG=A480, FILE=ir.asm) 399 428 456
SENT_SERIAL             411         equates.asm         None            None
        -refs-  (SEG=A480, FILE=ir.asm) 17 315 318 467 472 475
SERIAL_OUT              489         ir.asm              A480            None
        -refs-  (SEG=A480, FILE=ir.asm) 317 466 474
SHADES                  449         equates.asm         None            None
        -refs-  (SEG=None, FILE=equates.asm) 450
                (SEG=A480, FILE=MAIN.ASM) 211 212 590 677 692 755 830
                (SEG=A480, FILE=INIT.ASM) 143 144
                (SEG=A480, FILE=CONTRAST.ASM) 30
SHADES16                414         equates.asm         None            None
        -refs-  (SEG=A480, FILE=MAIN.ASM) 250
                (SEG=A480, FILE=INIT.ASM) 82
SHA_OUT                 492         CONTRAST.ASM        None            None
        -refs-  (SEG=A480, FILE=MAIN.ASM) 213 591 615 688 693 757 832
                (SEG=A480, FILE=CONTRAST.ASM) 31
SH_040                  512         CONTRAST.ASM        None            None
        -refs-  (SEG=A480, FILE=CONTRAST.ASM) 494
SH_060                  522         CONTRAST.ASM        None            None
        -refs-  (SEG=A480, FILE=CONTRAST.ASM) 510
SH_090                  535         CONTRAST.ASM        None            None
        -refs-  (SEG=A480, FILE=CONTRAST.ASM) 526
SMONO                   152         equates.asm         None            None
        -refs-  (SEG=A480, FILE=MAIN.ASM) 211 678
                (SEG=A480, FILE=INIT.ASM) 145 204 213 231
SNOS                    153         equates.asm         None            None
        -refs-  (SEG=A480, FILE=MAIN.ASM) 614 687 752 827
                (SEG=A480, FILE=CONTRAST.ASM) 494
SREG                    89          ir.asm              A480            None
        -refs-  (SEG=A480, FILE=ir.asm) 102
SRH                     322         equates.asm         None            None
        -refs-  (SEG=None, FILE=equates.asm) 323
                (SEG=A480, FILE=ir.asm) 92 94 128 146 158 205
SRL                     321         equates.asm         None            None
        -refs-  (SEG=None, FILE=equates.asm) 322
                (SEG=A480, FILE=ir.asm) 89 91 138 159 176 204
STABLE                  137         equates.asm         None            None
        -refs-  (SEG=A480, FILE=MAIN.ASM) 802
STEP5                   738         MAIN.ASM            A480            None
        -refs-  (SEG=A480, FILE=MAIN.ASM) 764 770
SW_READ                 408         MAIN.ASM            None            None
        -refs-  (SEG=A480, FILE=MAIN.ASM) 245
SY20                    642         MAIN.ASM            None            None
        -refs-  (SEG=A480, FILE=MAIN.ASM) 639
SY200                   663         MAIN.ASM            None            None
        -refs-  (SEG=A480, FILE=MAIN.ASM) 648
SY40                    647         MAIN.ASM            None            None
        -refs-  (SEG=A480, FILE=MAIN.ASM) 634
SY70                    655         MAIN.ASM            None            None
        -refs-  (SEG=A480, FILE=MAIN.ASM) 650
SY80                    659         MAIN.ASM            None            None
        -refs-  (SEG=A480, FILE=MAIN.ASM) 654
SY900                   665         MAIN.ASM            None            None
        -refs-  (SEG=A480, FILE=MAIN.ASM) 645 661
```

| Symbol | Value | File | Col4 | Col5 |
|---|---|---|---|---|
| SYCOLD | 415 | equates.asm | None | None |
| -refs- | (SEG=A480, FILE=MAIN.ASM) 60 137 277 | | | |
| SYNC | 633 | MAIN.ASM | None | None |
| -refs- | (SEG=A480, FILE=MAIN.ASM) 486 | | | |
| SYNCS | 374 | equates.asm | None | None |
| -refs- | (SEG=None, FILE=equates.asm) 375 376 | | | |
| | (SEG=A480, FILE=MAIN.ASM) 189 274 564 569 | | | |
| | (SEG=A480, FILE=INIT.ASM) 92 | | | |
| SYNC_POL | 261 | MAIN.ASM | None | None |
| -refs- | (SEG=A480, FILE=MAIN.ASM) 197 | | | |
| SY_P20 | 267 | MAIN.ASM | None | None |
| -refs- | (SEG=A480, FILE=MAIN.ASM) 264 | | | |
| SY_P80 | 276 | MAIN.ASM | None | None |
| -refs- | (SEG=A480, FILE=MAIN.ASM) 268 270 | | | |
| TASKT | 255 | equates.asm | None | None |
| -refs- | (SEG=A480, FILE=MAIN.ASM) 216 | | | |
| TC1 | 239 | equates.asm | None | None |
| -refs- | (SEG=A480, FILE=ir.asm) 69 | | | |
| TC2 | 240 | equates.asm | None. | None |
| -refs- | (SEG=A480, FILE=ir.asm) 83 | | | |
| TC3 | 241 | equates.asm | None | None |
| -refs- | (SEG=A480, FILE=ir.asm) 101 | | | |
| TC4 | 242 | equates.asm | None | None |
| -refs- | (SEG=A480, FILE=ir.asm) 47 321 | | | |
| TCONVAL | 292 | equates.asm | None | None |
| -refs- | (SEG=A480, FILE=MAIN.ASM) 148 | | | |
| TES_A80 | 239 | CONTRAST.ASM | None | None |
| -refs- | (SEG=A480, FILE=CONTRAST.ASM) 233 236 | | | |
| TES_ADD | 72 | CONTRAST.ASM | None | None |
| -refs- | (SEG=A480, FILE=CONTRAST.ASM) 211 218 222 232 235 238 | | | |
| TES_ALL | 230 | CONTRAST.ASM | None | None |
| -refs- | (SEG=A480, FILE=MAIN.ASM) 509 527 600 623 950 | | | |
| TEXT | 546 | MAIN.ASM | None | None |
| -refs- | (SEG=A480, FILE=MAIN.ASM) 485 | | | |
| TEXTKEY | 576 | MAIN.ASM | A480 | None |
| -refs- | (SEG=A480, FILE=MAIN.ASM) 556 561 566 | | | |
| TICK_TC | 237 | equates.asm | None | None |
| -refs- | (SEG=A480, FILE=ir.asm) 220 291 | | | |
| TITB | 225 | equates.asm | None | None |
| -refs- | (SEG=A480, FILE=CONTRAST.ASM) 194 | | | |
| TITG | 224 | equates.asm | None | None |
| -refs- | (SEG=A480, FILE=CONTRAST.ASM) 193 | | | |
| TITLE | 397 | equates.asm | None | None |
| -refs- | (SEG=A480, FILE=CONTRAST.ASM) 191 | | | |
| TITR | 223 | equates.asm | None | None |
| -refs- | (SEG=A480, FILE=CONTRAST.ASM) 192 | | | |
| TITSCR | 90 | TITLE.ASM | None | None |
| -refs- | (SEG=A480, FILE=MAIN.ASM) 57 111 | | | |
| TM40 | 180 | TITLE.ASM | None | None |
| -refs- | (SEG=A480, FILE=TITLE.ASM) 189 | | | |
| TM60 | 187 | TITLE.ASM | None | None |
| -refs- | (SEG=A480, FILE=TITLE.ASM) 188 | | | |
| TMODVAL | 279 | equates.asm | None | None |
| -refs- | (SEG=A480, FILE=MAIN.ASM) 147 | | | |
| TO_GRAF | 563 | MAIN.ASM | A480 | None |
| -refs- | (SEG=A480, FILE=MAIN.ASM) 547 | | | |
| TO_H_G | 557 | MAIN.ASM | None | None |
| -refs- | (SEG=A480, FILE=MAIN.ASM) 550 | | | |
| TO_H_T | 552 | MAIN.ASM | None | None |
| -refs- | (SEG=A480, FILE=MAIN.ASM) 549 | | | |
| TO_TEXT | 568 | MAIN.ASM | A480 | None |
| -refs- | (SEG=A480, FILE=MAIN.ASM) 548 931 | | | |
| TRUE_DATA | 182 | ir.asm | A480 | None |
| -refs- | (SEG=A480, FILE=ir.asm) 179 | | | |
| TTBSTA | 273 | TITLE.ASM | None | None |
| -refs- | (SEG=A480, FILE=TITLE.ASM) 119 | | | |
| TUPDAT | 61 | TITLE.ASM | None | None |
| TURN_CLEAR_OFF | 745 | MAIN.ASM | A480 | None |
| -refs- | (SEG=A480, FILE=MAIN.ASM) 720 | | | |
| TWIP50 | 415 | CONTRAST.ASM | None | None |
| -refs- | (SEG=A480, FILE=CONTRAST.ASM) 413 | | | |
| TWIP70 | 423 | CONTRAST.ASM | None | None |
| -refs- | (SEG=A480, FILE=CONTRAST.ASM) 421 | | | |
| TWIPD | 403 | CONTRAST.ASM | None | None |
| -refs- | (SEG=A480, FILE=MAIN.ASM) 599 603 622 626 | | | |
| TWIPER | 450 | equates.asm | None | None |
| -refs- | (SEG=None, FILE=equates.asm) 452 | | | |
| | (SEG=A480, FILE=MAIN.ASM) 595 598 602 619 621 625 | | | |
| | (SEG=A480, FILE=CONTRAST.ASM) 28 406 | | | |

| Symbol | Value | File | Seg | Other |
|---|---|---|---|---|
| TXLED | 8 | equates.asm | None | None |
| -refs- | (SEG=A480, FILE=MAIN.ASM) 130 554 559 565 572 | | | |
| | (SEG=A480, FILE=INIT.ASM) 105 | | | |
| TX_FLAG | 94 | equates.asm | None | None |
| -refs- | (SEG=A480, FILE=MAIN.ASM) 152 | | | |
| T_A70 | 78 | CONTRAST.ASM | None | None |
| -refs- | (SEG=A480, FILE=CONTRAST.ASM) 75 | | | |
| T_A90 | 82 | CONTRAST.ASM | None | None |
| -refs- | (SEG=A480, FILE=CONTRAST.ASM) 77 | | | |
| U1NOT | 87 | equates.asm | None | None |
| -refs- | (SEG=A480, FILE=MAIN.ASM) 47 129 | | | |
| | (SEG=A480, FILE=TITLE.ASM) 91 111 | | | |
| U1_S30 | 829 | MAIN.ASM | None | None |
| -refs- | (SEG=A480, FILE=MAIN.ASM) 826 | | | |
| U1_S40 | 831 | MAIN.ASM | None | None |
| -refs- | (SEG=A480, FILE=MAIN.ASM) 828 | | | |
| U1_SETUP | 817 | MAIN.ASM | None | None |
| -refs- | (SEG=A480, FILE=INIT.ASM) 154 | | | |
| UART_50 | 22 | INTER.ASM | None | None |
| -refs- | (SEG=A480, FILE=INTER.ASM) 10 | | | |
| UART_60 | 28 | INTER.ASM | None | None |
| -refs- | (SEG=A480, FILE=INTER.ASM) 25 | | | |
| UART_70 | 34 | INTER.ASM | None | None |
| -refs- | (SEG=A480, FILE=INTER.ASM) 32 | | | |
| UART_90 | 38 | INTER.ASM | None | None |
| -refs- | (SEG=A480, FILE=INTER.ASM) 18 20 27 | | | |
| UART_I | 6 | INTER.ASM | None | None |
| -refs- | (SEG=A480, FILE=MAIN.ASM) 22 | | | |
| UPDATE_LAST | 203 | ir.asm | A480 | None |
| -refs- | (SEG=A480, FILE=ir.asm) 130 141 149 | | | |
| VALID_FRAME | 121 | ir.asm | A480 | None |
| VERTSY | 129 | TITLE.ASM | None | None |
| -refs- | (SEG=A480, FILE=TITLE.ASM) 234 | | | |
| VETTI350 | 393 | equates.asm | None | None |
| -refs- | (SEG=A480, FILE=CONTRAST.ASM) 160 | | | |
| VETTI400 | 383 | equates.asm | None | None |
| -refs- | (SEG=A480, FILE=CONTRAST.ASM) 159 | | | |
| VGA350 | 392 | equates.asm | None | None |
| VGA400 | 391 | equates.asm | None | None |
| VGA480 | 390 | equates.asm | None | None |
| VGA8 | 210 | equates.asm | None | None |
| -refs- | (SEG=A480, FILE=CONTRAST.ASM) 156 | | | |
| VGAG | 209 | equates.asm | None | None |
| -refs- | (SEG=A480, FILE=CONTRAST.ASM) 155 | | | |
| VGAR | 208 | equates.asm | None | None |
| -refs- | (SEG=A480, FILE=CONTRAST.ASM) 154 | | | |
| VGA_GRAF | 382 | equates.asm | None | None |
| -refs- | (SEG=A480, FILE=MAIN.ASM) 548 563 582 | | | |
| | (SEG=A480, FILE=INIT.ASM) 104 | | | |
| | (SEG=A480, FILE=CONTRAST.ASM) 153 | | | |
| VGA_TEXT | 381 | equates.asm | None | None |
| -refs- | (SEG=A480, FILE=MAIN.ASM) 547 568 581 | | | |
| | (SEG=A480, FILE=CONTRAST.ASM) 147 | | | |
| VIDCLT | 257 | equates.asm | None | None |
| -refs- | (SEG=A480, FILE=MAIN.ASM) 208 | | | |
| VS1 | 10 | ropti.asm | A480 | None |
| VS100 | 144 | TITLE.ASM | None | None |
| -refs- | (SEG=A480, FILE=TITLE.ASM) 140 | | | |
| VS110 | 147 | TITLE.ASM | None | None |
| -refs- | (SEG=A480, FILE=TITLE.ASM) 163 | | | |
| VS120 | 155 | TITLE.ASM | None | None |
| -refs- | (SEG=A480, FILE=TITLE.ASM) 149 | | | |
| VS140 | 159 | TITLE.ASM | None | None |
| -refs- | (SEG=A480, FILE=TITLE.ASM) 153 | | | |
| VS150 | 162 | TITLE.ASM | None | None |
| -refs- | (SEG=A480, FILE=TITLE.ASM) 152 157 | | | |
| VS2 | 12 | ropti.asm | A480 | None |
| -refs- | (SEG=A480, FILE=ropti.asm) 9 | | | |
| VS200 | 165 | TITLE.ASM | None | None |
| -refs- | (SEG=A480, FILE=TITLE.ASM) 143 166 | | | |
| VS210 | 170 | TITLE.ASM | None | None |
| -refs- | (SEG=A480, FILE=TITLE.ASM) 171 | | | |
| VS220 | 178 | TITLE.ASM | None | None |
| -refs- | (SEG=A480, FILE=TITLE.ASM) 179 | | | |
| VSAH | 35 | equates.asm | None | None |
| VSCNT | 432 | equates.asm | None | None |
| -refs- | (SEG=None, FILE=equates.asm) 445 | | | |
| | (SEG=A480, FILE=MAIN.ASM) 157 | | | |

```
                        (SEG=A480, FILE=ir.asm) 221 222 226
VSIN             41      equates.asm           None          None
        -refs- (SEG=A480, FILE=ir.asm) 230
                (SEG=A480, FILE=ropti.asm) 10 12
VSOFF            59      TITLE.ASM             None          None
        -refs- (SEG=A480, FILE=TITLE.ASM) 174
VSON             58      TITLE.ASM             None          None
        -refs- (SEG=A480, FILE=TITLE.ASM) 130 132 167 172
VSYNC           376      equates.asm           None          None
        -refs- (SEG=A480, FILE=ropti.asm) 9
VT220           394      equates.asm           None          None
        -refs- (SEG=A480, FILE=MAIN.ASM) 220 634
                (SEG=A480, FILE=INTER.ASM) 60
                (SEG=A480, FILE=CONTRAST.ASM) 185
                (SEG=A480, FILE=ir.asm) 235 250
VTEXB           214      equates.asm           None          None
        -refs- (SEG=A480, FILE=CONTRAST.ASM) 150
VTEXG           213      equates.asm           None          None
        -refs- (SEG=A480, FILE=CONTRAST.ASM) 149
VTEXR           212      equates.asm           None          None
        -refs- (SEG=A480, FILE=CONTRAST.ASM) 148
V_M50           447      MAIN.ASM              None          None
V_MINUS         445      MAIN.ASM              None          None
        -refs- (SEG=A480, FILE=MAIN.ASM) 474
V_MOVE          345      MAIN.ASM              None          None
        -refs- (SEG=A480, FILE=MAIN.ASM) 441 449 822
V_P20           437      MAIN.ASM              None          None
        -refs- (SEG=A480, FILE=MAIN.ASM) 434
V_P50           439      MAIN.ASM              None          None
V_PLUS          433      MAIN.ASM              None          None
        -refs- (SEG=A480, FILE=MAIN.ASM) 464
V_POS           346      equates.asm           None          None
        -refs- (SEG=None, FILE=equates.asm) 347
                (SEG=A480, FILE=MAIN.ASM) 348 349 357 440 448 818
                (SEG=A480, FILE=INIT.ASM) 134
WAIT_VS_START     8      ropti.asm             A480          None
WARM20           91      MAIN.ASM              None          None
WARM24           96      MAIN.ASM              None          None
        -refs- (SEG=A480, FILE=MAIN.ASM) 92 127
WARM26           99      MAIN.ASM              None          None
        -refs- (SEG=A480, FILE=MAIN.ASM) 95 124
WARM30          104      MAIN.ASM              None          None
        -refs- (SEG=A480, FILE=MAIN.ASM) 101
WARM35          109      MAIN.ASM              None          None
        -refs- (SEG=A480, FILE=MAIN.ASM) 106
WARM40          126      MAIN.ASM              None          None
        -refs- (SEG=A480, FILE=MAIN.ASM) 115
WARM50          128      MAIN.ASM              None          None
        -refs- (SEG=A480, FILE=MAIN.ASM) 120 125
WARM60          141      MAIN.ASM              None          None
        -refs- (SEG=A480, FILE=MAIN.ASM) 137
WARM80          184      MAIN.ASM              None          None
        -refs- (SEG=A480, FILE=MAIN.ASM) 186
WHIT             76      TITLE.ASM             None          None
        -refs- (SEG=A480, FILE=TITLE.ASM) 274 274 274 274 275 275
                276 276 276 276 277 277 278 278 278 278 279
                279 280 280 280 280 281 281 282 282 282 282
                283 283 284 284 284 284 285 285 286 286 286
                286 287 287 288 288 288 288 289 289
WHITE            75      TITLE.ASM             None          None
        -refs- (SEG=A480, FILE=TITLE.ASM) 76 240
XDATA             0      shell.asm             None          None
XEMPTY          418      equates.asm           None          None
        -refs- (SEG=A480, FILE=MAIN.ASM) 179 1039
                (SEG=A480, FILE=INTER.ASM) 26 29
XID             996      MAIN.ASM              None          None
        -refs- (SEG=A480, FILE=MAIN.ASM) 990
XID220          998      MAIN.ASM              None          None
        -refs- (SEG=A480, FILE=MAIN.ASM) 1011
XID240         1003      MAIN.ASM              None          None
        -refs- (SEG=A480, FILE=MAIN.ASM) 1000
XID900         1013      MAIN.ASM              None          None
        -refs- (SEG=A480, FILE=MAIN.ASM) 1002
XMIT           1036      MAIN.ASM              None          None
        -refs- (SEG=A480, FILE=MAIN.ASM) 890 1007
XMIT90         1041      MAIN.ASM              None          None
        -refs- (SEG=A480, FILE=MAIN.ASM) 1039
XPTR            469      equates.asm           None          None
        -refs- (SEG=None, FILE=equates.asm) 470
                (SEG=A480, FILE=MAIN.ASM) 934 1005 1008 1010
```

```
XQEND              462      equates.asm          None          None
     -refs- (SEG=None, FILE=equates.asm) 463
            (SEG=A480, FILE=MAIN.ASM) 1029
            (SEG=A480, FILE=INTER.ASM) 32
XQPOP              466      equates.asm          None          None
     -refs- (SEG=None, FILE=equates.asm) 468
            (SEG=A480, FILE=MAIN.ASM) 165 883 1000
            (SEG=A480, FILE=INTER.ASM) 23 30 31 33 35
XQPUS              465      equates.asm          None          None
     -refs- (SEG=None, FILE=equates.asm) 466
            (SEG=A480, FILE=MAIN.ASM) 164 887 1004 1027 1037
            (SEG=A480, FILE=INTER.ASM) 25
XQUE               461      equates.asm          None          None
     -refs- (SEG=None, FILE=equates.asm) 462
            (SEG=A480, FILE=MAIN.ASM) 164 165 1030
            (SEG=A480, FILE=INTER.ASM) 33
```

RECOMMENDED SETUP PROCEDURE FOR THE A720C

Description of setup

Each A720C has 9 control that require adjustment. The three controls near the edge of the center blue board are for adjusting the offset voltage for each of the three analog video signals red, green and blue from a VGA video board. The three controls next to the VGA offset controls are for adjusting the offset voltage for each of the three analog video signals red, green and blue for a MAC II. There is a single control on each board near the panels that adjusts the contrast or color of each panel. The bottom board is red, the middle board is blue and the top board is green. All of these controls must be adjusted in order to provide proper color balance.

Required equipment

1. PC with VGA video board, color monitor, video cable and serial interface.
2. The A720C Bremote program for the PC.
3. Mac II with video cable.
4. Small screw driver or adjustment tool for adjusting the controls.
5. Voltmeter for measuring the contrast voltages.
6. Log book for tracking contrast voltage variations.
7. A720C remote control.
8. A bright overhead projector (OP) like the Proxima projector by Dukane.

Step by step procedure

1. Maintain the temperature in the setup room between 20 and 25 degrees C. or 68 to 77 degrees F. Temperature affects the setting of the color balance.
2. It is necessary for the PC to have a complete path to a color monitor when it is first powered up. Either a cheater plug or an A720C may be used to complete the path. Turn on the power to the PC.
3. If not already done, remove the top plastic cover from an A720C.
4. Lift and tilt the boards so the contrast controls are accessible.
5. In order to have access to the green contrast voltage test point, disconnect the LCD panel cable to the top green board.
6. While on the bench (do not place on OH), connect the power cable to the A720C.
7. Turn on the power to the A720C.
8. Preset the contrast controls by adjusting the three contrast controls (one on each board) until; red (control is on bottom board)=17 volts, blue (middle board)=18 volts, and green (top board)=19 volts. At this point, it is not necessary to set the voltages exactly. Each contrast voltage can be measured at its corresponding test point on the green board. The test points for the red and blue contrasts voltages (labeled "R" and "B") are near the J6 connector at the lower right of the top green board. The test point for the green contrast voltage (labeled "G") is to the left of the LCD panel connector. Clip the ground lead of the voltmeter to the heat plate of the voltage regulator on the top green board. Red can now be measured at test point "R", green at test point "G", and blue at test point "B".
9. Turn the power off to the A720C. Reconnect the LCD panel cable to the top green board.
10. Place the A720C on the overhead projector. Until the color balance setup is complete (at the end of step 19), the time on the overhead projector should be kept to a minimum (not more than 10 minutes and it possible, less than 7 minutes).
11. Connect the serial cable to the PC and A720C. For proper setup of the color balance, the serial cable must be connected to the PC and the A720C.
12. Connect the video cable from the VGA board to the A720C.
13. Turn on the power to the A720C. For about one second, the A720C should project a checker board pattern of color bars and white bars. From this point, be sure not to touch the "COLOR+", "COLOR−", "CONTRAST+" or "CONTRAST−" on the remote or keypad. Cycle the power on/off if one of these keys is touched.
14. If not already started, start the batch setup program by typing "CAL720" on the PC. Press "ALT" "A" and then the "ENTER" key on the PC. If started, press the "FWD" key on the remote until the first screen of vertical lines appears.
15. The first screen contains vertical lines to allow setup of the sync knob. The A720C must be in sync for proper color balance setup. Turn the sync knob until the lines are straight and no waving of the lines occur. The sync knob is the white knob on the middle board near the power switch. Press the "FWD" key on the remote control to advance to the next screen.

16. The second screen contains a large "X" for the purpose of aligning the A720C on the OP. A line should be flashing at the top of the screen. Move the A720C until the lines of the "X" appear white and no separate color lines appear. Again press the "FWD" key on the remote.

17. The third screen contains 64 shade of each of the three primary colors red, green and blue. The purpose of this screen is to adjust the three offset controls for the analog VGA video signals of red, green and blue. The three controls are at the edge of the middle board and are labeled on the p.c. board with "R", "G" and "B". Press the "8 COLOR" key on the A720C remote control (the "EXIT" key on the A408SC remote). This places the A720C in the 8 color only mode. Adjust each control until the corresponding color on the screen has its top row all black and its second row is all in color. Some bars may appear to have stripes. Place the striped bars on the upper line for each color. When complete press the "8 COLOR" key on the A720C remote (the "EXIT" key on the A480SC remote) to return to normal colors and the "FWD" key to advance to the next screen.

18. The fourth screen contains 16 color bars. Double check the offset settings by pressing the "REV VID" key on the remote. The original black background should all be the same color of white. If two shades of white are seen the offset setup is incorrect and needs to be redone from step 17. If ok, press the "REV VID" key on the remote to return to normal video with a black background.

19. The 16 color bars will now e used to set the initial color balance. This is done by adjusting the three contrast controls locating near the edge of each board. (bottom=red, middle=blue, top=green).

19A. First, make sure the A720C is in normal color mode and not 8 colors only. At the left side of the screen, about half way down, is a pair of green rectangles forming a square. There should be two different shades of green in the square. If there is only one shade then the A720C is still in the 8 color only mode. In this case it is necessary to use the "8 COLOR" key on the A720C remote (the "EXIT" key on the A480SC remote) to toggle between 8 color only mode and full color mode. Also, it is mandatory that the line at the top of the screen is flashing. If the line is not flashing, either the serial link is not working or the wrong Bremote is installed in the PC.

19B. Second, turn the red contrast control (bottom board) until the red color starts to bleed out of some of the boxes. Bleeding appears as a ghost image above and/or below the box. Now turn the red control back the other way until the bleeding just disappears.

19C. Third, turn the green contrast control (top board) until the green color starts to bleed. Turn the control the other way until the bleeding just disappears.

19D. Fourth, if necessary, turn down the red control (bottom board) until the red bleeding again disappears.

19E. Fifth, turn up the blue control (middle board) until the background appears to start turning blue. Now turn the blue control back the other way until the background again appears black. At this point the grey box in the lower left of the screen should have a very slight blue tint.

19F. Sixth, press the "FWD" key on the remote. The screen contains a picture of Mickey Mouse. The sky behind Mickey should be a dark blue. If the sky appears more black than blue, try turning the blue control (middle board) up until the sky appears dark blue and then press the "REV" key on the remote to recheck the color bars. It may be necessary to re-adjust either red and/or green. If necessary restart step 19. At this point the color is balanced.

20. Turn off the power to the A720C. Remove the LCD panel connector from the green board. Turn on the power to the A720C. Measure the contrast voltages for red, green and blue at the three test points. Record the voltages in the log book.

21. Turn off the power to the A720C. Reinstall the LCD panel cable into the connector on the green top board. Remove the VGA video cable and insert the MAC II cable. Turn on the power to the A720C.

22. Now adjust the offset controls for the MAC II. If not already started, bring up the screen with the 64 shades of each of the primary colors by
   a. double clicking on "PICTViewer" in the "MAC Offset" window.
   b. pulling down the "FILE" menu.
   c. selecting "EXPAND WINDOW TO SCREEN".
   d. pulling down the "FILE" menu.
   e. selecting "OPEN A PICT".
   f. double clicking on "RGB offset".

The MAC II offset controls are located inside of the VGA offset controls and are labeled "R", "G" and "B" on the middle board. Press the "8 COLOR" key on the A720C (the "EXIT" key on an A480SC remote) remote control. This places the A720C in the 8 color only mode. Adjust each control until the corresponding color on the screen has its top two rows in black and its bottom two rows all in color. Some bars may appear to have stripes. Place the striped bars on the second line from the top.

23. Remove all cables and without touching the controls, gently place the boards back into the lower plastic case, taking care not to bump any adjustment.

24. Remove the A720C from the overhead and install the top plastic case. The setup procedure is now complete.

R. M., Engineering, Mar. 26, 1990

What is claimed is:

1. A display system comprising:
   a plurality of liquid crystal display panels, each one of said panels having a plurality of electrically operable pixel elements for displaying color images;
   each liquid crystal panel being interposed between a pair of polarizers that cooperate with said panel for passing a portion of the visible light spectrum to form said color image;
   each one of said panels exhibiting substantially different relative luminance levels as a function of an applied direct current reference voltage level;
   direct current voltage level control means for biasing each one of said panels with a direct current reference voltage level to maximize substantially the luminance of said pixels when fully energized;
   said electrically operable pixels being electrically energized independently of said direct current voltage control means;
   contrast adjustment means for balancing color contrast between each of said panels; and
   said contrast adjustment means causing the direct current reference voltage level for each one of said panels to be adjusted by substantially different offset direct current voltage values to substantially optimize the color contrast between each one of said panels.

2. A display system according to claim 1, wherein said contrast adjustment means includes:
digital to analog converter means for generating analog signals indicative of the direct current voltages to be applied to each one of said panels to substantially optimize the color contrast between said panels; and
a differential amplifier responsive to said analog signals for generating said direct current voltages for each one of said liquid crystal display panels.

3. A display system according to claim 1, wherein each one of said liquid crystal display panels is a nematic liquid crystal display panel.

4. A display system according to claim 3, wherein said nematic liquid crystal display panel is a twisted nematic liquid crystal display panel.

5. A display system according to claim 3, wherein said nematic liquid crystal display panel is a highly twisted nematic liquid crystal display panel.

6. A display system according to claim 3, wherein said nematic liquid crystal display panel is a supertwisted nematic liquid crystal display panel.

7. A display system according to claim 1, wherein said display panel construction includes three monochromatic liquid crystal display panels.

8. A display system according to claim 7, wherein one of said monochromatic liquid crystal display panels in cooperation with its associated polarizers passes non-colored light and colored light, said colored light being substantially in the yellow color spectrum of visible light.

9. A display system according to claim 8, wherein another one of said monochromatic liquid crystal display panels in cooperation with its associated polarizers passes non-colored light and colored light, said colored light being substantially in the magenta color spectrum of visible light.

10. A display system according to claim 9, wherein another one of said monochromatic liquid crystal display panels in cooperation with its associated polarizers passes non-colored light and colored light, said colored light being substantially in the cyan color spectrum of visible light.

11. A display system according to claim 7, wherein one of said monochromatic liquid crystal display panels in cooperation with its associated polarizers passes colored light, said colored light being substantially in the red color spectrum of visible light.

12. A display system according to claim 11, wherein another one of said monochromatic liquid crystal display panels in cooperation with its associated polarizers passes colored light, said colored light being substantially in the green color spectrum of visible light.

13. A display system according to claim 12, wherein another one of said monochromatic liquid crystal display panels passes colored light, said colored light being substantially in the blue color spectrum of visible light.

14. A display system according to claim 1, wherein said liquid crystal panel is an active matrix liquid crystal display panel.

15. A display system according to claim 1, wherein said display panel construction includes a set of active matrix liquid crystal display panels.

16. A display system according to claim 1, wherein said direct current voltage level control means is manually adjustable between a substantially maximum amount of relative luminance when said panel is energized and a substantially minimum amount of relative luminance when said panel is de-energized.

17. A display system according to claim 16, wherein said liquid crystal display panel has two controllable modes of operation in response to said video means, at least one of said modes being a non-white mode.

18. A display system according to claim 1, further including processor means for generating a plurality of displayable test pattern images, each one of said displayable test pattern images having different shades of color.

19. A method for displaying color images comprising;
using a plurality of liquid crystal display panels, each one of said panels having a plurality of electrically operable pixel elements for displaying color images;
interposing each one of said panels between a pair of polarizers that cooperate with said panel for passing a portion of the visible light spectrum to form said color images;
using direct current voltage level control means for biasing each of said panels with a direct current reference voltage;
biasing each of said panels with a direct current reference voltage level to maximize substantially the luminance of pixels when fully energized;
energizing selectively said pixel elements independently of said direct current voltage level control means;
balancing color contrast between each one of said panels by causing the direct current reference voltage level for each one of said panels to be adjusted by substantially different offset direct current voltage values to substantially optimize the color contrast between each one of said panels.

* * * * *